(12) United States Patent
Hernandez et al.

(10) Patent No.: US 12,528,741 B2
(45) Date of Patent: Jan. 20, 2026

(54) COMPOSITIONS FOR CONTROLLING MICROBIALLY INDUCED CONCRETE CORROSION

(71) Applicant: The Regents of the University of Colorado, Denver, CO (US)

(72) Inventors: Mark T. Hernandez, Boulder, CO (US); Ismael Justo Reinoso, Boulder, CO (US); Alejandro Caicedo-Ramirez, Houston, TX (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 691 days.

(21) Appl. No.: 17/793,247

(22) PCT Filed: Jan. 21, 2021

(86) PCT No.: PCT/US2021/014387
§ 371 (c)(1),
(2) Date: Jul. 15, 2022

(87) PCT Pub. No.: WO2021/150735
PCT Pub. Date: Jul. 29, 2021

(65) Prior Publication Data
US 2023/0072595 A1    Mar. 9, 2023

Related U.S. Application Data

(60) Provisional application No. 62/963,985, filed on Jan. 21, 2020.

(51) Int. Cl.
| | | |
|---|---|---|
| *C04B 22/04* | (2006.01) | |
| *C04B 14/02* | (2006.01) | |
| *C04B 14/06* | (2006.01) | |
| *C04B 18/14* | (2006.01) | |
| *C04B 103/30* | (2006.01) | |
| *C04B 103/67* | (2006.01) | |
| *C04B 111/20* | (2006.01) | |

(52) U.S. Cl.
CPC ............ *C04B 22/04* (2013.01); *C04B 14/022* (2013.01); *C04B 14/068* (2013.01); *C04B 18/142* (2013.01); *C04B 2103/302* (2013.01); *C04B 2103/67* (2013.01); *C04B 2111/2092* (2013.01)

(58) Field of Classification Search
CPC ........ A01N 59/20; A01N 59/16; C04B 22/04; C04B 14/022; C04B 14/068; C04B 18/142; C04B 2103/302; C04B 2103/67; C04B 2111/2092; Y02W 30/91
See application file for complete search history.

(56) References Cited

U.S. PATENT DOCUMENTS

| | | |
|---|---|---|
| 10,494,302 B1 | 12/2019 | Ibrahim et al. |
| 2008/0178769 A1 | 7/2008 | Goodwin et al. |
| 2011/0067601 A1 | 3/2011 | Fried |
| 2012/0137933 A1 | 6/2012 | Koh et al. |
| 2016/0286818 A1 | 10/2016 | Hernandez et al. |

FOREIGN PATENT DOCUMENTS

| | | | | |
|---|---|---|---|---|
| CN | 110436954 A | * | 11/2019 | |
| DE | 69736443 T2 | * | 3/2007 | ............... C22B 7/04 |
| EP | 0837043 A1 | * | 4/1998 | |
| PL | 199518 B1 | * | 9/2008 | |

OTHER PUBLICATIONS

Federal Highway Administration Research and Technology, "User Guidelines for Waste and Byproduct Materials in Pavement Construction", Blast Furnace Slag and Steel Slag , Publication No. FHWA-RD-97-148. (Year: 2016).*
"ASTM, C192/C192M-16a: Standard Practice for Making and Curing Concrete Test Specimens in the Laboratory.", ASTM: West Conshohocken, PA, p. 8, 2016.
"International Search Report and Written Opinion dated Jun. 25, 2021 for International Application No. PCT/US21/14387".
Caicedo-Ramirez , "Antimicrobial Aggregates for the In-Situ Control of Microbially Induced Concrete Corrosion", 2018, 1-185.
Hernandez , et al., "Fine aggregate substitution with acidified granular activated carbon influences fresh-state and mechanical properties of ordinary Portland cement mortars", Construction and Building Materials, 207, 2019, 59-69.
Justo-Reinoso, Ismael, "Microstructural and Mechanical Responses of Cementitious Materials to Substitutions with Fine Antimicrobial Aggregates", Bath Symposium Presentation, Sep. 6, 2019.
Justo-Reinoso, Ismael, "Microstructural and Mechanical Responses of Cementitious Materials to Substitutions with Fine Antimicrobial Aggregates.", Chapters 4-5. University of Colorado at Boulder ProQuest Dissertations Publishing, 2018.
Justo-Reinoso, Ismael, "Microstructural responses of Cementitious Materials to Substitutions with Fine Antimicrobial Aggregates.", Thesis Presentation, Nov. 8, 2018.
Justo-Reinoso , et al., "Use of Sustainable Antimicrobial Aggregates for the In-Situ Inhibition of Biogenic Corrosion on Concrete Sewer Pipes", MRS Advances, 4, 2019, 2939-2949.
Justo-Reinoso, Ismael , "Use of Sustainable Antimicrobial Aggregates for the In-Situ Inhibition of Biogenic Corrosion on Concrete Sewer Pipes.", XXVIII International Materials Research Congress, Aug. 19, 2019.

* cited by examiner

*Primary Examiner* — Anthony J Green
(74) *Attorney, Agent, or Firm* — Saul Ewing LLP; Domingos J. Silva; Dennis Ostrovsky

(57) ABSTRACT

This invention provides in one aspect compositions that improve the corrosion-resistance of cementitious materials. In certain embodiments, the compositions of the invention inhibit the growth of acidophilic bacteria thriving in/on cementitious material.

10 Claims, 89 Drawing Sheets

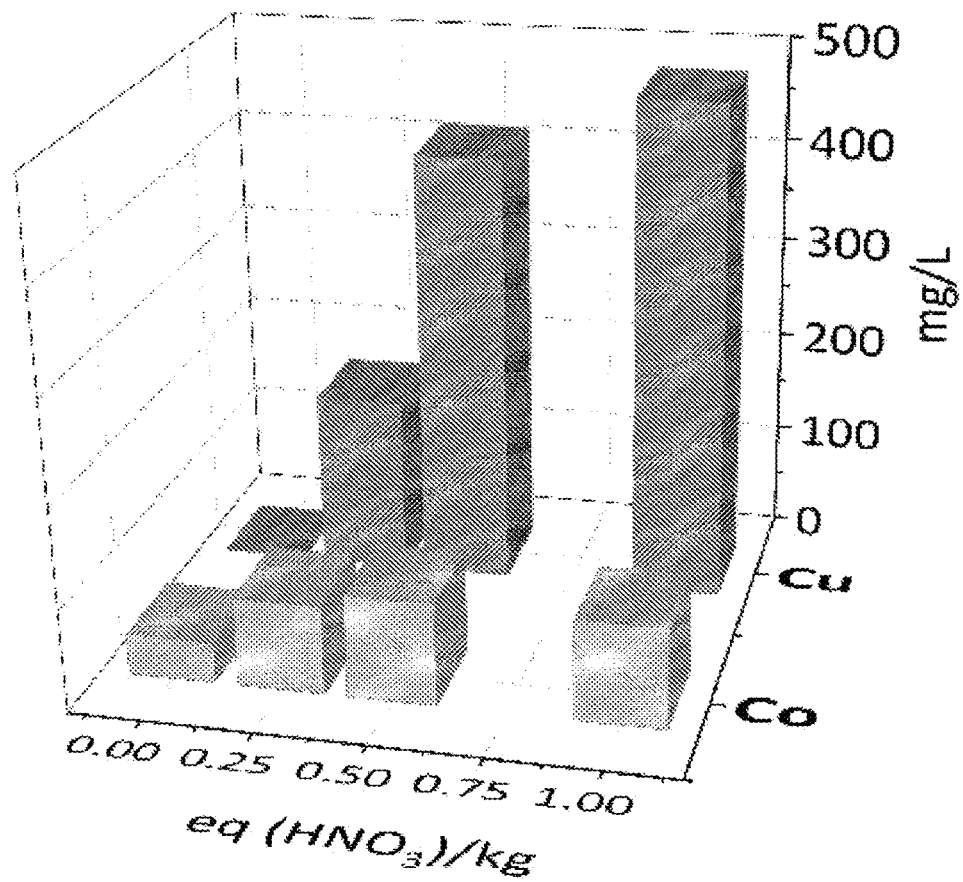

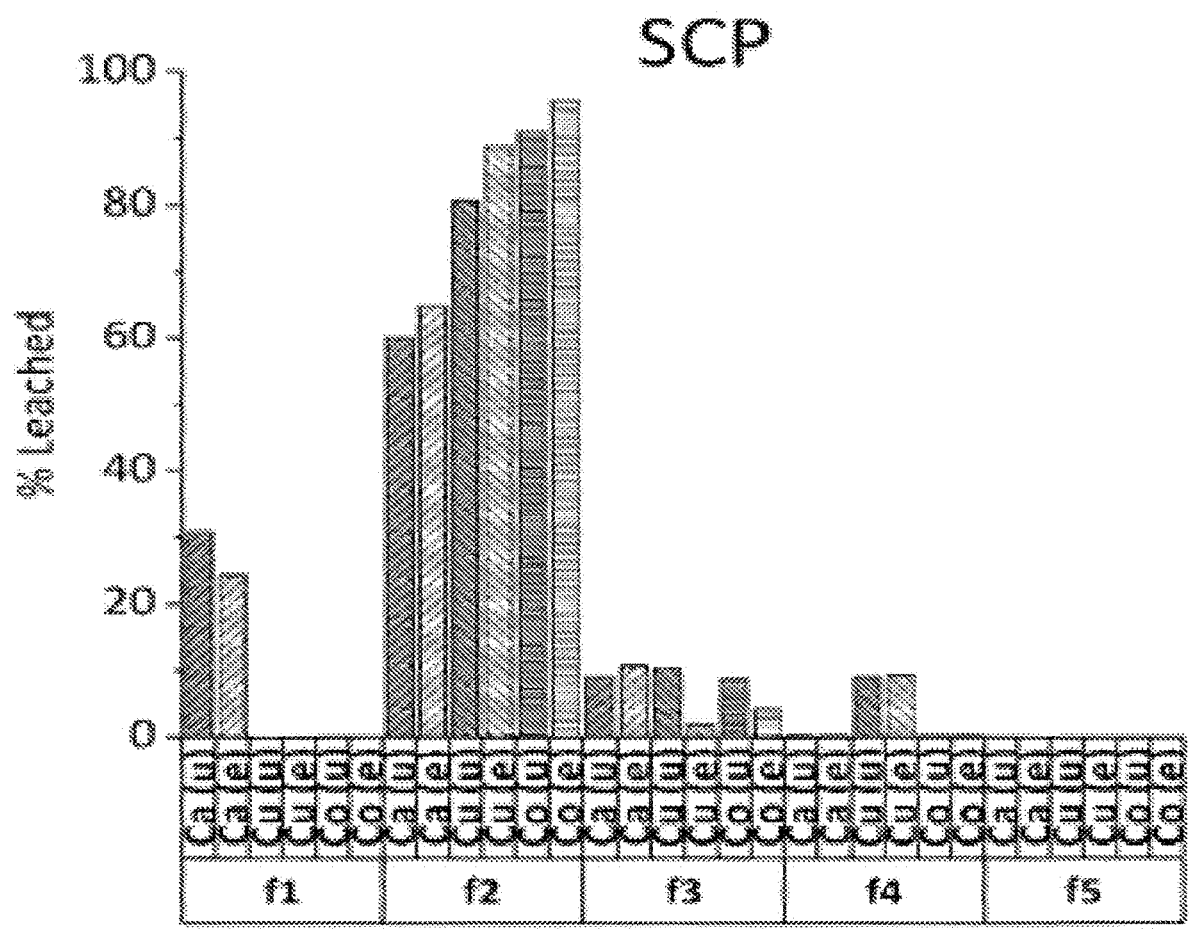

COMPOSITIONS FOR CONTROLLING MICROBIALLY INDUCED CONCRETE CORROSION

CROSS-REFERENCE TO RELATED APPLICATION

The present application is a 35 U.S.C. § 371 national stage application from, and claims priority to, International Application No. PCT/US2021/014387, which claims priority under 35 U.S.C. § 119 (e) to U.S. Provisional Application No. 62/963,985, filed Jan. 21, 2020, all of which applications is applications are incorporated herein by reference in their entireties its entirety

BACKGROUND OF THE INVENTION

Concrete is the most common material used to transport storm water and sewage in the world. It is used for pipes, culverts, tunnels, and a variety of other subterranean appurtenances. Municipalities, water utilities, and many agencies recognize that concrete corrosion is emerging as one of the most serious problems plaguing this critical infrastructure. The dominant form of concrete deterioration in wastewater conveyance systems is microbially mediated (Microbial Induced Concrete Corrosion, also known as MICC). This type of corrosion occurs because of ubiquitous microbiological sulfur cycling within sewers. Below the waterline, sulfate present in wastewater is reduced to sulfide ($H_2S$) under anoxic conditions. This compound partitions into the headspace of pipes and other wastewater structures as a gas, which serves as a substrate for biofilms of acidogenic sulfur-oxidizing bacteria (SOBs) above the waterline. These biofilms produce sulfuric acid, which chemically dissolve the cement binder and compromise the concrete structure.

While current mitigation technologies are focused on developing acid resistant materials, little research has been done on limiting acidophile development in these environments. Thus, there is a need in the art to develop compositions that restrict the development of microbes, specifically acidophiles, in concrete based structures, thereby minimizing the concrete corrosion. The present invention addresses this need.

BRIEF SUMMARY OF THE INVENTION

The present disclosure relates in part to a composition comprising a cementitious substrate and at least one fine aggregate associated with at least one heavy metal, wherein the fine aggregate is present throughout the composition and comprises at least one of granular activated carbon (GAC) and steel slag, or any combinations thereof. In certain embodiments, the GAC comprises unmodified GAC. In certain embodiments, the GAC comprises surface area-modified granular activated carbon (GAC-Acid). In certain embodiments, the steel slag is basic oxygen furnace slag (BOF-S). In certain embodiments, the at least one heavy metal is selected from the group consisting of cadmium (Cd), chromium (Cr), zinc (Zn), copper (Cu), silver (Ag), nickel (Ni), cobalt (Co), lead (Pb), molybdenum (Mo), and tungsten (W). In certain embodiments, the composition makes bioavailable at least a portion of the at least one heavy metal upon contact with an environment having a pH of about 5 or less. In certain embodiments, the bioavailability of the at least one heavy metal reduces or inhibits the growth of acidophilic bacteria within the composition. In certain embodiments, the acidophilic bacteria comprises *Acidithiobacillus thiooxidans* and/or *Acidithiobacillus ferrooxidans*.

In another aspect, the present disclosure relates to a method of preparing a cementitious composition. In yet other aspects, the present disclosure relates to a cementitious composition described herein as prepared by the method described herein.

BRIEF DESCRIPTION OF THE DRAWINGS

The following detailed description of specific embodiments of the invention will be better understood when read in conjunction with the appended drawings. For the purpose of illustrating the invention, specific embodiments are shown in the drawings. It should be understood, however, that the invention is not limited to the precise arrangements and instrumentalities of the embodiments shown in the drawings.

(FIG. 1B) PAC+Cd (18.6 mg/g); and (FIG. 1C) PAC+Cu (10.6 mg/g).

FIG. 4A: $Cu^{2+}$, FIG. 4B: $Ag+$, FIG. 4C: Cu/Ag in combination at a ratio 2:1, FIG. 4D: $Co^{2+}$, and FIG. 4E: Cu/Co in combination at a ratio 1:1. Enrichments were inoculated with 150 μL of biofilm extract from a corroded site and dominated by *Acidithiobacillus* spp. (>95% relative abundance).

FIG. 5A: $Cu^{2+}$, FIG. 5B: $Ag^+$, FIG. 5C: $Cu^{2+}/Ag^+$ in combination at a ratio 2:1, FIG. 5D: $Co^{2+}$, and FIG. 5E: $Cu^{2+}/Co^{2+}$ in combination at a ratio 1:1. Light grey bars indicate enrichment cultures where pH dropped below 2. Dark grey bars indicate batches where pH approached neutrality. (n=3).

FIGS. 12A-12F show solubilized metal from metal-loaded sorbents after exposure to increasing amounts of acid (eq $HNO_3$/kg). FIGS. 12A-12C: metal concentration (mg/L) at equilibrium in the liquid phase at each acid addition and sorbent. FIGS. 12D-12F: metal leached expressed as percentage of the total metal loaded on each sorbent. GAC-Cu: Calgon 20×50 granular activated carbon loaded with copper; GAC-Acid-Cu: Acidified granular activated carbon loaded with copper; GAC-Cu—Co: Calgon 20×50 granular activated carbon co-loaded with copper and cobalt; BOF-S—Cu: BOF slag particles loaded with copper; BOF-S—Cu—Co: BOF slag particles co-loaded with copper and cobalt.

FIGS. 13A-13B: metal concentration (mg/L) at equilibrium in the liquid phase at each acid addition and sorbent. FIGS. 13C-13D: metal leached expressed as percentage of the total metal loaded on each sorbent. GAC-Cu: Calgon 20×50 granular activated carbon loaded with copper; GAC-Acid-Cu: Acidified granular activated carbon loaded with copper; GAC-Cu—Co: Calgon 20×50 granular activated carbon co-loaded with copper and cobalt; BOF-S—Cu: BOF slag particles loaded with copper; BOF-S—Cu—Co: BOF slag particles co-loaded with copper and cobalt.

FIGS. 15A-15C: metal concentration (mg/L) at equilibrium in the liquid phase at each acid addition and mortar. FIGS. 15D-15F: metal leached expressed as percentage of the total metal loaded on each mortar. CUP10: mortar with 10% of sand replaced by GAC-Cu; CHP10: mortar with 10% of sand replaced by GAC-Acid-Cu; CUCP10: mortar with 10% of sand replaced by GAC-Cu—Co; SP: mortar with sand replaced by BOF-S—Cu, volumetrically equivalent to 10% GAC formulations; SCP: mortar with sand replaced by BOF-S—Cu—Co, volumetrically equivalent to 10% GAC formulations.

FIGS. 16A-16B: metal concentration (mg/L) at equilibrium in the liquid phase at each acid addition and mortar. FIGS. 16C-16D: metal leached expressed as percentage of the total metal loaded on each mortar. CUP10: mortar with 10% of sand replaced by GAC-Cu; CHP10: mortar with 10% of sand replaced by GAC-Acid-Cu; CUCP10: mortar with 10% of sand replaced by GAC-Cu—Co; SP: mortar with sand replaced by BOF-S—Cu, volumetrically equivalent to 10% GAC formulations; SCP: mortar with sand replaced by BOF-S—Cu—Co, volumetrically equivalent to 10% GAC formulations.

(FIG. 17B) changes in microbial activity and pH; (FIG. 17C) relative changes of microbial activity (on a cell density basis) over time; and, (FIG. 17D) log-linear relationship between cell dilution and RLU. All observations were concurrently performed in enrichments inoculated with biofilm extracted from the crown of corroding sewers.

(FIG. 18A) Stained bacteria extracted from *Acidithiobacillus* cultures. (FIG. 18B) Stained bacteria (and debris) extracted from corroded mortar specimens.

Universal columns represent average 16S gene copies circumscribed by universal primers. *Acidithiobacillus* columns represent average 16S gene copies circumscribed by probes specific to the genus *Acidithiobacillus*. (n=3).

Figure 30:
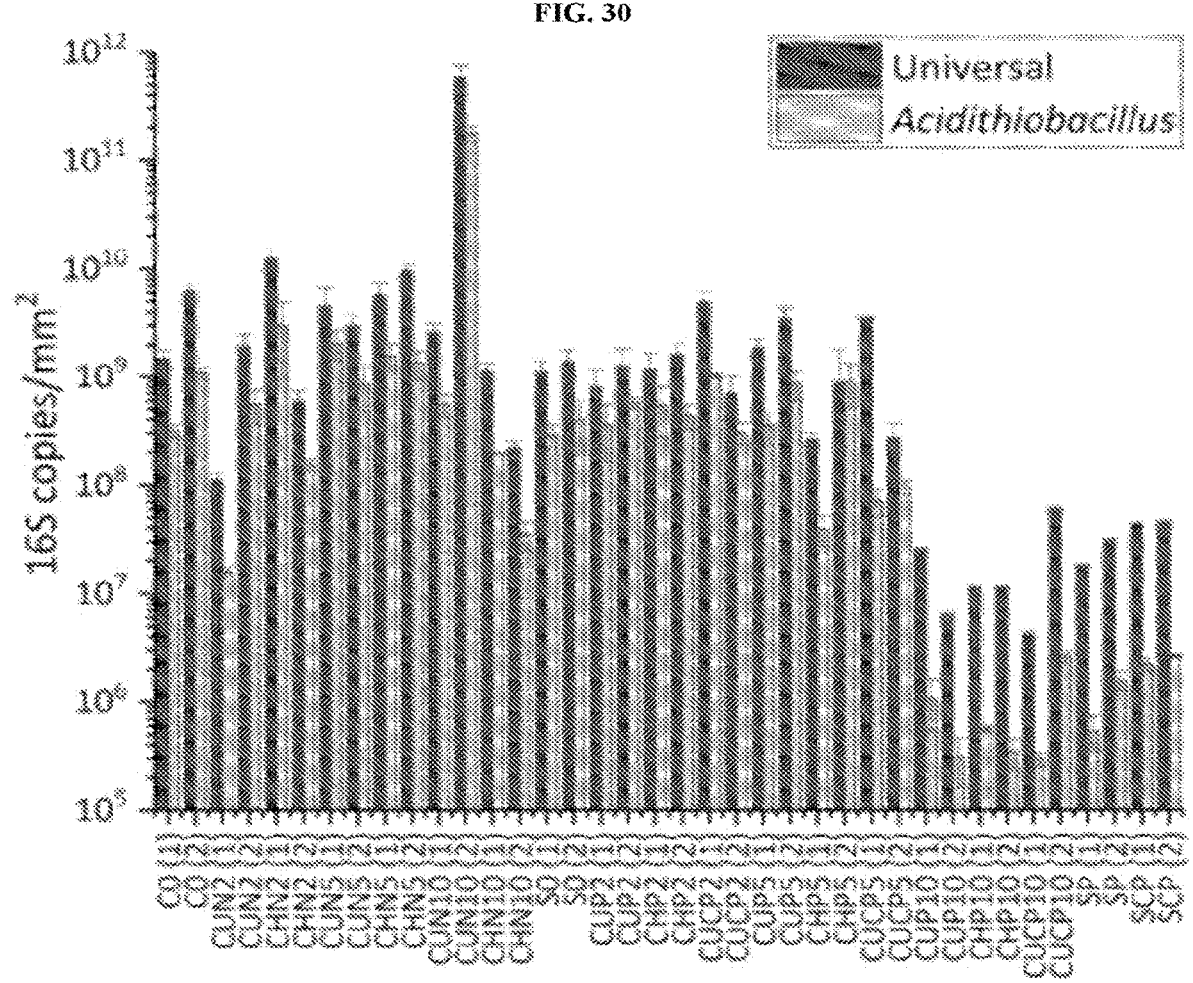

FIG. 30 is a graph showing 16S rRNA gene copies per surface area of each sample. Numbers in parentheses indicate replicates for each formulation. Universal columns represent average 16S gene copies circumscribed by universal primers. *Acidithiobacillus* columns represent average 16S gene copies circumscribed by probes specific to the genus *Acidithiobacillus*. (n=3).

Figure 31:
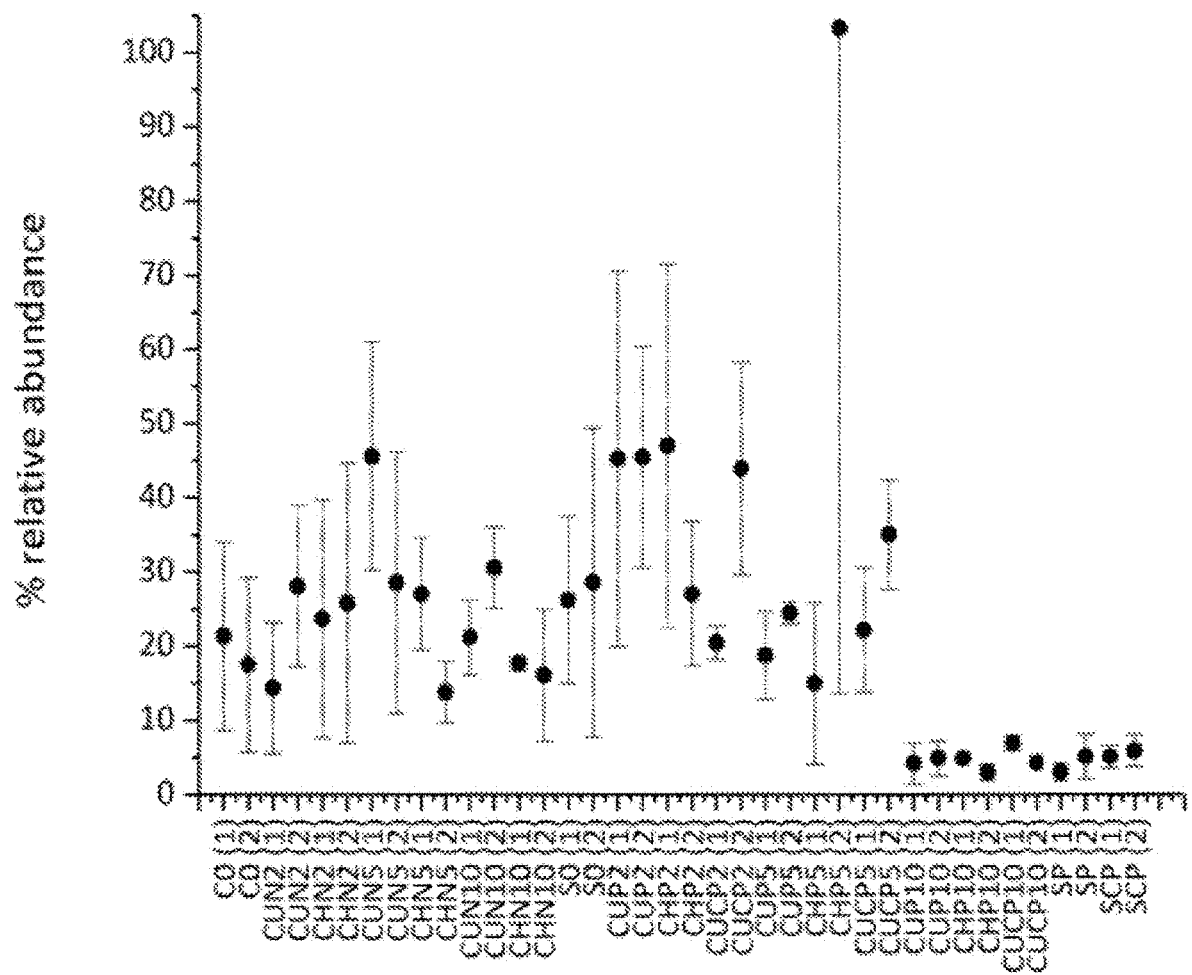

FIG. 31 is a graph showing relative abundance (%) of *Acidithiobacillus*-specific 16S rRNA gene copy numbers from the total universal 16S rRNA gene copy numbers. (n=3).

Figure 32:
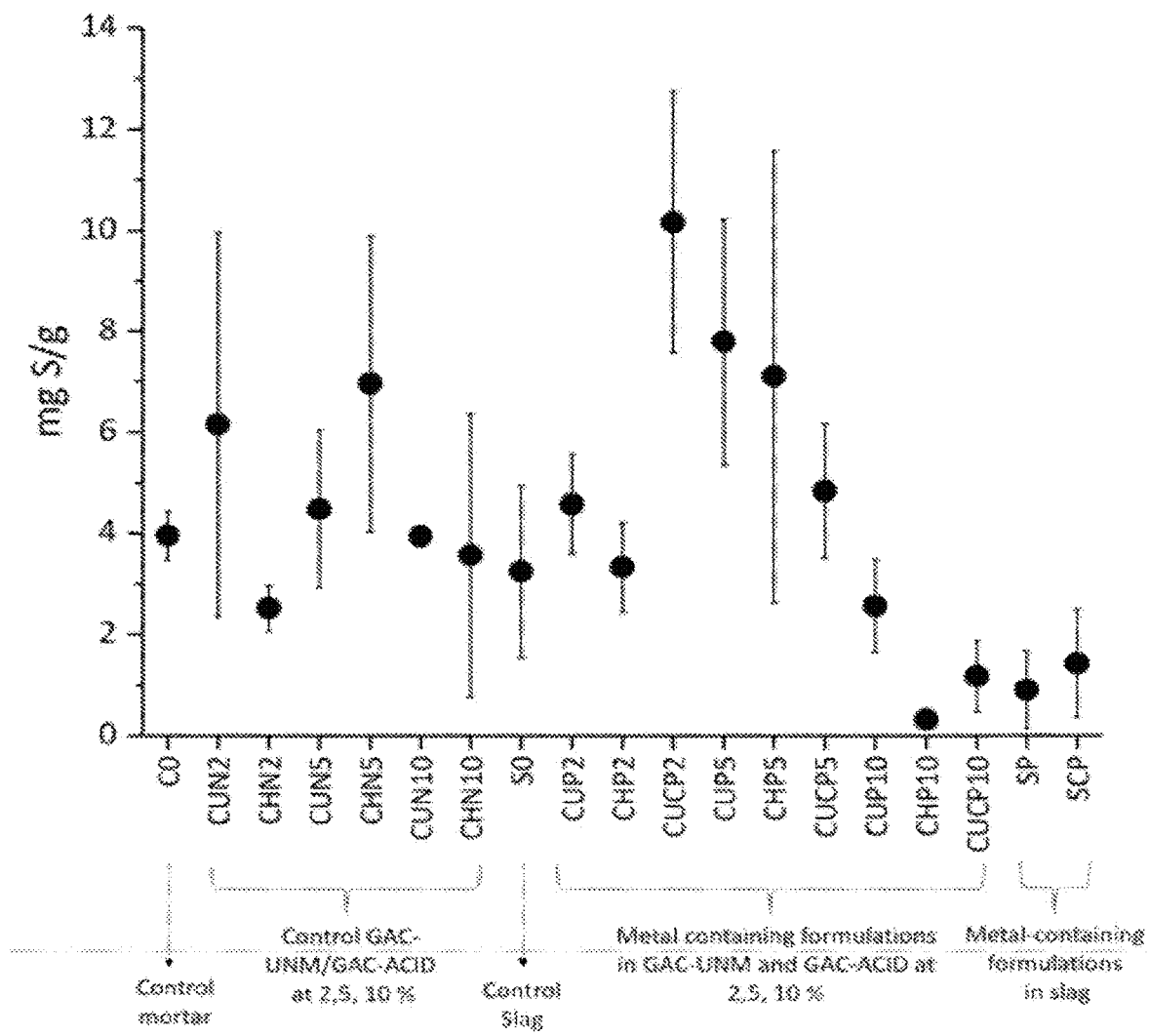

FIG. 32 is a graph showing total sulfur content (mg S) normalized by corrosion product mass obtained for each formulation after 11 months of exposure to a corrosive sewer environment. Bars indicate range of observations.

Figure 33:
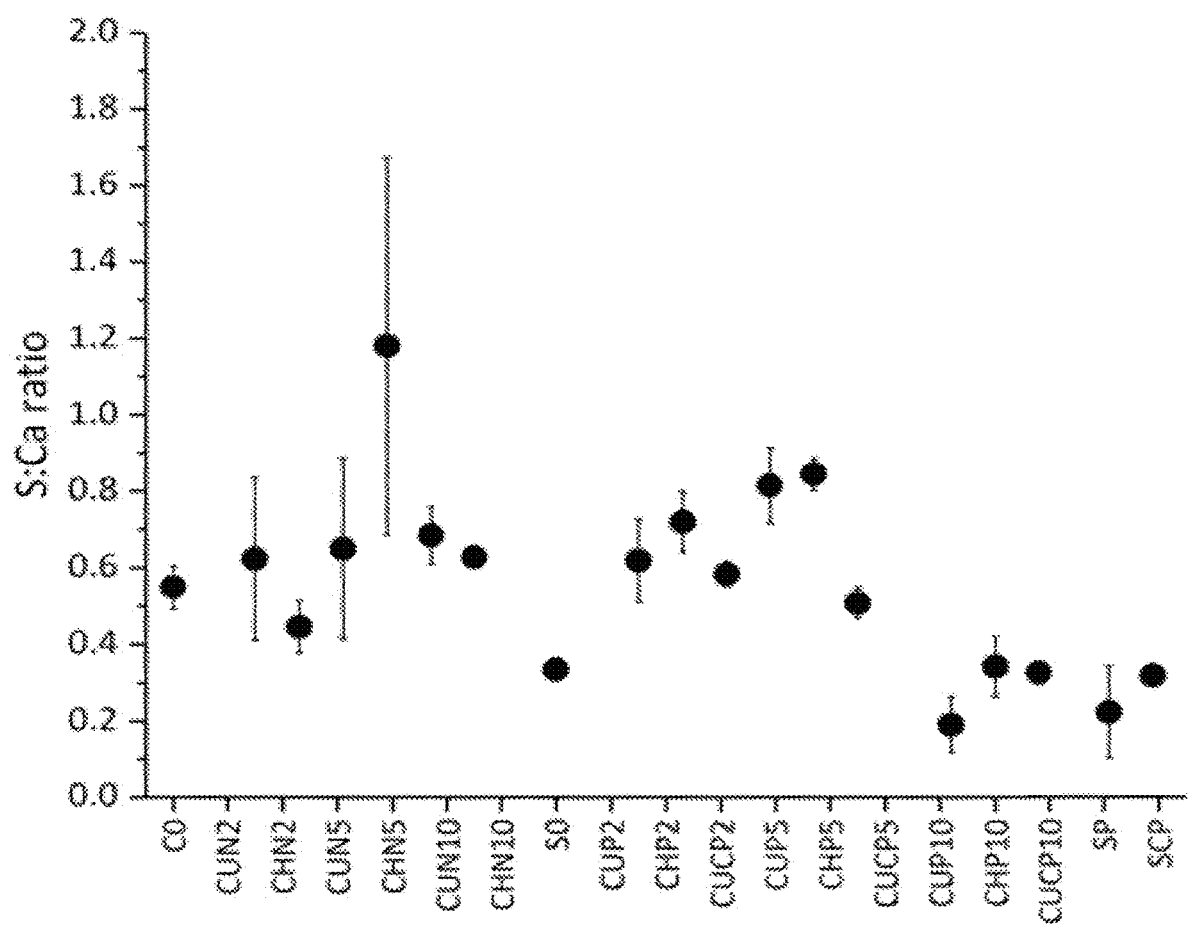

FIG. 33 is a graph showing sulfur-to-calcium ratios obtained from the corrosion suspensions for each formulation at the end of the experiment. Bars indicate range of observations.

Figure 34A:
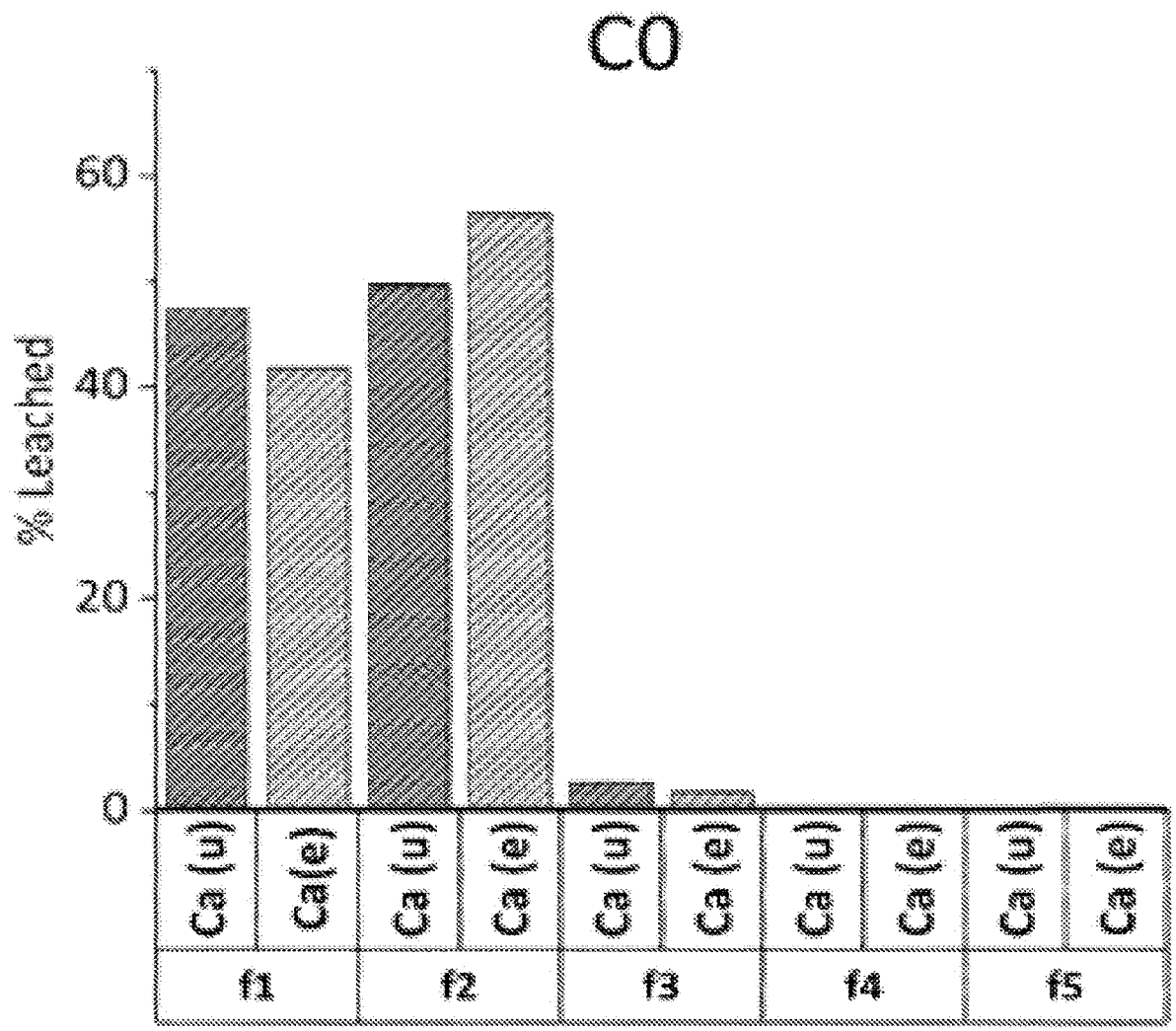
Figure 34B:
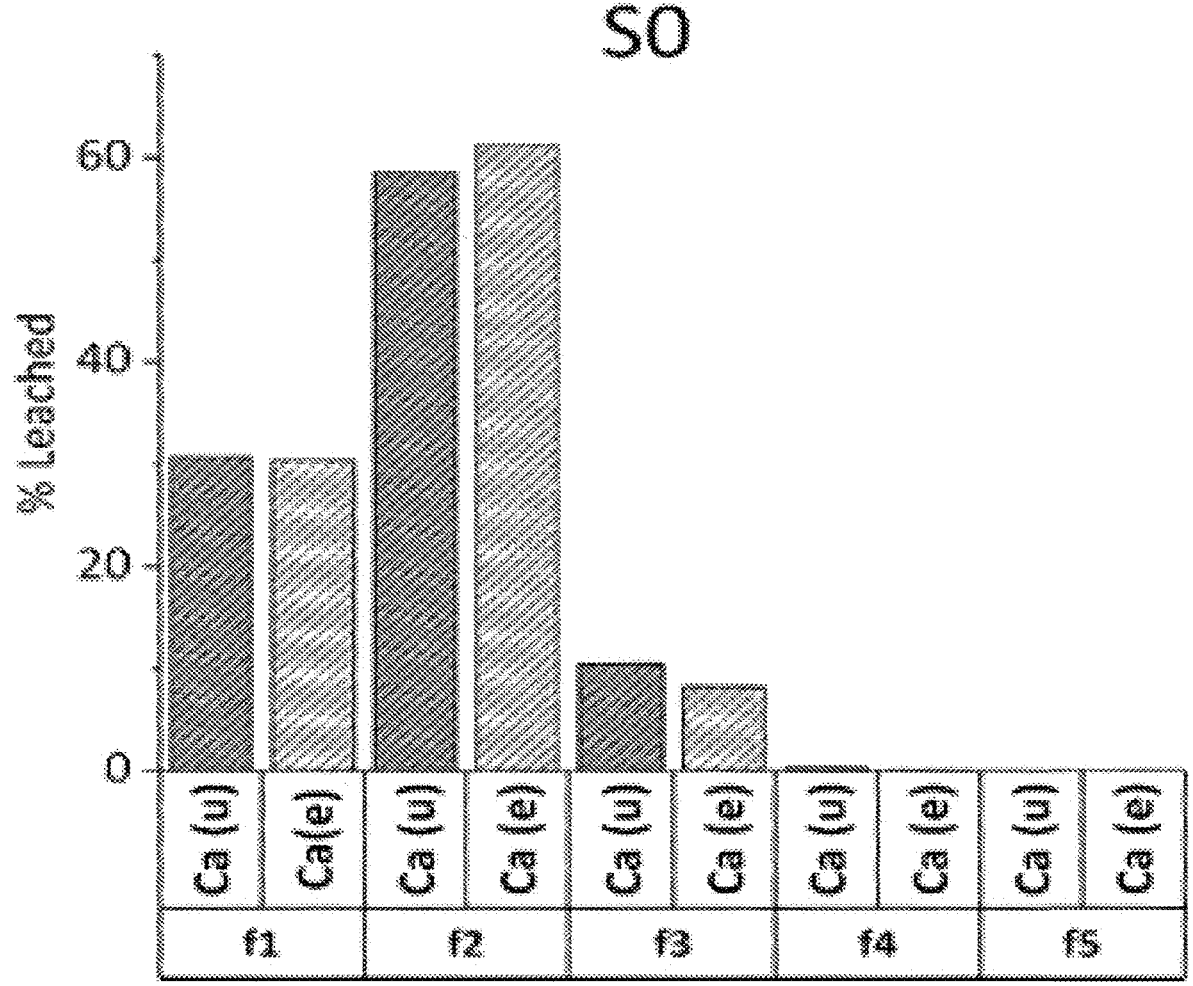

FIGS. 34A-34B show calcium leached from mortar formulations (on a mass percent basis) after sequential extractions of pulverized mortar samples. (u): calcium leached from corrosion unexposed formulations; (e): calcium leached from formulations after exposure to sewer corrosion (11 months). C0: mortar without sand substitution by antimicrobial aggregates (FIG. 34A). S0: mortar with sand fractions substituted by BOF-S (FIG. 34B).

Figure 35A:
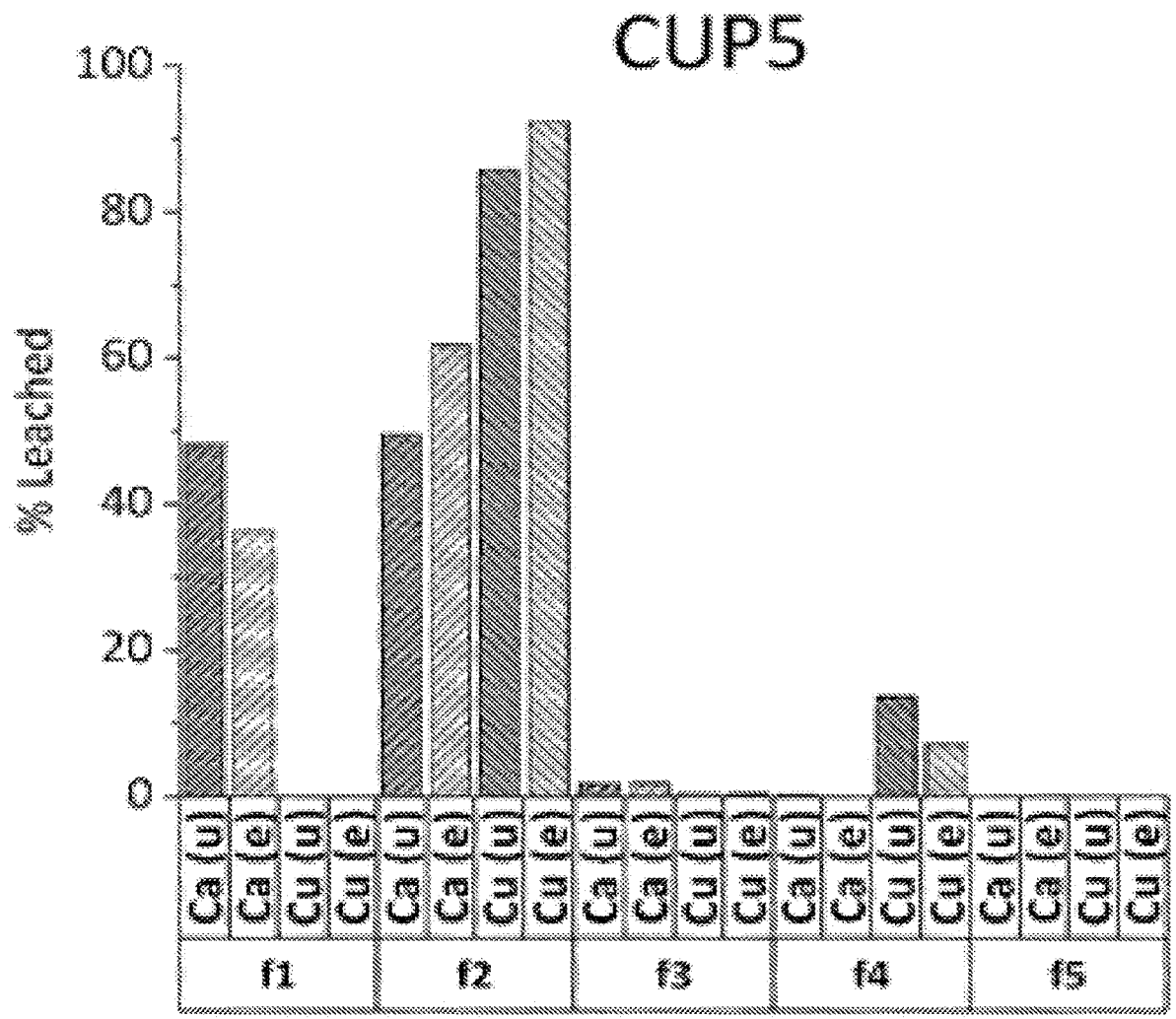
Figure 35B:
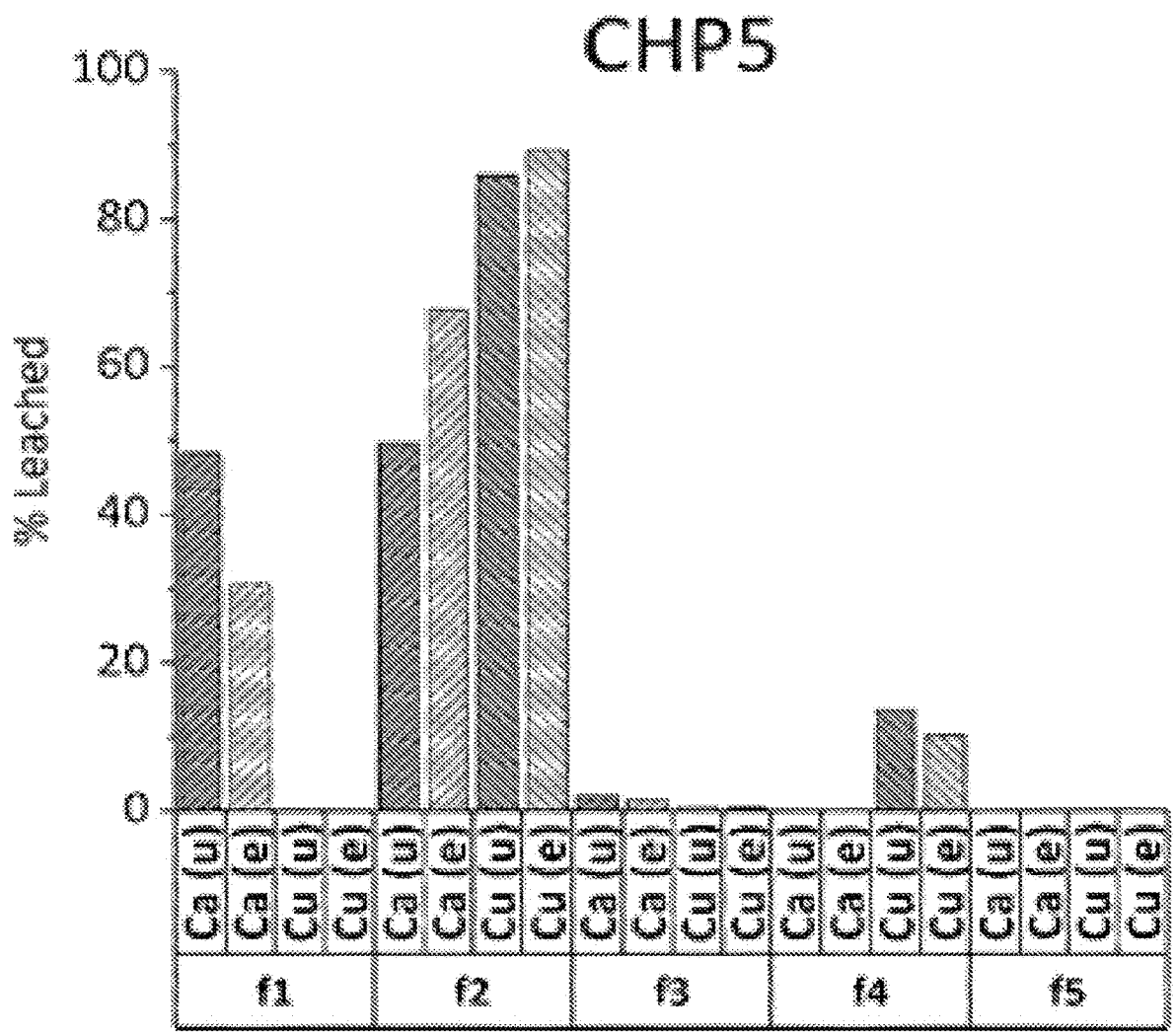
Figure 35C:
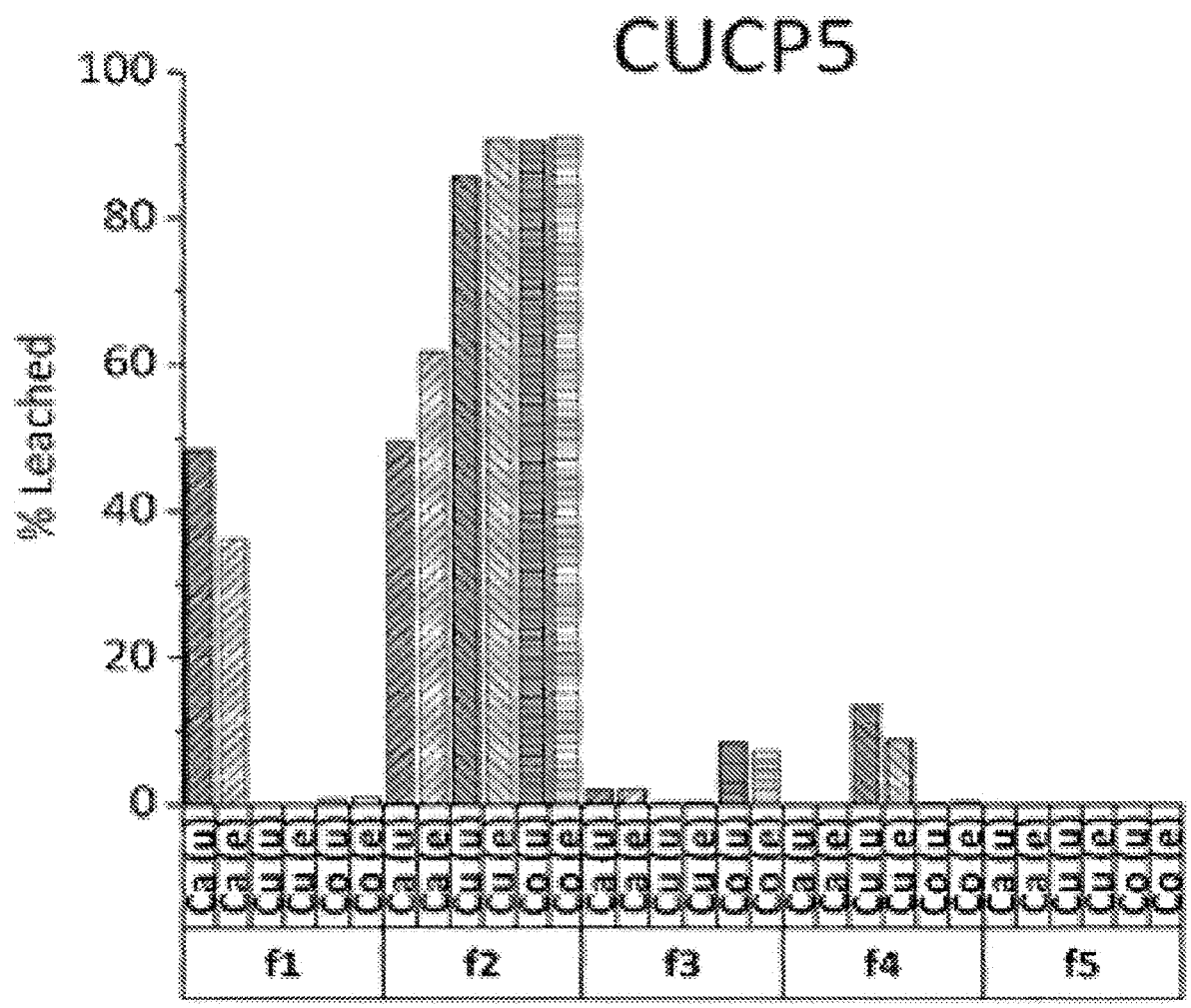
Figure 35D:
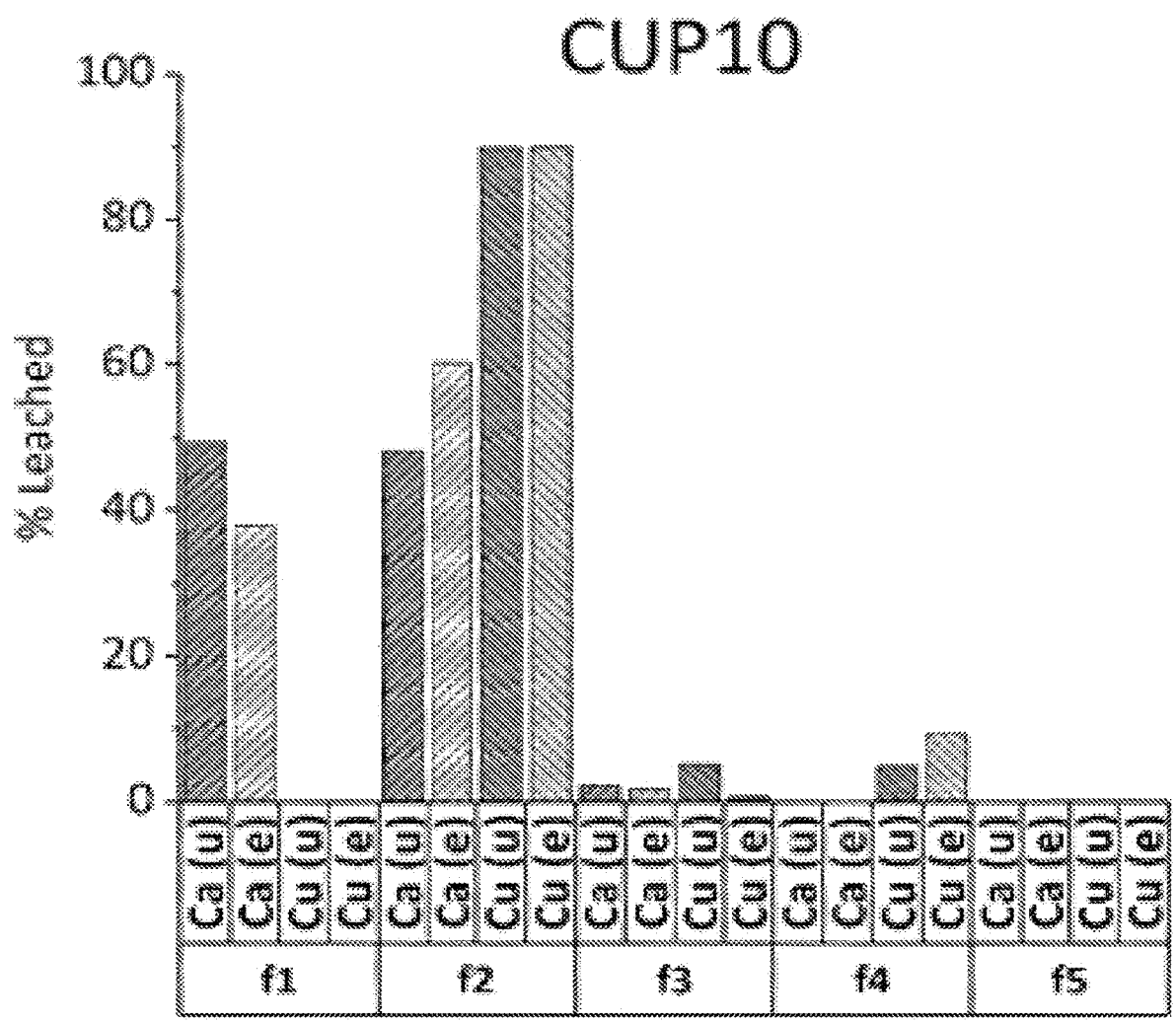

FIGS. 35A-35D show calcium, copper, and cobalt leached from mortar formulations (on a mass percent basis) after sequential extractions of pulverized mortar samples. (u): metals leached from corrosion unexposed formulations; (e): metals leached from formulations after exposure to sewer corrosion (11 months); CUP5: mortar with 5% sand replaced by GAC-Cu (FIG. 35A); CHP5: mortar with 5% sand replaced by GAC-ACID-Cu (FIG. 35B); CUCP5: mortar with 5% sand replaced by GAC-Cu—Co (FIG. 35C); CUP10: mortar with 10% sand replaced by GAC-Cu (FIG. 35D).

Figure 36A:
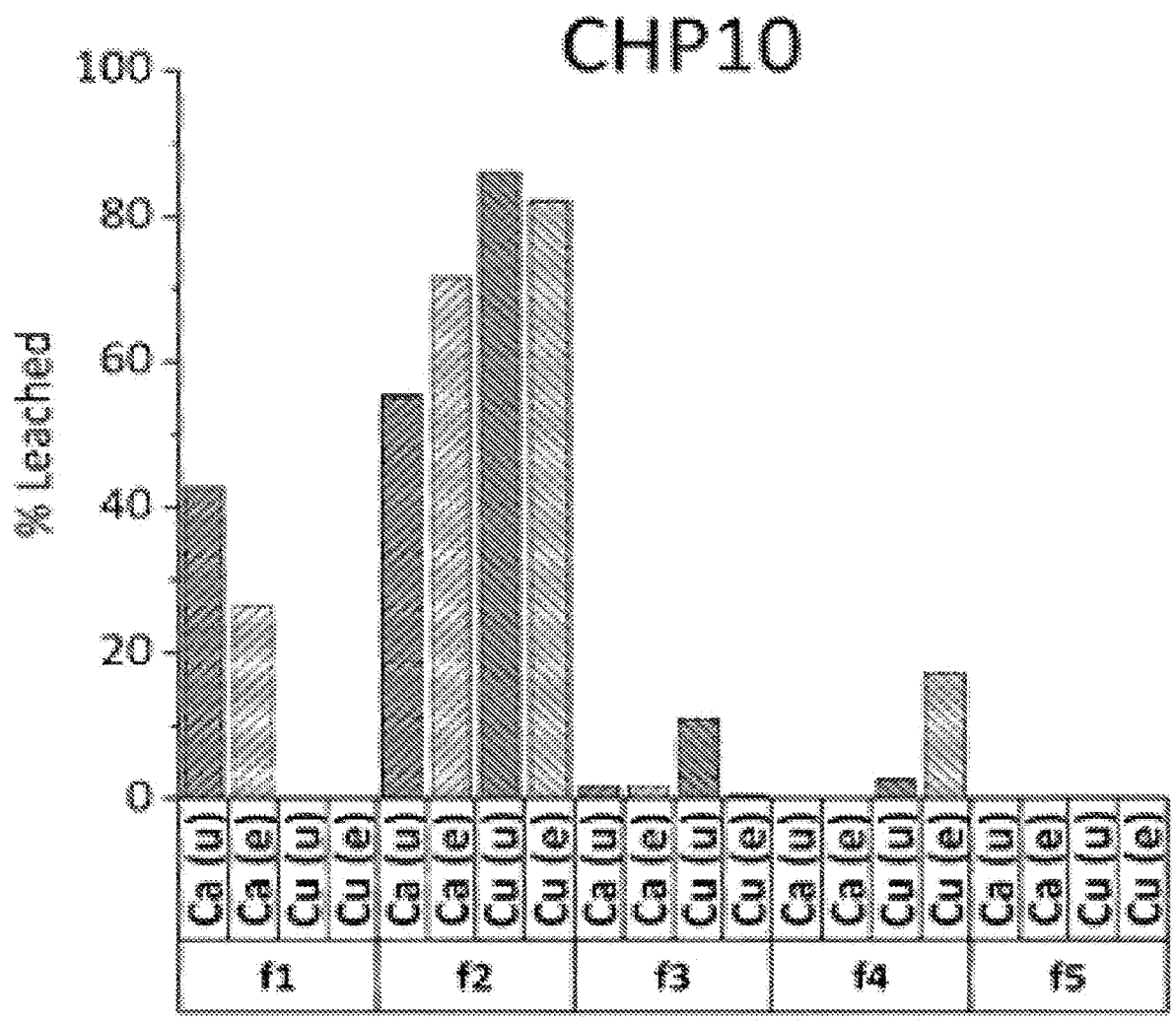
Figure 36B:
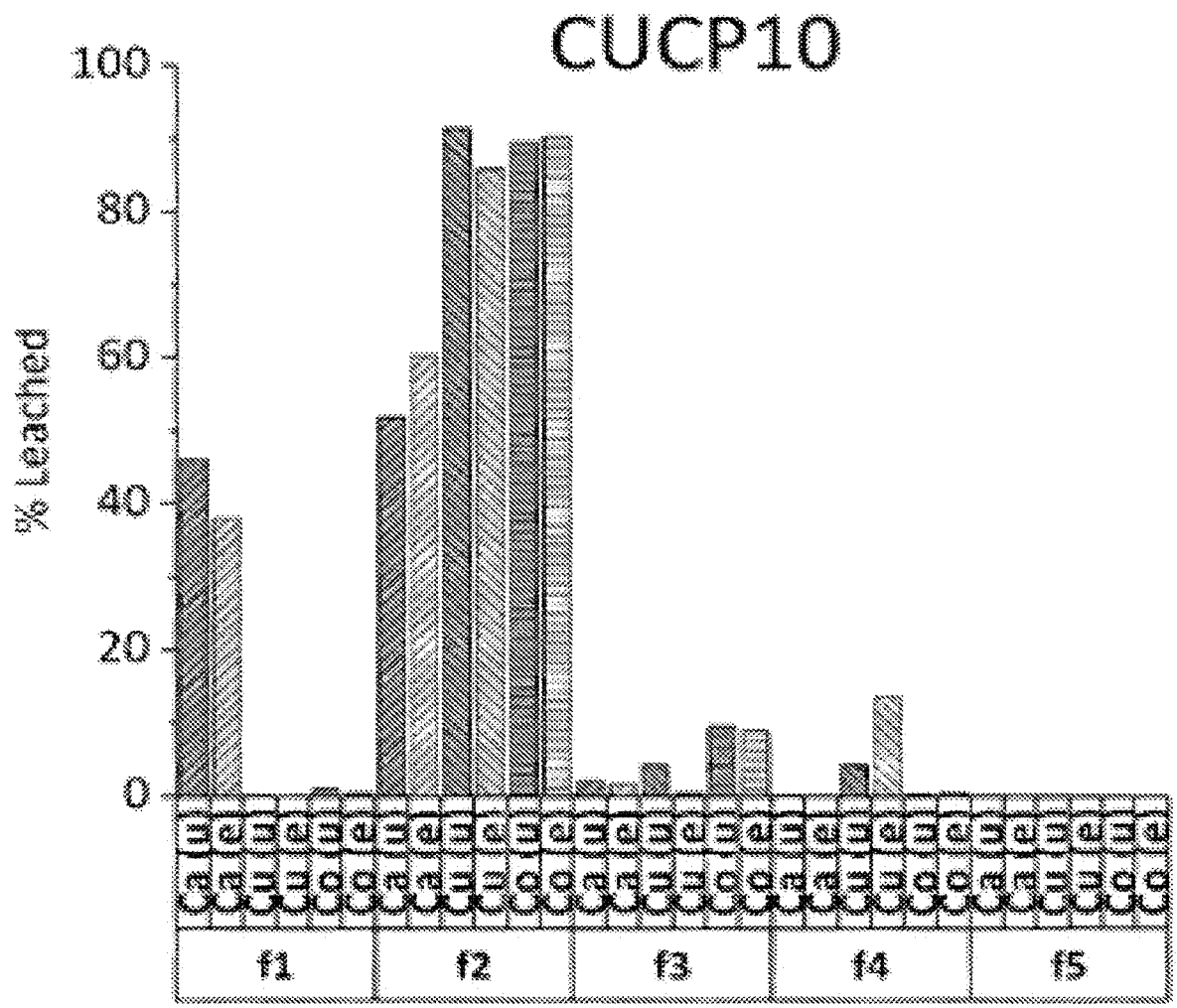
Figure 36C:
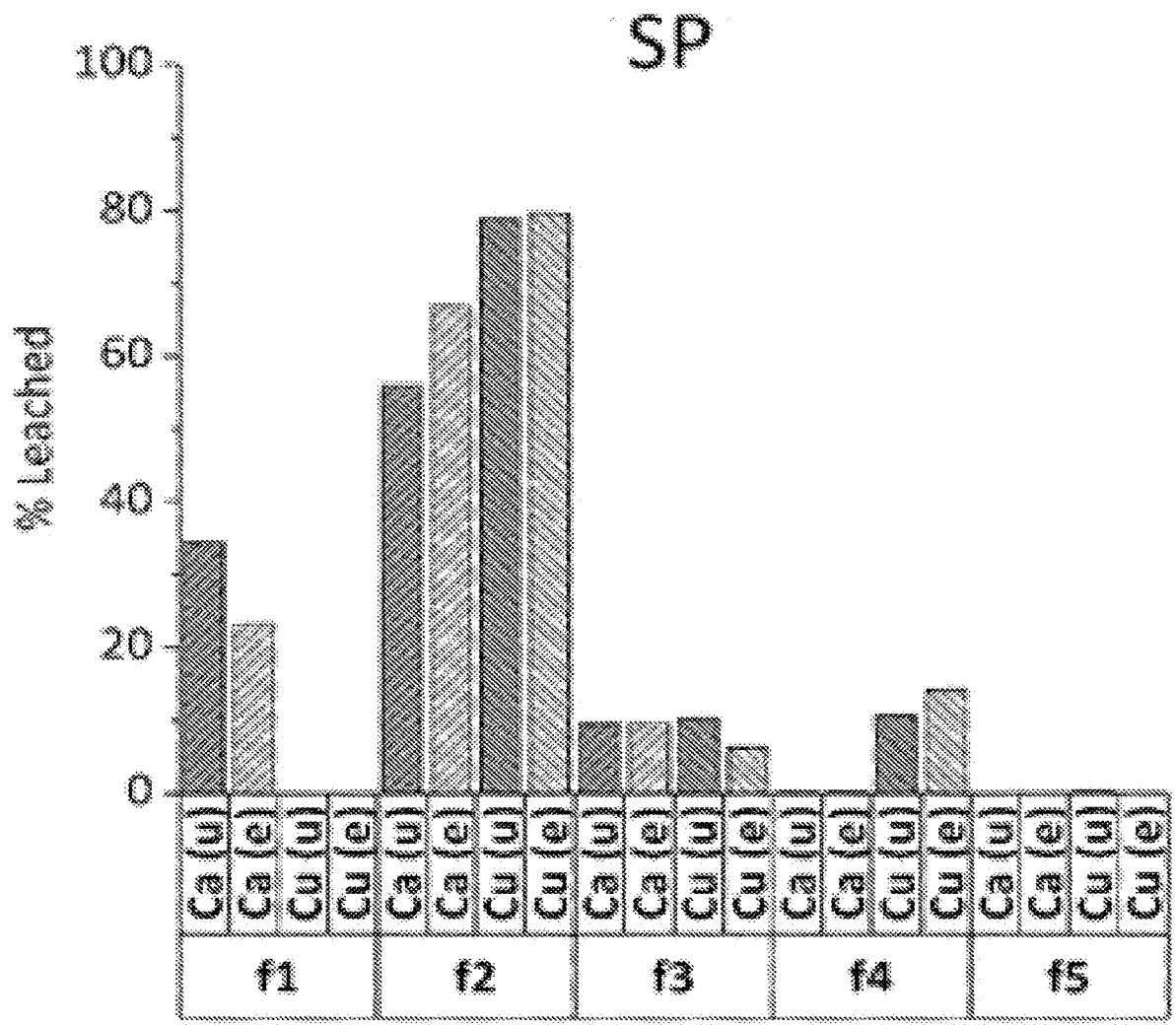
Figure 37A:
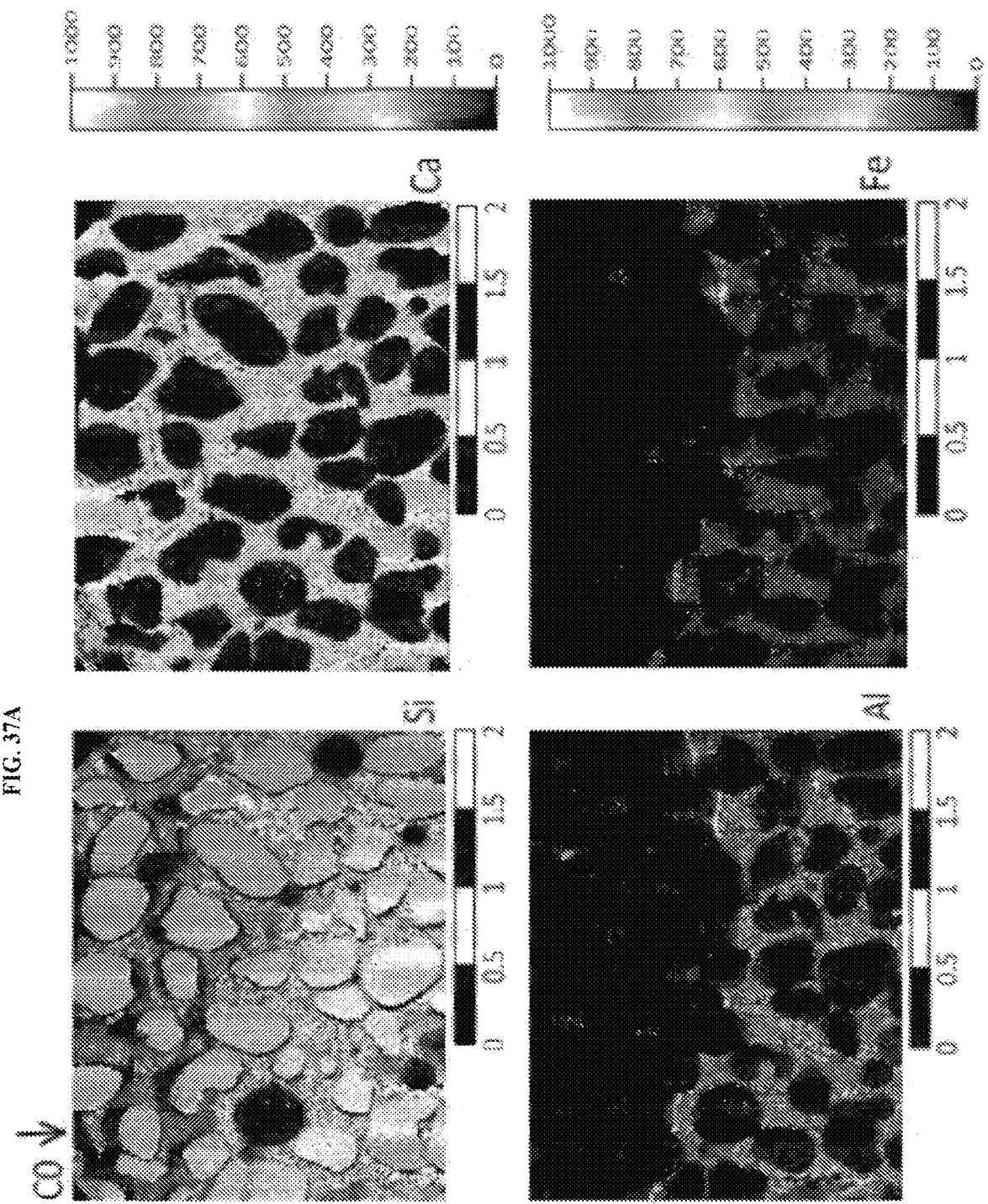
Figure 37B:
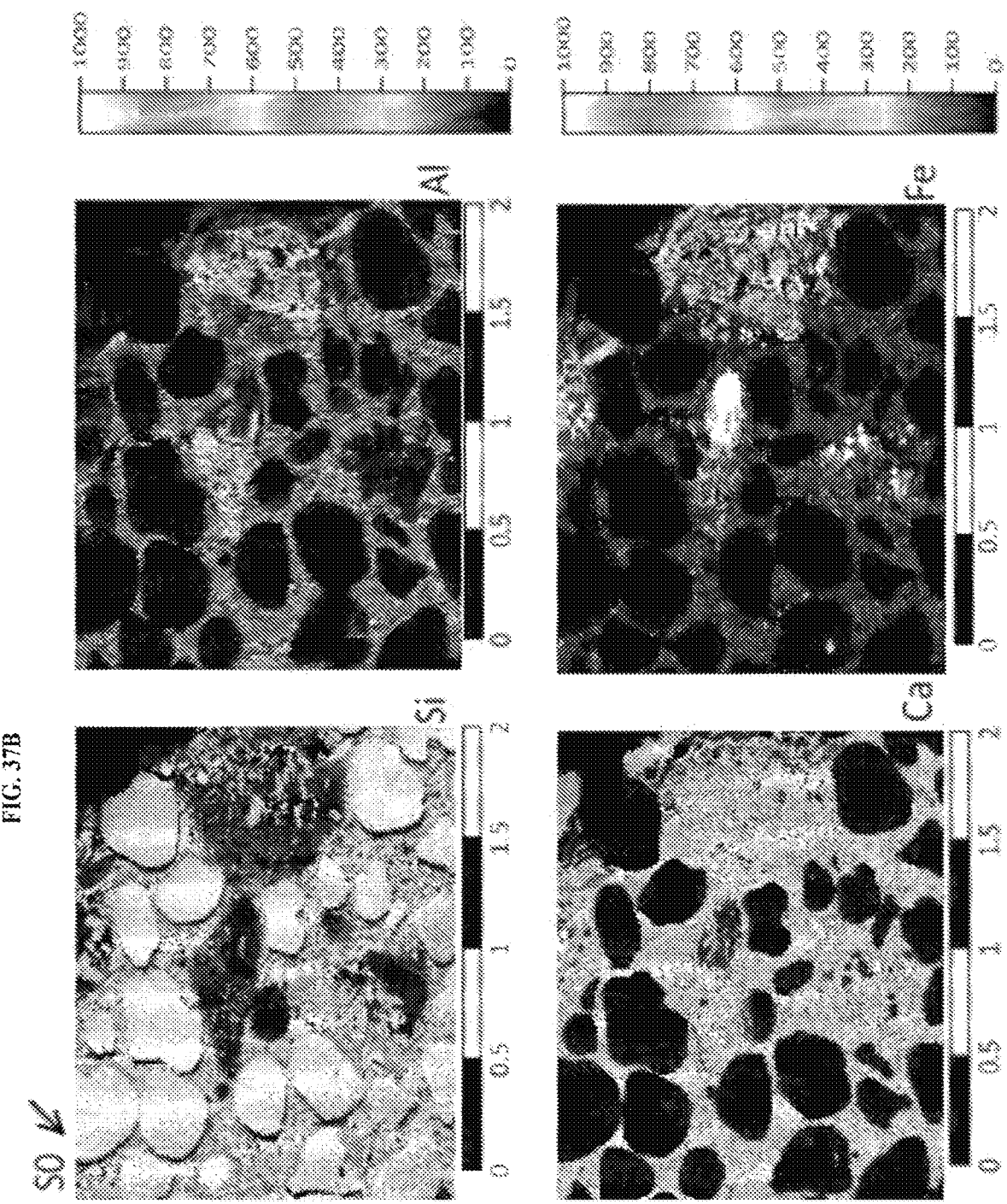
Figure 37C:
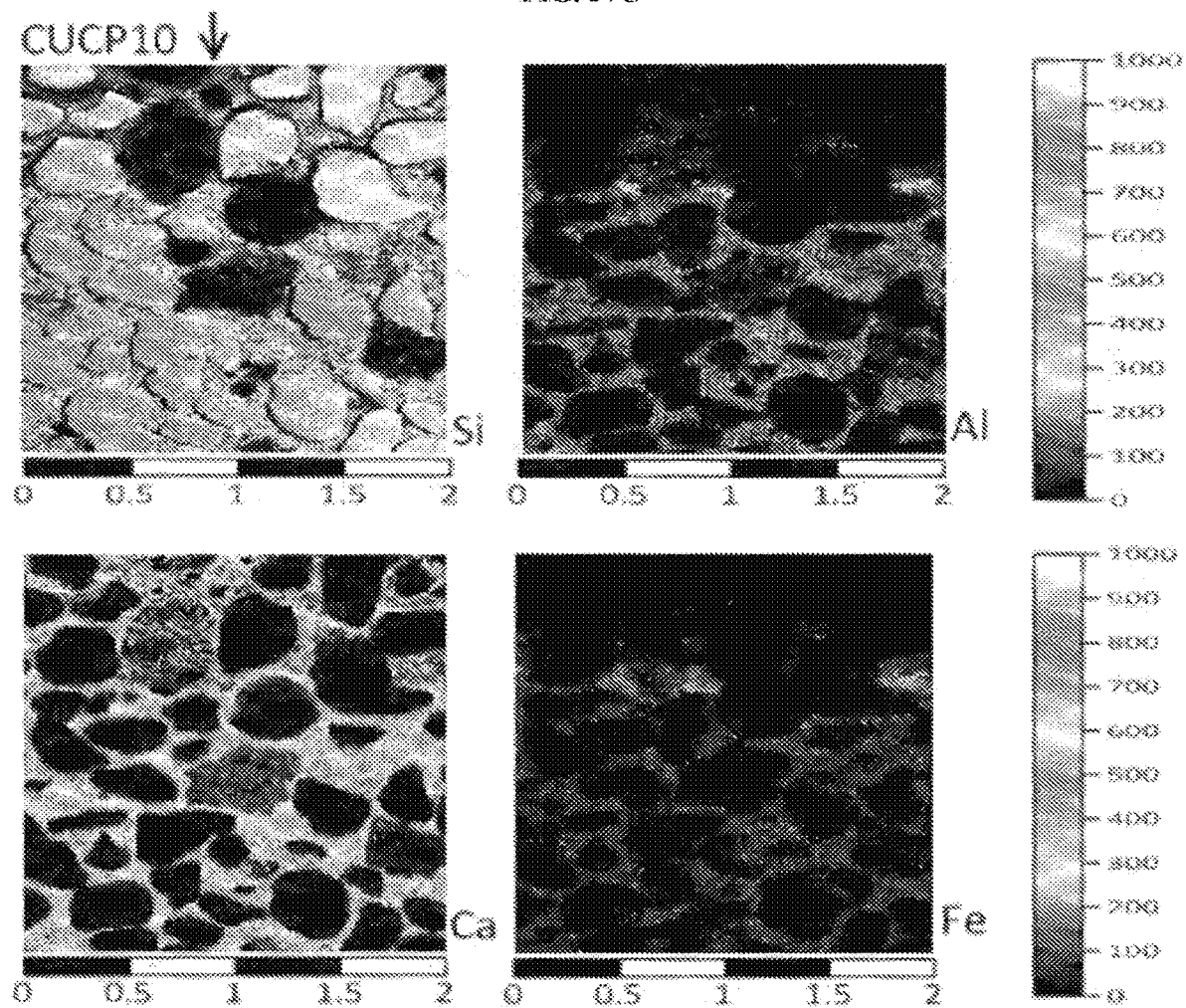
Figure 37D:
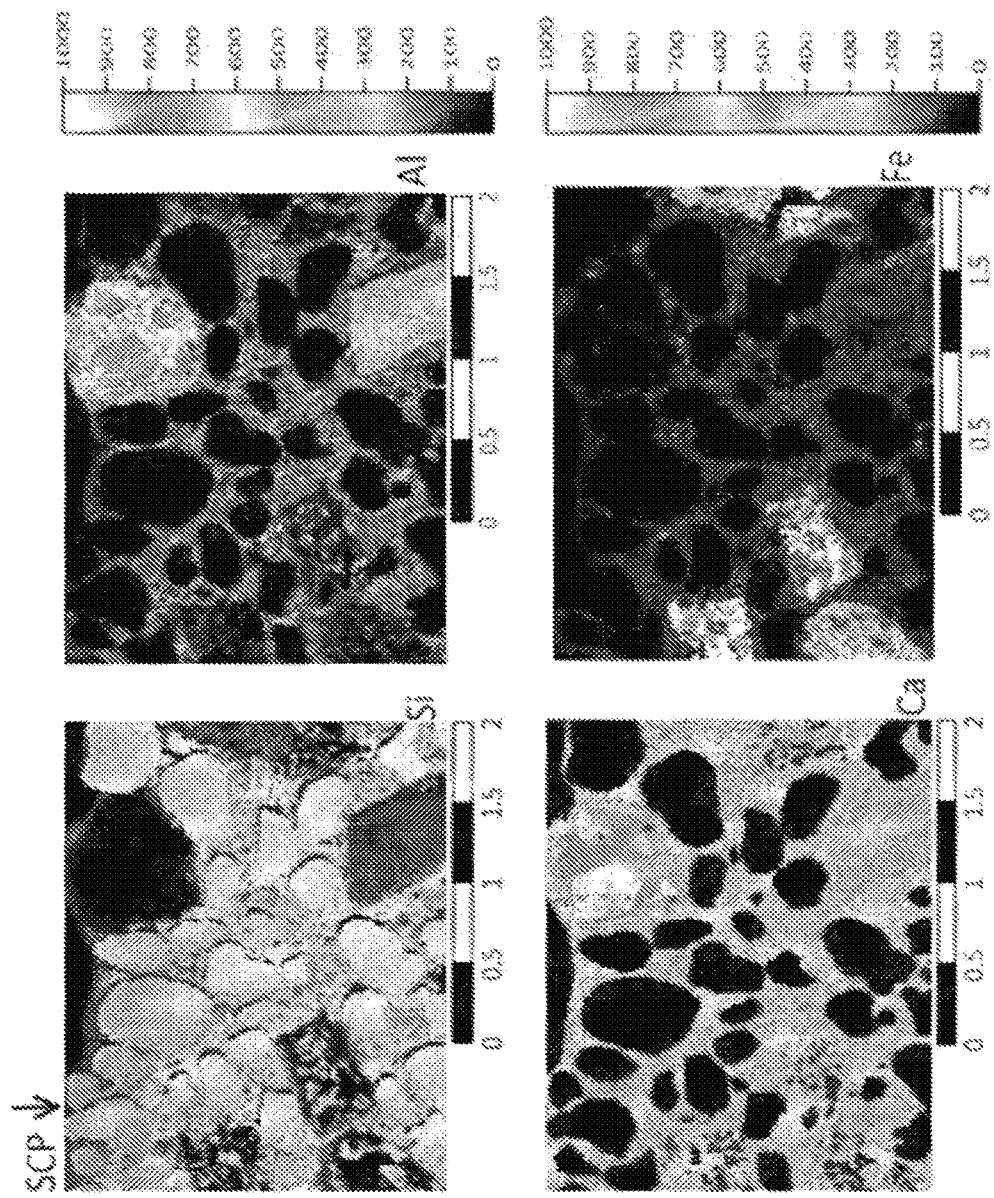
Figure 37E:
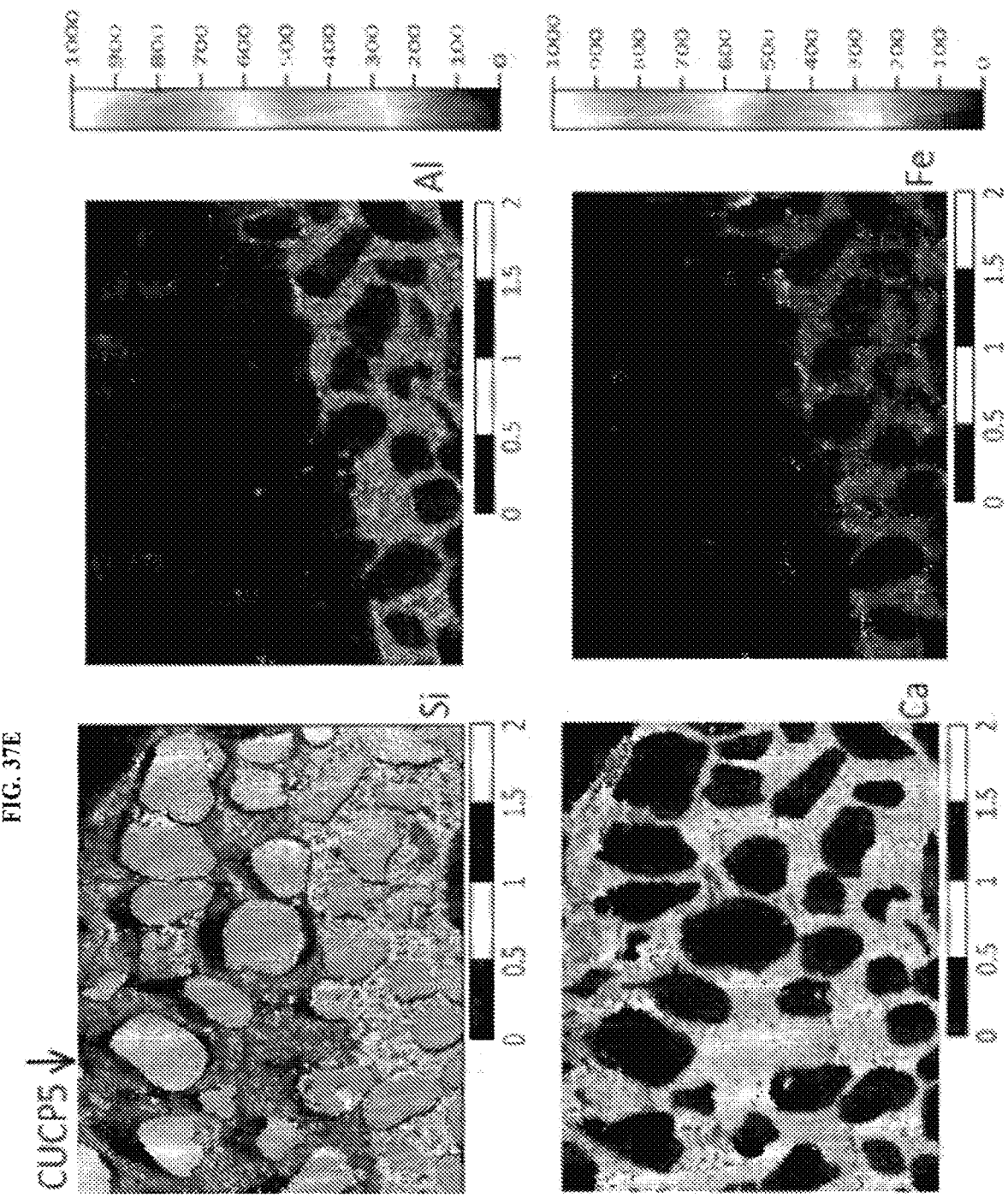
Figure 38A:
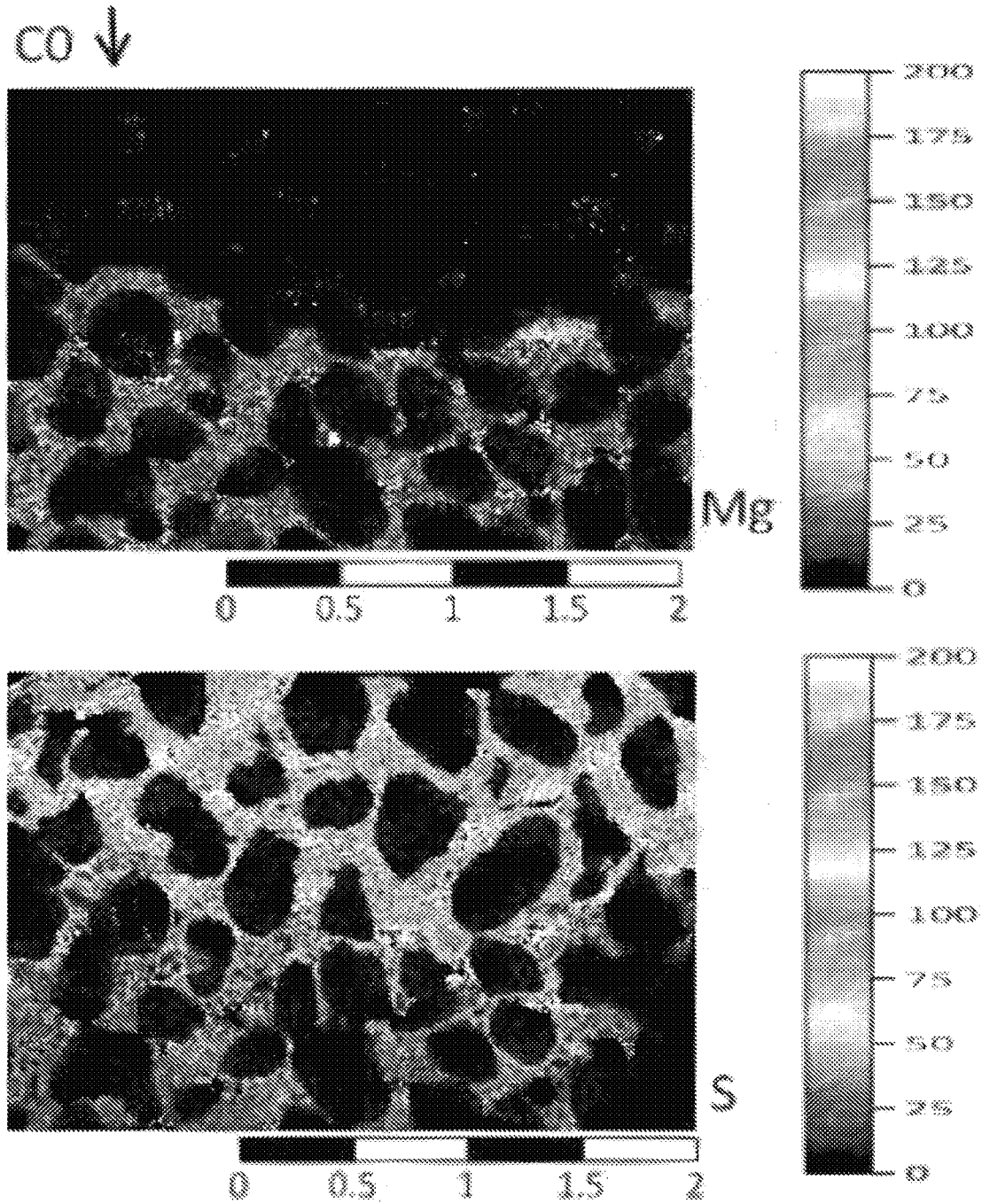
Figure 38B:
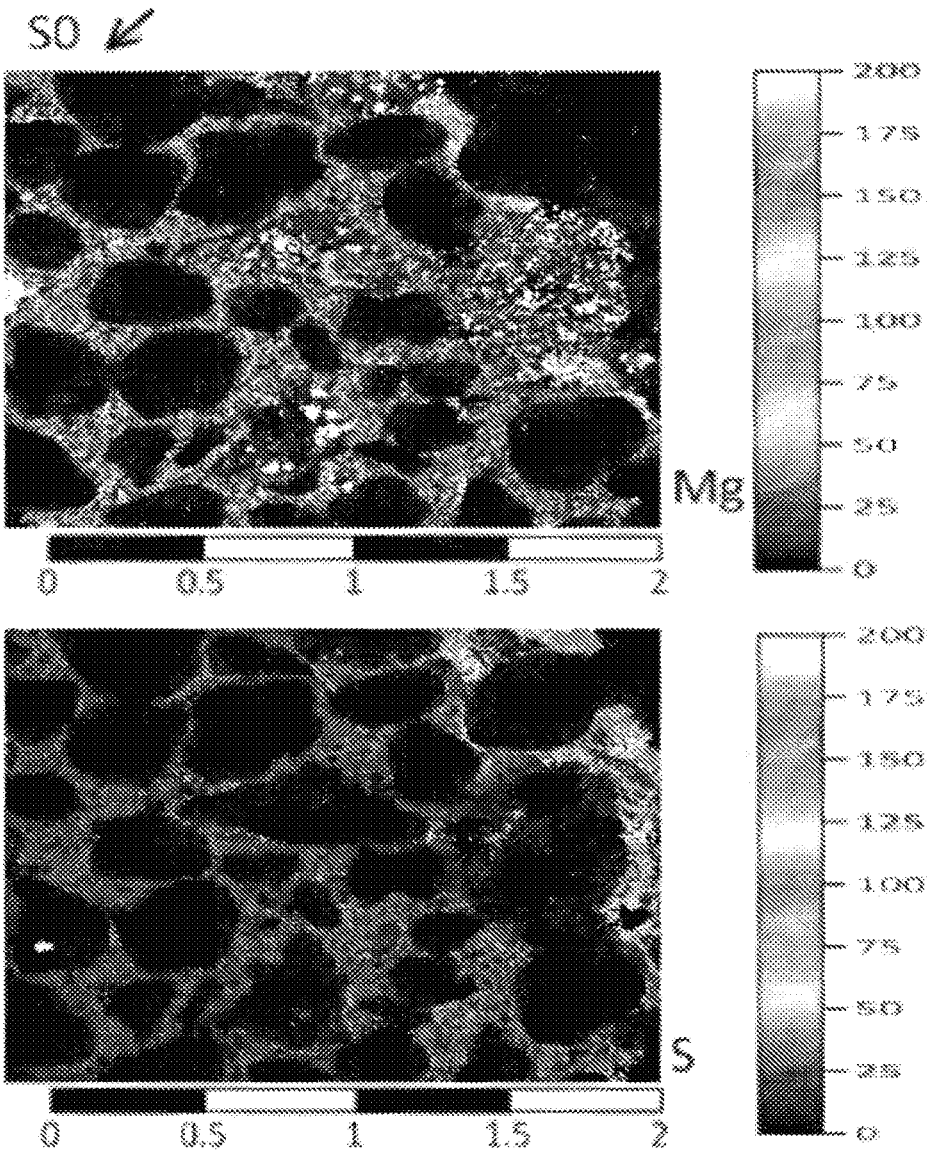
Figure 38C:
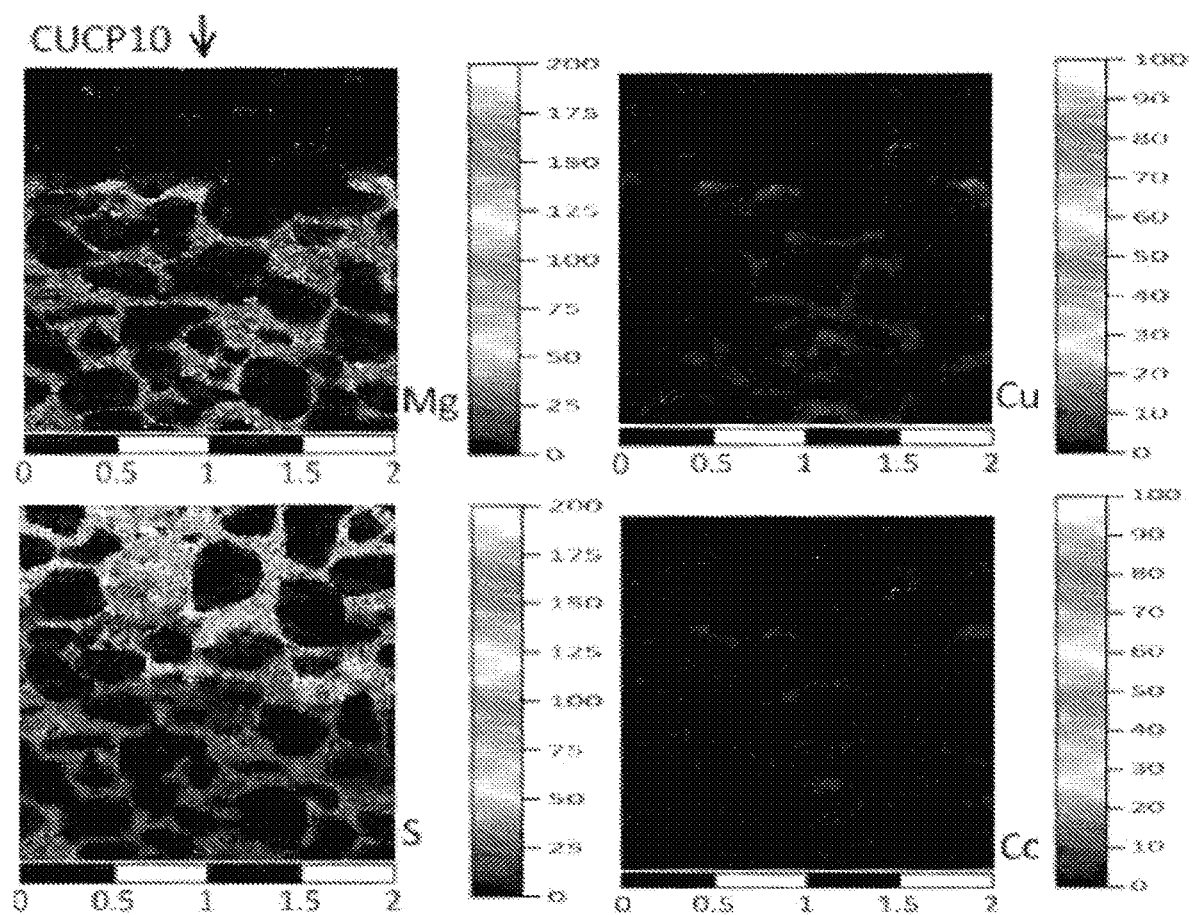
Figure 38D:
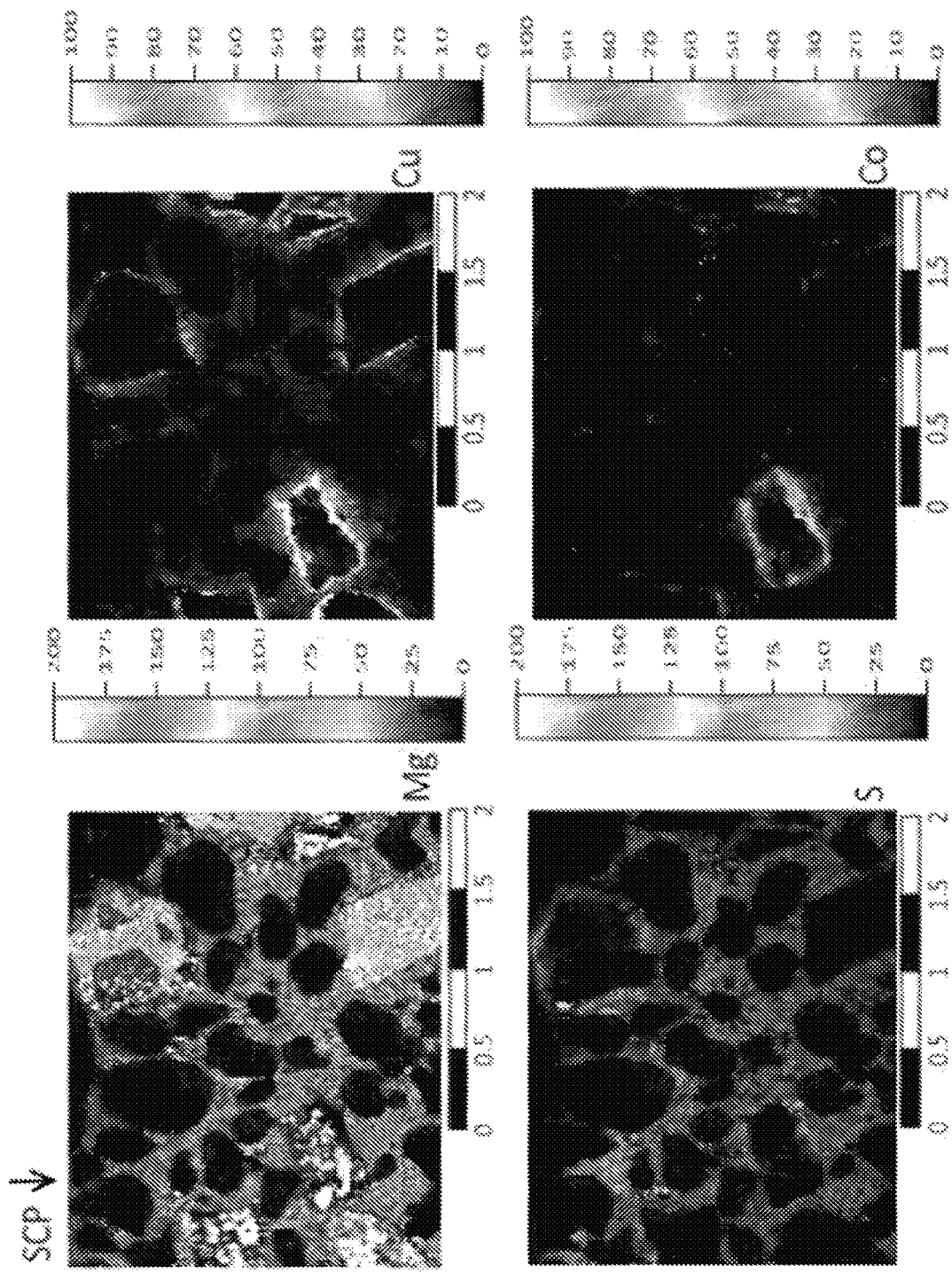
Figure 38E:
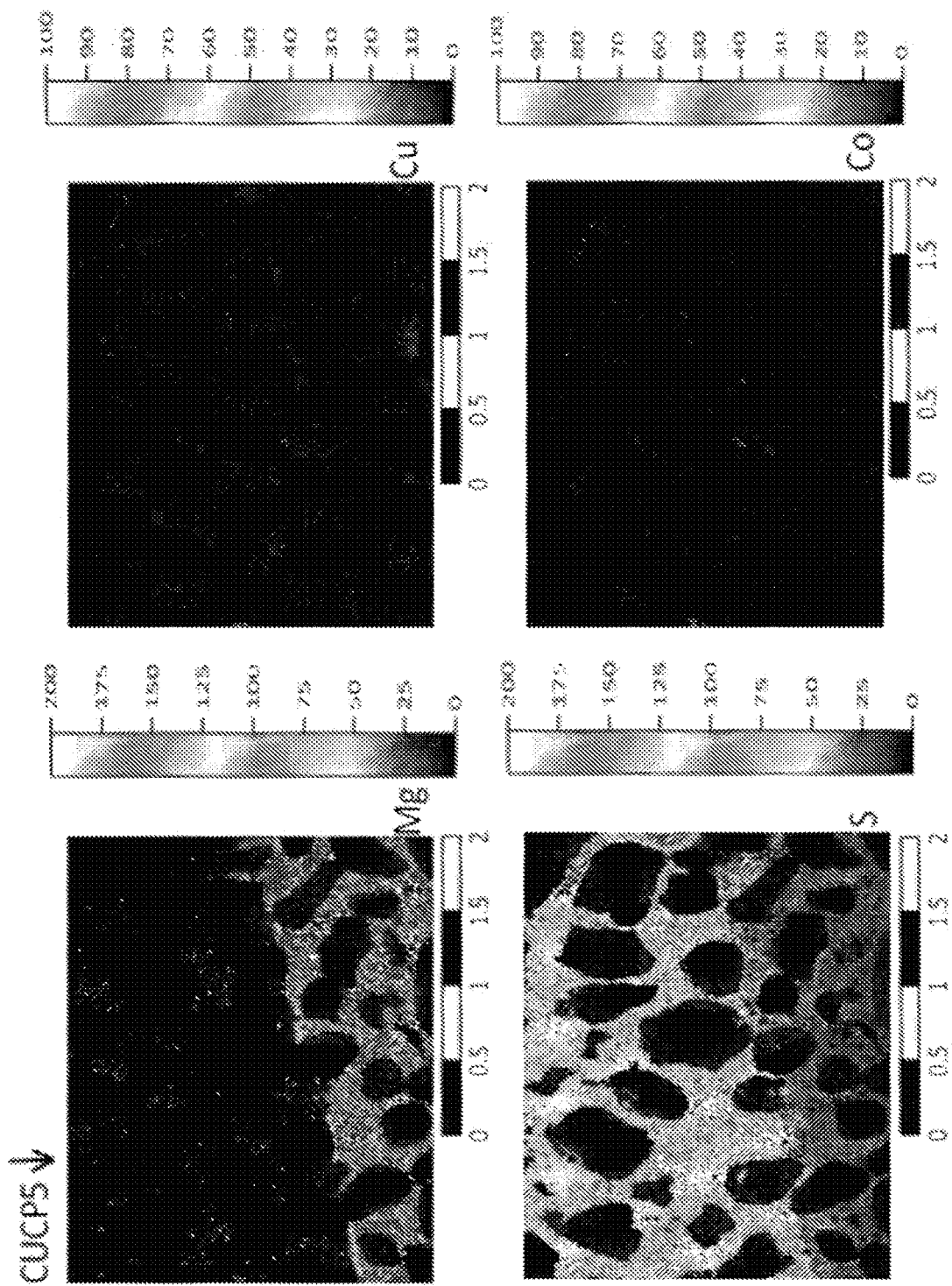

FIGS. 36A-36D provide a set of graphs showing calcium, copper, and cobalt leached from mortar formulations (on a mass percent basis) after sequential extractions of pulverized mortar samples. (u): metals leached from corrosion unexposed formulations; (e): metals leached from formulations after exposure to sewer corrosion (11 months); CHP10: mortar with 10% sand replaced by GAC-Acid-Cu (FIG. 36A); CUCP10: mortar with 10% sand replaced by GAC-Cu—Co (FIG. 36B); SP: mortar with fractions of sand replaced by BOF-S—Cu (FIG. 36C); SCP: mortar with fractions of sand replaced by BOF-S—Cu—Co (FIG. 36D).

FIGS. 37A-37E show elemental mapping of C0 (FIG. 37A), S0 (FIG. 37B), CUP10 (FIG. 37C), SCP (FIG. 37D), and CUCP5 (FIG. 37E) after exposure to sewer corrosion (11 months). Scale bars represent net intensity counts obtained for each element. Arrows indicate the direction of the corrosion front. Scale bar=2 mm.

Figure 39:
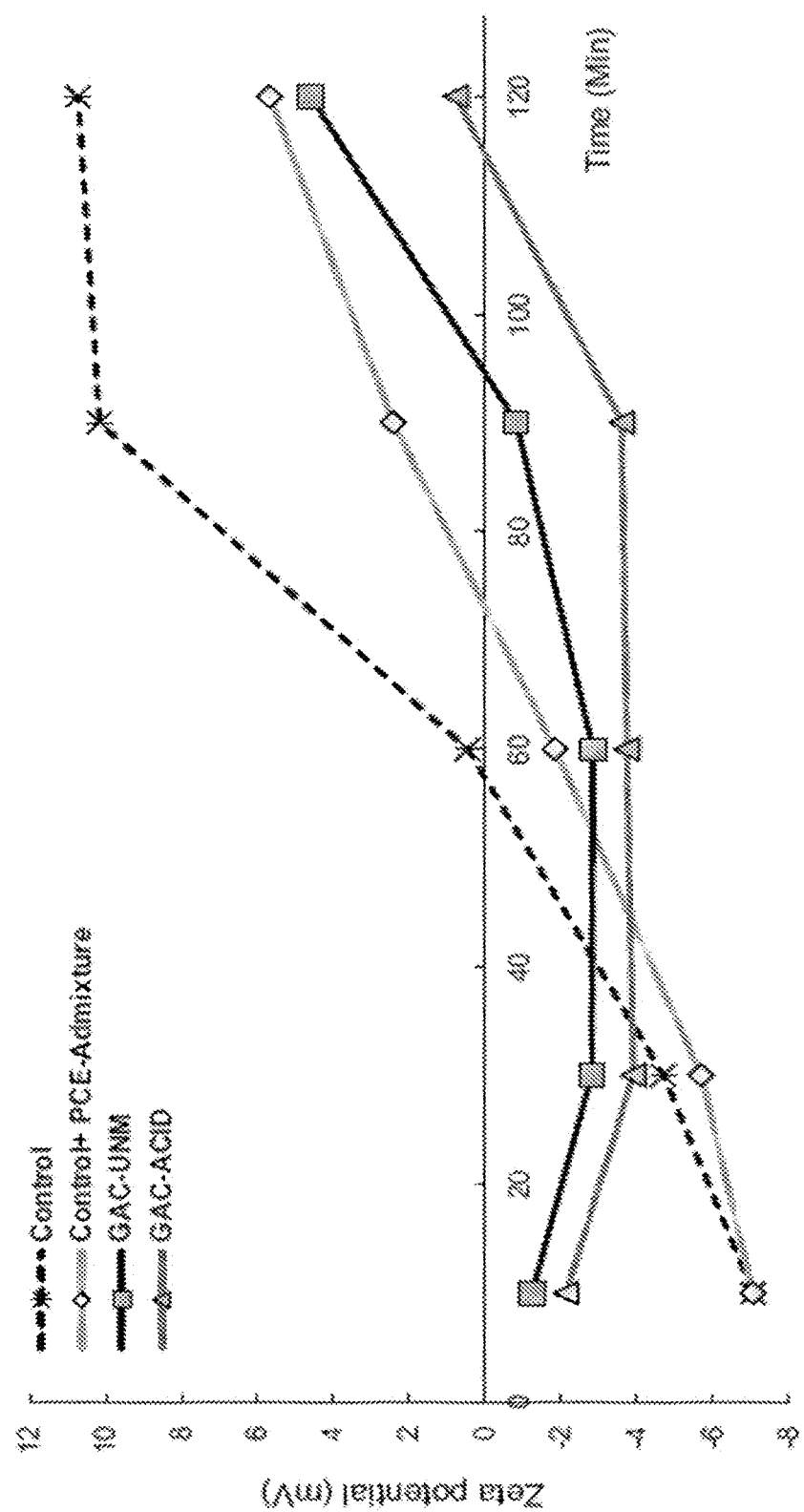

FIGS. 38A-38E shows elemental mapping of C0 (FIG. 38A), S0 (FIG. 38B), CUP10 (FIG. 38C), SCP (FIG. 38D), and CUCP5 (FIG. 38E) after exposure to sewer corrosion (11 months). Scale bars represent net intensity counts obtained for each element. Arrows indicate the direction of the corrosion front. Scale bar=2 mm FIG. 39 shows a zeta potential plot of the particles in the following cement mortar formulations: Control (0% GAC), 10% GAC, GAC-Acid, and control (0% GAC)+PCE-Admixture (0.122% of cement content).

Figure 40:
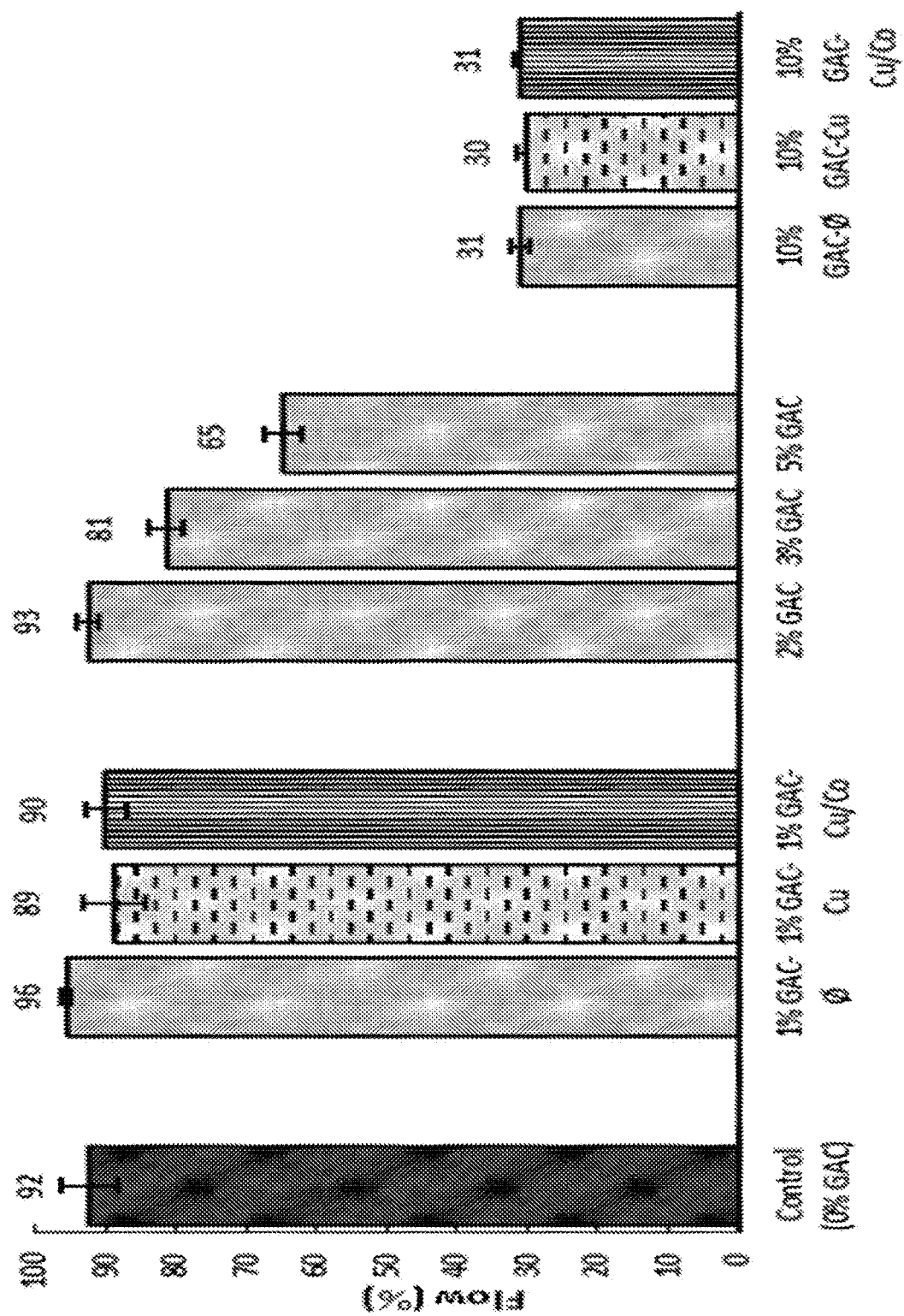

FIG. 40 provides a bar graph showing variation in workability as percentage flow for formulations with GAC replacement ratios (by mass) of 0% (control), 1%, 2%, 3%, 5%, and 10%. Additionally, formulations with 1% and 10% GAC replacements are shown with the presence of biocidal metals (copper and/or cobalt). All formulations with (w/c) eff=0.45.

Figure 41:
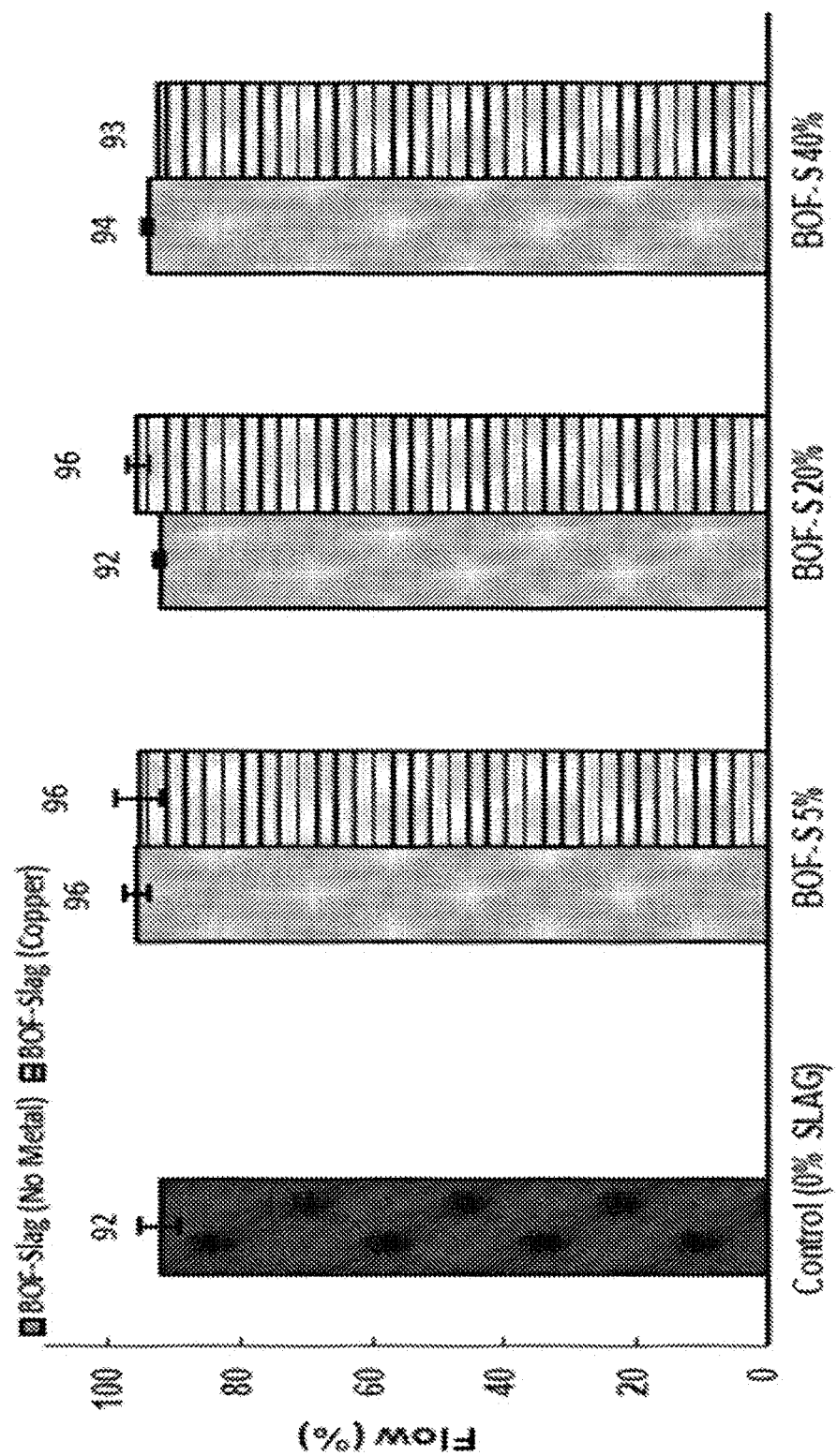

FIG. 41 provides a bar graph showing variation in workability as percentage flow for the following formulations containing BOF-S (no metal) and copper-laden BOF-S replacements (by mass): 0% (control), 5%, 20%, and 40%. All formulations with (w/c) eff=0.45.

Figure 42:
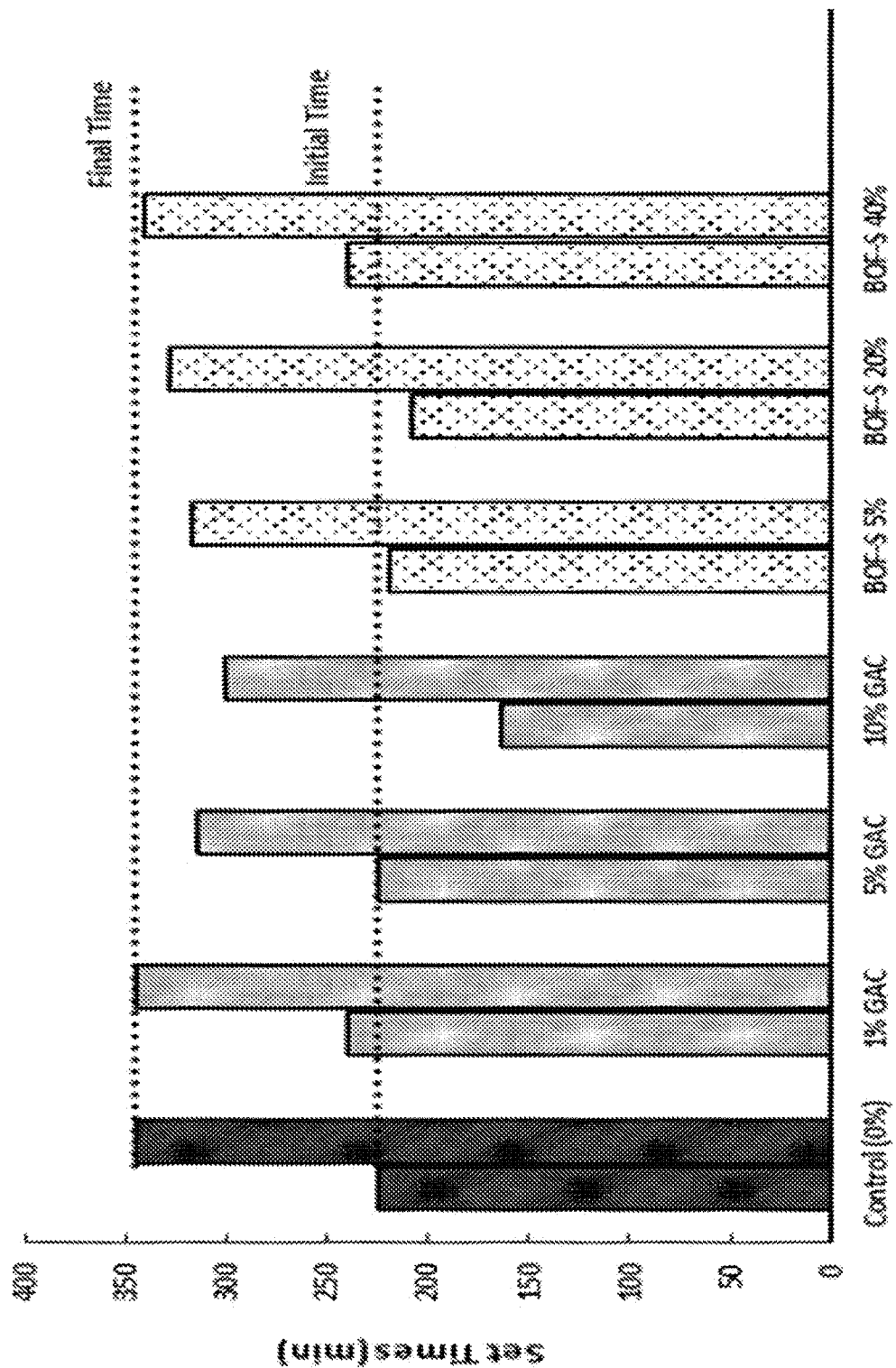
Figure 43A:
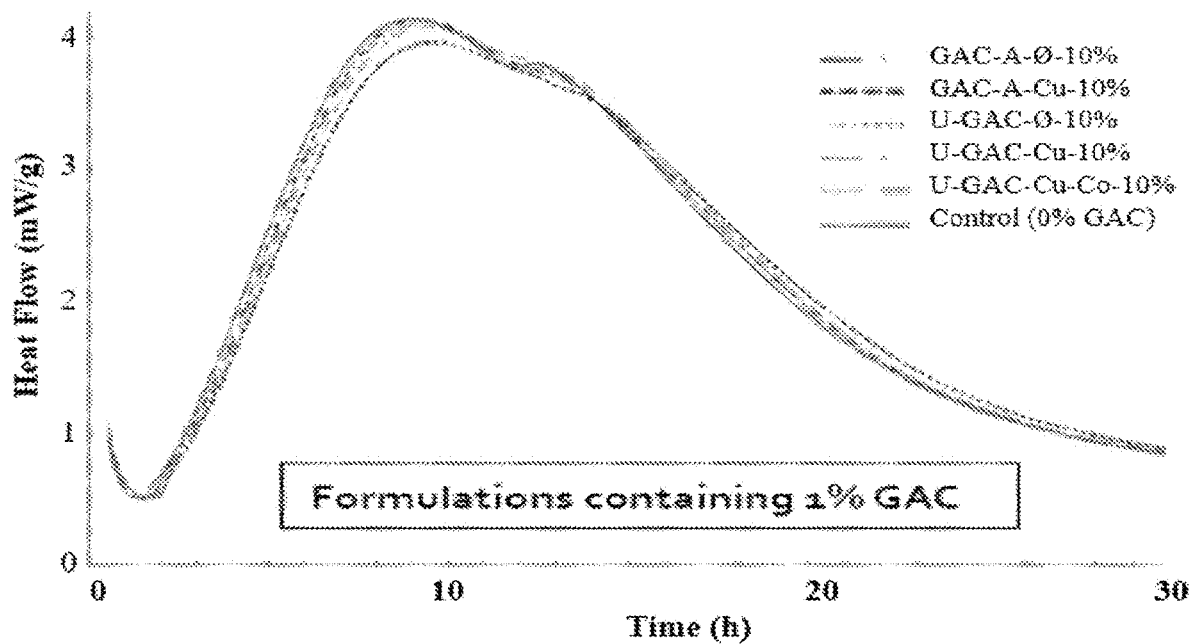
Figure 43B:
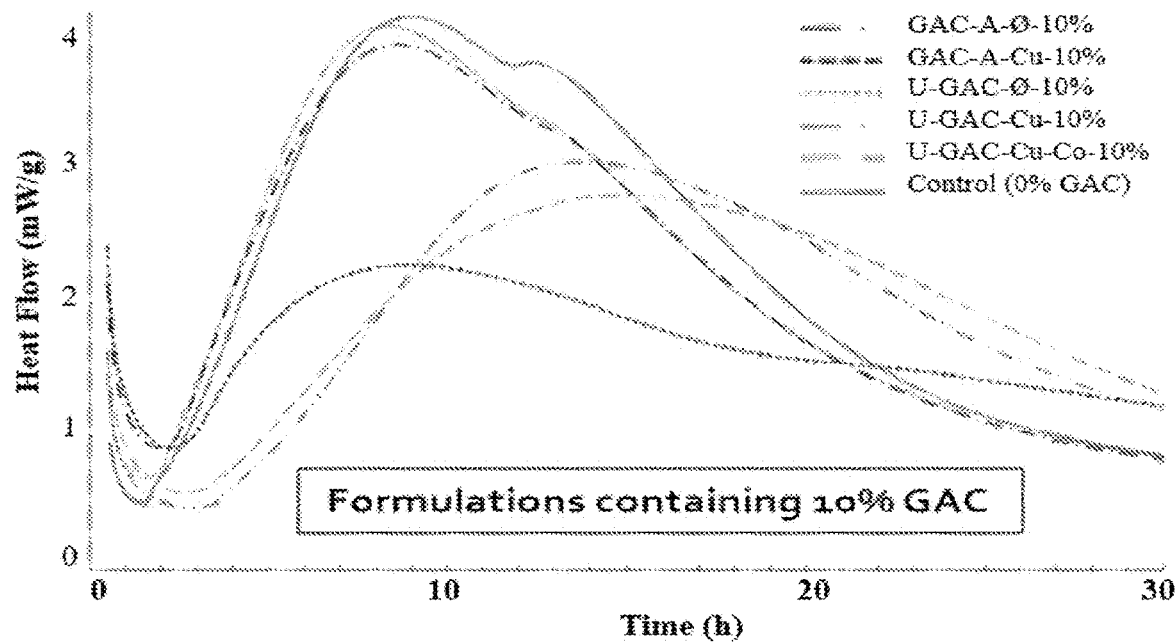
Figure 43C:
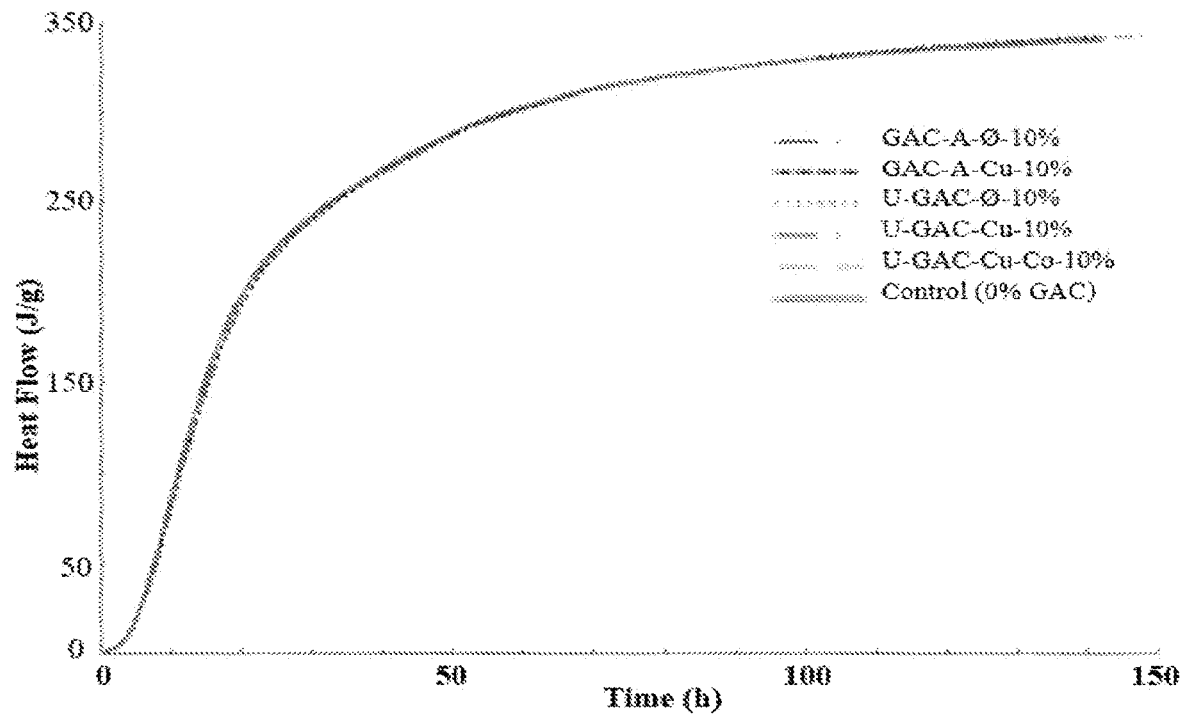
Figure 43D:
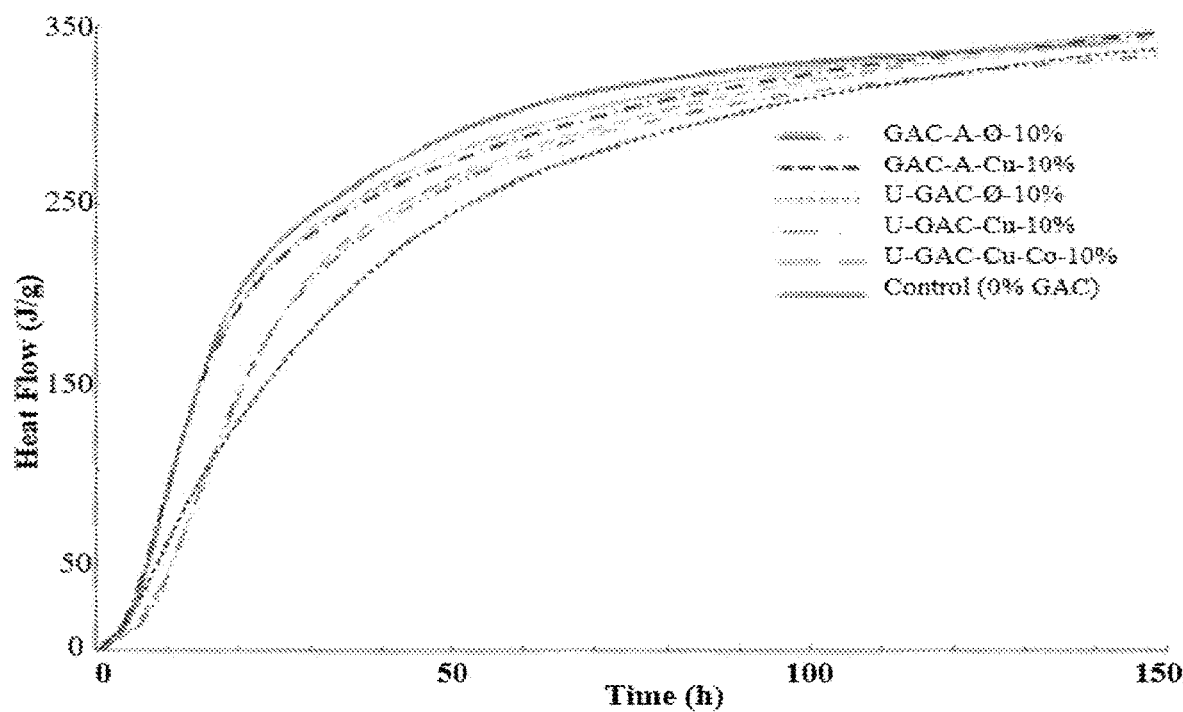

FIG. 42 provides a bar graph showing initial and final set-times of cement mortars with the following fine aggregate replacements: Control (0%), GAC (no metal): 1%, 5%, and 10%; BOF-S (no metal): 5%, 20%, and 40%.

FIGS. 43A-43D provide heat flow graphs for cement mortar compositions comprising 1% GAC substitution (FIG. 43A and FIG. 43C) and 10% GAC substitution (FIG. 43B and FIG. 43D) showing the influence of antimicrobial aggregates on early hydration kinetics.

Figure 44:
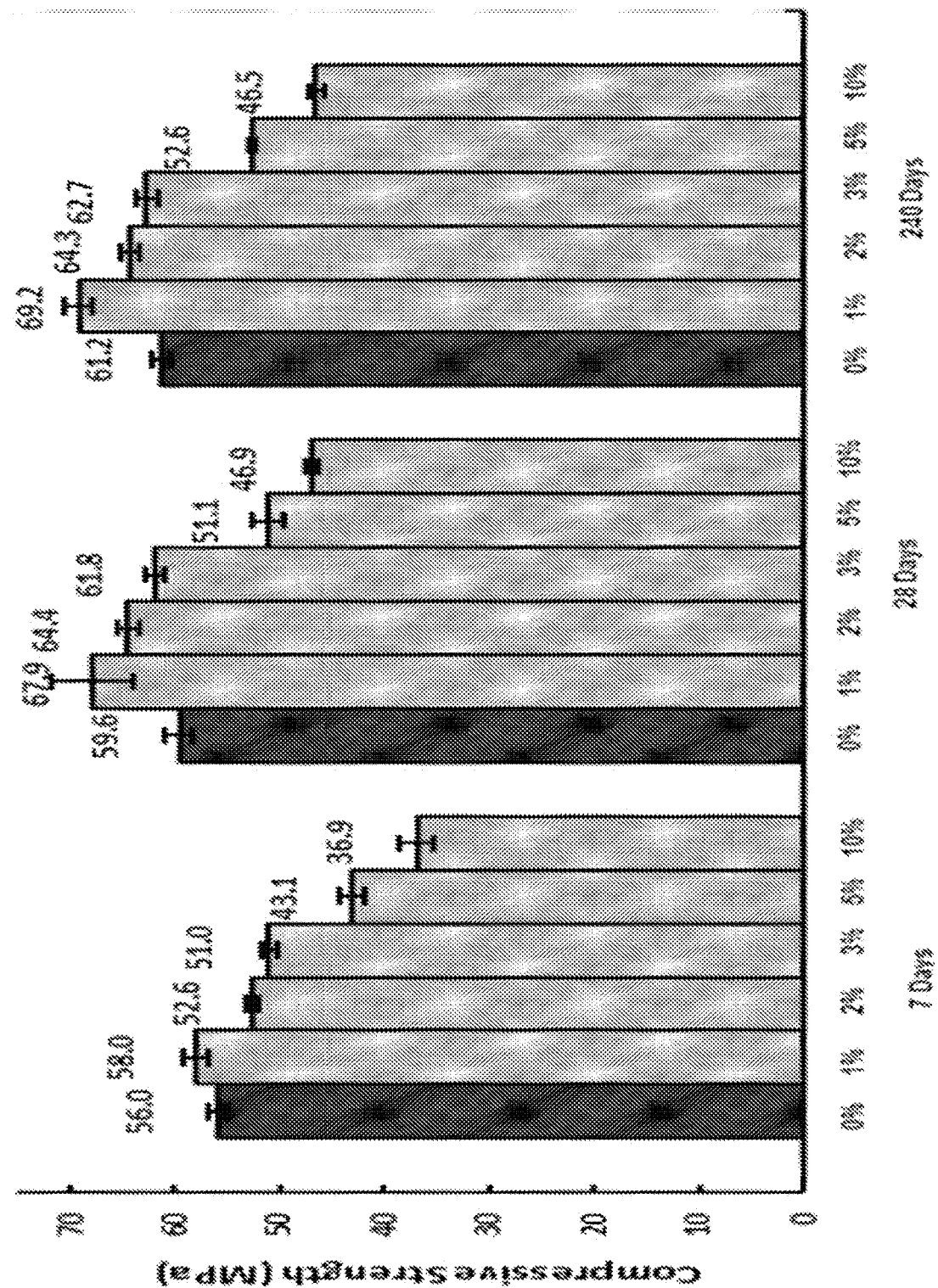

FIG. 44 provides a bar graph showing the influence of the replacement of fine aggregate with GAC on compressive strength after a curing period of: 7, 28, and 240-days. Results represent the average of three cubic specimens for six different percentages replacement: 0%, 1%, 2%, 3%, 5%, and 10%. Error bars represent±one standard deviation.

Figure 45:
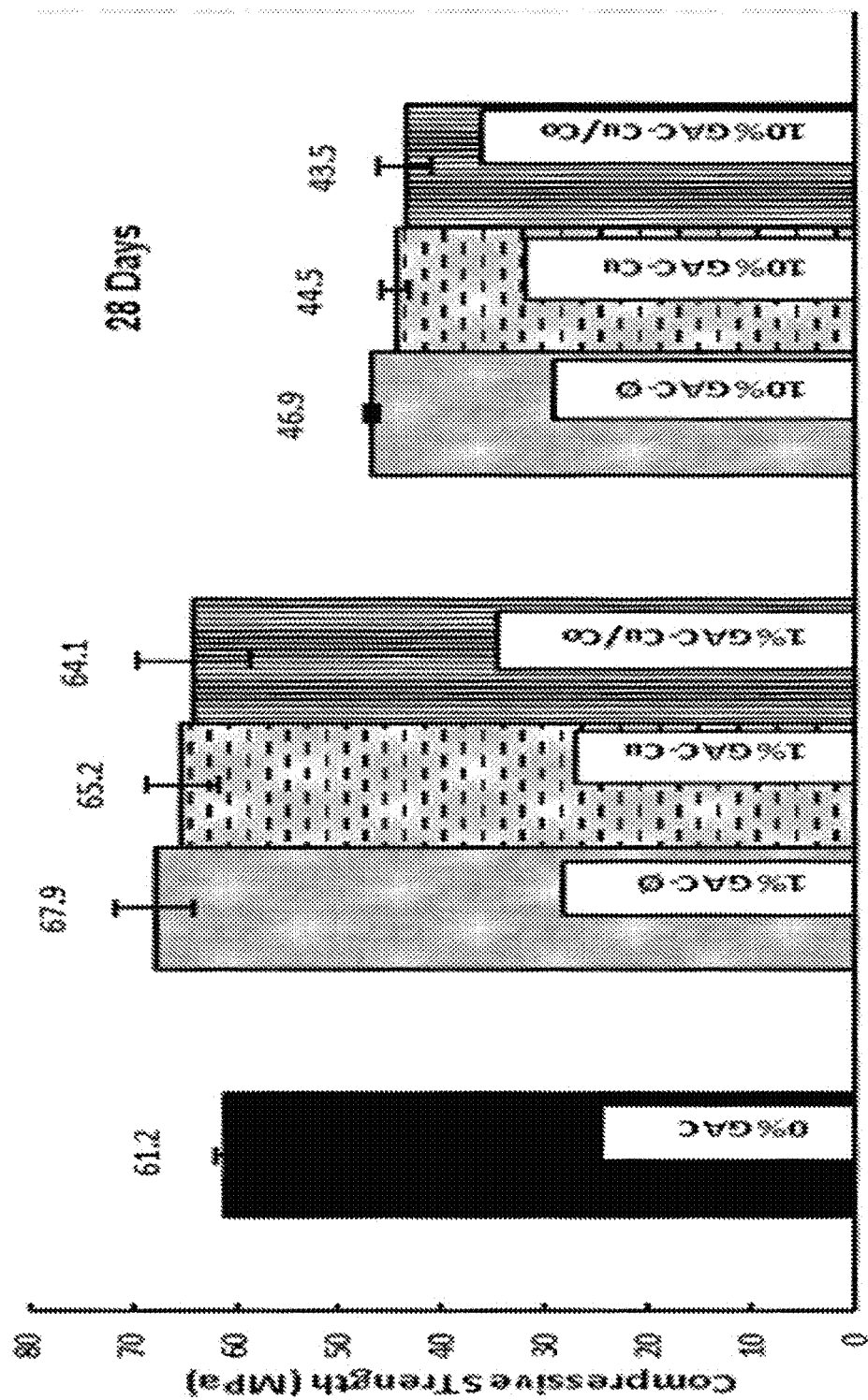

FIG. 45 provides a bar graph showing the influence on compressive strength of the replacement by mass of 1% or 10% of fine aggregate by GAC laden with biocidal metals (copper and/or copper/cobalt), after a curing period of 28-days. Results represent the average of three cubic specimens. Error bars represent±one standard deviation.

Figure 46:
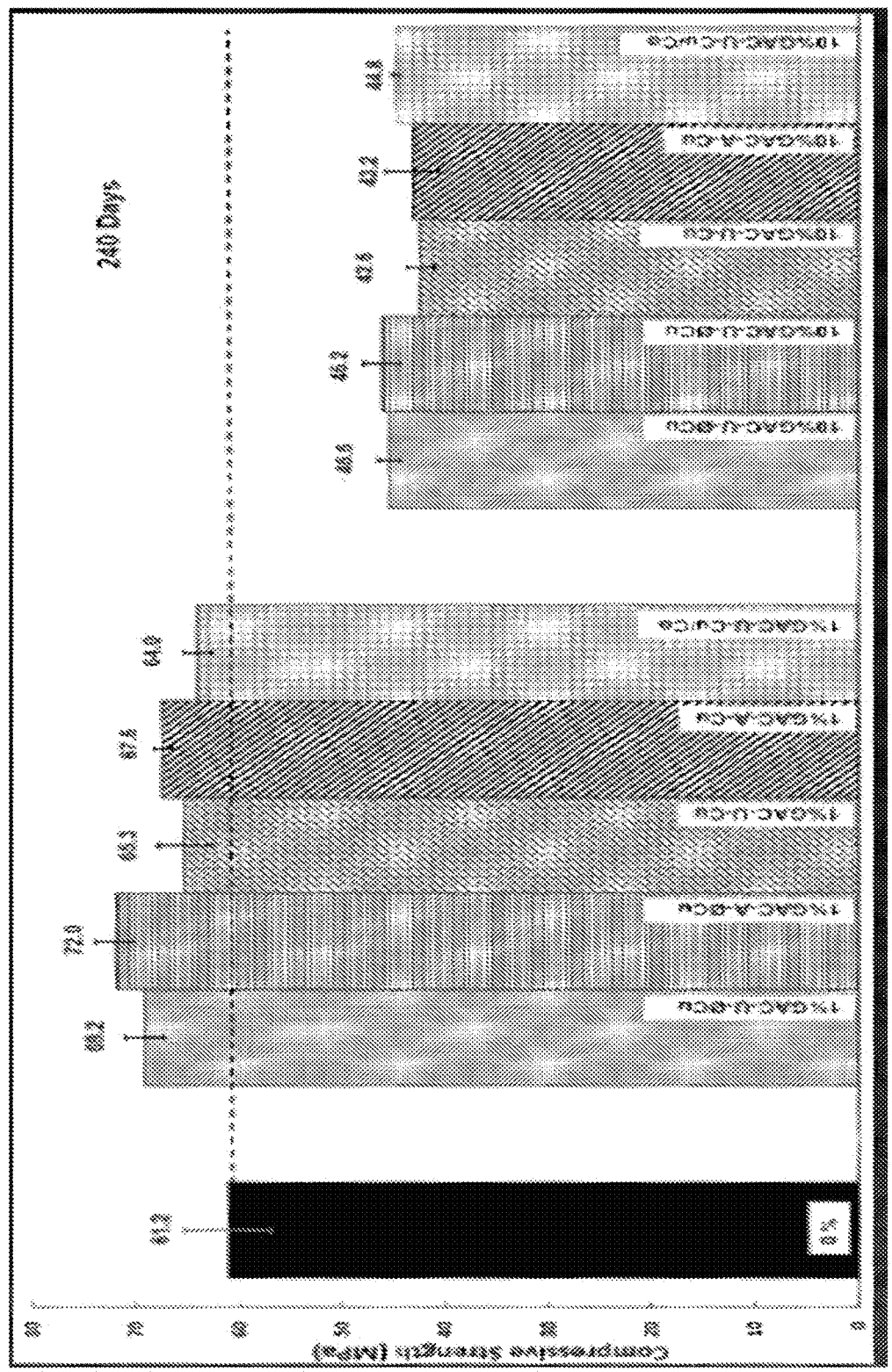

FIG. 46 provides a bar graph showing the influence on compressive strength of replacement of 1% or 10% (w/w) of the fine aggregate with GAC, with or without incorporated metals selected from the group consisting of Cu and Cu/Co, compared to a control lacking GAC substitution, after 240 days of curing.

Figure 47:
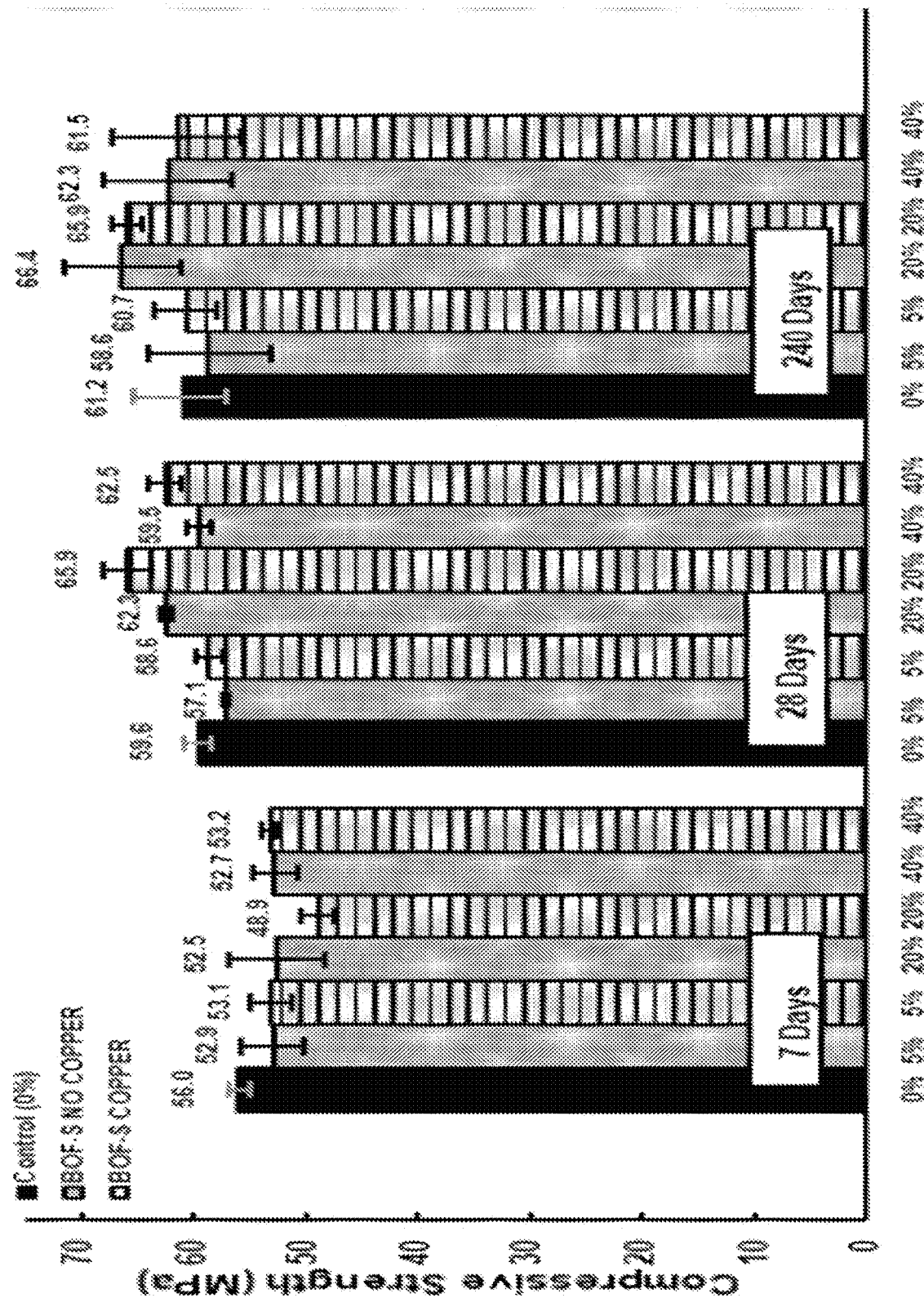

FIG. 47 provides a bar graph showing the influence of the replacement of fine aggregate by BOF-S (with and without copper) on compressive strength, after 7, 28 and 240 days of standard curing. Results represent the average of three cubic specimens for four different percentages (by mass) of BOF-S replacement: 0% (control), 5%, 20%, and 40%. Error bars represent±one standard deviation.

Figure 48A:
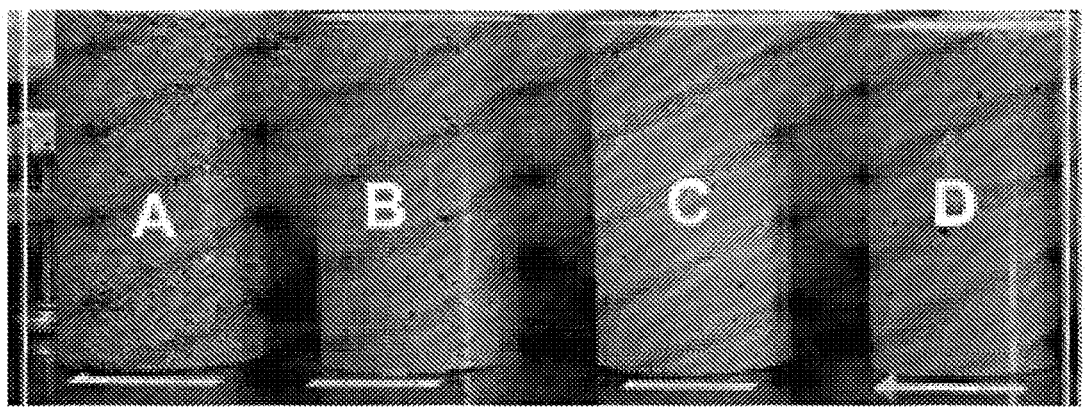
Figure 48B:
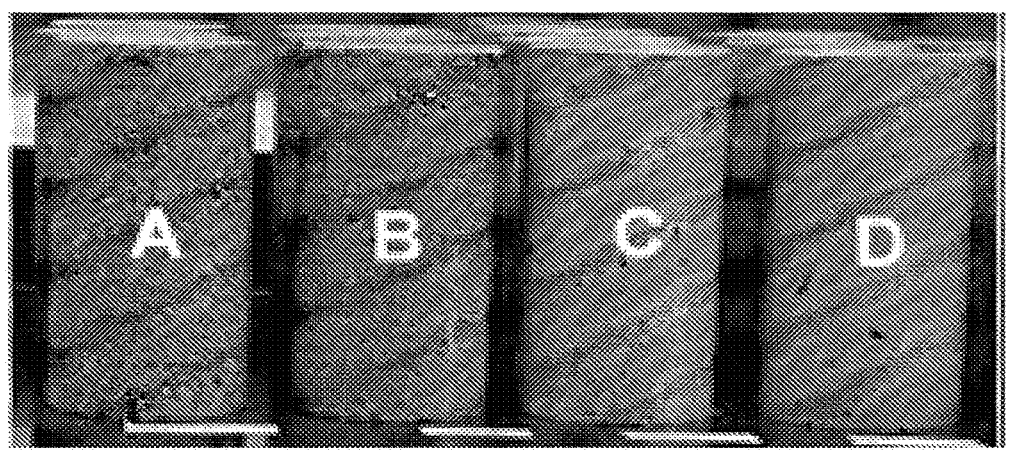
Figure 48C:
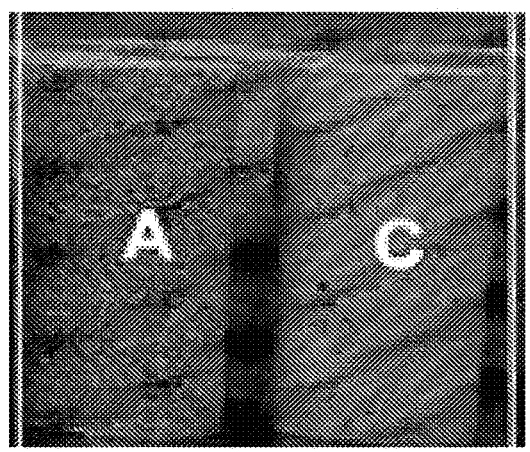

FIGS. 48A-48C provide photographs of cured cylinder surfaces, including control formulations (FIG. 48A), 50%-BOF-S and 1% GAC formulations (FIG. 48B), and 50% BOF-S formulations.

Figure 49:
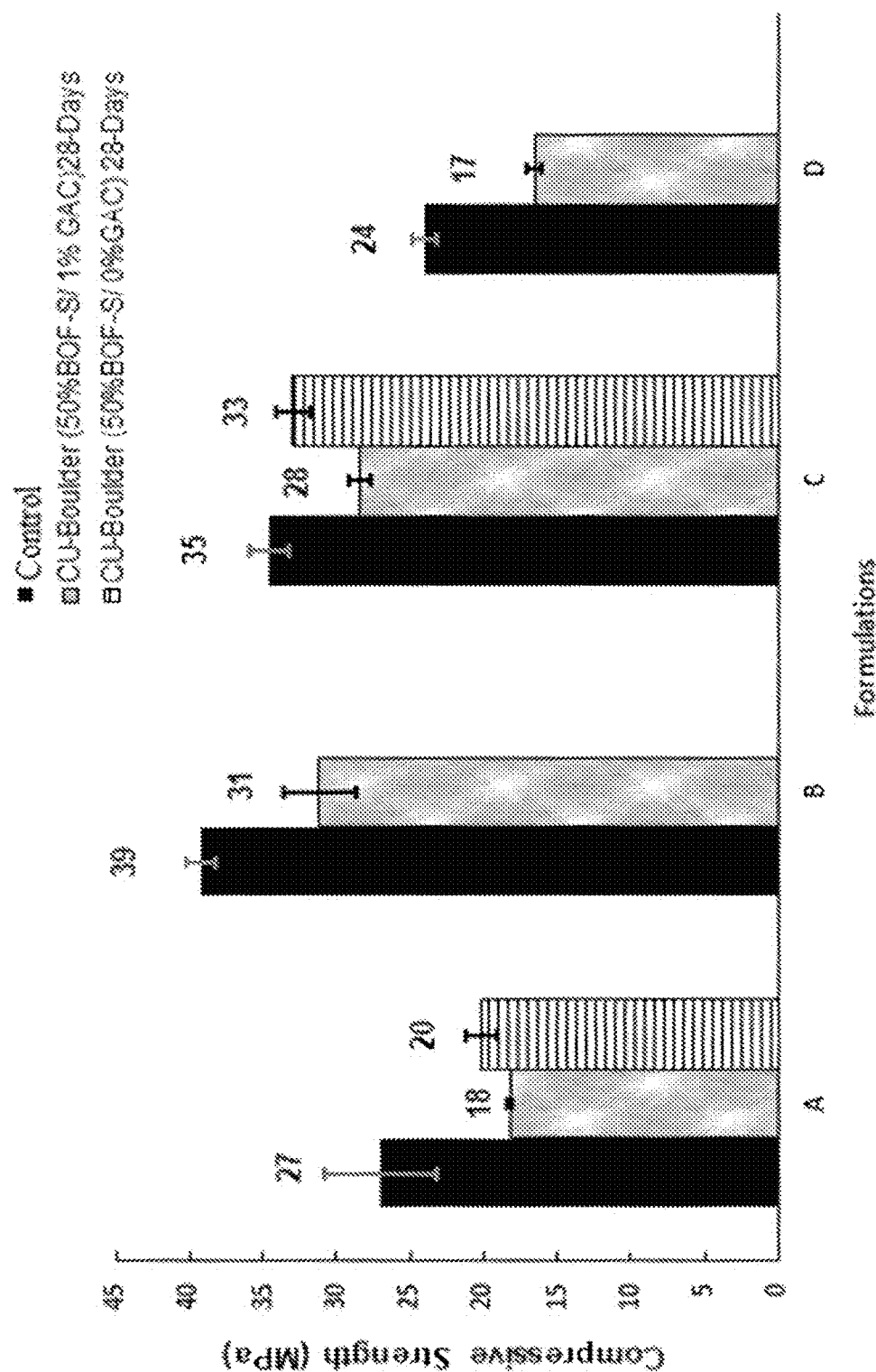

FIG. 49 provides a bar graph showing the influence of fine aggregate replacement with copper-laden BOF-S and GAC on the compressive strength of concrete sewer pipes formulations, after a curing period of 28 days. Results represent the average of three cylindrical specimens for F-A, F-B, F-C, and F-D (black); CUB-A, CUB-B, CUB-C, and CUB-D (grey); and CUB-A-OGAC and CUB-C-OGAC (hashed). Error bars represent±one standard deviation.

Figure 50:
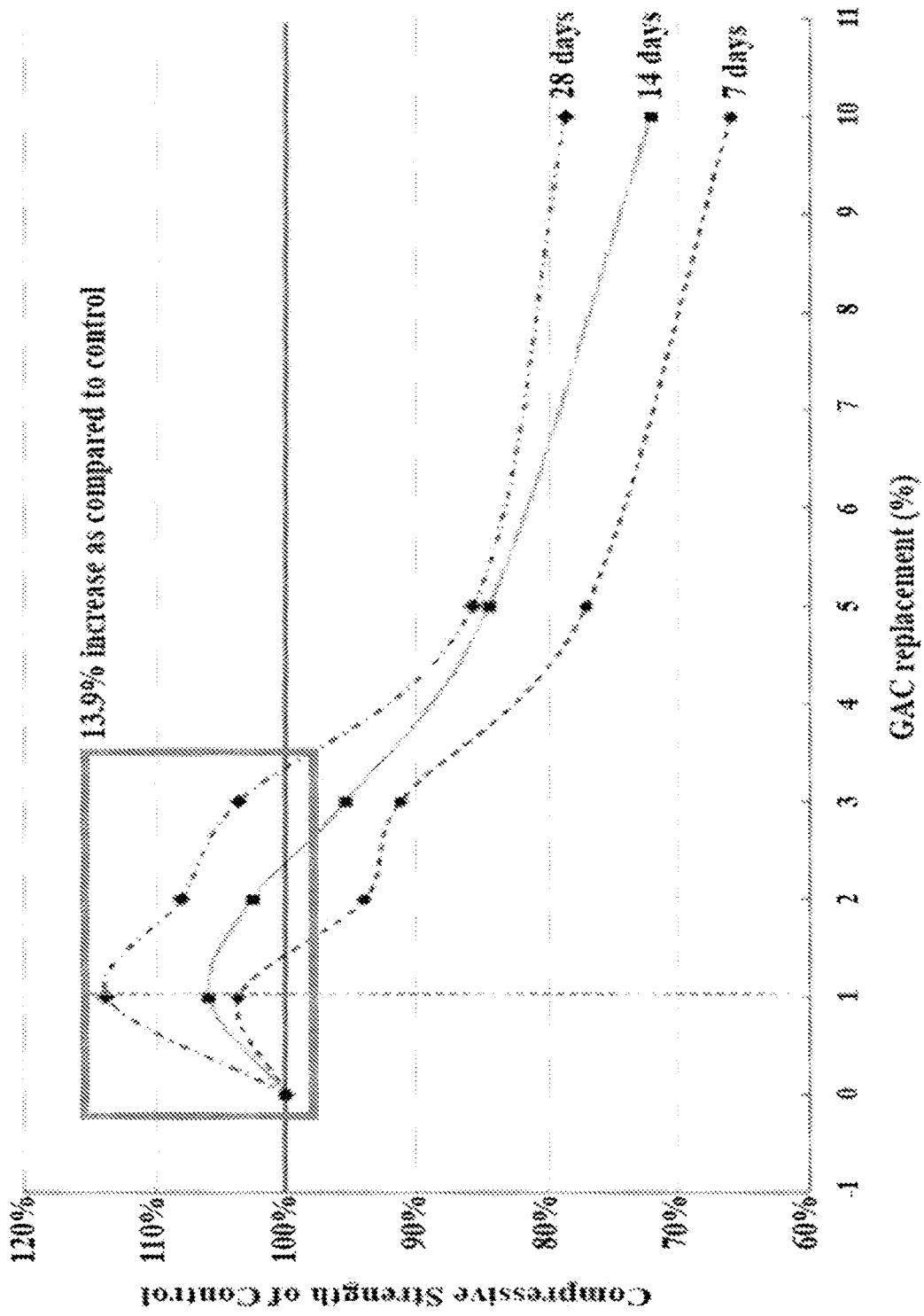

FIG. 50 provides a graph showing the influence of GAC substitution (1-10% w/w) on compressive strength with varied periods of curing (7, 14, and 28 days).

Figure 51:
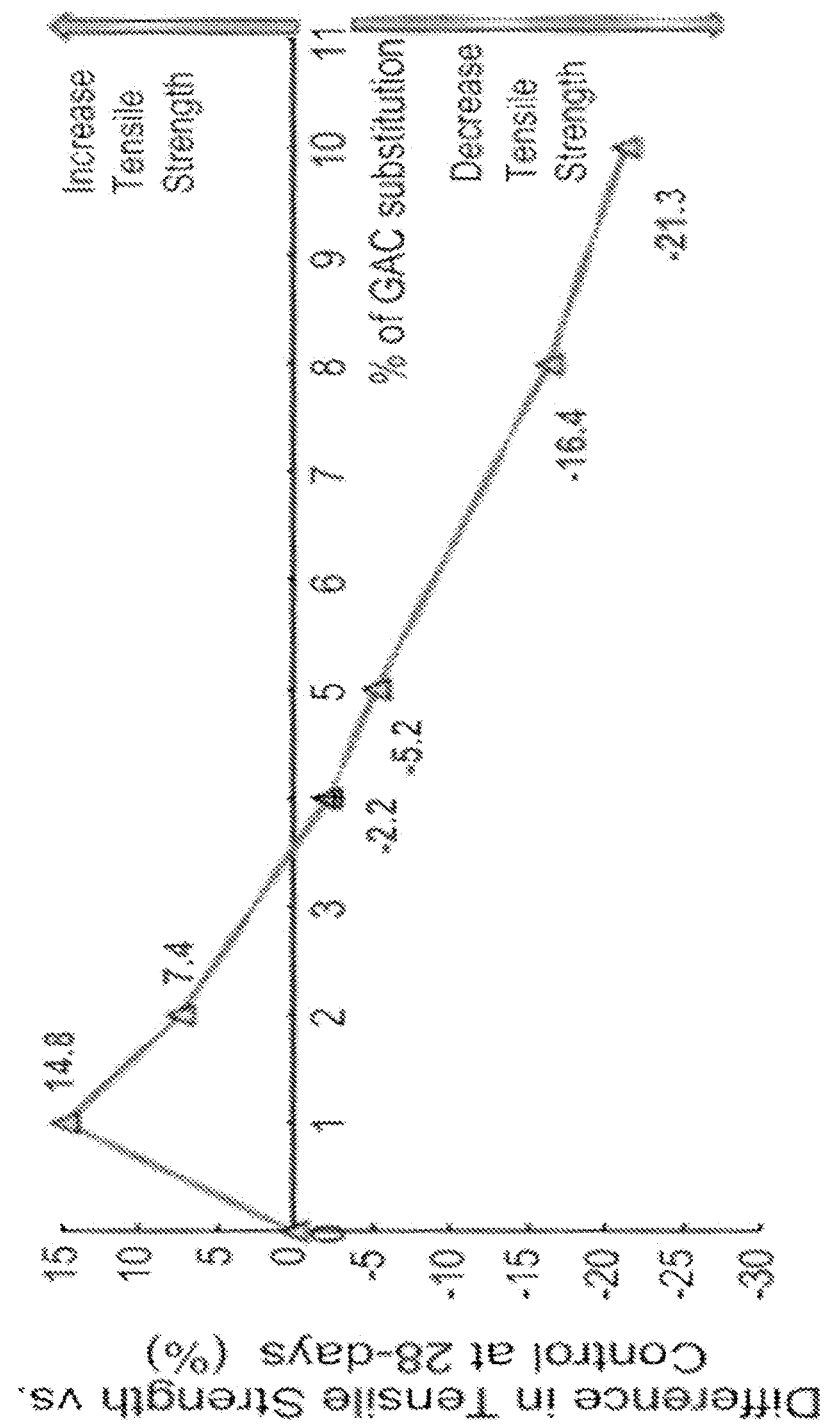

FIG. 51 provides a graph showing the influence of increasing GAC substitution on the tensile strength of cement mortar compositions.

Figure 52:
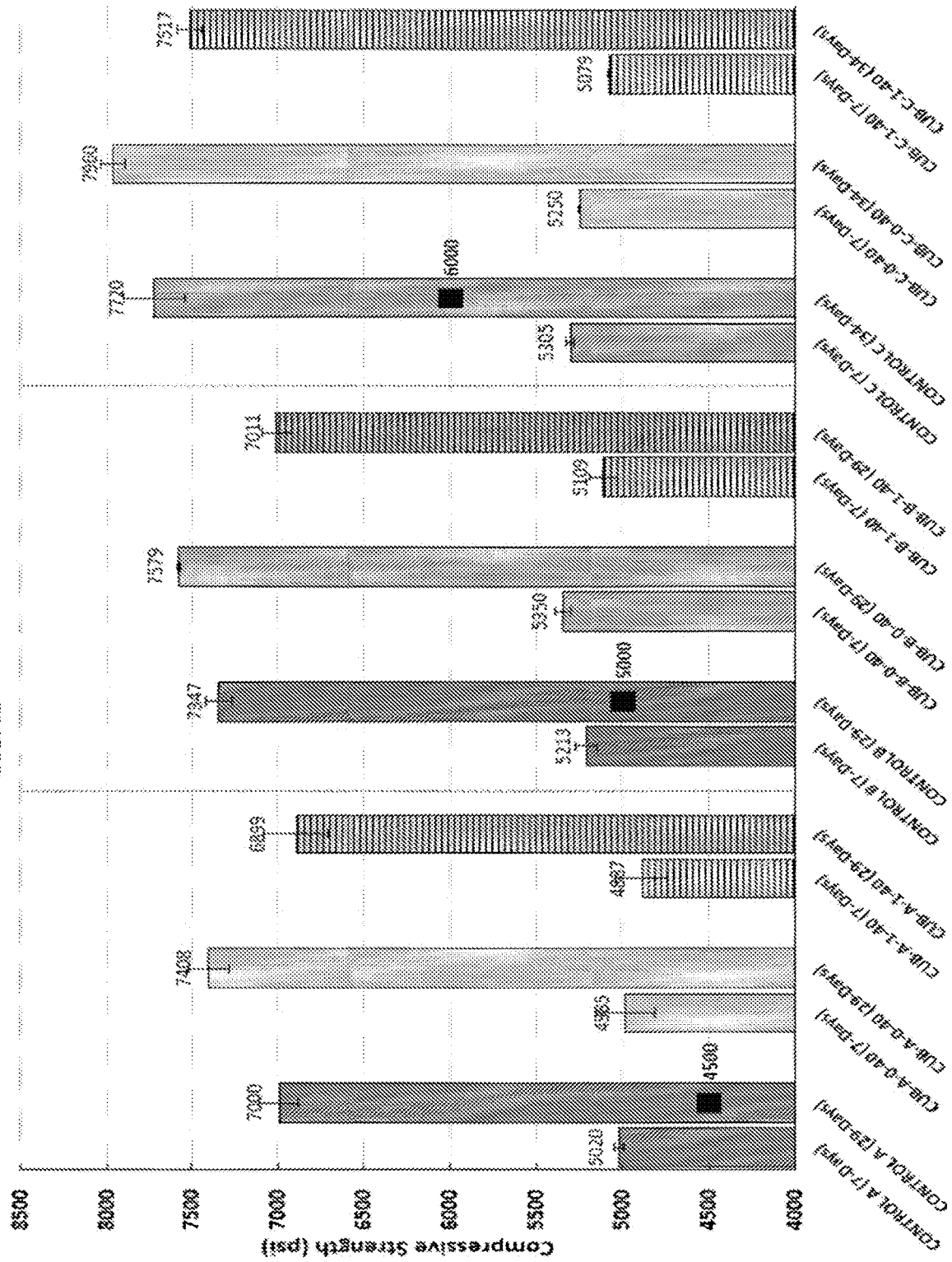

FIG. 52 provides a bar graph showing the compressive strength of three different compositions (i.e. A, B, and C), including for each formulation: a control lacking GAC and/or steel slag fine aggregate substitution; a mixture wherein a fraction the fine aggregate is substituted with 1% GAC (w/w) and 40% steel slag (w/w); and a mixture wherein the fine aggregate was substituted with 40% GAC steel slag (w/w); wherein each of the control, 1% GAC/40% steel slag, and 40% steel slag formulations for each composition were cured for two different periods of time. The design compressive strength is represented with a black square: Formulation A: 4500 psi; Formulation B: 5000 psi; and Formulation C: 6000 psi. The mixtures of Formulation A and Formulation B were cured at 7 and 29 days, whereas the mixtures of Formulation C were cured at 7 and 34 days. Concrete compositions: CONTROL A (fine aggregate sand, ⅜" coarse aggregate); CUB-A-0-40 (fine aggregate sand, ⅜" coarse aggregate, 40% steel slag); CUB-A-1-40 (fine aggregate sand, ⅜" coarse aggregate, 1% GAC, 40% steel slag); CONTROL B (fine aggregate sand, ⅜" coarse aggregate); CUB-B-0-40 (fine aggregate sand, ⅜" coarse aggregate, 40% steel slag); CUB-B-1-40 (fine aggregate sand, ⅜" coarse aggregate, 1% GAC, 40% steel slag); CONTROL C (fine aggregate sand, ⅜" coarse aggregate); CUB-C-0-40 (fine aggregate sand, ⅜" coarse aggregate, 40% steel slag); CUB-C-1-40 (fine aggregate sand, ⅜" coarse aggregate, 1% GAC, 40% steel slag).

DETAILED DESCRIPTION OF THE INVENTION

The invention relates to development of metal-impregnated sorbents to substitute for a fraction of the fine aggregates traditionally used in cements. In certain embodiments, the sorbents contemplated in the invention inhibit the bacterial communities responsible for the corrosion in sewer systems. As described herein, the inhibition potential of selected heavy metals against Sulfur Oxidizing Bacteria (SOB) communities were evaluated to resolve the minimum inhibitory concentrations of the metals, individually as well as in different combinations. Simultaneously, different sorbents along with their metal desorption profiles in response to biogenic acid are also characterized. Field studies in the Denver Metropolitan wastewater collection system were used to assess anti-corrosion performance of cement mortar formulations with different loads of metal-impregnated sorbents.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in inorganic and/or organic chemistry, polymer chemistry and materials sciences are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

The term "associated with" as used herein refers to a non-covalent interaction or association of two or more substances which are in contact with or mixed with one another, wherein the mixing can be homogenous or non-homogenous.

The term "makes bioavailable" refers to a phenomenon wherein the coordination state of the metal changes in such a manner that the metal may interact with biological organisms (e.g. bacteria) and exhibit antibacterial activity.

As used herein, the term "cementitious" includes cement or any material that contain cement. Non-limiting examples of material that comprise cement are concrete, mortar, stucco, tile grout, and/or thin-set adhesive.

As used herein, the term "comprising" includes "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

As used herein, "GAC" refers to granular activated carbon. In certain embodiments, the GAC has a specific surface area greater than about 500 $m^2/g$.

As used herein, "GAC-Acid" refers to a GAC treated with acid (under conditions that may in certain embodiments involve heating), which results in a surface area-modified GAC. A GAC-Acid has a surface area about 15% to about 30% smaller than the corresponding GAC. The acids used for modifying GAC include, for example, nitric acid, citric acid, sulfuric acid, acetic acid or phosphoric acid.

As used herein, the term "liquid-water reducer" refers to a chemical agent which is added to a concrete mixture before it is poured, wherein the addition of the chemical agent at least one of: reduces the amount of water needed (i.e. increases the workability of the mortar), decreases the resultant concrete porosity, increases the resultant concrete strength, reduces the water permeability, and increases the resultant concrete durability.

The term "shotcrete" as used herein, refers to the process of placing concrete or mortar, wherein the cementitious material is conveyed through a hose and pneumatically projected at a high velocity onto a surface.

Abbreviations used herein include: Granular activated carbon (GAC), Surface area-modified granular activated carbon (GAC-Acid), Sulfur Oxidizing Bacteria (SOB), basic oxygen furnace slag (BOF-S), and Microbial Induced Concrete Corrosion (MICC).

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compositions

In one aspect, the present disclosure provides a composition comprising a cementitious substrate and at least one fine aggregate associated with at least one heavy metal, wherein the fine aggregate is present throughout the composition and comprises at least one of granular activated carbon (GAC) and steel slag, or any combinations thereof.

In certain embodiments, the GAC comprises unmodified GAC. In certain embodiments, the GAC comprises surface area-modified granular activated carbon (GAC-Acid).

In certain embodiments, the GAC comprises at least one heavy metal. In certain embodiments, the at least one heavy metal is selected from the group consisting of cadmium (Cd), chromium (Cr), zinc (Zn), copper (Cu), silver (Ag), nickel (Ni), cobalt (Co), lead (Pb), molybdenum (Mo), and tungsten (W). In certain embodiments, the at least one heavy metal is at least one of Cu and Co. In certain embodiments, the at least one heavy metal is Cu. In certain embodiments, the at least one heavy metal is Cu and Co. In certain embodiments, the GAC comprises Cu having a concentration of about 10 to about 20 mg Cu/g GAC. In certain embodiments, the GAC comprises Cu having a concentration of about 10 to about 15 mg Cu/g GAC. In certain embodiments, the GAC comprises Cu having a concentration of about 15 to about 20 mg Cu/g GAC. In certain embodiments, the GAC comprises Cu having a concentration of about 12 to about 14 mg Cu/g GAC. In certain embodiments, the GAC comprises Cu having a concentration of about 13 mg Cu/g GAC. In certain embodiments, the GAC comprises Cu having a concentration of 13 mg Cu/g GAC. In certain embodiments, the GAC comprises Cu having a concentration of 12.8 mg Cu/g GAC. In various embodiments, the GAC has a Cu concentration equal to or greater than about 10, 10.2, 10.4, 10.6, 10.8, 11, 11.2, 11.4, 11.6, 11.8, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8, 18, 18.2, 18.4, 18.6, 18.8, 19, 19.2, 19.4, 19.6, 19.8, or 20 mg Cu/g GAC. In various embodiments, the GAC has a Cu concentration equal to or lower than about 10, 10.2, 10.4, 10.6, 10.8, 11, 11.2, 11.4, 11.6, 11.8, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8, 18, 18.2, 18.4, 18.6, 18.8, 19, 19.2, 19.4, 19.6, 19.8, or 20 mg Cu/g GAC.

In certain embodiments, the GAC comprises Co having a concentration of about 0.01 to about 10 mg Co/g GAC. In certain embodiments, the GAC comprises Co having a concentration of about 0.01 to about 8 mg Co/g GAC. In certain embodiments, the GAC comprises Co having a concentration of about 0.01 to about 6 mg Co/g GAC. In certain embodiments, the GAC comprises Co having a concentration of about 0.03 mg Co/g GAC. In certain embodiments, the GAC comprises Co having a concentration of about 4.5 mg Co/g GAC. In various embodiments, the GAC comprises Co having a concentration equal to or greater than about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.50, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, or 6 mg Co/g GAC. In various embodiments, the GAC comprises Co having a concentration equal to or lower than about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.50, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, or 6 mg Co/g GAC.

In certain embodiments, the GAC comprises about 1 to about 10% (w/w) of the fine aggregate. In certain embodiments, the GAC comprises about 1 to about 5% (w/w) of the fine aggregate. In certain embodiments, the GAC comprises about 1% (w/w) of the fine aggregate. In certain embodiments, the GAC comprises about or greater than 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, or 10.0% (w/w) of the fine aggregate. In certain embodiments, the GAC comprises about or lower than 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, or 10.0% (w/w) of the fine aggregate.

In certain embodiments, the steel slag is basic oxygen furnace slag (BOF-S). In certain embodiments, the steel slag comprises at least one heavy metal. In certain embodiments, the at least one heavy metal is selected from the group consisting of cadmium (Cd), chromium (Cr), zinc (Zn), copper (Cu), silver (Ag), nickel (Ni), cobalt (Co), lead (Pb), molybdenum (Mo), and tungsten (W). In certain embodiments, the at least one heavy metal is Cu. In certain embodiments, the steel slag comprises Cu having a concentration of about 10 to about 20 mg Cu/g steel slag. In certain embodiments, the steel slag comprises Cu having a concentration of about 10 to about 15 mg Cu/g steel slag. In certain embodiments, the steel slag comprises Cu having a concentration of about 15 to about 20 mg Cu/g steel slag. In certain embodiments, the steel slag comprises Cu having a concentration of about 16 to about 19 mg Cu/g steel slag. In certain embodiments, the steel slag comprises Cu having a concentration of about 18 mg Cu/g steel slag. In certain embodiments, the steel slag comprises Cu having a concentration of 17.9 mg Cu/g steel slag. In certain embodiments, the steel slag comprises Cu having a concentration equal to or greater than about 10, 10.2, 10.4, 10.6, 10.8, 11, 15 11.2, 11.4, 11.6, 11.8, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8, 18, 18.2, 18.4, 18.6, 18.8, 19, 19.2, 19.4, 19.6, 19.8, or 20 mg Cu/g steel slag. In certain embodiments, the steel slag comprises Cu having a concentration equal to or lower than about 10, 10.2, 10.4, 10.6, 10.8, 11, 15 11.2, 11.4, 11.6, 11.8, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8, 18, 18.2, 18.4, 18.6, 18.8, 19, 19.2, 19.4, 19.6, 19.8, or 20 mg Cu/g steel slag.

In certain embodiments, the steel slag comprises about 5 to about 50% (w/w) of the fine aggregate. In certain embodiments, the steel slag comprises about 5 to about 10% (w/w) of the fine aggregate. In certain embodiments, the steel slag comprises about 10 to about 15% (w/w) of the fine aggregate. In certain embodiments, the steel slag comprises about 15 to about 20% (w/w) of the fine aggregate. In certain embodiments, the steel slag comprises about 20 to about 25% (w/w) of the fine aggregate. In certain embodiments, the steel slag comprises about 25 to about 30% (w/w) of the fine aggregate. In certain embodiments, the steel slag comprises about 30 to about 35% (w/w) of the fine aggregate. In certain embodiments, the steel slag comprises about 35 to about 40% (w/w) of the fine aggregate. In certain embodiments, the steel slag comprises about 40 to about 45% (w/w) of the fine aggregate. In certain embodiments, the steel slag comprises about 45 to about 50% (w/w) of the fine aggregate. In certain embodiments, the steel slag comprises about 40% (w/w) of the fine aggregate. In certain embodiments, the steel slag comprises equal to or greater than about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% (w/w) of the fine aggregate. In certain embodiments, the steel slag comprises equal to or lower than about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% (w/w) of the fine aggregate.

In certain embodiments, the fine aggregate further comprises sand. In certain embodiments, the sand is Ottawa sand. In certain embodiments, the sand comprises about 40 to about 99% (w/w) of the fine aggregate. In certain embodiments, the sand comprises about 40 to about 90% (w/w) of the fine aggregate. In certain embodiments, the sand comprises about 40 to about 80% (w/w) of the fine aggregate. In certain embodiments, the sand comprises about 50 to about 70% (w/w) of the fine aggregate. In certain embodiments, the sand comprises about 55 to about 65% (w/w) of the fine aggregate. In certain embodiments, the sand comprises about 60% (w/w) of the fine aggregate. In certain embodiments, the sand comprises about 59% (w/w) of the fine aggregate. In certain embodiments, the sand comprises equal to or greater than about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% (w/w) of the fine aggregate. In certain embodiments, the sand comprises equal to or lower than about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% (w/w) of the fine aggregate.

In certain embodiments, the composition comprises:
(a) GAC comprising GAC-Acid, wherein: the GAC-Acid is associated with Cu and Co, wherein the concentration of Cu is about 8.3 mg Cu/g GAC and the concentration of Co is about 0.03 mg Co/g GAC; and the GAC-Acid comprises about 1% (w/w) of the fine aggregate;
(b) steel slag comprising BOF-S, wherein: the BOF-S is associated with Cu, wherein the concentration of Cu is about 17.9 mg Cu/g steel slag; and the BOF-S comprises about 40% (w/w) of the fine aggregate; and
(c) sand, wherein: the sand is Ottawa sand; and the sand comprises about 59% (w/w) of the fine aggregate.

In certain embodiments, the at least one heavy metal comprises two heavy metals having a ratio ranging from about 1:1 to about 3:1 (w/w). In various embodiments, the at least one heavy metal comprises two heavy metals having a ratio of equal to or higher than about 1.2:1, 1.4:1, 1.6:1, 1.8:1, 2:1, 2.2:1, 2.4:1, 2.6:1, 2.8:1, or 3:1 (w/w). In various embodiments, the at least one heavy metal comprises two heavy metals having a ratio of equal to or lower than about 1.2:1, 1.4:1, 1.6:1, 1.8:1, 2:1, 2.2:1, 2.4:1, 2.6:1, 2.8:1, or 3:1 (w/w).

In certain embodiments, the composition is part of a cementitious structure comprising the composition. In certain embodiments, the cementitious structure comprises a cementitious material selected from the group consisting of concrete, mortar, stucco, tile grout, and thin-set adhesive. In certain embodiments, the corrosion-resistance and the strength of the cementitious structure is improved as compared to a cementitious structure that does not comprise the composition.

In certain embodiments, the composition makes bioavailable at least a portion of the at least one heavy metal upon contact with an environment having a pH of about 5 or less. In certain embodiments, the bioavailability of the at least one heavy metal reduces or inhibits the growth of acidophilic bacteria within the composition. In certain embodiments, the acidophilic bacteria comprises *Acidithiobacillus thiooxidans* and/or *Acidithiobacillus ferrooxidans*.

It is understood and herein contemplated that the amount of heavy metal used in the composition can vary depending on the intended application environment. As the pH of the application environment drops, the amount of metal having changed coordination state increases and the bacterial inhibition increases. In certain embodiments, an application environment with lower pH requires less amount of metal in the sorbent material to achieve the required bacterial inhibition. Accordingly, for inhibiting the acidophilic bacteria, the concentration of metal is about 5 mg/L to about 100 mg/L. In certain embodiments, the concentration of metal for inhibiting the activity of acidophilic bacteria in liquid is about 5 mg/L, 10 mg/L, 15 mg/L, 20 mg/L, 25 mg/L, 30 mg/L, 35 mg/L, 40 mg/L, 45 mg/L, 50 mg/L, 55 mg/L, 60 mg/L, 65 mg/L, 70 mg/L, 75 mg/L, 80 mg/L, 85 mg/L, 90 mg/L, 95 mg/L, or about 100 mg/L.

The amount of metal used for inhibiting the acidophilic bacteria may also vary depending on whether or not the metal is used in combination with any other metal(s). In one specific embodiment, for example, a decrease in the pH was monitored and used as an indicator for significant acidophilic SOB activity in the liquid samples. When Cu was the only metal used, all samples with a Cu concentration below about 40 mg/L indicated significant acidophilic activity and had a common endpoint below pH 2. Above the threshold of about 40 mg Cu/L, no pH depression was observed; in contrast, pH increased and plateaued at values ranging between 6.5 and 6.7. When Cu was used in combination with Co, the threshold for Cu required to inhibit the acidophilic activity changed to 10 mg Cu/L and the threshold for Co remained at 10 mg Co/L. Surprisingly, these results demonstrate that the amount of metal required for inhibiting the activity of acidophiles varies depending on whether the metal is used alone or is used in combination with any other metal(s).

In certain embodiments, the composition is a coating applied to a cementitious structure. In certain embodiments, the cementitious substrate comprises cement, shotcrete, or concrete. In certain embodiments, the cementitious substrate comprises a non-hydraulic cement or hydraulic cement.

In certain embodiments, the composition is prepared by a process comprising:
providing a homogenous cement aggregate mixture comprising: a first fine aggregate; at least one second fine aggregate; cement; and at least one heavy metal;

wherein the first fine aggregate or the at least one second fine aggregate comprise at least one of GAC, GAC-Acid, and steel slag;

providing a first mixture comprising: at least one coarse aggregate; and a liquid-water reducer;

mixing the homogenous cement-aggregate mixture and the first mixture to form the cementitious composition.

Methods of Use and Manufacture

In another aspect, the invention provides a method of protecting a structure comprising a cementitious material from microbially induced corrosion, the method comprises contacting at least a portion of the cementitious material with a composition presented elsewhere herein, thereby protecting the cementitious material from microbially induced corrosion. In certain embodiments, the cementitious material comprises a structure having a surface, a portion of which is coated with the composition contemplated in the invention. In certain embodiments, the contacting comprises incorporating the composition in the at least a portion of the cementitious material.

In some embodiments, structures that are exposed to aqueous wastes, including saline aqueous wastes, can have their structural integrity or their useful lifetimes extended by incorporating the cementitious materials described herein. Saline aqueous waste includes sea water or ocean water containing wastes. By the way of non-limiting example, the structure is a part of infrastructure such as for example, wastewater infrastructure, water treatment and distribution infrastructure, petroleum refining and transportation infrastructure, subsurface well casings and supports, hydraulic fracturing wells, and natural gas storage and/or transportation infrastructure.

In certain embodiments, the non-limiting examples of structure include manholes, wet wells, pump stations, pipes, clarifiers, and channels.

In certain embodiments, the cementitious material is selected from the group consisting of concrete, mortar, stucco, tile grout, and thin-set adhesive.

In another aspect, the present disclosure provides a method of preparing a cementitious composition, the method comprising:

providing a homogenous cement aggregate mixture comprising: a first fine aggregate; at least one second fine aggregate; cement; and at least one heavy metal; wherein the first fine aggregate or the at least one second fine aggregate comprise at least one of GAC, GAC-Acid, and steel slag;

providing a first mixture comprising: at least one coarse aggregate; and a liquid-water reducer;

mixing the homogenous cement-aggregate mixture and the first mixture to form the cementitious composition.

In certain embodiments, providing the homogenous cement aggregate mixture comprises mixing the first fine aggregate and the at least one second fine aggregate to provide a fine aggregate mixture. In certain embodiments, providing the homogenous cement aggregate mixture comprises adding cement to the fine aggregate mixture to provide a fine aggregate cement mixture. In certain embodiments, providing the homogenous cement aggregate mixture comprises mixing the fine aggregate cement mixture.

In certain embodiments, the liquid-water reducer is dispersed in a volume of water to provide a dispersed admixture solution.

In certain embodiments, providing the first mixture comprises adding about half of the dispersed admixture solution to at least one coarse aggregate to provide a mixture comprising the at least one coarse aggregate and dispersed admixture. In certain embodiments, providing the first mixture comprises mixing the mixture.

In certain embodiments, mixing the homogenous cement-aggregate mixture and the first mixture comprises adding the homogenous fine aggregate cement mixture to the first mixture to provide a second mixture. In certain embodiments, mixing the homogenous cement-aggregate mixture and the first mixture comprises adding about half of the dispersed admixture solution to the second mixture to provide a final mixture. In certain embodiments, mixing the homogenous cement-aggregate mixture and the first mixture comprises subjecting the final mixture to a mixing and resting cycle comprising at least two periods of mixing and an intermittent resting period.

In certain embodiments, the first fine aggregate is sand.

In certain embodiments, the liquid-water reducer comprises about 1.0 to 5.0% (w/w) of 2,2',2"-nitrilothriethanol, about 0.1 to 1.0% (w/w) of 2,2'-iminodiethanol, and about 0.1 to about 1.0% (w/w) of [1,1']-biphenyl-2-ol. In certain embodiments, the liquid-water reducer comprises a lignosulfonate. In certain embodiments, the lignosulfonate comprises sodium lignosulfonate. In certain embodiments, the liquid-water reducer comprises a synthetic sulfonate. In certain embodiments, the liquid-water reducer comprises a polycarboxylate.

In certain embodiments, the first mixture is mixed for a period of about 10 minutes. In certain embodiments, the mixing and resting cycle comprises mixing for 3 minutes, resting for 3 minutes, and mixing for 2 minutes.

Kit

In yet another aspect, the invention provides a kit comprising the composition of the invention and an instructional material, wherein the instructional material comprises instructions for using the composition presented herein to build corrosion-resistant cementitious structures.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents with art-recognized alternatives and using no more than routine experimentation, are within the scope of the present application. In general, the terms and phrases used herein have their art-recognized meaning, which can be found by reference to standard texts, journal references and contexts known to those skilled in the art. Any preceding definitions are provided to clarify their specific use in the context of the invention.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1

Metal Inhibition Potential in Solid Media

Figure 1A:
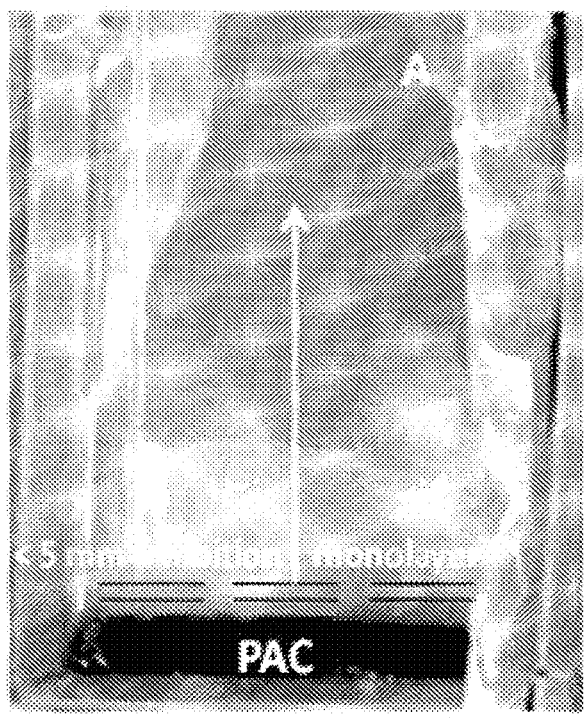
FIGS. 1A-1C show photographs of inhibition response from sulfur oxidizing bacteria isolated from a corroding sewer grown on thiosulfate-containing agar after 240 hours (final pH≤3), in the presence of (FIG. 1A) PAC alone.
Figure 1B:
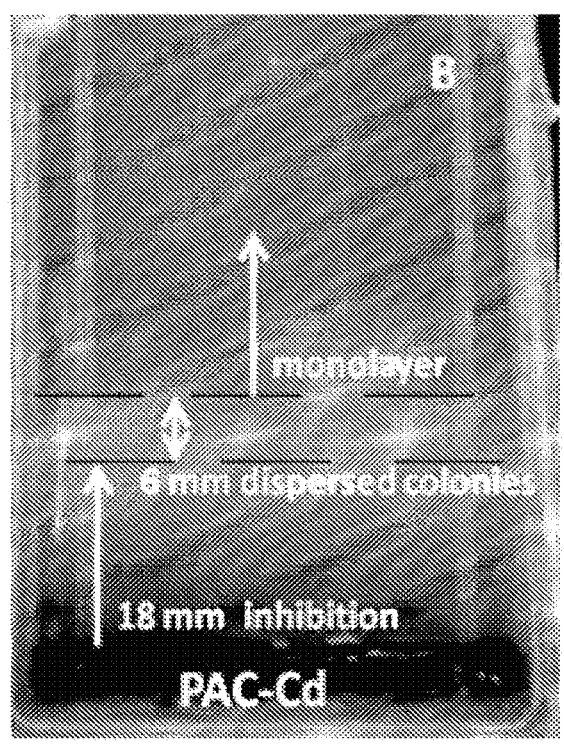
Figure 1C:
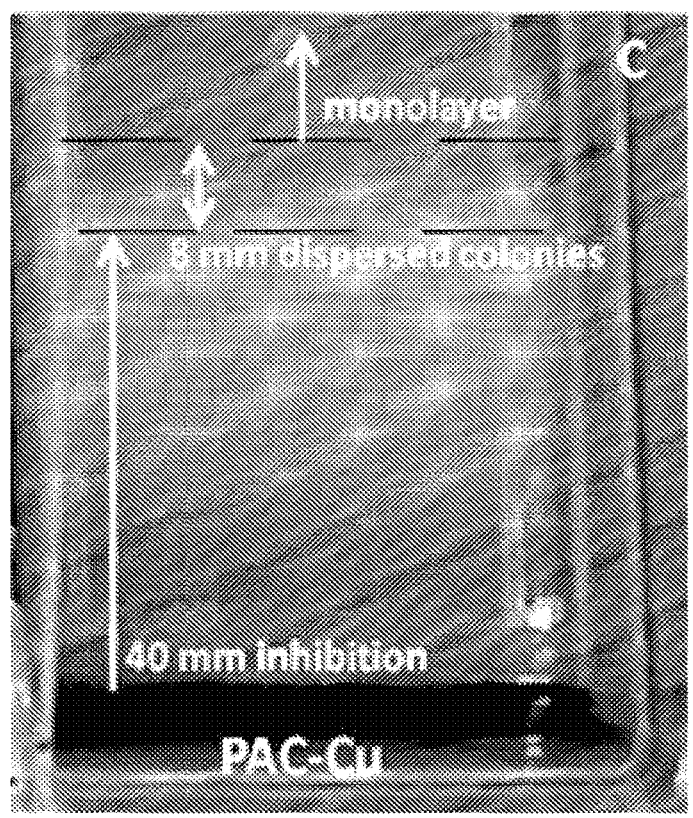

Inhibition potential of selected heavy metal ions was determined by a modified Kirby-Bauer diffusion susceptibility test As indicated by a pH-sensitive indicator dye, after 10 days, the agar pH dropped below 3 evenly across the plate, and the following three microbial growth zones distinctly emerged with different characteristic lengths, from the metal-laden powdered activated carbon (PAC): a clear inhibition zone, followed by a zone of dispersed macrocolonies, which then transitioned into a "lawn" of continuous bacterial growth (FIG. 1A-1C). The control plate (FIG. 1A) containing PAC with no associated metals showed continuous growth along its length, and a small inhibition distance was measured (<5 mm). Different inhibition distances were measured based on the type of metal used and the amounts leached into the agar.

TABLE 1

Metal content as normalized by activated carbon mass (mg Metal/g PAC).

| Cu (mg/g PAC) | Co (mg/g PAC) | Cd (mg/g PAC) | Ni (mg/g PAC) | Zn (mg/g PAC) | (Cu/Co) (mg/g PAC) |
|---|---|---|---|---|---|
| 10.6 | 13.4 | 18.6 | 4.1 | 11.6 | 11/5.1 |

Figure 2:
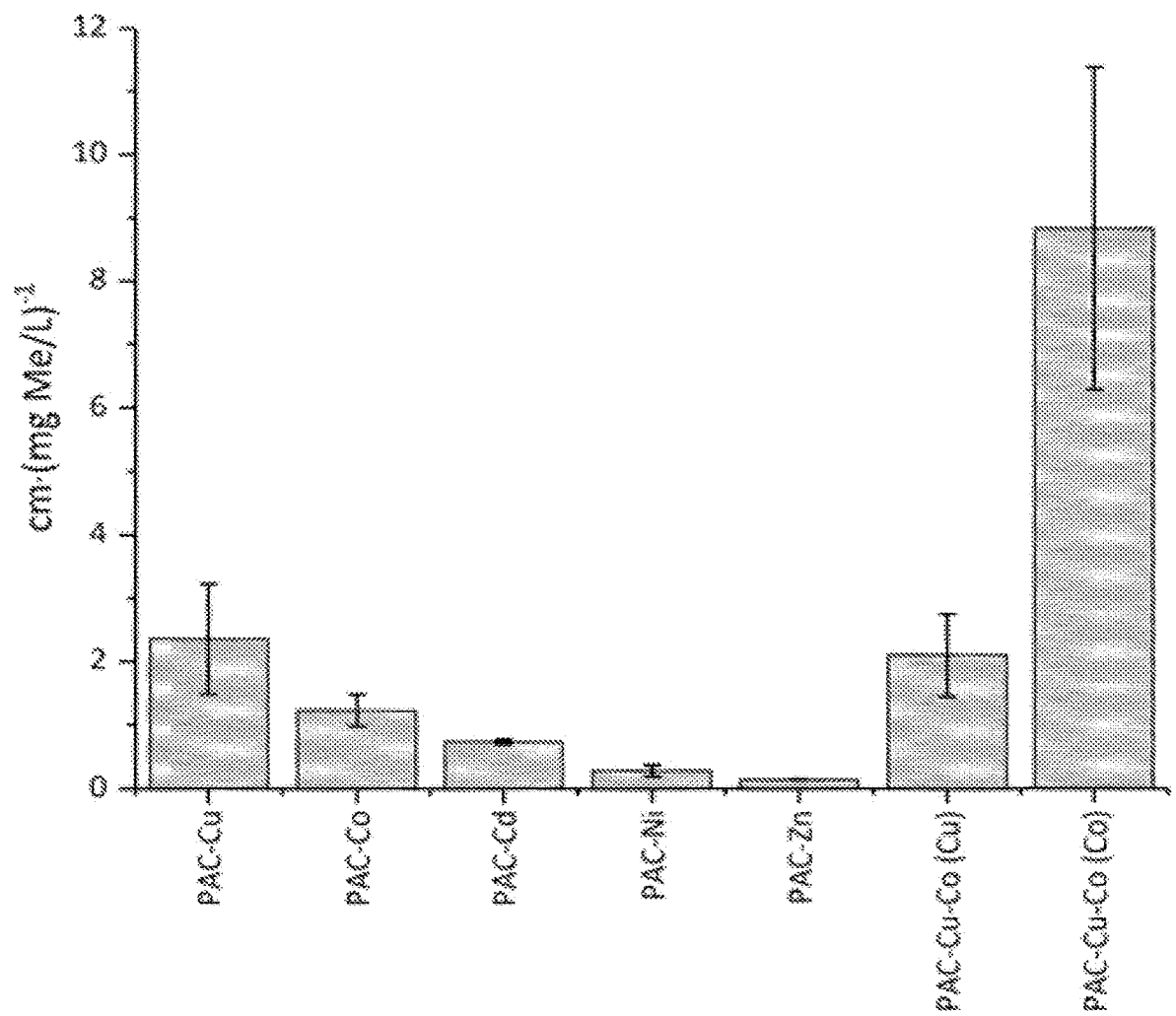
FIG. 2 is a graph showing characteristic inhibition lengths normalized by local metal concentration that had diffused to the end of the inhibition zones as compared to otherwise identical control plates not containing metal. Plates co-loaded with both copper and cobalt are on the right side of the plot; parentheticals below represent metal measured in co-loading scenario. (n=3).

After accounting for the inhibition distance observed on the control plates, and normalizing this characteristic distance by the metal concentrations leached, the "potential" of each metal in inhibiting acidophilic growth was indexed in FIG. 2.

Metal normalized inhibition lengths followed the series Cu>Co>Cd>Ni=Zn, where Zn and Ni displayed the least (relative) inhibitory potential. When Co and Cu were concomitantly loaded on activated carbon, the inhibition potential associated with Co increased 7.18 times over that of the Co alone, while Cu inhibition potential remained significantly unchanged. The correspondent average values on a normalized basis were: 2.36 cm·(mg Cu/L)$^{-1}$, 1.23 cm·(mg Co/L)$^{-1}$, 0.74 cm·(mg Cd/L)$^{-1}$, 0.28 cm·(mg Ni/L)$^{-1}$, 0.14 cm·(mg Zn/L)$^{-1}$, and 2.1 cm·(mg Cu/L)-1 and 8.83 cm·(mg Co/L)$^{-1}$, the latter two values when concomitantly loaded.

Figure 3:
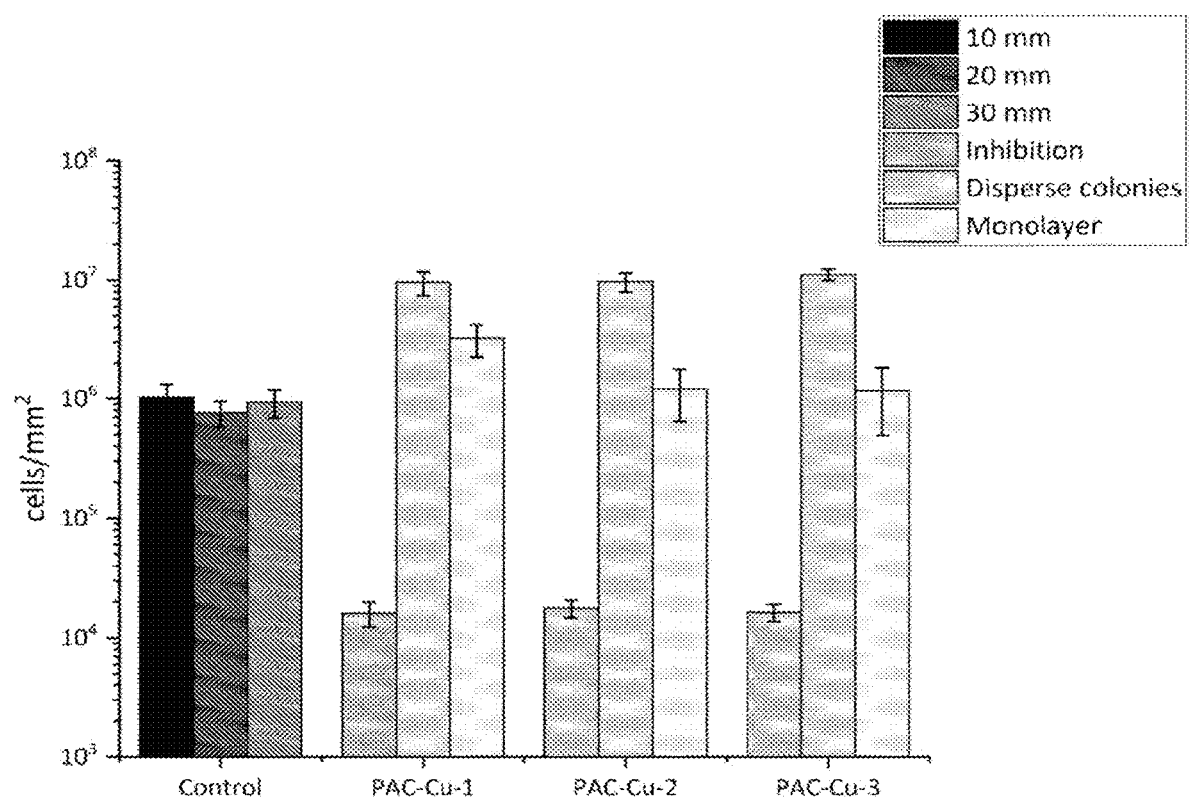
FIG. 3 is a graph showing cell density in the respective inhibition and growth zones on rectangular acidophilic agar plates incorporating copper laden activated carbon. (n=3).
Figure 4A:
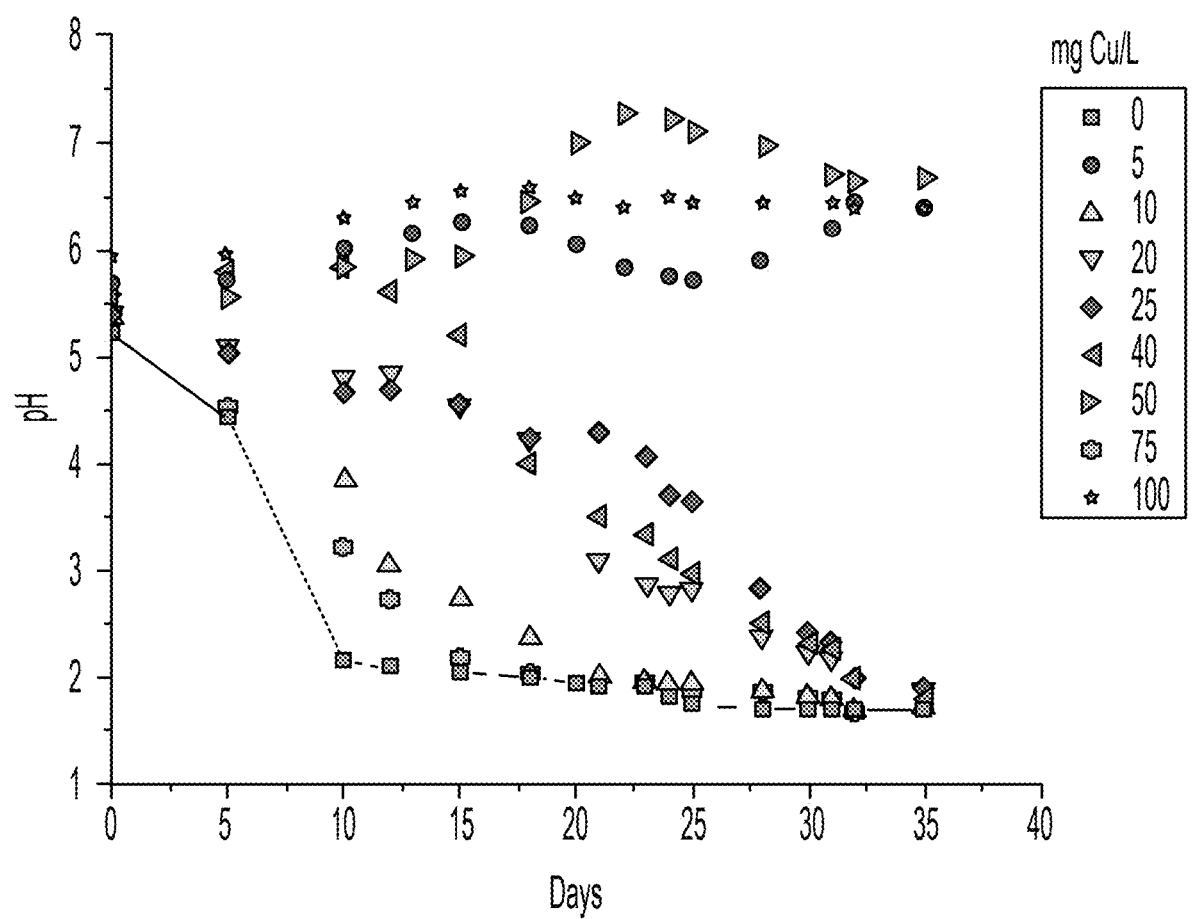
FIGS. 4A-4E are graphs showing pH of enrichments including different levels of copper, cobalt, and silver, alone and in combinations.
Figure 4B:
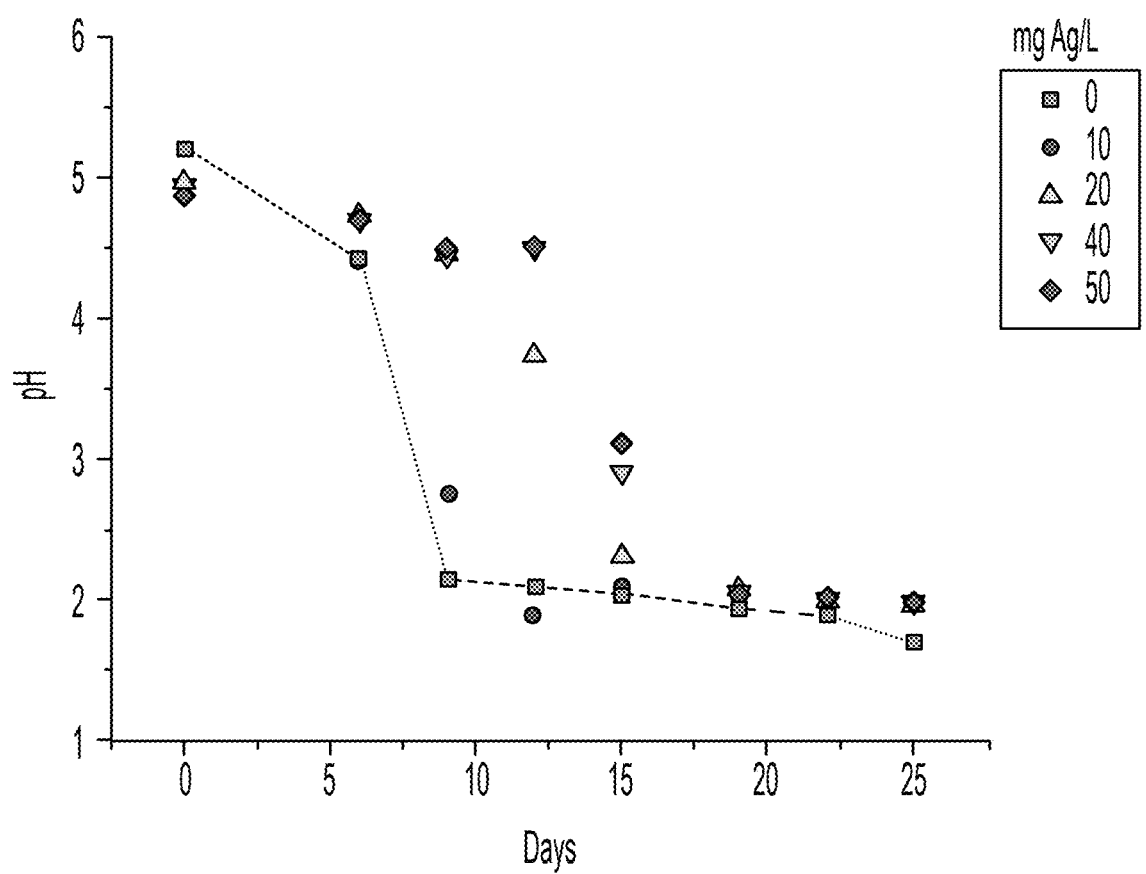
Figure 4C:
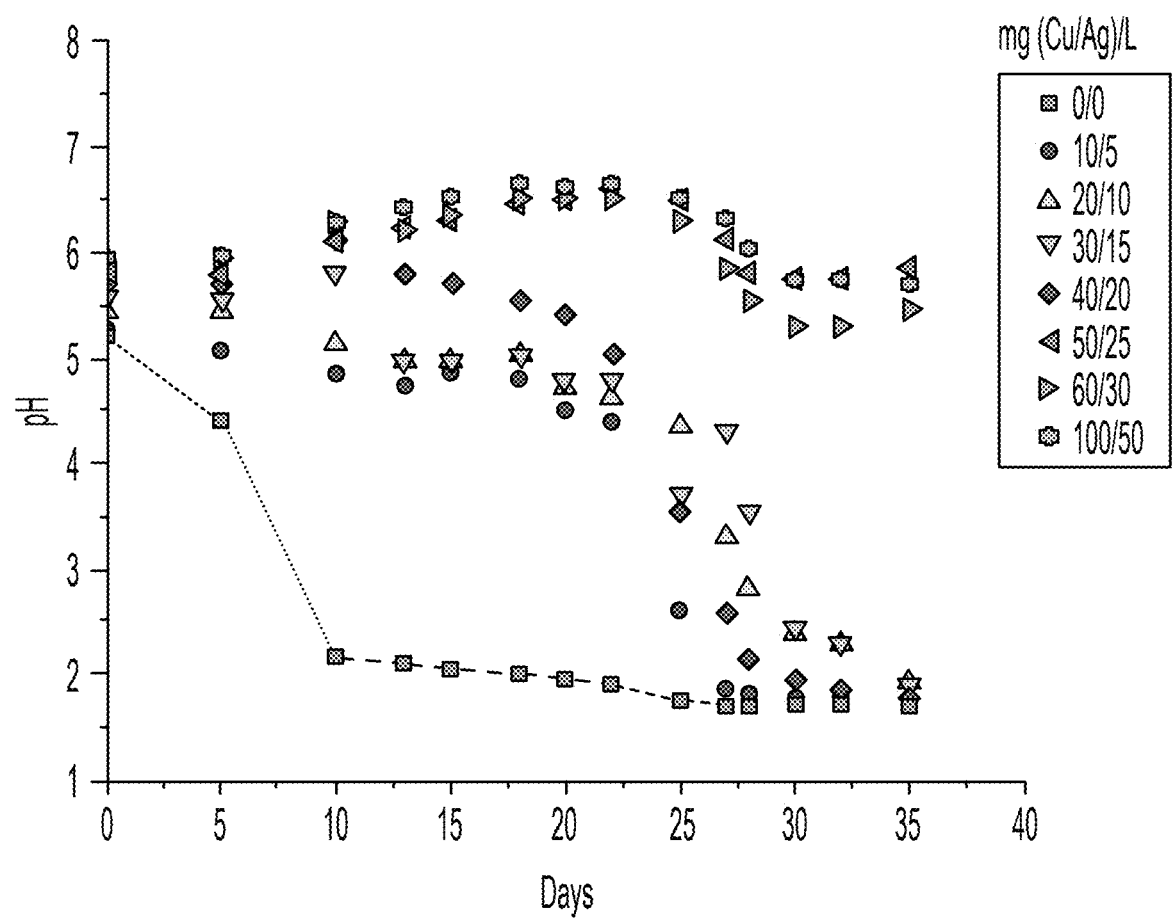
Figure 4D:
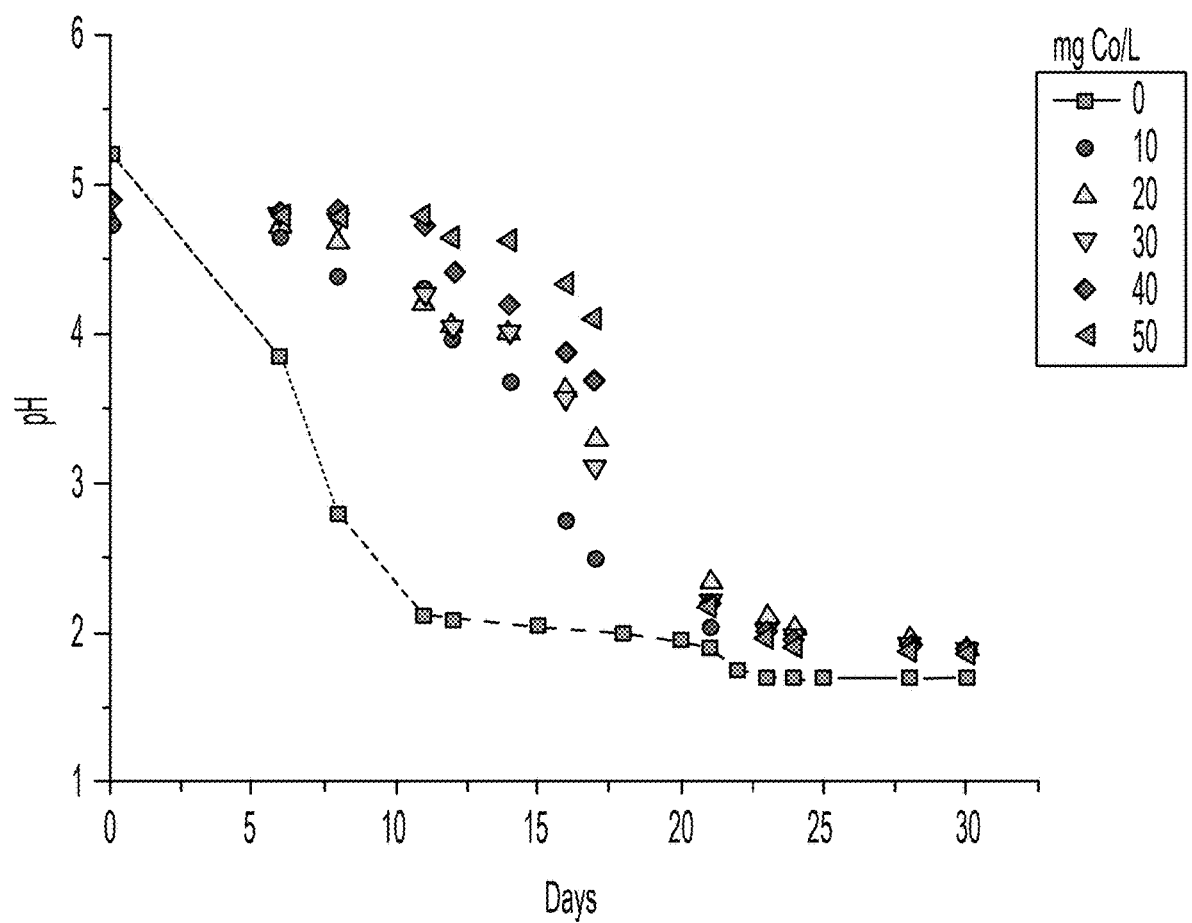
Figure 4E:
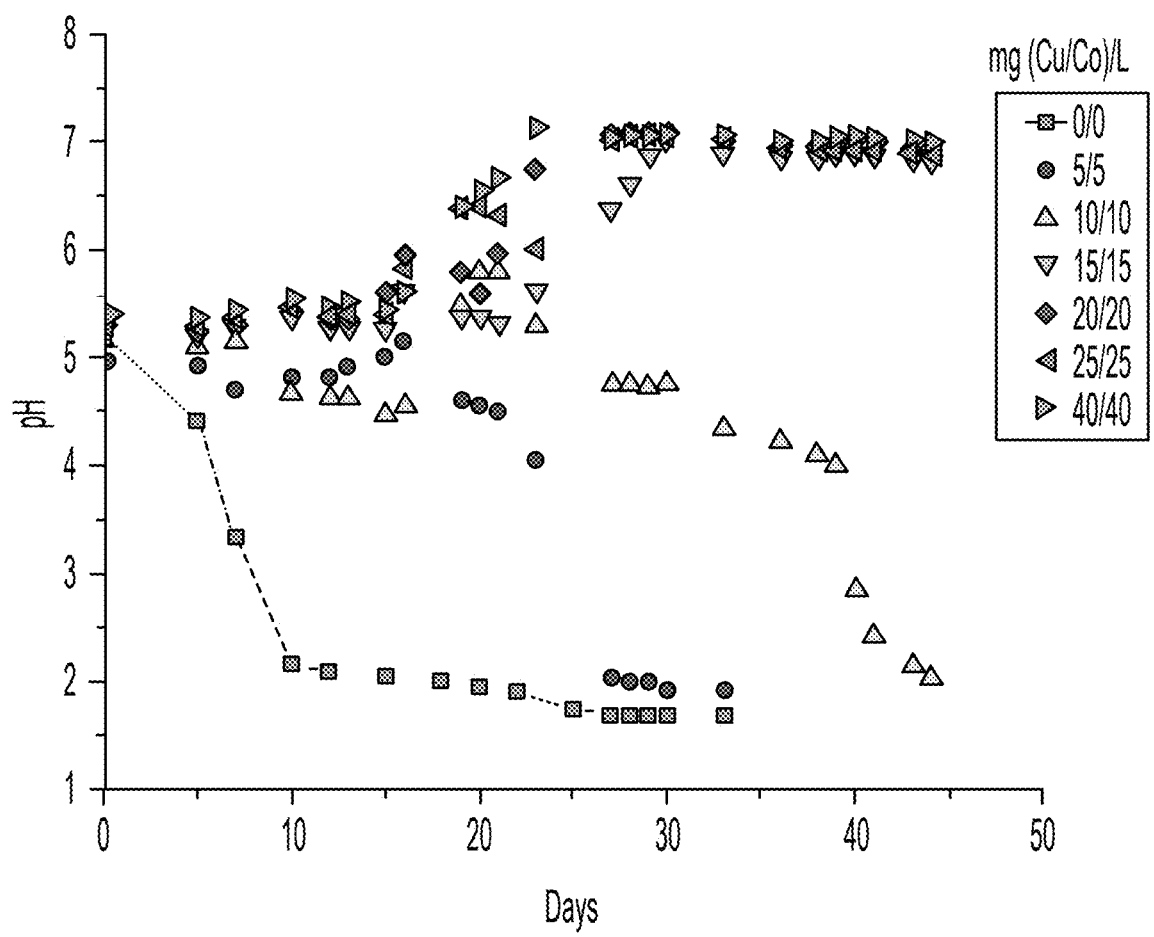
Figure 5A:
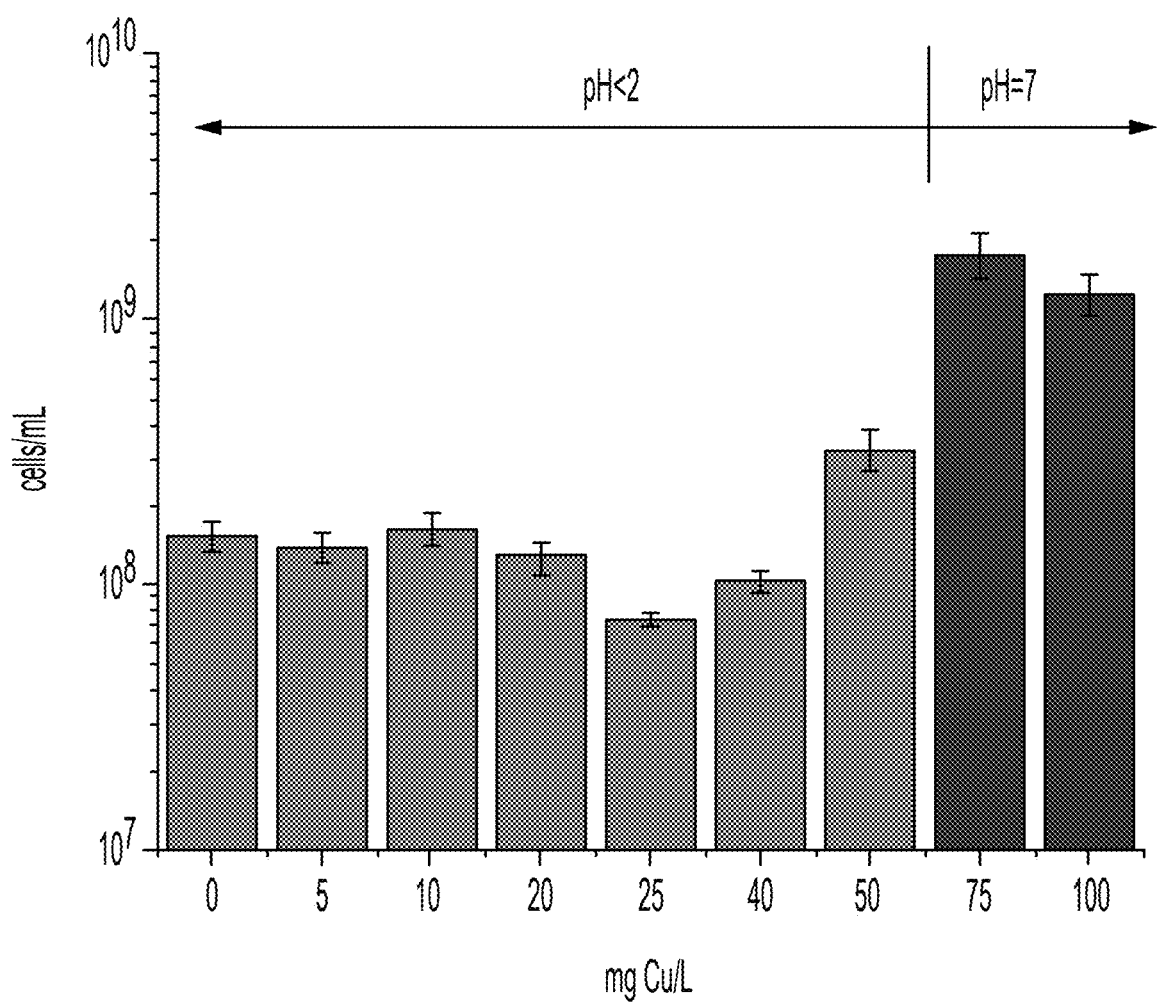
FIGS. 5A-5E are graphs showing cell densities (cells/mL) observed in sewer sourced enrichment cultures including copper, cobalt and silver, alone and in combinations.
Figure 5B:
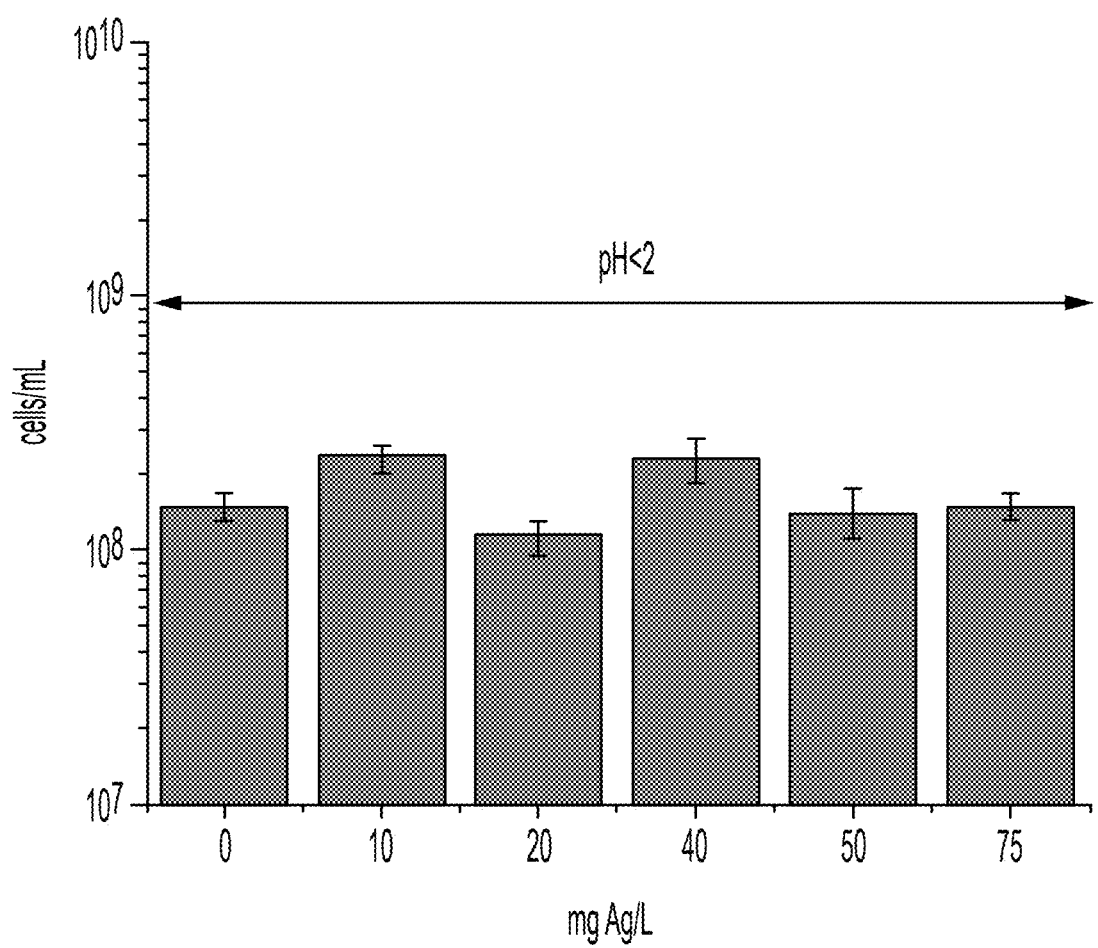
Figure 5C:
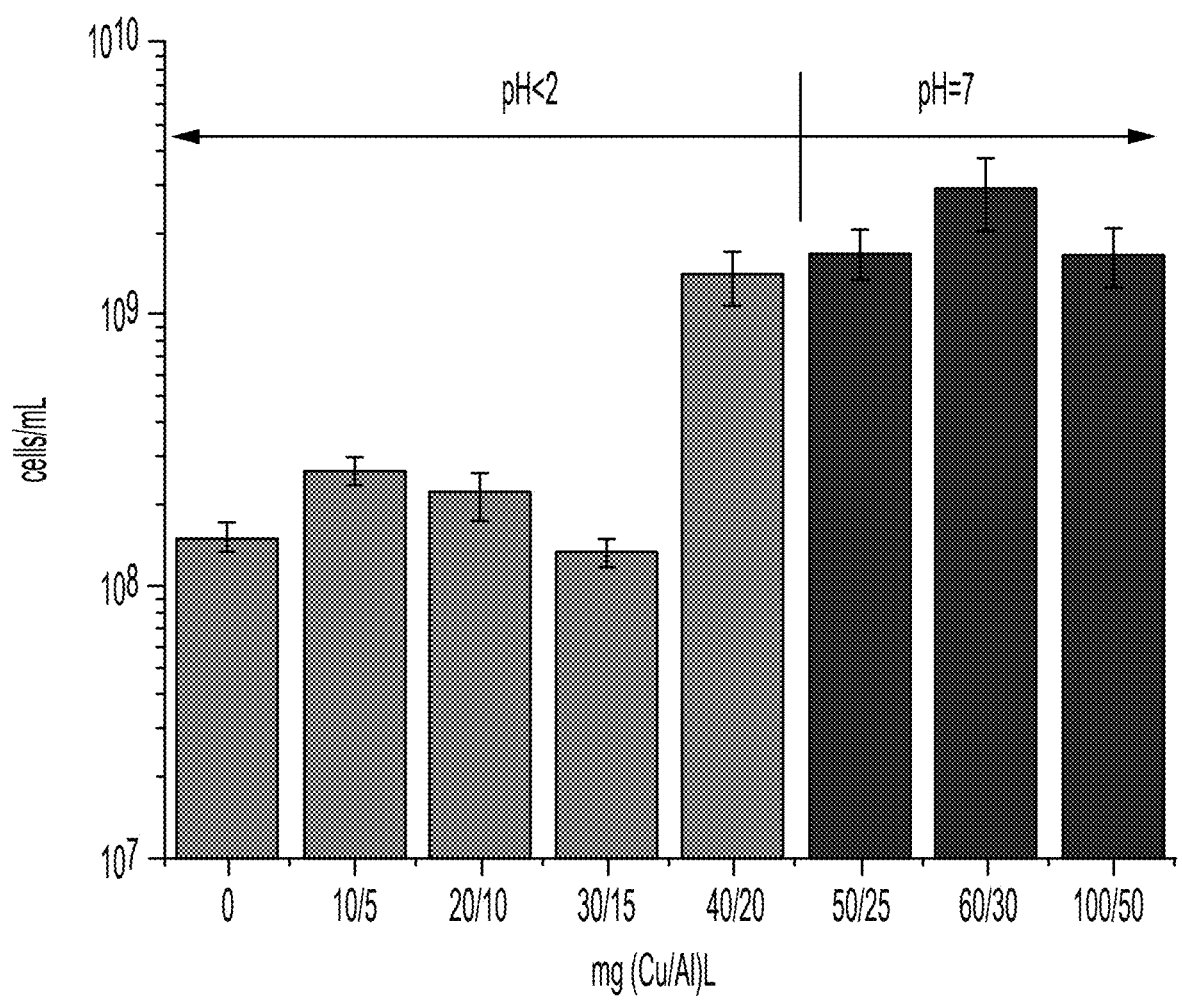
Figure 5D:
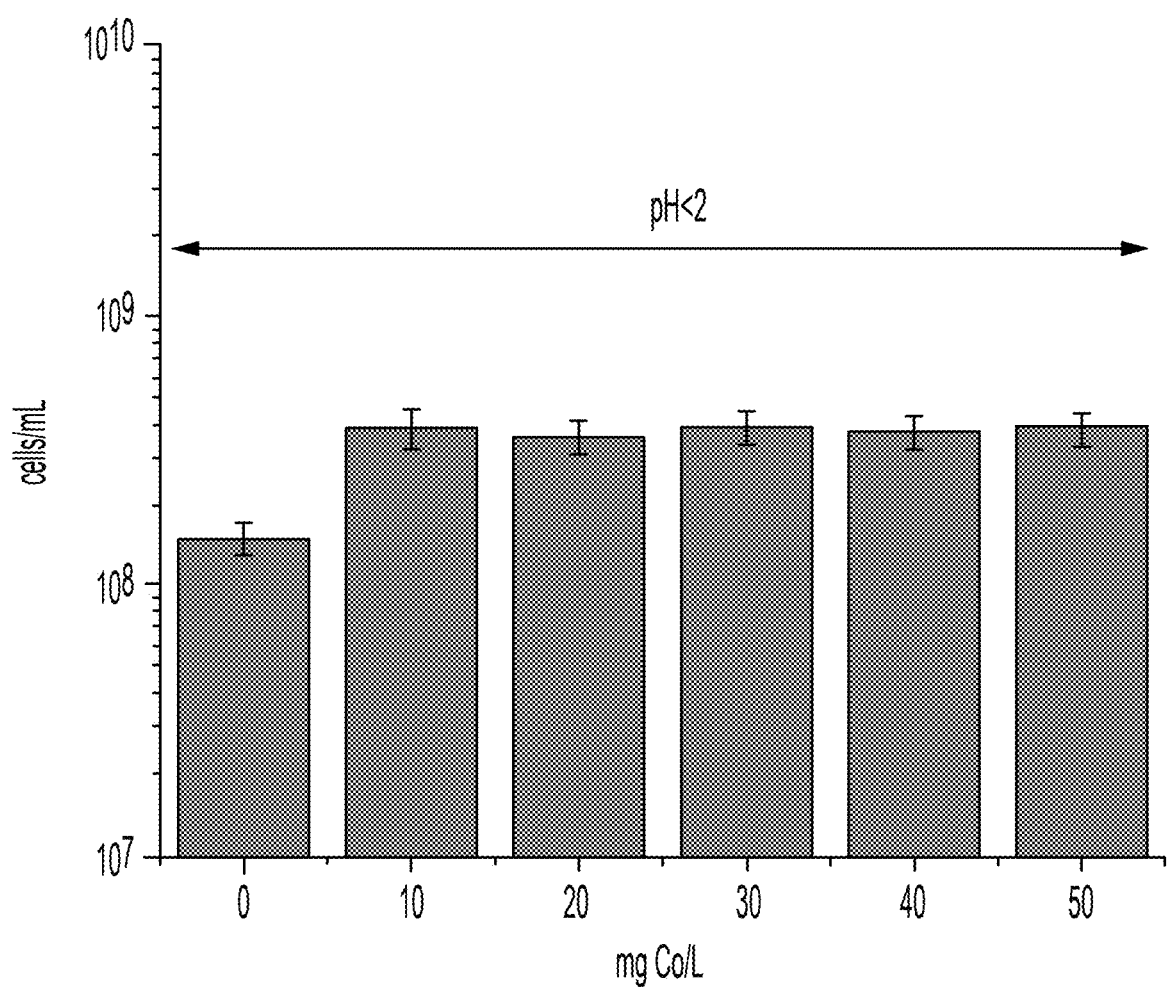
Figure 5E:
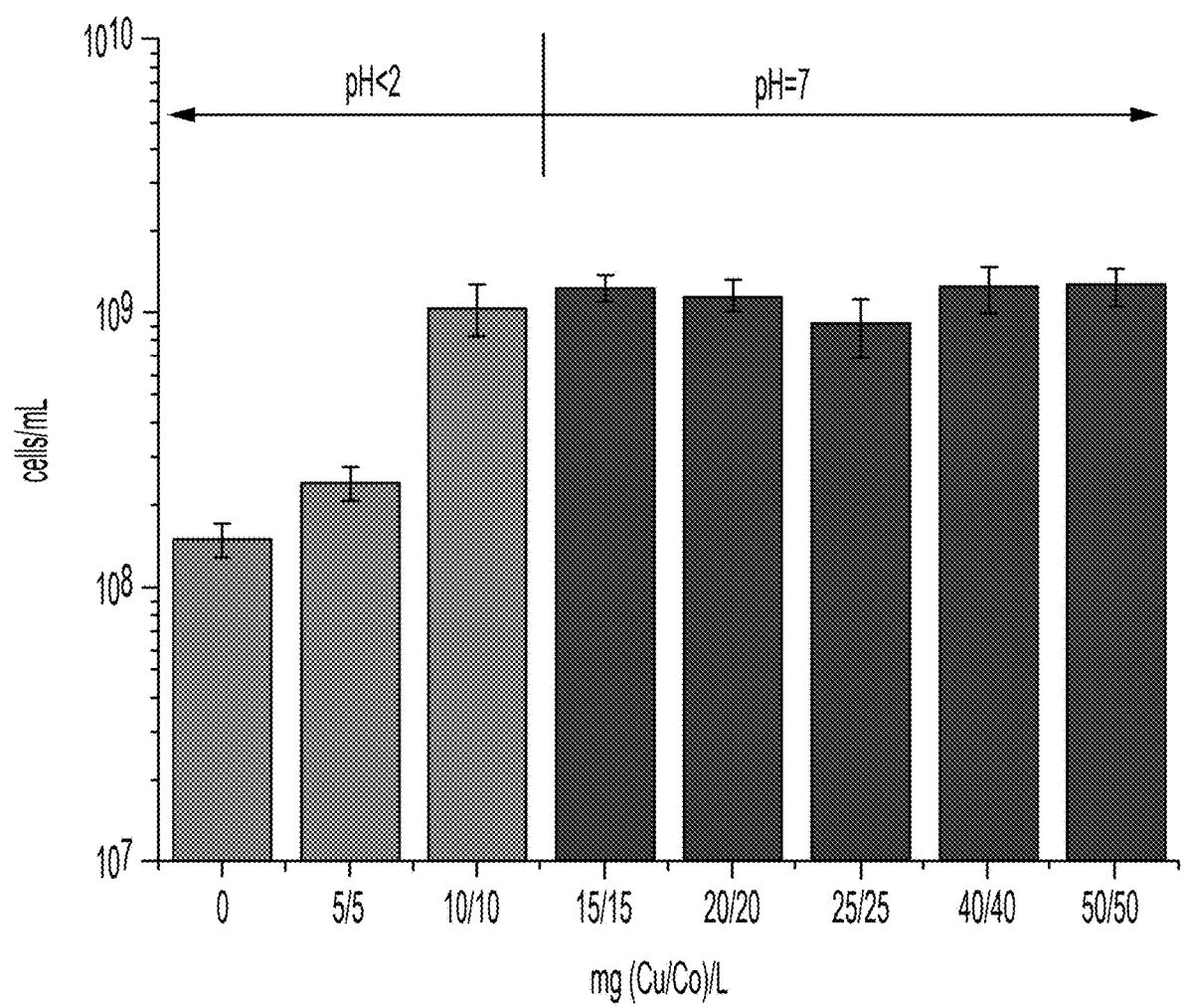

Bacterial cell abundance on the different areas of the plate surfaces were quantified using the epifluorescence microscopy methods known in the art. Areas selected for representative analysis were located in the center of each inhibition zone and the dispersed colonies area, and 10 mm into the bacterial monolayer. For all metals, cell densities were consistently lower at the inhibition zone, averaging 1.67× 10$^4$ cells/mm$^2$. Cell densities in the disperse colonies area were the highest, averaging 1×10$^7$ cells/mm$^2$. Finally, the cell densities found in the monolayer were slightly lower than in the previous area, averaging 1.87×10$^6$ cells/mm$^2$. The control plates without metals had consistent values along the plate, and presented minimum changes (9.09×10$^5$ cells/mm$^2$). The cell densities in the inhibition area of the metal-containing plates increased when compared to the initial inoculated cell density (by a maximum factor of 3). FIG. 3 shows the cell densities at the three different growth areas for triplicate Cu-containing plates.

The results presented herein support the concept that different metal ions may have different inhibitory potential against *Acidithiobacillus* spp. enriched from sewer crown extracts. *Acidithiobacillus* spp. response to metal mixtures is limited, however, the synergy of binary and ternary metal solutions have been described. In the present disclosure, a synergistic effect resulted from concurrent exposure to Cu and Co (FIG. 2). The assay developed herein is the first of its kind for solid phase observations of metal inhibition of acidophilic communities. The classic Kirby-Bauer antibiotic sensitivity test was adopted to assess diffusion inhibition of *Acidithiobacillus thiooxidans* growing on agar surfaces, in a longitudinal format. This method serves a simple and effective way to benchmark the inhibitory potential of leached metals by simple distance measurements.

Liquid inhibition assays require monitoring of multiple parameters such as pH, metabolite concentration, and cell numbers, to verify acidophile response, and are relatively labor intensive and costly. This assay requires only visual inspection of the generated inhibition length on a macroscale, and the determination of the metal concentration at the interface (FIG. 3). After incubation, the cell densities in the inhibition zone only increased by a maximum factor of 3 of the original inoculum density (control). Higher surface cell densities were consistently observed in the zones containing dispersed colonies. This may be attributable to the increased biofilm production.

Metal inhibition studies of *Acidithiobacillus* spp. have predominantly studied pure *Acidithiobacillus ferrooxidans* strains as an environmental model organism. Additionally, *A. ferrooxidans* isolates used in many metal-tolerance studies were enriched from sites with relatively high heavy metal concentrations (e.g. acid mine drainage). The enrichments and inhibition assays described herein, are predominantly enriched *Acidithiobacillus thiooxidans* from corroded sewer crowns. While the enrichment origin did not impact the hierarchy of heavy metal inhibition potential observed, the results show *A. thiooxidans* enrichments from sewer crowns are significantly more sensitive to soluble heavy metals than *A. ferrooxidans* recovered from metal-contaminated sites.

Example 2

Metal Inhibition in Liquid Media

Cu and Co possessed the highest inhibitory potential in solid phase cultures, and were thus further investigated in liquid settings. The pH was monitored and used as an indicator for significant acidophilic SOB activity (FIGS. 4A-4E). *Thiobacillus* media, without any metal addition, was used as control for comparative analysis. In batches containing Cu, an increasing lag presented before pH drop occurred, in response to increasing Cu concentration, up to 40 mg Cu/L. All challenges below that threshold (40 mg Cu/L included) indicated significant acidophilic activity and had a common endpoint below pH 2. Above 40 mg Cu/L, no pH depression was observed; in contrast, pH increased and plateaued at values ranging between 6.5 and 6.7. Batches containing only Ag or Co, showed a similar lag effect; however, pH depression still resulted up to the highest challenge concentration (75 mg Ag/L, and 50 mg Co/L). Where only cobalt and silver were used, all challenges indicated some evidence of acidophilic activity.

Combinations of metals were also studied, including Cu/Ag and Cu/Co at mass ratios of 2:1 and 1:1, respectively. Where Cu/Ag were combined, thresholds for pH depression were observed at 40 mg Cu/L and 20 mg Ag/L. The same threshold was observed as for Cu alone, indicating no significant effect of silver on acidophile inhibition under these conditions. Thresholds for pH were also observed above 10 mg Cu/L and 10 mg Co/L, where copper and cobalt were combined. This challenge was monitored over 30 days, indicating significant acidophilic activity after 40 days of incubation.

All metal species used for the challenges were based on nitrate salts. Therefore, inhibition in the presence of counter ions, was also monitored. Challenges with increasing $NO_3$ concentrations (up to 200 mg $NO_3$/L) where prepared with $NaNO_3$. All challenges indicated acidophilic activity and no lag effect was ever observed.

Aliquots for cell quantification and genetic analyses were extracted from each experiment when pH reached 2. If no pH drop was observed, aliquots were extracted after 30 days of incubation. FIGS. 5A-5E illustrate the observed cell densities for all tests. Cell densities where pH dropped averaged: $1.06 \times 10^8$ cells/mL for Cu, $1.73 \times 10^8$ cells/mL for Ag, $3.81 \times 10^8$ cells/mL for Co, $5.06 \times 10^8$ cells/mL for Cu/Ag, and $6.47 \times 10^8$ cells/mL for Cu/Co. Cell densities for batches where pH did not drop were observed at an order of magnitude higher: $1.11 \times 10^9$ cells/mL for Cu, $2.10 \times 10^9$ cells/mL for Cu/Ag, and $1.16 \times 10^9$ cells/mL for Cu/Co.

Figure 6A:
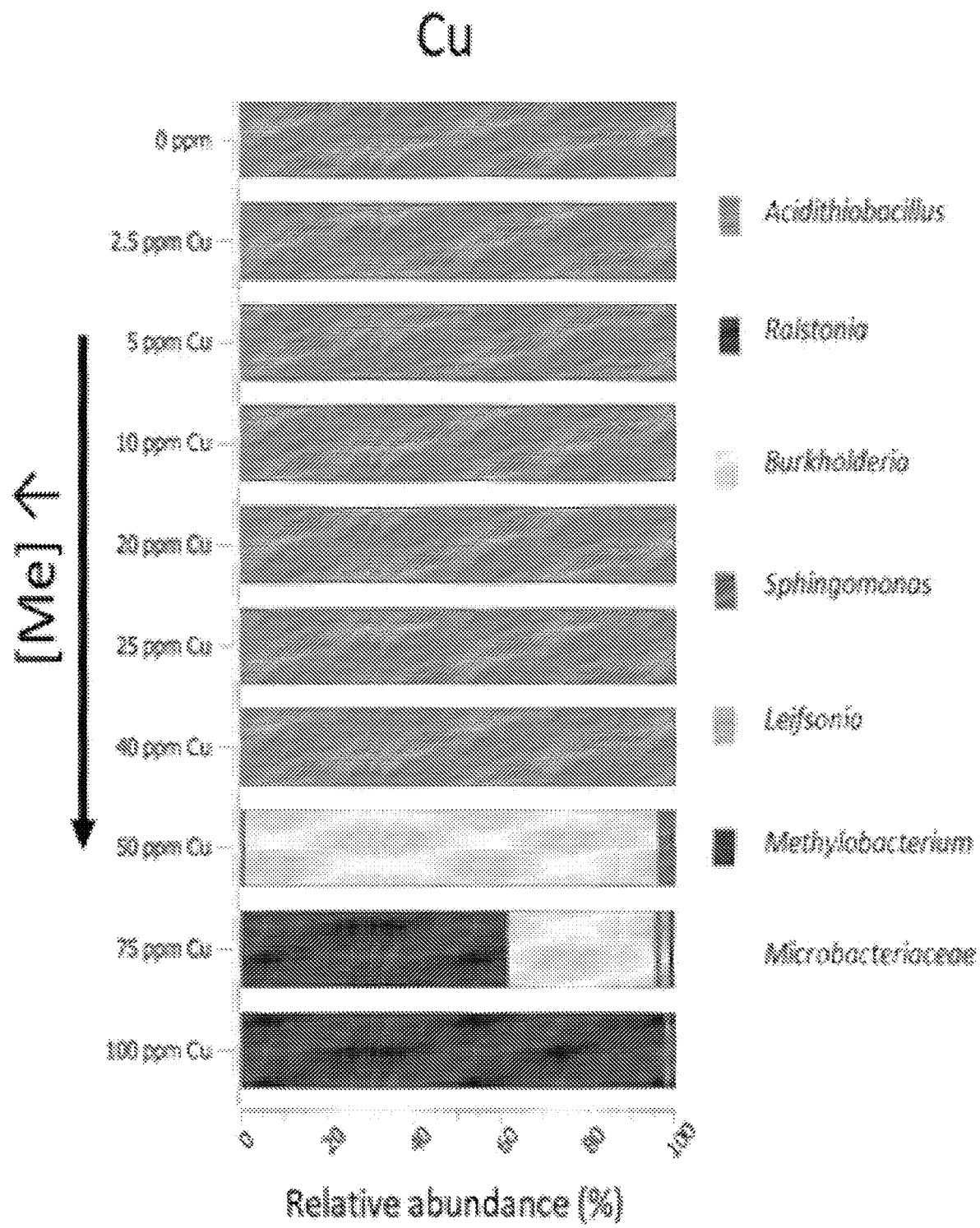
FIGS. 6A-6B show the relative abundance of bacterial taxa observed in sewer sourced enrichment cultures in the presence of copper (FIG. 6A), or copper and silver (FIG. 6B).
Figure 6B:
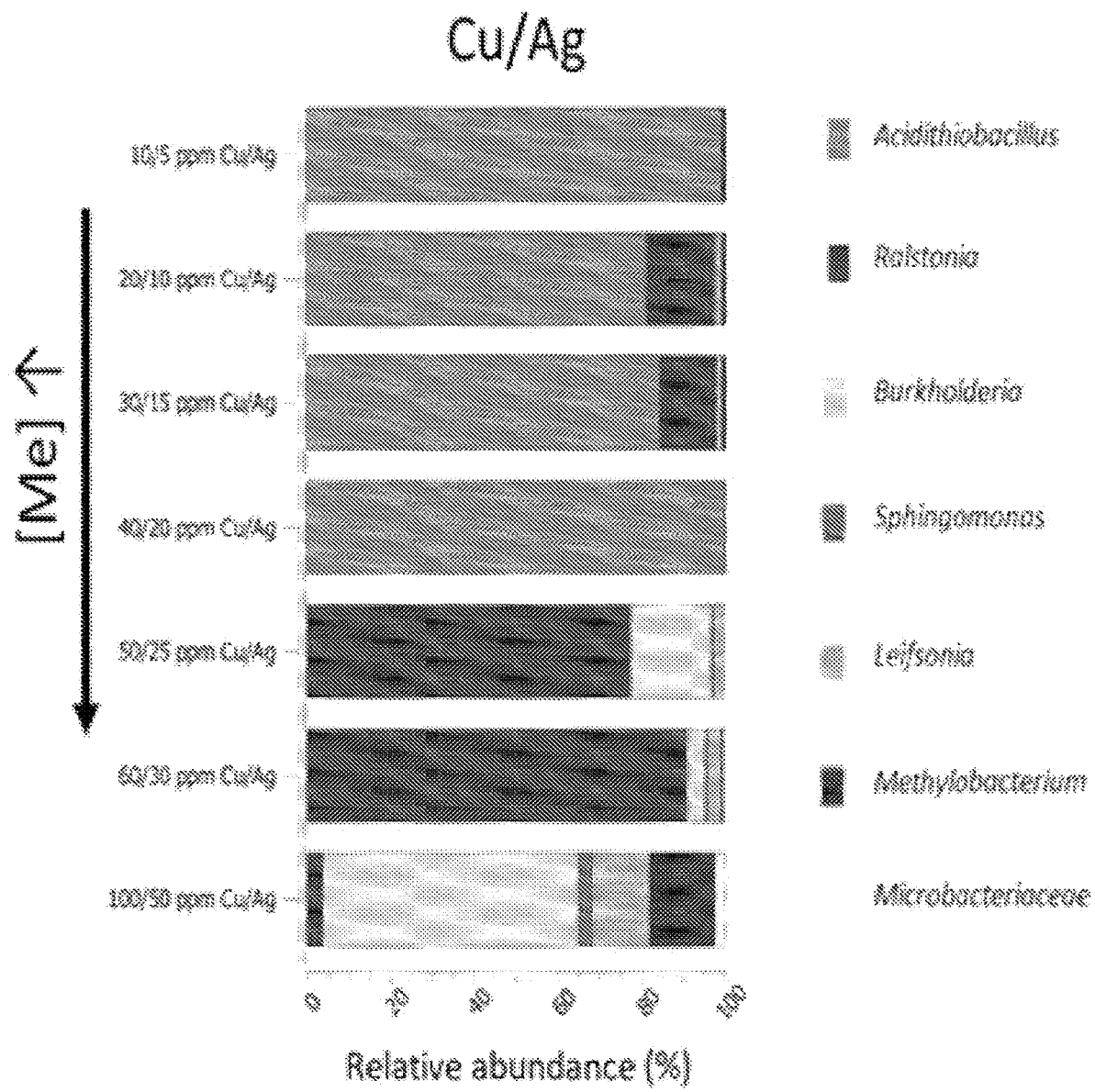

Cu and Cu/Ag mixtures were chosen to investigate the microbial communities under conditions where a pH threshold was observed. 16S rRNA gene analysis of 17 samples generated over 4 million sequences, classified in 611 operational taxonomic units (OTUs). After rarefaction analysis, the median Good's coverage was >99.9%, indicating enough sequencing data to confidently describe the diversity within these samples. Abundant OTUs consistently included 5 bacteria genera (FIGS. 6A-6B). Samples with metal concentration below the acidophilic inhibition threshold (40 mg Cu/L) indicated bacterial communities were dominated by *Acidithiobacillus* spp. Above that concentration, microbial composition significantly shifted to more diverse communities which were dominated by *Burkholderiaceae*. In Cu challenges, *Acidithiobacillus* spp. represented the dominant genus with >99% relative abundance under all conditions below the concentration threshold of 40 mg Cu/L. *Acidithiobacillus* accounted for less than 1% under any condition where Cu >40 mg/L. In contrast, *Burkholderia* and *Ralstonia* spp. dominated communities where pH did not drop, while *Leifsonia* and *Methylobacterium* were found in smaller proportions. When copper and silver were both present, *Acidithiobacillus* represented the dominant genus below the concentrations of 40 mg Cu/L and 20 mg Ag/L. The same genus represented less than 1% in batches above these concentrations. Following the same pattern as in the presence of Cu alone, the enrichments were also dominated by *Burkholderia* and *Ralstonia* spp. with significant presence of *Sphingomonas* spp., *Leifsonia* spp., *Methylobacterium* spp., and *Microbacteriaceae* spp. (when Cu ≥40 mg/L).

Figure 7:
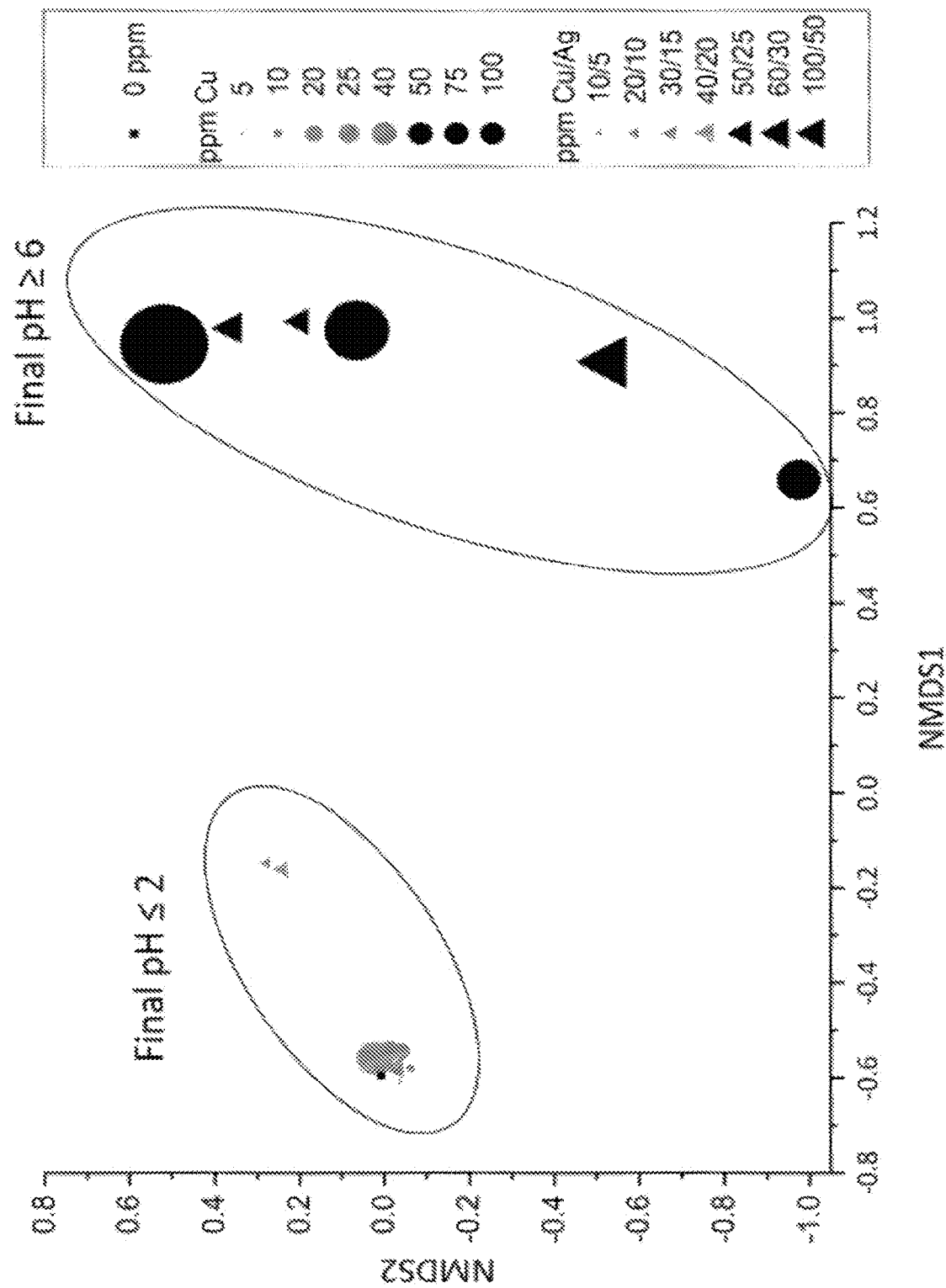
FIG. 7 is a graph showing non-metric multidimensional scaling (NMDS) analysis of metal exposed bacterial communities. Symbols represent metal combinations and are scaled with increasing concentration. Grey color indicates conditions were biogenic acid production depress pH below 2. Black color indicates batches where pH approaches neutrality. Circles denote major clusters of enrichments dominated by *Acidithiobacillus* (Left) and *Burkholderiaceae* (Right)

Non-metric multidimensional scaling (NMDS) analysis correlates distance between matrix points with microbial composition similarity in a two axis format. FIG. 7 displays an NMDS plot for selected enrichments. All enrichments which expressed pH depression exhibited high community similarity as judged by phylogenetic analysis. Community analyses suggests they were markedly different in enrichments where pH did not drop, regardless of the metal combinations used. No trends were observed that suggests association between metal combination (and concentration) with community similarity for the enrichment assemblages above the inhibition thresholds (≥50 mg Cu/L).

The inhibitory effects and minimum inhibitory concentration of Cu and Co were further assessed on mixed acidophilic cultures in a liquid format. Silver (Ag) was also included based on its literature history as broad-spectrum inhibitory metal. As for the solid inhibition assays, the results presented in this study support the hypothesis that different metal may ions have markedly different inhibitory potential against *Acidithiobacillus* spp. extracted from sewer crowns. The temporal monitoring of pH used in this study proved to be a reliable and useful indicator for acidophilic activity and metabolism and metal sensitivity. The minimum inhibitory concentration (MIC) for acidophilic growth was repeatedly observed from enrichments that did not experience significant pH drop after 30 days of incubation. In thiosulfate-based media, stationary phase for *Acidithiobacillus* cultures was reached 8 days after inoculation. The relative duration of experiments highlighted metal-induced lag phases from stable inhibitory concentrations. MICs clearly emerged for Cu alone (50 mg Cu/L), and in mixtures of Cu/Ag (50 mg/L and 25 mg/L) and Cu/Co (15 mg/L and 15 mg/L). Enrichments with Ag and Co alone did not exhibit acute inhibition up to the highest concentrations tested (75 mg/L and 50 mg/L, respectively). No inhibitory synergism was observed when mixing Cu and Ag at a 2:1 ratio, when compared to any individual metal alone. However, synergistic inhibition was observed when Cu and Co were present at a 1:1 ratio. The MIC associated with Cu exposure dropped markedly from 50 mg/L to 15 mg/L, when mixed with Co at equal mass concentration. Similarly, the MIC of Co lowered from >50 mg/L, when individually added to 15 mg/L when added together with Cu. The literature is tenuous on this topic.

A majority of investigations on metal inhibition have been done on *Acidithiobacillus* species typically found in ironand sulfide-rich mining ores, which usually contain elevated heavy metal levels. This condition likely exerts selection pressure on these bacterial communities to tolerant different transition metals, as observed by the presence of "transferable genomic islands". However, it is indicated herein that *A. thiooxidans* may be susceptible to lower heavy metal concentrations than mining-environments, particularly Cu. In certain embodiments, *A. thiooxidans* growing in sewer crowns is susceptible to doses of heavy metals that are markedly lower than mining environments. Without being bound by theory, a second, non-limiting, explanation for the MICs observed in this study is the preferential growth of heterotrophic communities, found in acidophilic mixed cultures at low relative abundance, at metal concentrations above the MIC in carbon-limited media. Direct quantification at the end of the metal exposures, indicated elevated cellular abundance, independent of metal dose.

Moreover, slightly higher cell densities were observed beyond metal inhibition thresholds. This led to the investigation of microbial community composition at different metal exposures, when started from the identical inoculum. Copper alone, and the binary mixture of Cu and Ag, exhibited a pH-based inhibition threshold. 16S rDNA analysis revealed a transition from *Acidithiobacillus* dominance (<50 mg Cu/L) to a variety of oligotrophic communities (>50 mg Cu/L) above the MIC. At metal concentrations where *Acidithiobacillus* growth was inhibited, the bacterial community was dominated by *Burkholderia* and *Ralstonia*. These ubiquitous genera have been found in many environments: rivers, seas, soils, pure water systems, wastewater, and concrete corroded sewer systems. Some species have been detected in acid mine drainage and heavy metal contaminated sites as well, indicating adaptability within a broad pH range and heavy metal concentration spectrum. Both genera are associated with heterotrophy and oligotrophy, which allows them to thrive in environments with low organic carbon load. Additionally, some species carry the genetic information for mediated assimilatory reduction of sulfate and thiosulfate. *Leifsonia* spp., *Sphingomonas* spp., *Methylobacterium* spp., and *Microbacterium* spp. were also in significant abundance at high metal concentrations. These genera have also been found in a wide variety of environments, including wastewater, and are able to use thiosulfate mixotrophically. Additionally, *Methylobacterium* spp. have been observed to mediate oxidation of reduced sulfur species.

The higher metal concentration dosages shifted the microbial community from less diverse acidophilic, autotrophic communities to more diverse neutrophilic communities able to survive in a thiosulfate enrichment. Two conditions may support this community response. In a non-limiting embodiment, the inhibition of *Acidithiobacillus thiooxidans* by heavy metal exposure reduces competition for ecological niches, otherwise to be colonized by other community members present in the inoculum. In a non-limiting embodiment, the metal-induced reduction in the growth kinetics of *Acidithiobacillus* (increased lag phase) allows for other opportunistic, heterotrophic, neutrophilic, sulfur oxidizing members present in the inoculum to develop, in the absent of healthy *Acidithiobacillus*. Due to the fact that dominant communities are able to sustain neutral pH and use the reduced sulfur source in the media, *Acidithiobacillus* remains unable to develop in significant numbers.

Example 3

Sorbent Sorption/Desorption Studies

Characterization of the sorbents used in the different mortar formulations were compiled through widely accepted material science techniques. This characterization was performed for the following reasons: i) to inform the designs of different corrosion-resisting mortars; ii) for elucidating possible interactions when combined with Portland cement; iii) to understand dominant sorption and desorption behavior of metal-impregnated sorbents; and iv) to investigate the fate of entrained when exposed to biogenic acids.

GAC Characterization

The activated carbon used in these studies was characterized using the following metrics: total-, micropore- and external-surface areas, bulk- and specific gravity, water sorption, pH, and $pH_{PZC}$ (Table 2). Calgon OL 20X50 (a granular activated carbon) was modified with hot acids as known in the art. Acidification resulted in approximately a 20% reduction of the BET surface area, micropore, and external surface areas; however, no significant changes in the micro- and mesopore distribution were observed. The bulk- and specific gravities were similar between the GACs tested here, with acid modification causing a small density reduction. Acid modification also caused a small reduction in water sorption capacity.

Additionally, acidification resulted in a strong difference in pH and $pH_{PZC}$ values. The raw GAC used displayed alkaline behavior (pH 10.51, $pH_{PZC}$>8) while its acid modified counterpart (GAC-Acid) displayed acidic behavior (pH 4.62, $pH_{PZC}$ 5.25) in unbuffered water. Acidification was designed for making the metal(s) bioavailable at pH levels where *Acidithiobacillus* spp. start to dominate the microbial community in sewer crown environments.

TABLE 2

Properties of unmodified GAC and acid-modified GAC (GAC-Acid).

| BET surface area (m²/g) | Micropore area (m²/g) | External surface area (m²/g) | Bulk specific gravity | Specific gravity | Water absorption (wt %) | pH | pH (PZC) |
|---|---|---|---|---|---|---|---|
| 1341.5[a] | 595.2[a] | 746.3[a] | 0.45[a] | 0.77[a] | 75.1[a] | 10.51[a] | >8[a] |
| 1073.6[b] | 479.5[b] | 594.1[b] | 0.43[b] | 0.75[b] | 74.2[b] | 4.62[b] | 5.25[b] |

[a]GAC;

[b]GAC-Acid.

Figure 8:
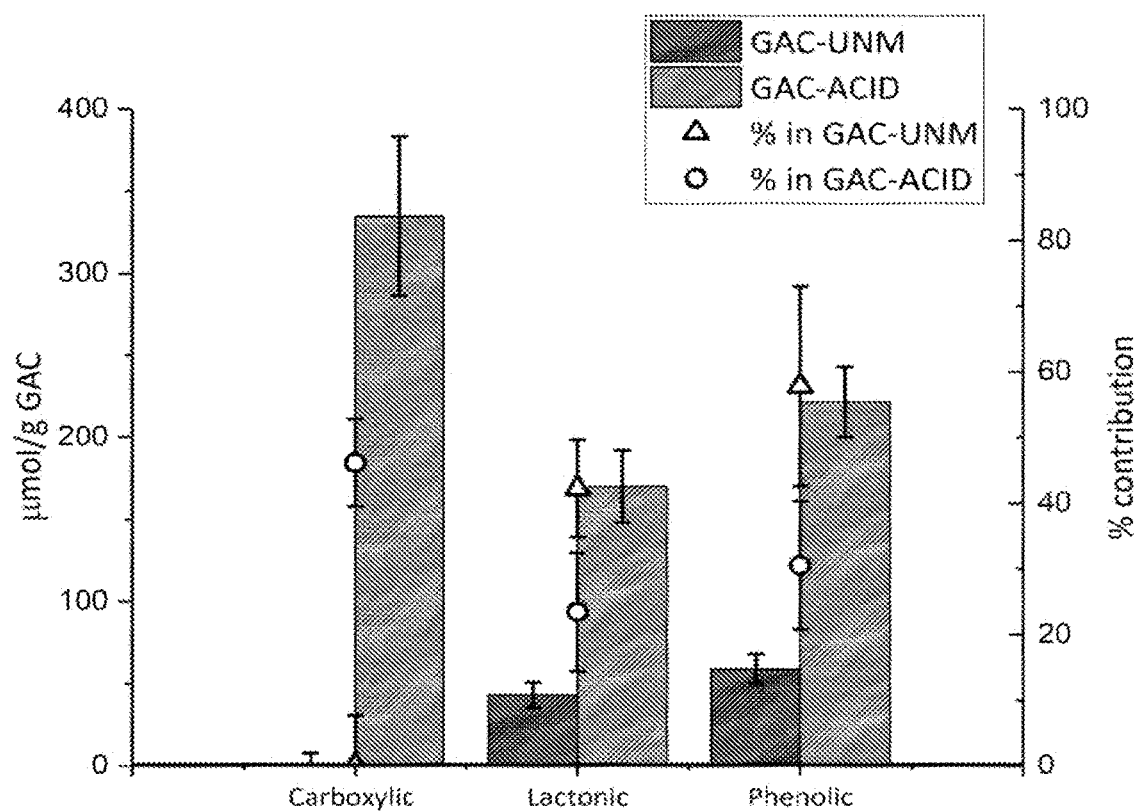
FIG. 8 is a graph showing oxygen-associated functional groups determined by Boehm titration. Bars indicate the concentration of functional groups in μmol/g GAC. Points indicate the relative contribution (%) of each functionality

The superficial chemical nature of the activated carbons used here was assessed through Boehm titration and FTIR. The oxygen-related functional group content of each carbon is presented in FIG. 8. In both cases, the distribution of oxygen-containing functional groups correlated with their pH and $pH_{PZC}$. Unmodified GAC presented basic pH along with a dominance of phenolic-associated groups (57.8%), while the acid modified counterpart showed acid pH and dominance of carboxyl-associated groups (46.1%). Additionally, the acidification process resulted in an increase of the total number of oxygen-related functionalities, by a factor of 7.1.

Figure 9:
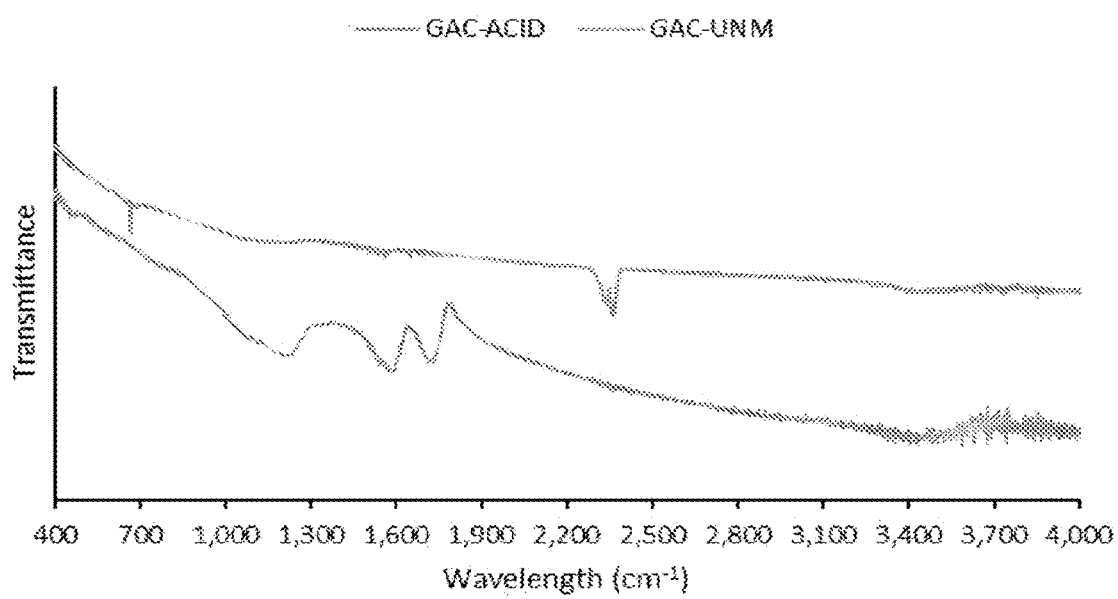
FIG. 9 is a plot showing Fourier Transformed Infrared Spectroscopy (FTIR) spectra of GAC and GAC which has been pretreated with nitric acid (GAC-Acid).

The 4,000-400 $cm^{-1}$ infrared spectra (FTIR) of the GACs are presented in FIG. 9. GAC showed a faint O—H stretch of alcohol, phenols, and carboxylic acids, detected as a broad band signal between 3,200-3,700 $cm^{-1}$. A possible band associated with stretch of C=O in cyclic amides at 1,546 $cm^{-1}$ and hydroxyls absorbing at 1,118 $cm^{-1}$ were also detected. Bands at 2,350 and 670 $cm^{-1}$ indicated the presence of physisorbed gaseous carbon dioxide. After acidification, major changes in the FTIR spectra were observed. Increased intensity of the band located between 3,200-3,700 $cm^{-1}$ (O—H stretch) was observed, while three new bands were detected at 1,220, 1,580, and 1,725 $cm^{-1}$. The first of the three bands (1,220 $cm^{-1}$) was attributed to a stretch in cyclic ethers attached to double bonds or asymmetrical stretch in either bridged group (—CO). The second band (1,580 $cm^{-1}$) was attributed to C=O containing groups, namely 1,3-diketone (enol form) or hydroxy aryl ketone groups. The band at 1,725 $cm^{-1}$ was correlated with the presence of ketone, ester, and carboxylic acid in aromatic rings.

Two types of GAC were used as metal carriers in mortar formulations: steam-superheated bituminous coal, commercially referred as OL 20×50 GAC (GAC), and the same GAC after modification with hot nitric acid (GAC-Acid). Acid modifications of activated carbon have been extensively studied, documenting nitric acid as an effective agent for controlling some types of functional groups. Thus, treatment with 5% $HNO_3$ lead to a 20% decrease in the specific surface area of the carbon. The decrease in surface area was mainly ascribed to the equal destruction of both micro- and mesopores, as no significant changes in the pore size distribution were observed.

Despite the loss in total specific surface area, no major differences in the water absorption capacity between unmodified and acid-modified carbons were observed. In a non-limiting embodiment, a significant amount of new oxidized functional groups, with high hydrophilicity, were introduced to the carbon during acid exposure. Therefore, the acidified carbon may compensate for hygroscopic loss, in what would result in a decrease in water sorption capacity, with the presence of hydrophilic groups that can bind water through chemisorption and hydrogen bonding. The acidification process lowered both pH and $pH_{PZC}$, as expected for the $HNO_3$ treatment applied here. Additionally, the relative abundance of oxygen-containing functional groups shifted from phenolic dominated towards carboxyl moieties in and on the acid-treated GAC. Additionally, the total number of surface functional groups increased, as a consequence of acid-enhanced oxidation as consistent with that observed by other GAC experimentalists. Increased incorporation of carboxylic groups has been described as the major consequence of $HNO_3$ GAC treatment. FTIR analysis supported the increased oxidation of GAC surfaces by detection of previously absent ester-, ketone-, and carboxylic-related groups.

Steel Slag Characterization

Steel slag particles used in this study was characterized with the following metrics: bulk- and specific gravity, water sorption, and pH (Table 3). Basic oxygen furnace slag (BOF-S) was exclusively used and substituted for Ottawa sand in cement mortar formulations. The specific gravity was 1.79 times higher than the bulk gravity, and 1.2 times higher than the specific gravity of the Ottawa sand (2.65) it replaced. The water sorption capacity for the BOF-S was 3.1%, compared to 0.01% for Ottawa sand. The pH of the sorbent was 12.54, indicating a strong alkaline characteristic.

TABLE 3

Properties of BOF-S and Ottawa sand used in mortar formulations.

| Fine aggregate | Bulk specific gravity | Specific gravity | Water absorption (wt %) | pH |
|---|---|---|---|---|
| BOF-S | 1.78 | 3.18 | 3.1 | 12.54 |
| Ottawa sand | 1.73 | 2.65 | 0.01 | — |

Additionally, the chemical nature of the BOF-S was evaluated through determination of its major oxides and mineralogy. The oxide composition was obtained after digestion of a representative fraction of the BOF-S solids and performed by ICP-OES analysis (Table 4). Oxide abundance followed the series $CaO>Fe_2O_3>SiO_2>MgO>Al_2O_3>MnO>P_2O_5>SO_4>Na_2O$. CaO (44.8 wt %) and $Fe_2O_3$ (35.1 wt %) accounted for more than 50% of the total oxide content.

TABLE 4

Major oxide composition of BOF-S in weight percent.

| $SiO_2$ | $Al_2O_3$ | CaO | $SO_4$ | $Fe_2O_3$ | $K_2O$ | $Na_2O$ | MgO | MnO | $P_2O_5$ | $CaO^a$ | $CaO^b$ |
|---|---|---|---|---|---|---|---|---|---|---|---|
| 14.7% | 6.6% | 31.7% | 0.4% | 25.8% | — | 0.1% | 10.8% | 2.5% | 0.7% | 0.4% | 1.5% |

[a] Grain CaO;
[b] Powder CaO

Figure 10:
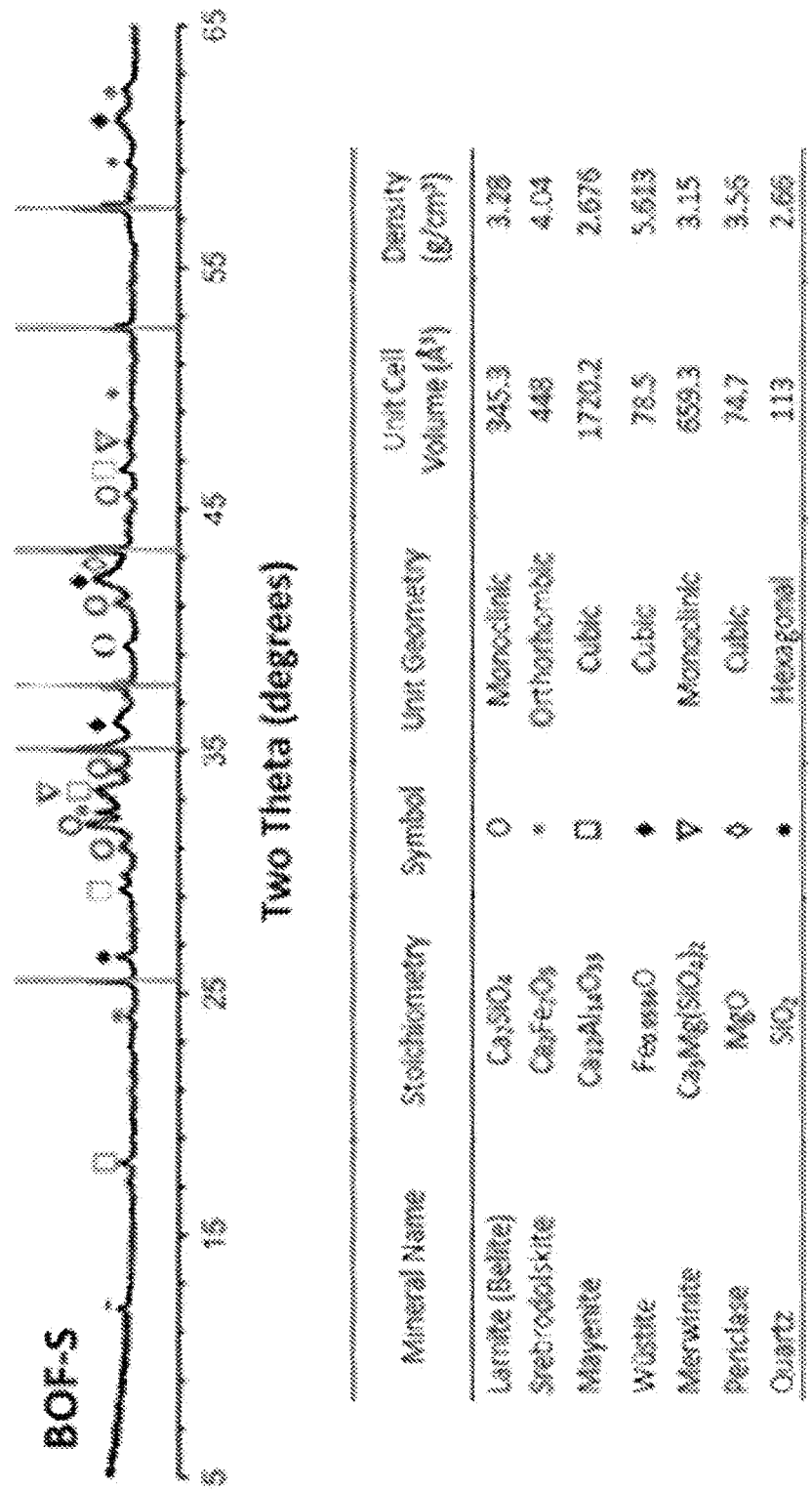
FIG. 10 shows raw diffraction pattern for BOF-S. Identified minerals are denoted with symbols as listed below the diffractogram. Mineral shapes, unit volumes, and densities have been obtained using Jade5 mineral database reference standard.

Mineral composition was obtained through peak analysis of the XRD diffractogram of the BOF-S, FIG. 10. Major peaks identified corresponded to Larnite, Srebrodolskite, Mayenite, Wüstite, Merwinite, Periclase, and Quartz.

Basic oxygen furnace steel slag (BOF-S) was also used as a metal carrier in mortar formulations. In contrast to carbon-based sorbents, BOF-S is mineral in nature. While its composition is similar to that of Portland cement, it differs significantly in the oxide proportions and the mineralogy. The major oxide composition (>1%) of the BOF-S used in this study indicated an oxide abundance in the following series $CaO>Fe_2O_3>SiO_2>MgO>MnO>Al_2O_3$. Minor components included titanium, vanadium, and chromium. The free lime content of the grains was assessed and compared to a pulverized format, where lime comprised 0.04% and 1.5% of the total weight. In the context of durability, excess of free lime may lead to increased sulfate attack and cement paste deterioration, as hydrated Ca(OH)$_2$ will readily dissolve in the presence of sulfuric acid. The fact that the BOF-S grains used in this study contribute to very small amounts of free lime indicates compatibility as a fine aggregate. The mineral composition of the slag used here exhibited major phases commonly found in different BOF-S (e.g. Larnite, Mayenite, Wüstite, and Srebrodolskite). The specific water sorption of this material indicated low porosity. This material was not subject to BET analyses, because numerous studies have characterized the specific surface area of BOF slag fractions which may reach the tenths of m$^2$ per gram.

Metal Sorption/Leaching Studies

The three types of sorbents used in this study were loaded to saturation (in batch) using Cu(NO$_3$)$_2$ solutions, and solutions containing both Cu(NO$_3$)$_2$ and Co(NO$_3$)$_2$ (Table 5). In order to favor metal cation sorption on acid modified GAC (GAC-Acid), the solution pH was controlled at 5.75. Batches of unmodified GAC were adjusted to pH 8 to favor precipitate sorption. No pH-adjustments were undertaken for BOF-S batches. In all cases, metal uptake efficiency followed the series BOF-S>GAC>GAC-Acid, as defined by the amount of metal sorbed per unit mass of sorbent. A small reduction in copper loading was observed when added in combination with cobalt. Cobalt associated poorly with acid modified GAC in the presence of copper. When compared to the loads of cobalt sorbed on GAC and BOF-S, cobalt loaded on acid modified GAC was significantly lower.

TABLE 5

Metal loads and selected characteristics of the sorbents of the present disclosure.

| Sorbent | pH | pH$_{PZC}$ | mg Cu/g | (mg Cu/g)/(mg Co/g) | Mechanism |
|---|---|---|---|---|---|
| GAC | 10.51 | >8 | 14.2 | 13.8/4.5 | Surface precipitation |
| GAC-Acid | 4.62 | 5.25 | 8.5 | 8.3/0.03 | Ionic exchange |
| BOF-S | 12.54 | — | 17.9 | 16.8/8.5 | Surface precipitation/ion exchange |

Figure 11:
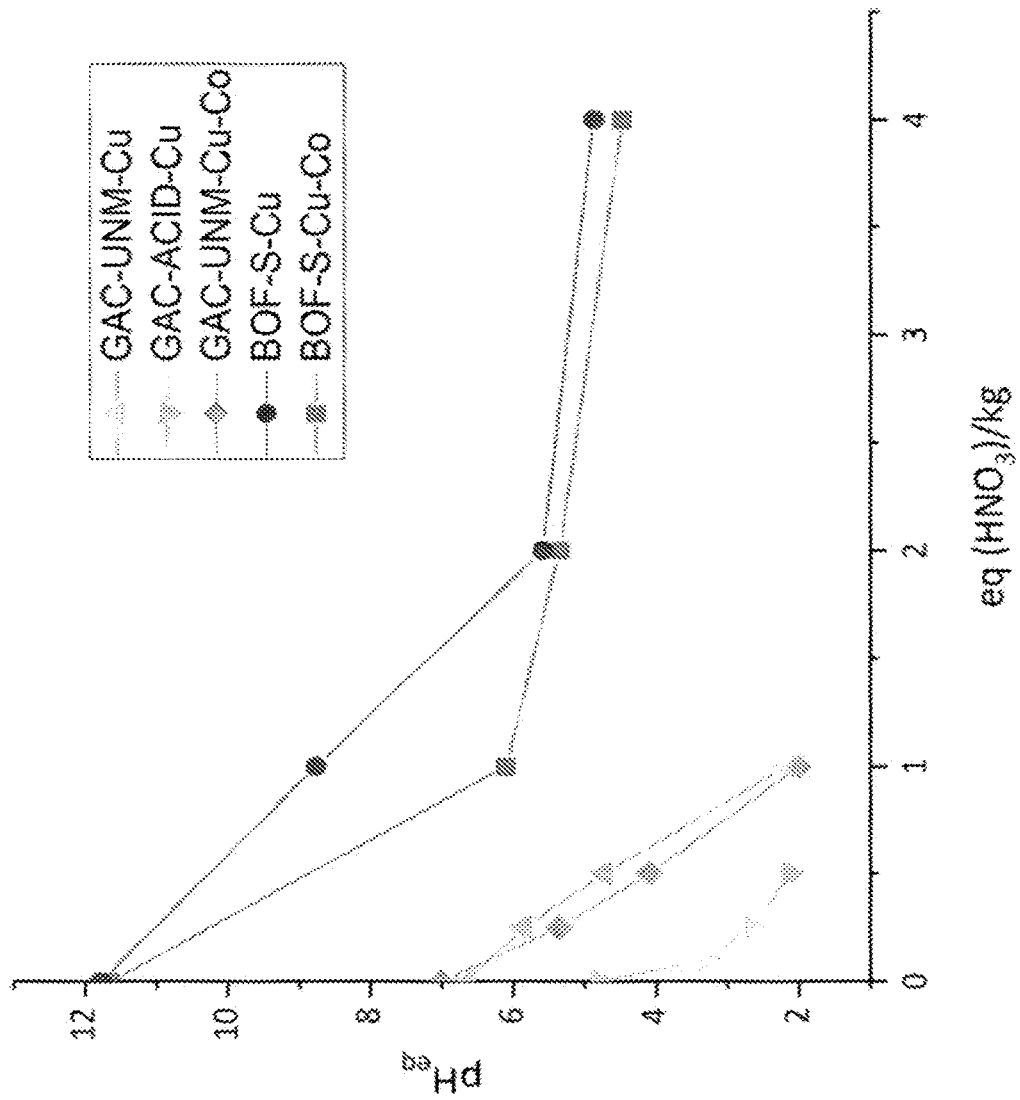
FIG. 11 is a graph showing equilibrium pH ($pH_{eq}$) of metal-laden sorbents exposed to increasing additions of acid (eq($HNO_3$)/kg). Results are shown for a liquid: solid ratio of 1:20. GAC-Cu: Calgon 20×50 granular activated carbon loaded with copper; GAC-Acid-Cu: Acidified granular activated carbon loaded with copper; GAC-Cu—Co: Calgon 20×50 granular activated carbon co-loaded with copper and cobalt; BOF-S—Cu: BOF slag particles loaded with copper; BOF-S—Cu—Co: BOF slag particles co-loaded with copper and cobalt.
Figure 12A:
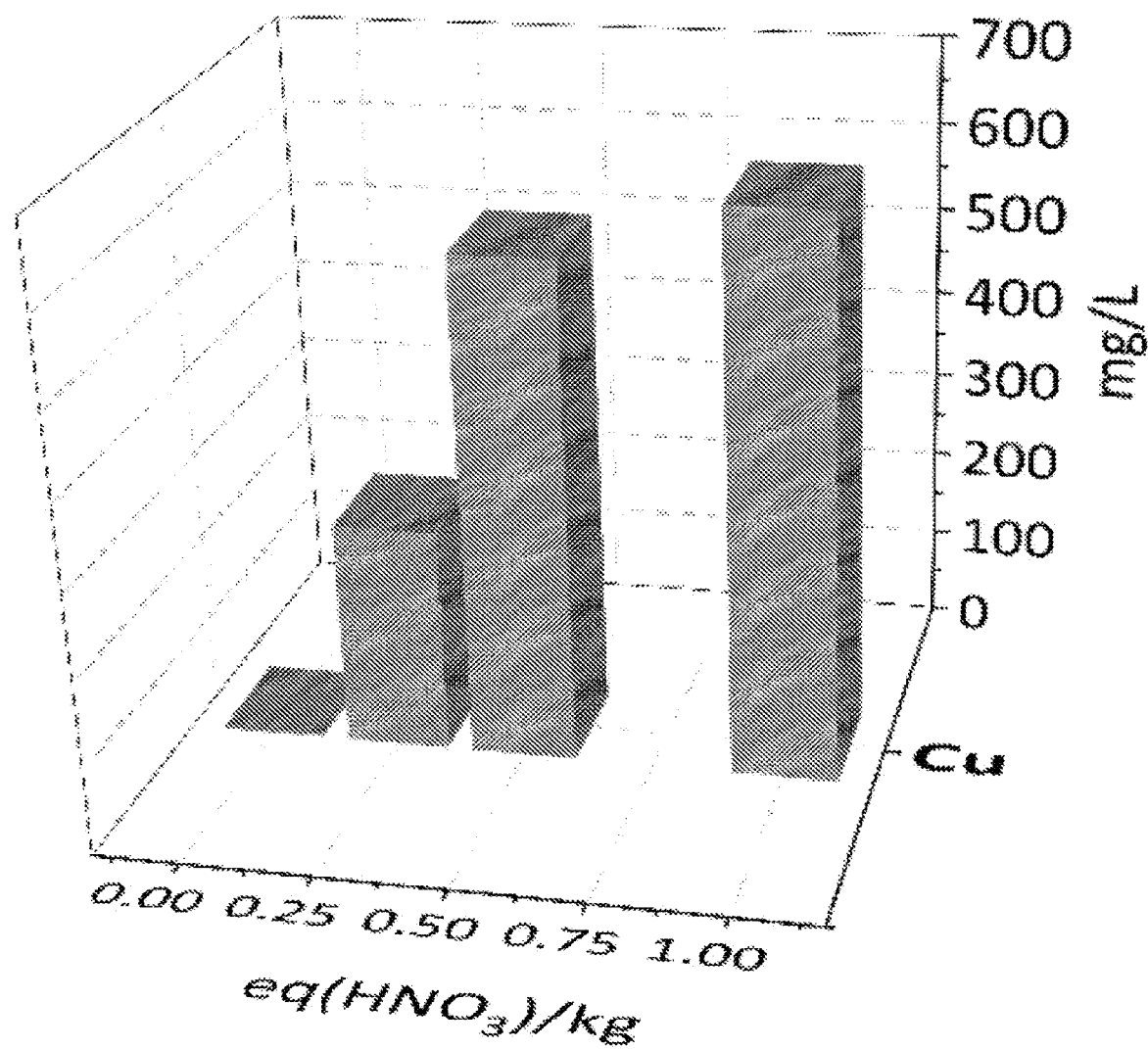
Figure 12B:
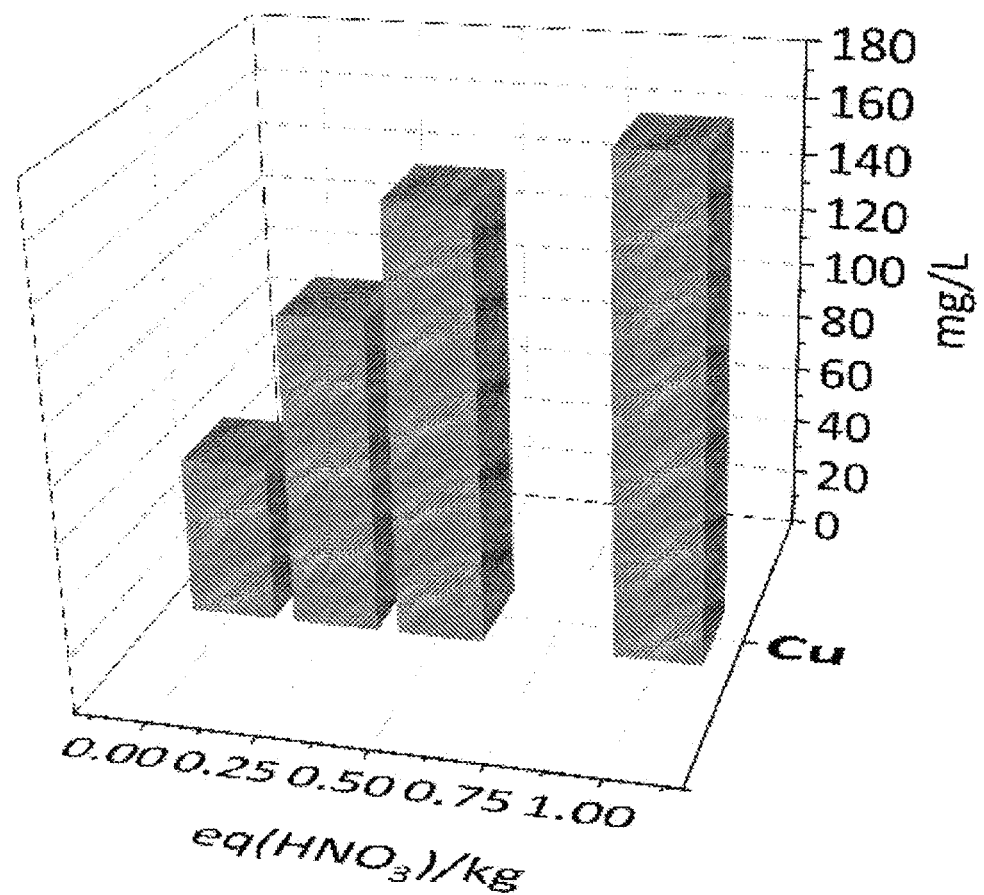
Figure 12D:
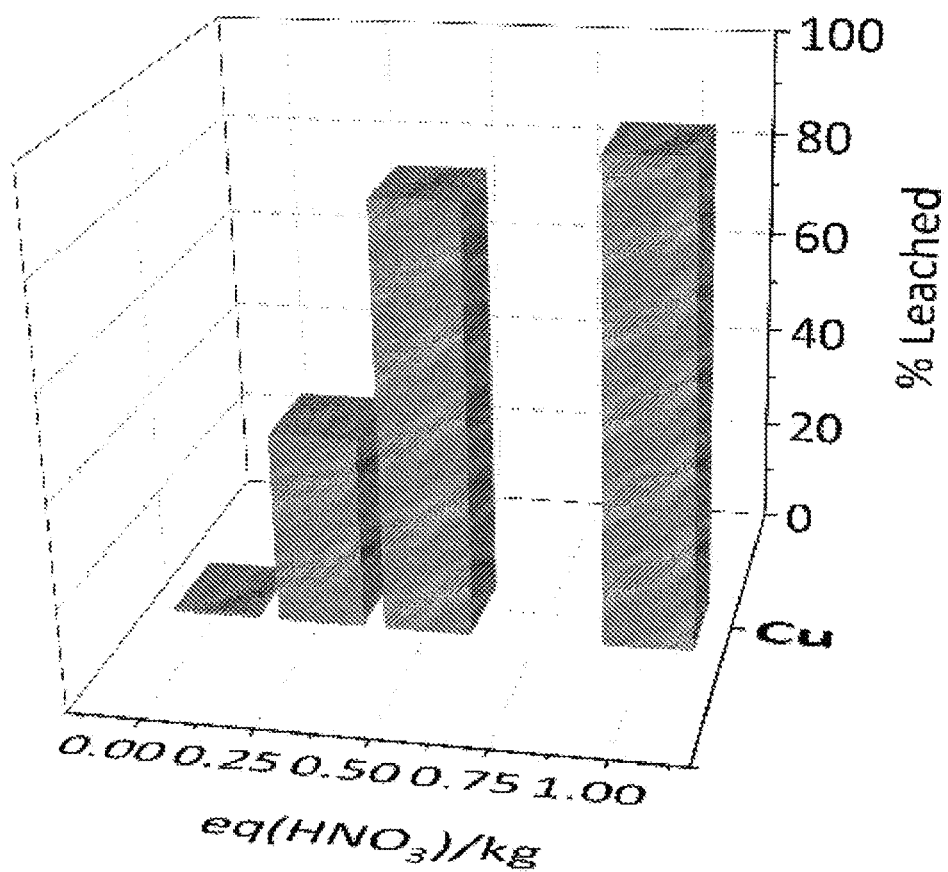
Figure 12E:
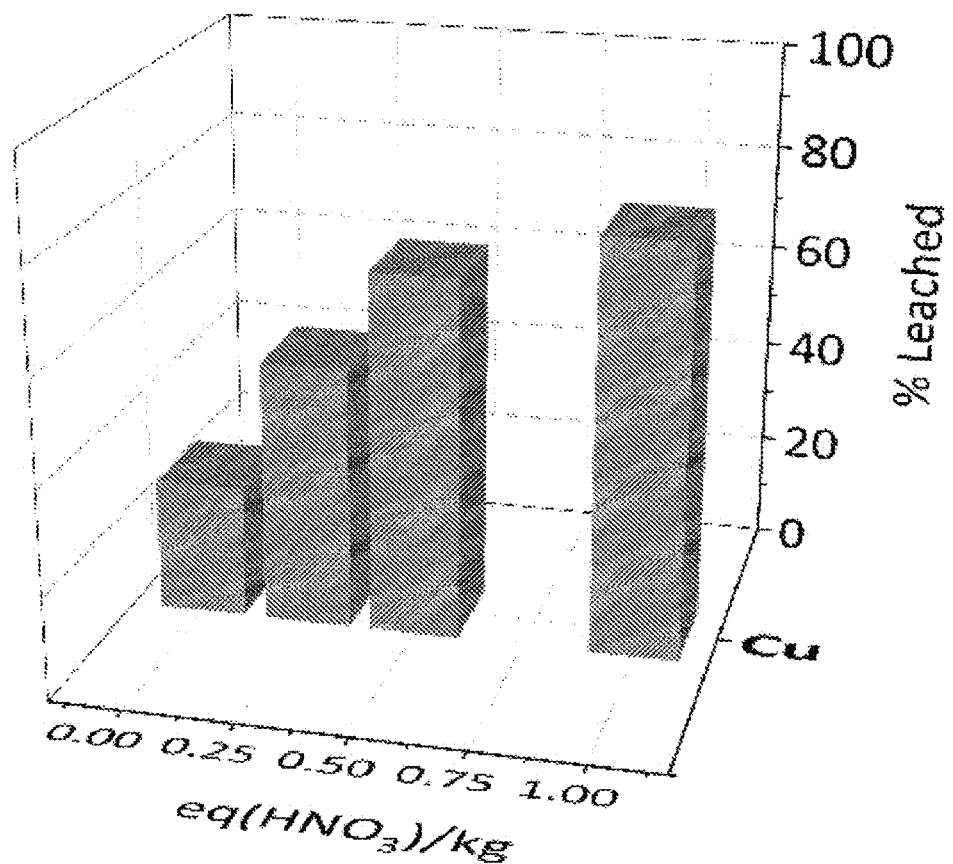
Figure 12F:
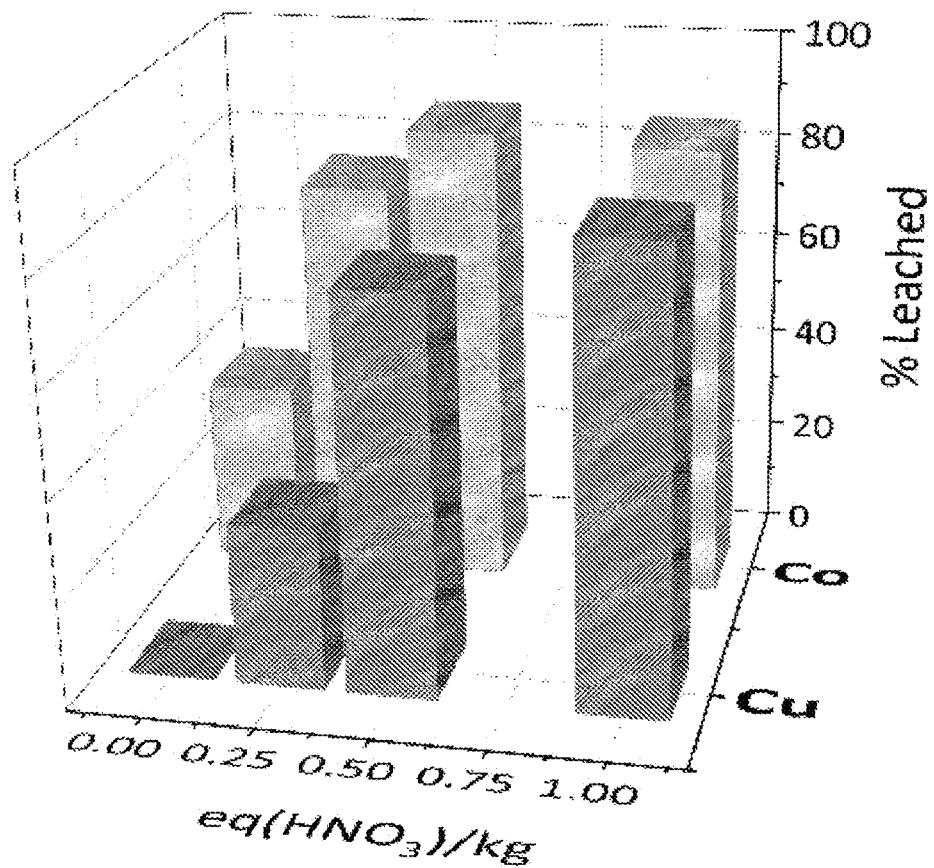
Figure 13A:
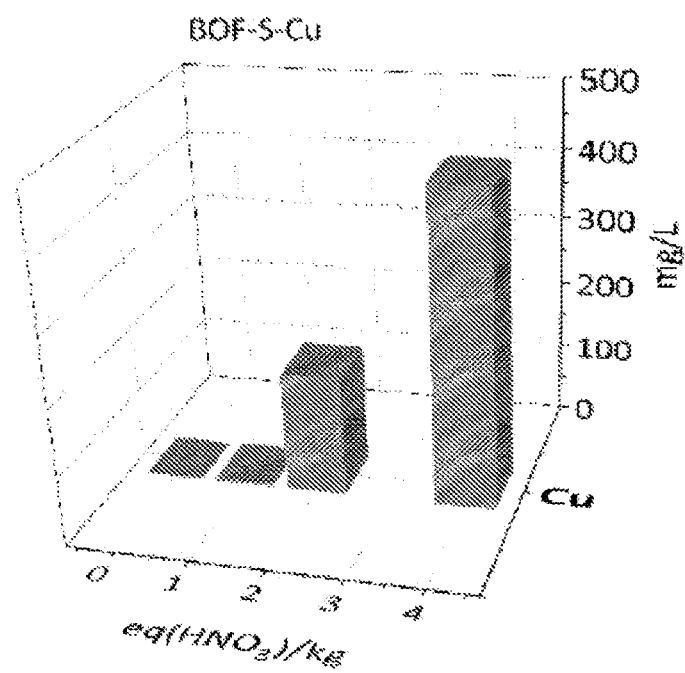
FIGS. 13A-13D show solubilized metal from metal-loaded sorbents, including BOF-S—Cu (FIG. 13A and FIG. 13C), and BOF-S—Cu—Co (FIG. 13B and FIG. 13D), after exposure to increasing amounts of acid (eq $HNO_3$/kg).
Figure 13B:
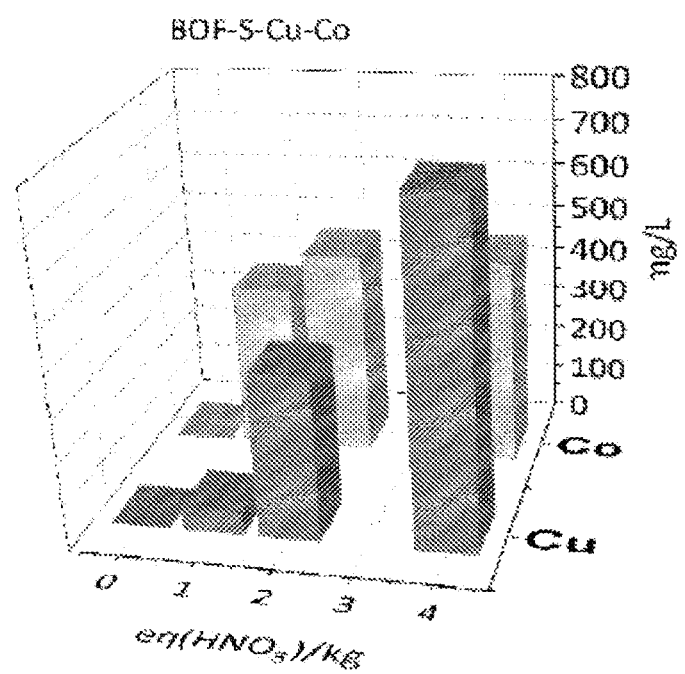
Figure 13C:
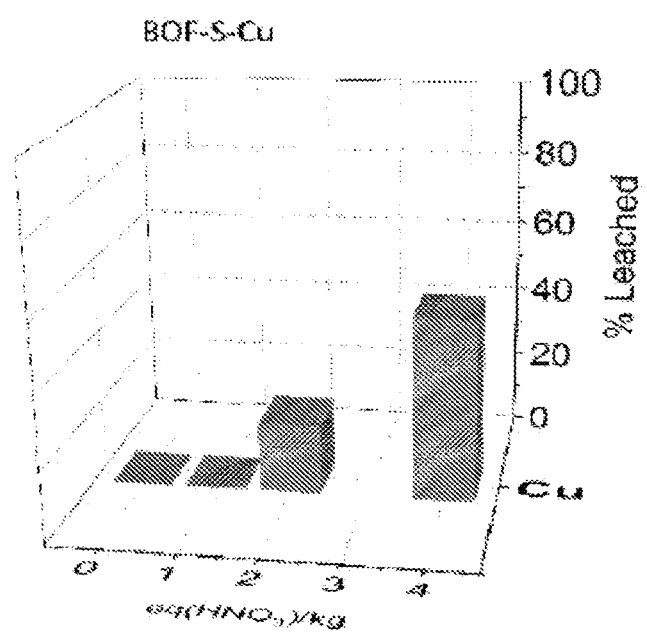
Figure 13D:
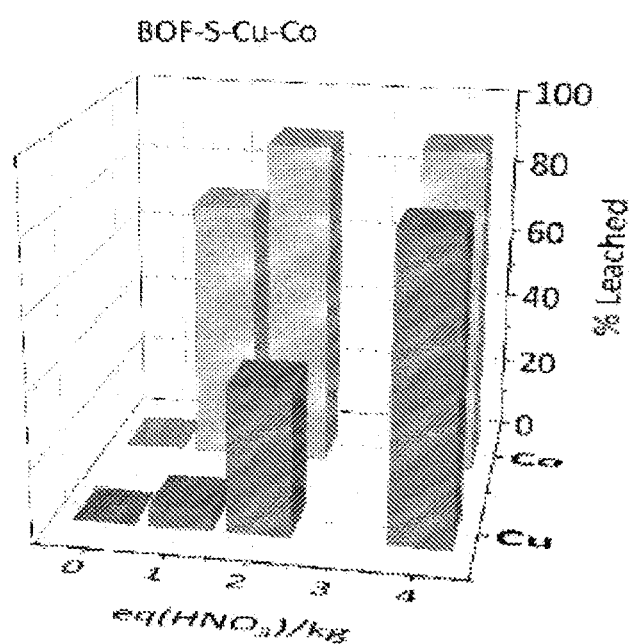

Next, the metal laden sorbents were subjected to an Acid Neutralization Capacity (ANC) assay (FIG. 11). As observed, the GAC-Acid-Cu rapidly transitioned from its natural pH of 4.8 (0 eq HNO$_3$/kg) to pH 2.12 (0.5 eq HNO$_3$/kg), exhibiting virtually no buffering capacity. GAC-Cu and GAC-Cu—Co exhibited similar trends, transitioning from pH 6.63 and 7 to pH 2.18 and 2, respectively. The two types of metal-laden slags differed from the carbons tested here as judged by their higher equilibrium pH and their markedly stronger alkaline buffering capacity. BOF slag particles loaded with copper (BOF-S—Cu) transitioned from pH 11.78 (0 eq HNO$_3$/kg) to pH 4.88 (4 eq HNO$_3$/kg). Similarly, BOF slag particles co-loaded with copper and cobalt (BOF-S—Cu—Co) transitioned from pH 11.78 (0 eq HNO$_3$/kg) to pH 4.47 (4 eq HNO$_3$/kg).

Aliquots were taken when equilibrium was reached and were then analyzed for soluble Cu and Co. The amount leached was normalized based on the total metal load per amount of sorbent used (Table 6). Visualization of both concentration and fraction leached at each acid addition and sorbent used is shown in FIG. 11.

TABLE 6

Metal leached (% w/w) from sorbents exposed to the Acid Neutralization Capacity (ANC) test with HNO$_3$.

| | Equivalents (HNO$_3$)/kg | | | | | | |
|---|---|---|---|---|---|---|---|
| Sorbent | 0 | 0.1 | 0.25 | 0.5 | 1 | 2 | 4 |
| GAC-Cu | 0.5[a] | — | 37.6[a] | 83.4[a] | 93.0[a] | — | — |
| GAC-Acid-Cu | 25.6[a] | 50.6[a] | 69.6[a] | 79.3[a] | — | — | — |
| GAC-Cu—Co | 0.1[a]/35.4[b] | — | 31.0[a]/76.8[b] | 75.8[a]/88.3[b] | 87.3[a]/86.8[b] | — | — |
| BOF-S-Cu | 0.1[a] | — | — | — | 0.3[a] | 19.2[a] | 50.70[a] |
| BOF-S-Cu—Co | 0[a]/0[b] | — | — | — | — | — | — |

[a] leached Cu;
[b] leached Co

Leachate analysis showed different metal coordination change (i.e. bioavailability) behaviors for the sorbents used and the type of metal sorbed. GAC-Cu leachate analysis on Cu, indicated a change from 0.5% of the total Cu load at 0 eq $HNO_3$/kg to 93% at 1 eq $HNO_3$/kg. A maximum difference in leached Cu (45.9%) occurred between 0.25 and 0.5 eq $HNO_3$/kg. GAC-Acid-Cu leachate transitioned from 25.6% at 0 eq $HNO_3$/kg to 79.3% at 1 eq $HNO_3$/kg. A maximum difference in leached Cu (45.9%) occurred between 0 and 0.25 eq $HNO_3$/kg. GAC-Cu—Co leachate, normalized by the Cu mass, transitioned from 0.1% at 0 eq $HNO_3$/kg to 87.3% at 1 eq $HNO_3$/kg. As for GAC-Cu, the maximum difference in leached Cu (34.3%) occurred between 0.25 and 0.5 eq $HNO_3$/kg. On the other hand, Co transitioned from 35.4% at 0 eq $HNO_3$/kg to 86.8% at 1 eq $HNO_3$/kg. The maximum difference in leached Co (41.4%) was observed between 0 and 0.25 eq $HNO_3$/kg. BOF-S—Cu increased the amount of leached Cu from 0.1% at 0 eq $HNO_3$/kg to 50.7% at 4 eq $HNO_3$/kg. In this case, the maximum difference in leached Cu (31.5%) occurred between 2 and 4 eq $HNO_3$/kg. Finally, BOF-S—Cu—Co leachate, normalized by the Cu mass, increased from 0% at 0 eq $HNO_3$/kg to 83% at 4 eq $HNO_3$/kg. The maximum difference in leached Cu (43.2%) occurred between 2 and 4 eq $HNO_3$/kg. Co transitioned from 0% at 0 eq $HNO_3$/kg to 90.5% at 4 eq $HNO_3$/kg. The maximum difference in leached Co (72.5%) was observed between 0 and 1 eq $HNO_3$/kg.

Figure 14:
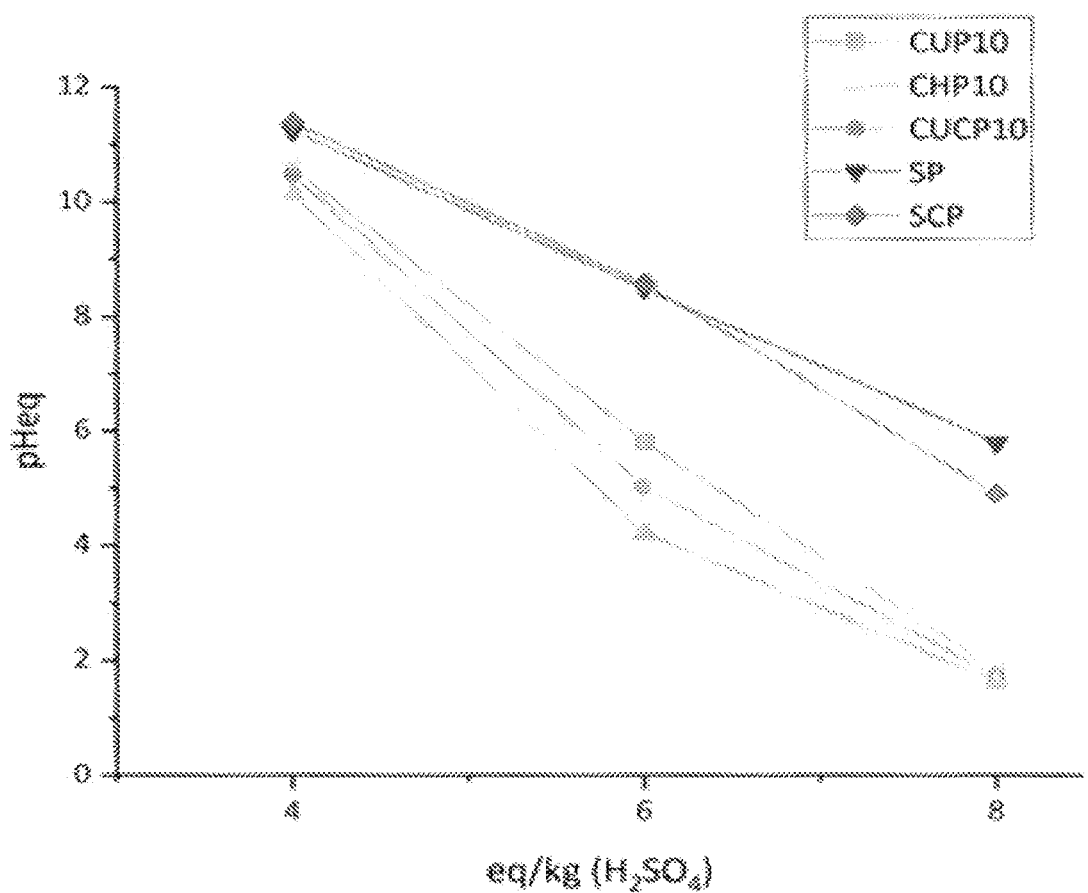
FIG. 14 is a graph showing equilibrium pH ($pH_{eq}$) of mortar formulations exposed to increasing additions of acid (eq($H_2SO_4$)/kg). Results are shown for a liquid:solid ratio of 20:1. CUP10: mortar with 10% of sand replaced by GAC-Cu; CHP10: mortar with 10% of sand replaced by GAC-Acid-Cu; CUCP10: mortar with 10% of sand replaced by GAC-Cu—Co; SP: mortar with sand replaced by BOF-S—Cu, volumetrically equivalent to 10% GAC formulations; SCP: mortar with sand replaced by BOF-S—Cu—Co, volumetrically equivalent to 10% GAC formulations.
Figure 15A:
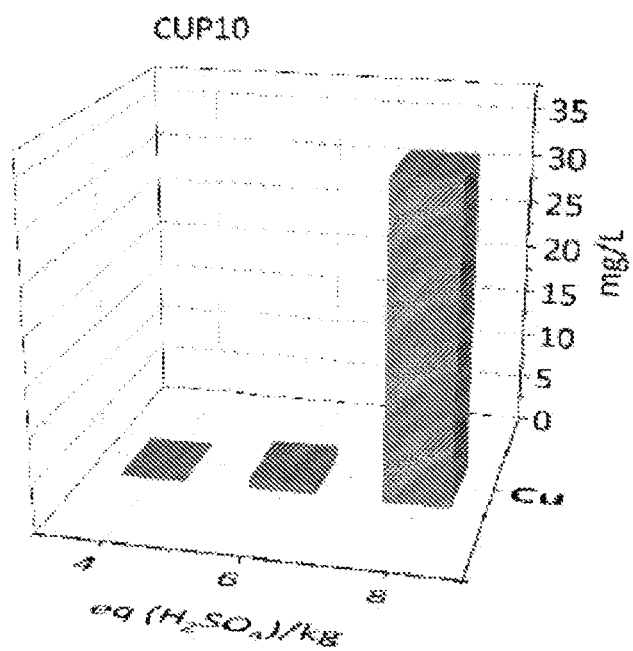
FIGS. 15A-15F show solubilized metal from metal-loaded sorbents after exposure to increasing amounts of acid (eq($HNO_3$)/kg).
Figure 15B:
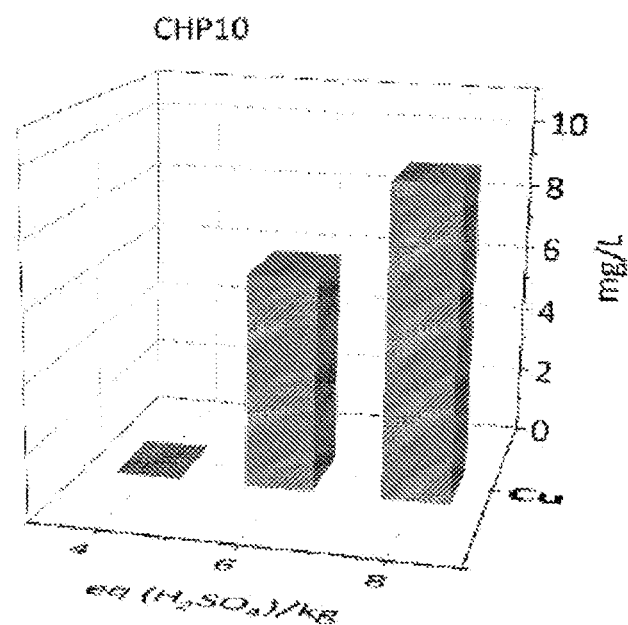
Figure 15C:
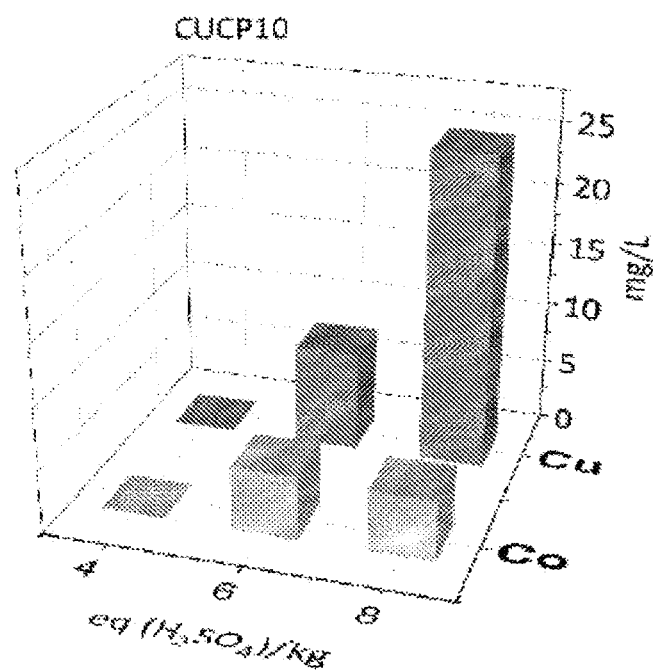
Figure 15D:
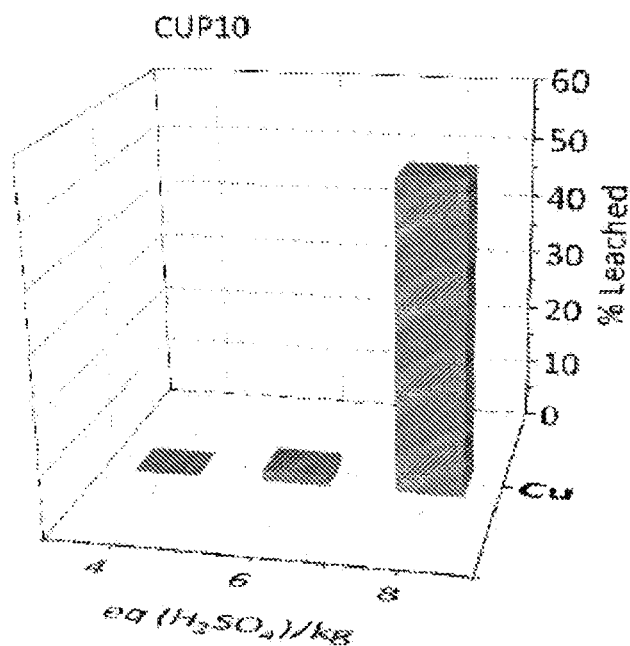
Figure 15E:
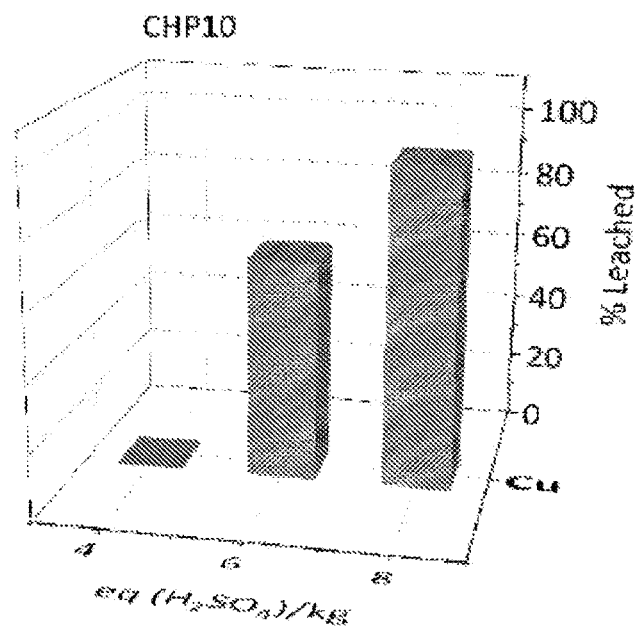
Figure 15F:
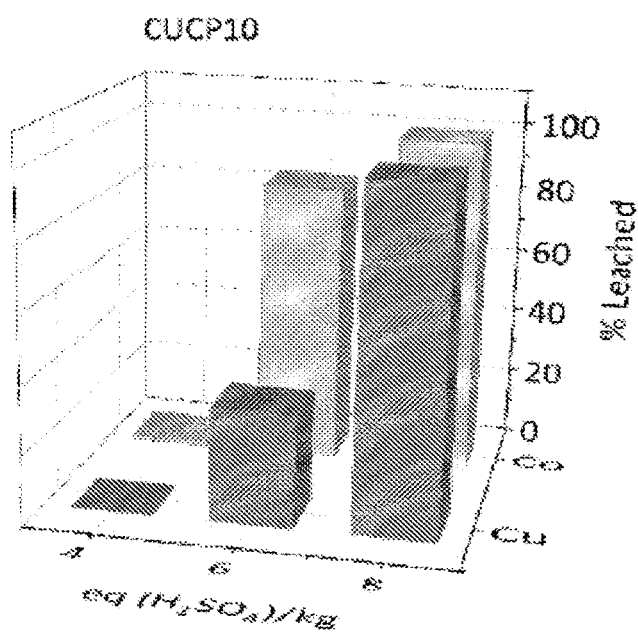
Figure 16A:
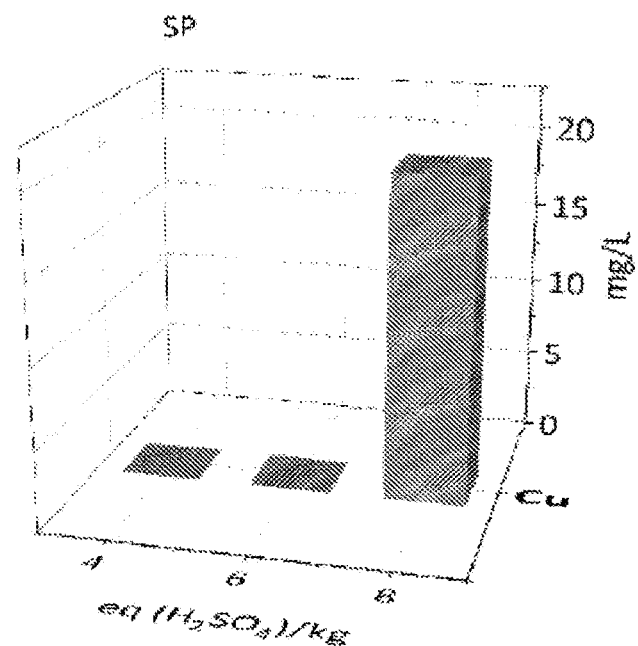
FIGS. 16A-16D show solubilized metal from metal-loaded sorbents after exposure to increasing amounts of acid (eq($HNO_3$)/kg).
Figure 16B:
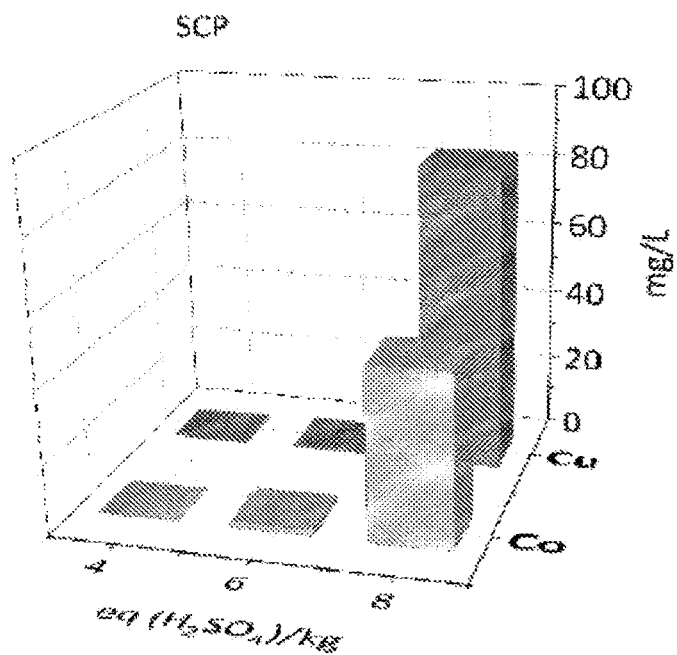
Figure 16C:
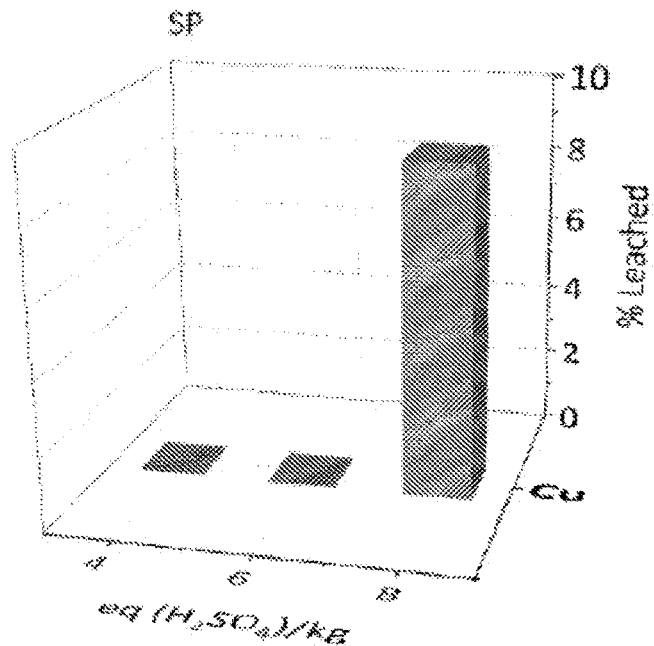
Figure 16D:
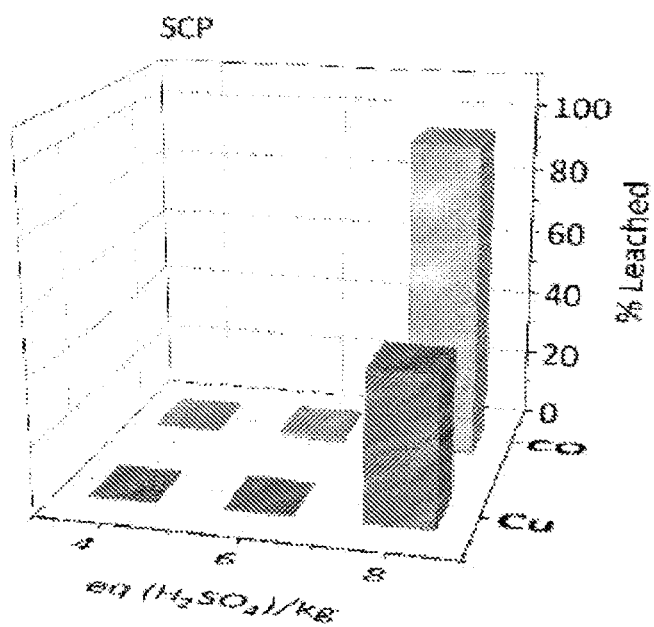

An additional ANC assay was performed on the metal-laden sorbents after being mixed and cured with Portland cement (FIG. 14). The goal was to elucidate the combined buffering capacity and leaching behavior when exposed to the most aggressive acid excreted by acidophilic bacteria ($H_2SO_4$). As observed, the amounts of acid delivered were increased to account for the buffering effect of the Ordinary Portland Cement (OPC). As for the sorbents, the acid-response could be divided between the formulations containing GAC and the formulations containing BOF-S. The mortar formulations containing GAC-Cu (CUP10), GAC-Acid-Cu (CHP10), and GAC-Cu—Co (CUCP10) transitioned from pH 10.58, 10.15, and 10.47 (4 eq $H_2SO_4$/kg), to pH 1.83, 163, and 1.72 (8 eq $H_2SO_4$/kg), respectively. While the starting an endpoint pH levels were similar, their difference was greater at 6 eq $H_2SO_4$/kg (5.81, 5.02, and 4.22). The formulations containing BOF-S—Cu (SP) and BOF-S—Cu—Co (SCP) transitioned from pH 11.23 and 11.37 (4 eq $H_2SO_4$/kg), to pH 5.79 and 4.90 (8 eq $H_2SO_4$/kg), respectively.

Leachate analysis and normalization was completed as previously described for metal-laden sorbent (Table 7).

TABLE 7

Metal leached from the mortar formulations exposed to the ANC test with $H_2SO_4$.

| Mortars | Sand replacement (wt %) | 4 Eq H2SO4/kg | 6 Eq H2SO4/kg | 8 Eq H2SO4/kg |
|---|---|---|---|---|
| CUP10 | 10 | $0^a$ | $1.7^a$ | 52.89 |
| CHP10 | 1 | $0^a$ | 66.1a | 96.68 |
| CUCP10 | 10 | $0^a/1.3^b$ | $32.9^a/84.2^b$ | 1008/100b |
| SP | 10-equivalent | $0^a$ | $0^a$ | 9.09 |
| SCP | 10-equivalent | $0^a/0.5^b$ | $0.4^a/1.3^b$ | $45.2^a/49.8^b$ |

*10-equivalent: Volumetric BOF-S grain distribution in the mortar equal to the 10% GAC formulations;
$^a$leached Cu;
$^b$leached Co.

CUP10 leachate analysis on Cu, indicated a change from 0% of the total Cu load at 4 eq $H_2SO_4$/kg to 52% at 8 eq $H_2SO_4$/kg. A maximum difference in leached Cu (50.3%) occurred between 8 and 6 eq $H_2SO_4$/kg. CHP10 leachate transitioned from 0% at 4 eq $H_2SO_4$/kg to 96% at 8 eq $H_2SO_4$/kg. A maximum difference in leached Cu (66.1%) occurred between 4 and 6 eq $H_2SO_4$/kg. CCP10U leachate, referred to Cu, transitioned from 0% at 4 eq $H_2SO_4$/kg to 100% at 8 eq $H_2SO_4$/kg. The maximum difference in leached Cu (67.1%) occurred between 6 and 8 eq $H_2SO_4$/kg. On the other hand, Co transitioned from 1.3% at 4 eq $H_2SO_4$/kg to 100% at 8 eq $H_2SO_4$/kg. The maximum difference in leached Co (82.9%) was observed between 4 and 6 eq $H_2SO_4$/kg. SP increased the amount of leached Cu from 0% at 4 eq $H_2SO_4$/kg to 9% at 8 eq $H_2SO_4$/kg. In this case, the maximum difference in leached Cu (9%) occurred between 6 and 8 eq $H_2SO_4$/kg. Finally, SCP leachate, referenced to Cu, increased from 0% at 4 eq $H_2SO_4$/kg/kg to 45.2% at 8 eq $H_2SO_4$/kg. The maximum difference in leached Cu (44.6%) occurred between 6 and 8 eq $H_2SO_4$/kg. Co transitioned from 0.5% at 4 eq $H_2SO_4$/kg to 49.8% at 8 eq $H_2SO_4$/kg. The maximum difference in leached Co (48.5%) was observed between 6 and 8 eq $H_2SO_4$/kg.

The physical chemistry of the sorbents guided the dominant mechanism of metal sequestration both during impregnation and incorporation in cement. For unmodified GAC, without wishing to be bound by theory, the dominant mechanism was assumed to be the surface precipitation of metal hydroxides. Before GAC addition, the metal solutions were pH-adjusted to 8 to favor hydroxide complex formation. Then, GAC was added and the mixture was agitated overnight. At the end of the experiment, the solution contained a precipitate colloid "cloud" and GAC particles. After being separated from the loading suspension and dried, the resulted grains were covered with a green/grey layer. For high adsorbent/adsorbate ratios three factors may explain this behavior: 1) the carbon surface (pHGAC=10.51) is higher than the solution pH; 2) the GAC surface behaves as a "nucleus" for metal hydroxide (Me(OH)2(s)) formation; and, 3) a locally high concentration of metal may exist on the carbon surface, increasing the opportunity for precipitation to occur. For acid-modified GAC, without wishing to be bound by theory, the mechanism was assumed to be ionic exchange. Due to the acidic nature of this modified GAC (=$pH_{PZC}$ 5.25) and the initial solution pH (5.75), the dominant species to be adsorbed were mainly $Cu^{2+}$, $Cu(OH)^+$, and $Co^{2+}$. Studies on surface functionalization have observed the improved cation adsorption of acid-treated GACs. For $HNO_3$-treated GAC, acidification results in the incorporation of oxidized groups (e.g carboxylic) that can bind metals through ionic interactions. Characterization of acid-treated GAC here suggests that incorporation of such groups occurred, implying that a dominant sorption mechanism is through functional ionic associations. The dominant metal sorption mechanisms on BOF-S were assumed to be a combination of surface precipitation and surface complexation. Similar to GACs, metal sorption on slags is dependent on the type, the solution pH, the metal concentration, and the adsorbate/adsorbent ratio. Generally, under acidic conditions, surface complexation onto silicates, iron, and manganese oxides is favored, while at higher pH levels surface precipitation of hydroxide complexes dominate. Additionally, at high metal concentrations (>0.1 g/L), the equilibrium pH for metal hydroxide formation is significantly lower.

Therefore, when adding highly alkaline slag into moderately concentrated metal solutions, formation of hydroxide complexes is favored, and may occur rapidly. The sorption conditions established in this study involved concentrated metal solutions (10 g/L). Before slag addition (40 g/L), the metal solutions pH ranged between 5.75 and 6.3. After BOF-S addition and overnight mixing, the equilibrium pH ranged between 6.5 and 8. Higher equilibrium pH levels were not observed likely because hydroxide ion was consumed to form copper hydroxide (and cobalt hydroxide). At the end of slag loading, the contact solution contained a precipitate "colloidal cloud" separate from the slag grains, suggesting hydroxide precipitation. After being separated from the suspension and dried, the BOF-S grains were covered with a green/grey layer (slightly pink for cobalt-containing batches).

These observations suggest that surface precipitation was a dominant sorption mechanism. However, the BOF-S used contained a significant proportion of $SiO_2$ (14.7%), $Fe_2O_3$ (25.8%), and MnO (2.5%), and heterogeneous grains were identified to be rich in these phases using EMPA. This suggests the possibility of metal sorption on these oxides as well. The Acid Neutralization Capacity (ANC) test was performed in order to investigate the buffering and leachability potential of the metal-laden sorbents when exposed to increasing amounts of acid. Two types of ANC tests were performed: ANC on the metal-laden sorbents, and ANC on the same when mixed and cured into Portland cement mortars.

With metal-laden sorbents, the ANC test indicated three distinct groups based on buffering capacity and metal bioavailability. The first group (GAC-Acid-Cu), showed little buffering effect with increasing acid addition. Before acid addition (0 eq/kg) the equilibrium pH was 4.8. This value was slightly higher than the measured pH of the carbon alone (pH=4.65), possibly due to (deionized) water-induced leaching of Cu (25.6%). At 0.5 eq acid/kg, the solution pH had reached 2.12 and the Cu leached 79.3% of its sorbed mass. The second group was composed of GAC-Cu and GAC-Cu—Co. These two sorbents showed increased neutralization capacity and Cu retention. Before acid addition (0 eq/kg), the solution pH was circumneutral and minimal leaching of Cu occurred. In contrast to the acidified carbon, these sorbents required 1 eq/kg of acid to reach pH≈2, at which point the Cu leached was 93% and 87.3%, respectively. The changes in pH with increasing acid addition are within the ranges observed for different carbons, with small variations accounting for the buffering effects of the leached metals. An observation can also be made on the different Cu liberation profiles. GAC-Acid-Cu initially made bioavailable significant amounts of Cu but delivered less metal into solution than the other two GACs with subsequent acid addition.

Without wishing to be bound by theory, this may arise from the leaching from GAC-Acid which occurred through site-specific competition and displacement of $Cu^{2+}$ by $H^+$ from the acid, while leaching from GAC occurred by the (rapid) acid dissolution of hydroxide complexes. The last group included both BOF-S—Cu and BOF-S—Cu—Co. These materials exhibited the highest buffering effect and the highest metal retention capacity when challenged with acid. Before acid addition (0 eq/kg), the solution pH approached 12 and minuscule amounts of Cu were seen in solution. In contrast to the GACs, the high buffering effect provided by the slags resulted in higher resistance to pH depression in response to acid addition. At 4 eq acid/kg, the solution pH approached 5 and the percentage of metal made bioavailable was 50.7% for Cu and 83% for Co. For both GAC and BOF-S, cobalt showed higher mobility than Copper in response to acid additions. This is likely because in dilute solutions, dominates aqueous speciation up to pH=8.2. Above this value, formation of the less soluble species $Co(OH)_2$ occurs. At 0 eq/kg, the solution pH of GAC already favors cobalt dissolution as $Co^{2+}$, while on BOF-S pH remains too high for $Co^{2+}$ to dominate the aqueous speciation.

ANC performed on metal-laden sorbents mixed and cured with OPC differentiate two distinct groups, as shown in FIG. 14. The amount of acid tested was increased to account for the additional alkalinity provided by cement. The first group included all the mortars with GAC. These mixtures resulted in similar solution pH (10.5) and Cu leached at 4 eq/kg (0%). The same group exhibited a common endpoint pH (2) after 8 eq/kg. In this case Cu leached increased following the series CUCP10=≈CHP10>CUP10. The major differences in pH were observed at 6 eq/kg, indicating a leachability trend against acid addition following the series CHP10>CUCP10>CP10U. These results correlate well with the observations on the ANC of isolated metal-laden sorbents. The second group included the two slag-containing formulations. These sample exhibited increased ANC and higher metal retention than their GAC counterparts. The mixtures exhibited similar behaviors at 4 eq/kg with no detectable Cu leached.

Significant Cu leaching was not observed until 8 eq/kg of acid addition, at which point SP leached 9% and SCP 45.2% of their total Cu load. The difference in Cu leached, on a percent basis, may be explained by their difference in solution pH at the end of the experiment. In CUCP10 and SCP, Co was observed more mobile than Cu, as also shown for individual metal sorbents.

Acidophile Inhibition by Mortar Formulations in Simulated Corrosive Environments Analysis of extracted (and suspended) corrosion products from formulations challenged with $H_2S$ and $CO_2$ in a bench-scale reactor were inconclusive. The pH of the corrosion products resulted in acidic values for all formulations. No trends were observed between formulations with tremendous variability between replicates. The acidification may have been a result of the continuous inoculation of acidophilic cultures onto the mortar's surface, as well as the acidification due to acid gases (i.e. $H_2S$ and $CO_2$). However, few universal and *Acidithiobacillus* qPCR amplicons were detected in the corrosion suspensions, indicating that all results relating to genetic observations were rendered indeterminate. Further, optical interferences made it impossible to detect; thus all bench scale reactor tests were abandoned.

Example 4

Mortar Formulations Effectiveness in Bench Scale Bioreactor

The effectiveness of the mortar formulations in inhibiting acidophilic growth was evaluated in laboratory settings after simulating severe corrosion environments in an annular reactor. After 250 days of exposure, the tested mortar slides were recovered, extracted, and analyzed for microbial activity, bacterial enumeration, and acidophilic abundance through 16SrRNA gene analysis.

Microbial Activity

Figure 17A:
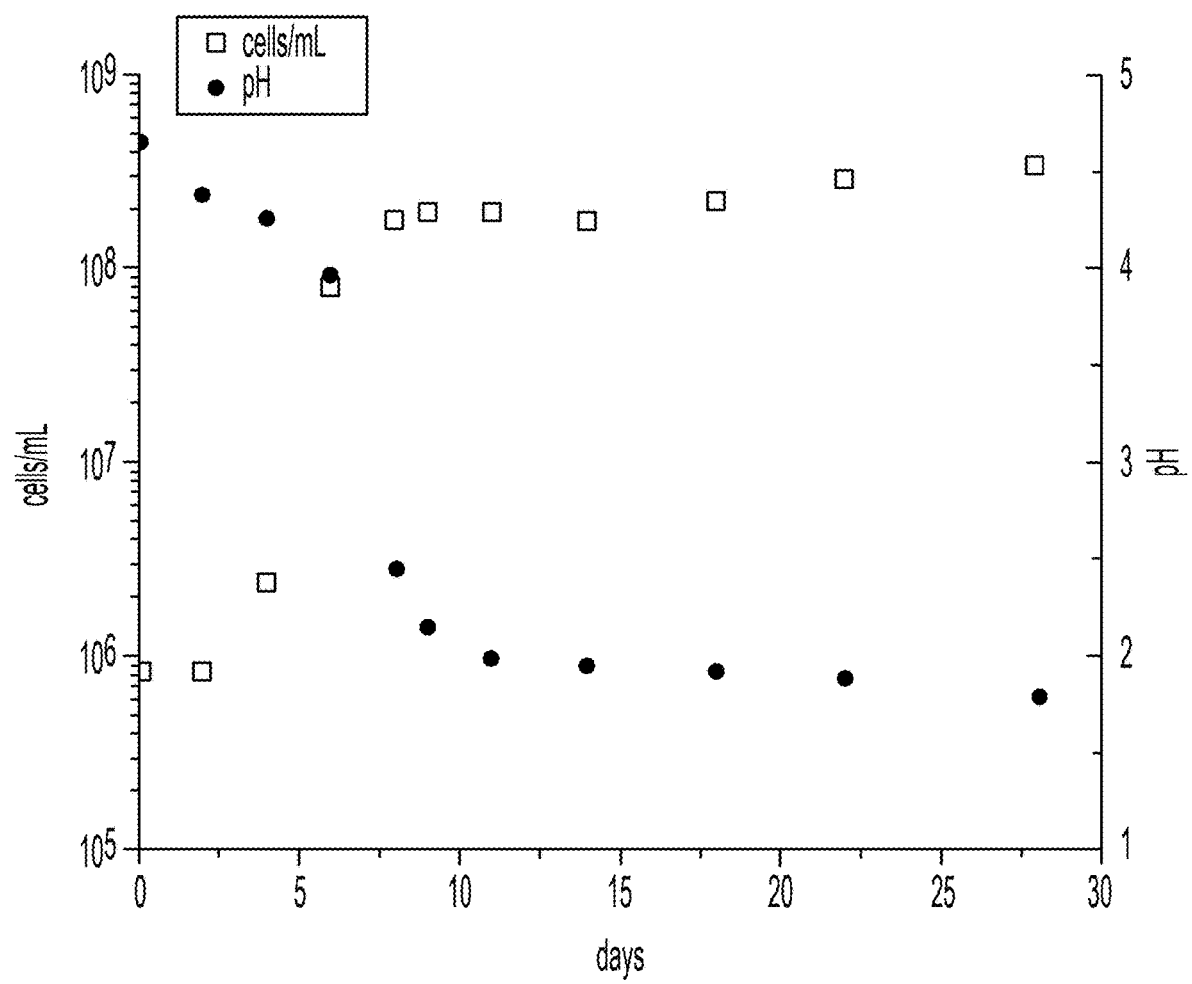
FIGS. 17A-17D are graphs showing (FIG. 17A) changes in cell density and pH.
Figure 17B:
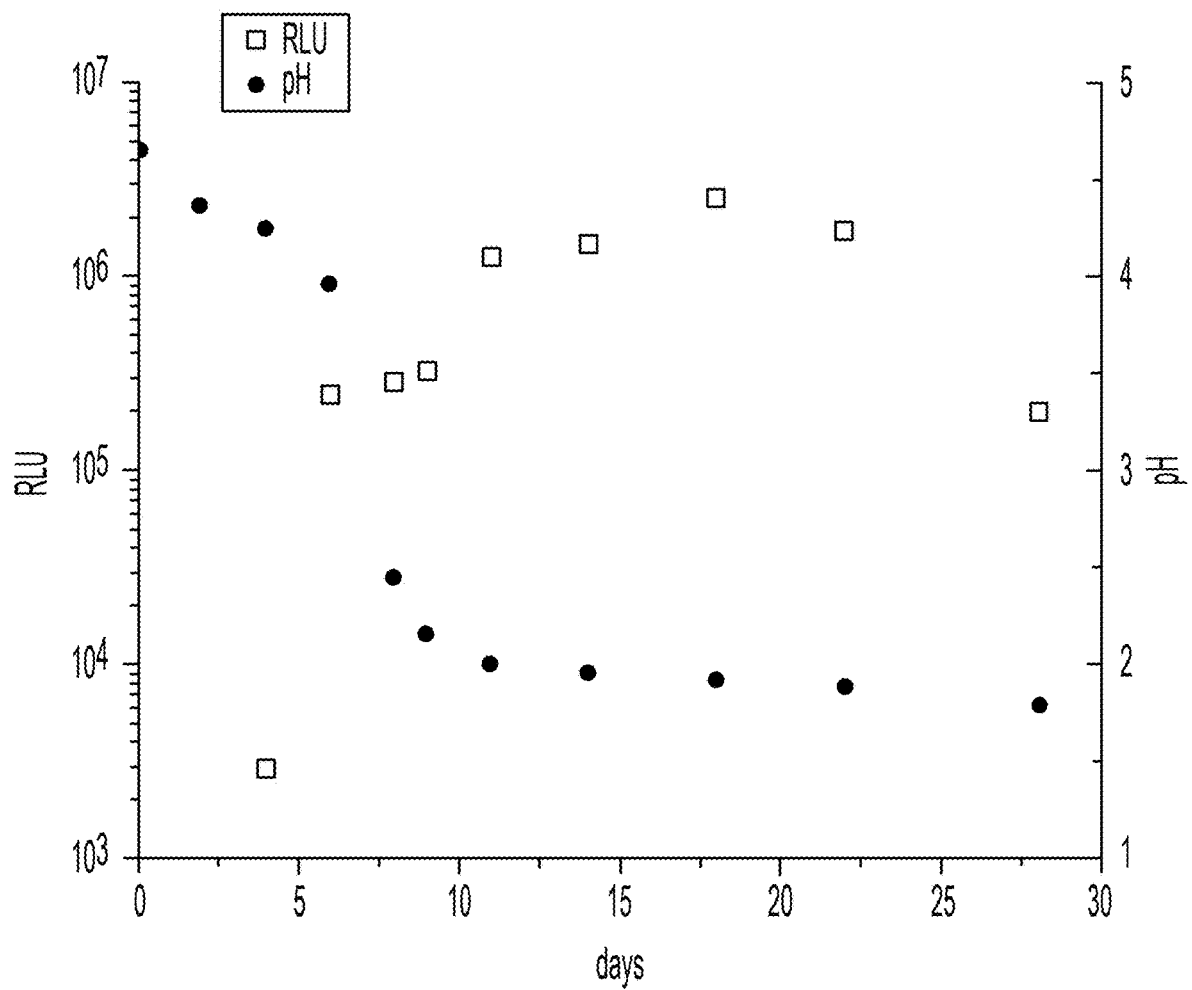
Figure 17C:
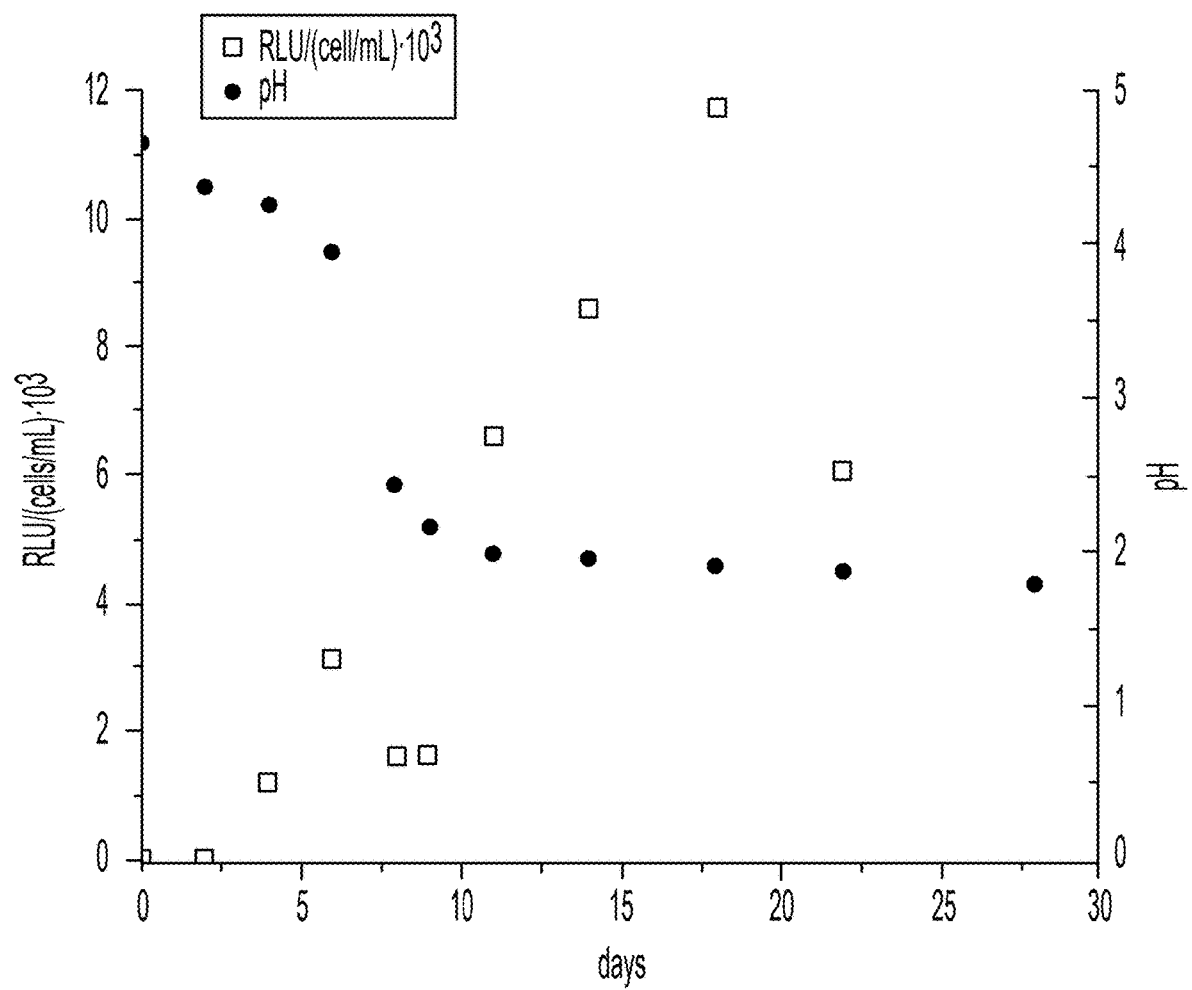

Validation on the use of the NovaLUM luminometric readings as a surrogate for acidophilic activity was previously completed on laboratory cultures. For this purpose, *Acidithiobacillus* mixed cultures were prepared and monitored for temporal changes in bacterial abundance, microbial activity, and culture pH (FIG. 17A-17C). The cell density followed a typical growth curve that correlated with the pH drop profile similar to that observed in liquid enrichments. A lag phase of 2 days preceded the exponential growth phase. pH slightly decreased during this time, dropping from 4.65 to 4.25. The exponential phase correlated with a significant pH drop, which transitioned from 4.25 to 2.15. After 9 days of incubation, the stationary phase was reached and minimum changes in total cell density were observed. pH continued dropping at a slower rate, stabilizing around 1.8 after 30 days of monitoring. No total RLU could be measured in the first 2 days.

Figure 17D:
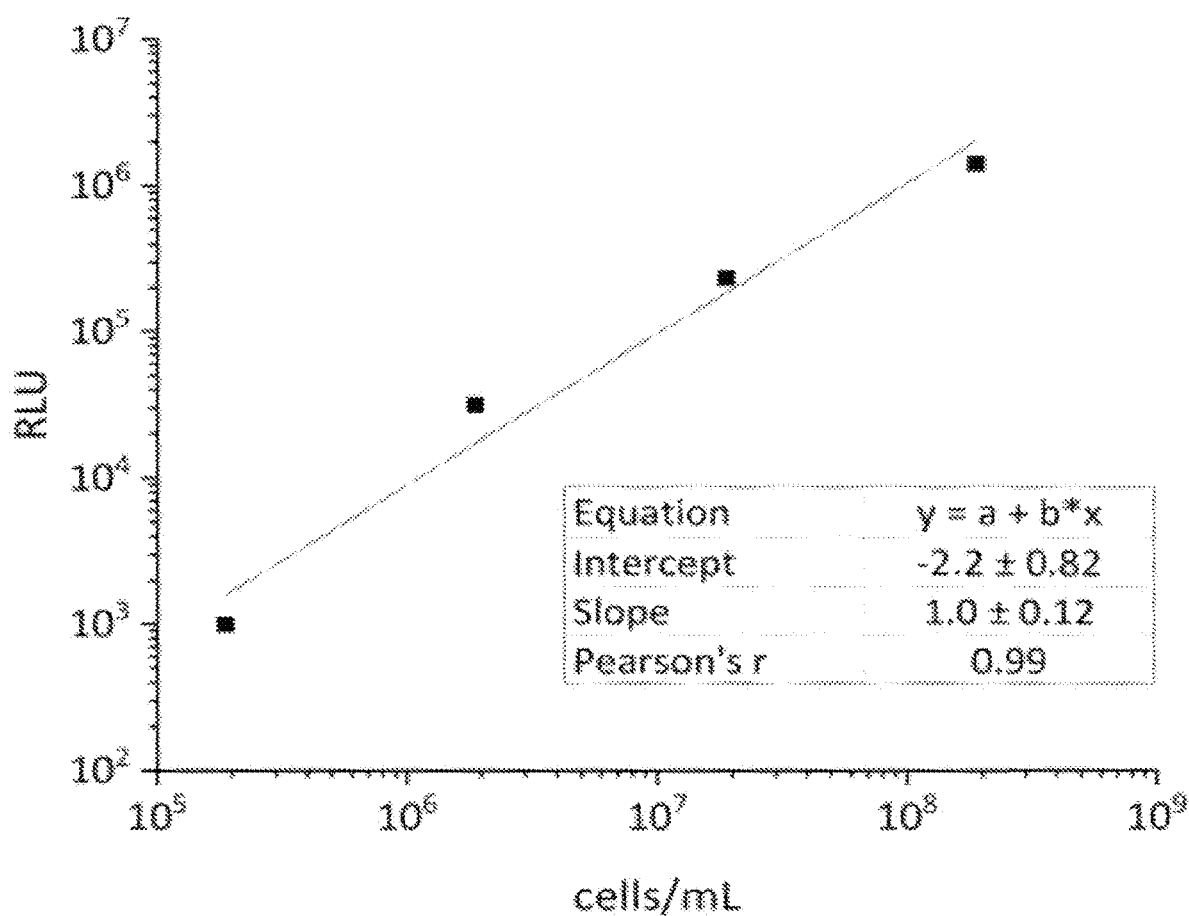

However, during the exponential growth the measured RLUs increased and plateau between 6 and 9 days after inoculation. After 9 days, the values continued to increase, at a slower rate than the initially observed, and peaked at day 18. From this point, the readings started to decrease sharply, suggesting a senescing phase. The normalized RLU (on a cell density basis), showed two peaks, a small one at 6 days (3.08 RLU/(cells/mL)·$10^3$), and a larger one at day 18 (11.72 RLU/(cells/mL)×$10^3$). After the second peak the normalized values decreased sharply, with a final measurement, at 28 days, resembling that at 4 days. Finally, the effect of diluting the cultures on the RLU readings was study by preparing serial dilution in sterile *Thiobacillus* media of a stationary phase culture (day 18) (FIG. 17D). A log-linear trend successfully described the relationship between cell density and acidophilic culture dilution between $10^5$ and $10^9$ cells/mL ($R^2$=0.99).

As judged by ATP, microbial activity in corrosion products was measured using the Luciferin-Luciferase reaction as known in the art. Swabs were immersed into each corrosion eluate for 30 seconds. Then, the correspondent Relative Light Units (RLU) were measured by inserting the swabs into a luminometer (Table 8).

Suspension pH

The extracted corrosion product was suspended in 10 mL of sterile saline solution, and is referred to as the corrosion eluate. For each sample, pH of the solution was measured and was used as an indicator of corrosion extent (Table 8).

TABLE 8

Measured pH and microbial activity (expressed as RLU) on the different corrosion eluates. Numbers in parenthesis indicate replicates for each formulation.

| Formulation | pH | RLU |
|---|---|---|
| C0 (1) | 3.93 | 481 |
| C0 (2) | 4.1 | 763 |
| CNU10 (1) | 3.34 | 782 |
| CNU10 (2) | 3.57 | 879 |
| CPU10 (1) | 4.5 | 6741 |
| CPU10 (2) | 4.3 | 5539 |
| CHP10 (1) | 3.35 | 2995 |
| CHP10 (2) | 4.81 | 3066 |
| CUCP10 (1) | 4.39 | 5274 |
| CUCP10 (2) | 3.88 | 12993 |
| S0 (1) | 3.9 | 466 |
| S0 (2) | 4.04 | 4049 |
| SP (1) | 5 | 5631 |
| SP (2) | 5.55 | 6076 |
| SCP (1) | 4.45 | 5308 |
| SCP (2) | 4.6 | 3309 |

Cell Abundance

Figure 18A:
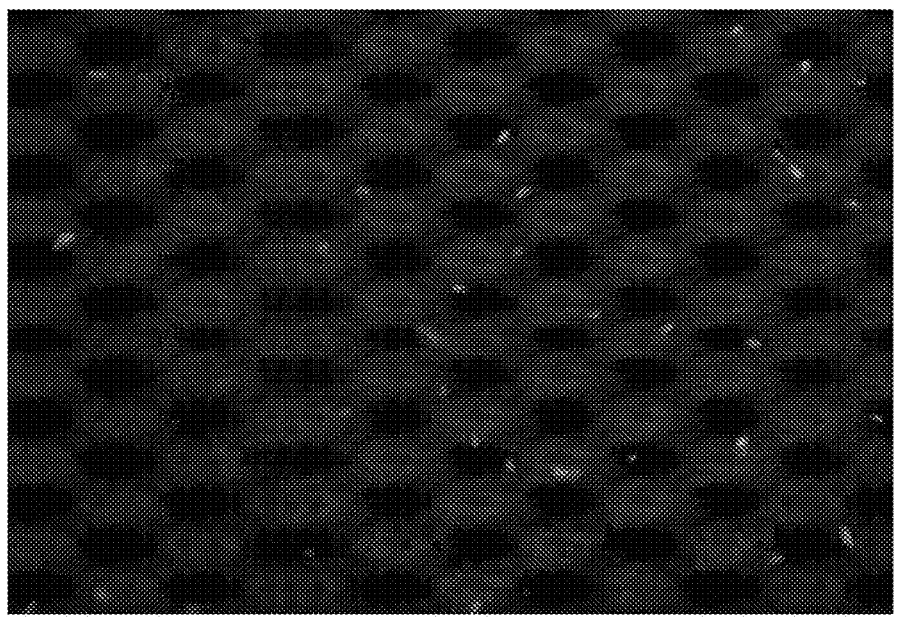
FIGS. 18A-18B show epifluorescence microscope images of DAPI stained bacteria at 100× magnification.
Figure 18B:
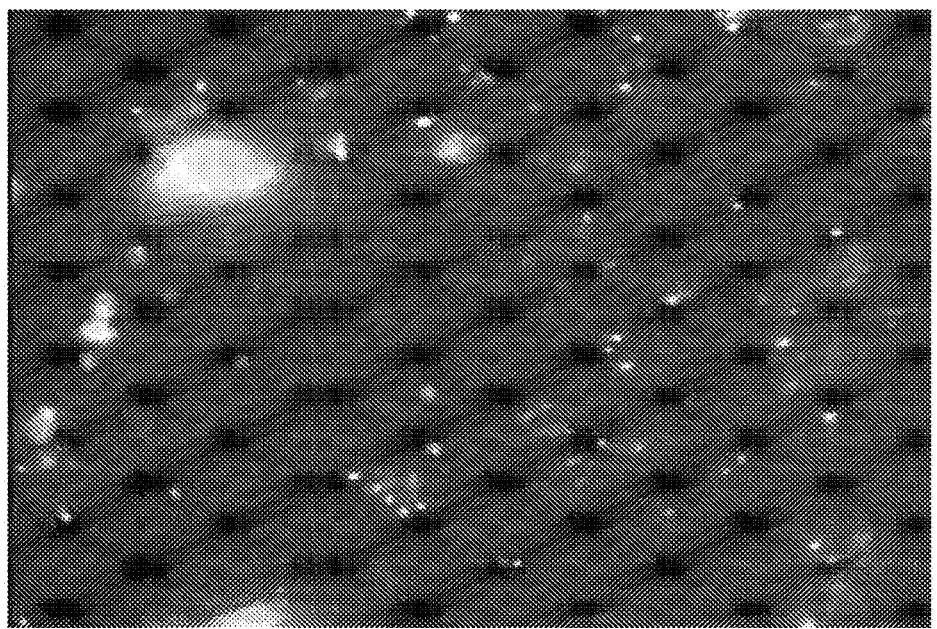

Dilutions of the corrosion suspensions were prepared in PBST (0.1% Tween 20). Dilutions were sonicated for 90 seconds at 80 W to facilitate cell detachment. Next, the larger and denser particles were allowed to settle for 30 minutes. Finally, aliquots taken, avoiding precipitates, were prepared for DAPI staining and microscope cell counts. While a simplified version of this method was successfully applied for cell enumeration of laboratory cultures, the cell detachment process from the mortar surfaces resulted in increased debris. The debris interacted with the DAPI stain and fluoresced when excited by ultraviolet light (FIGS. 18A-18B). This resulted in increased background brightness and the difficulty to differentiate between bacterial cells and debris of similar size and shape. Therefore, cell enumeration was not performed on these samples.

16S rDNA Analysis

Aliquots from the corrosion eluates were diluted for DNA extraction. Isolated and purified DNA were used to determine the relative recovery of universal and *Acidithiobacillus* 16S rRNA genes (Table 9). In all cases, the gene copy numbers recovered with universal primers were close or below the detection limit (100 copies/µL). *Acidithiobacillus* copy numbers were either undetected or ranged from <10 to 81 copies/µL. PCR inhibition due to a preponderance of dissolved chemical species from the corrosion eluate was investigated through serial dilutions in TE buffer of selected samples (S0 and CNU10). Even after significant dilutions, positive amplification was obtained using universal primers only after 40 cycles, but at or below 100 copies/µL. No amplification was obtained for *Acidithiobacillus* 16S rRNA gene, following serial dilutions.

TABLE 9

16S rDNA copy numbers from undiluted corrosion eluates in bench-scale bioreactor using universal and Acidithiobacillus-primers. Numbers in parentheses correspond to duplicates of each formulation.

| Formulation | Universal | *Acidithiobacillus* |
|---|---|---|
| C0 (1) | <100 | n/a |
| C0 (2) | <100 | n/a |
| CNU10 (1) | 122 | n/a |
| CNU10 (2) | 110 | n/a |
| CPU10 (1) | 117 | <10 |
| CPU10 (2) | 123 | n/a |
| CHP10 (1) | 140 | <10 |
| CHP10 (2) | 129 | n/a |
| CUCP10 (1) | 105 | n/a |
| CUCP10 (2) | 106 | <10 |
| S0 (1) | 110 | <10 |
| S0 (2) | 120 | <10 |
| SP (1) | <100 | n/a |
| SP (2) | <100 | 81 |
| SCP (1) | 123 | n/a |
| SCP (2) | 150 | n/a |

Example 5

Field Study

Figure 19:
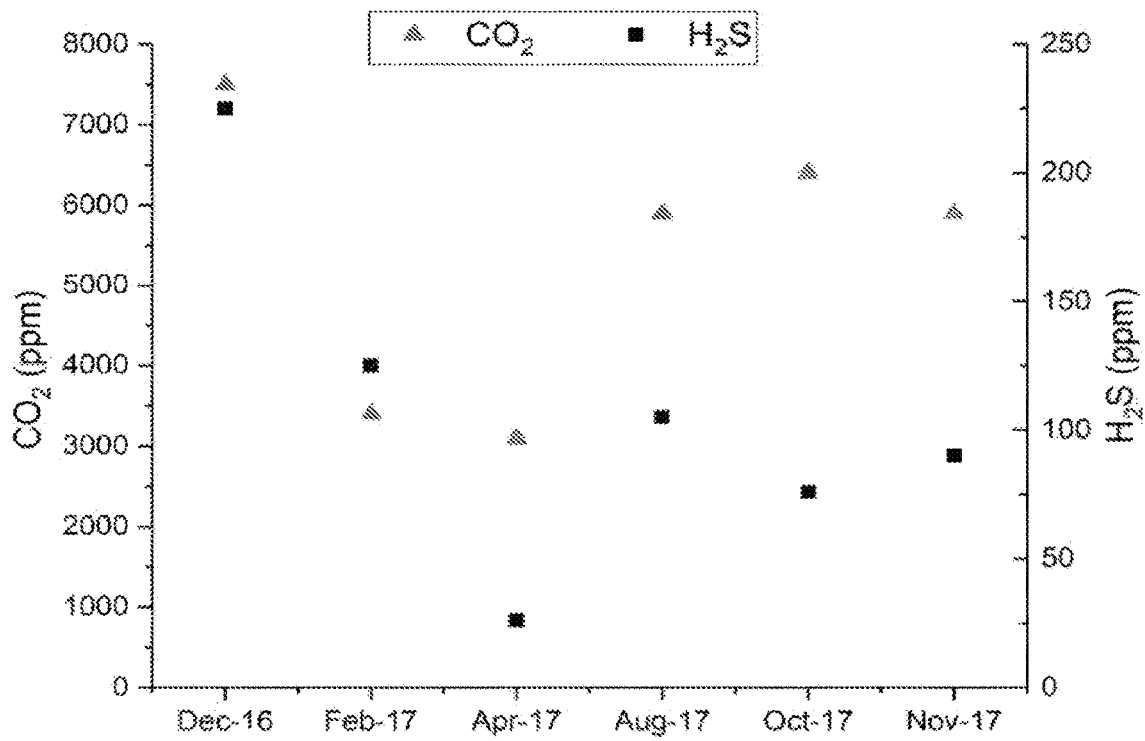
FIG. 19 is a graph showing concentrations of hydrogen sulfide ($H_2S$) and carbon dioxide ($CO_2$) in corroding manhole hosting test coupons.

Cast mortar specimens were exposed to sewer headspace gases for a total of 11 months in a corroding manhole. During this time, headspace gas concentrations ($H_2S$ and $CO_2$) were periodically observed and photographs of the samples' surface were archived (FIG. 19). After exposure, samples were recovered and brought to the laboratory for further analysis. Different physical, chemical, and microbiological parameters were evaluated in order to assess the performance of the mortar formulations when subjected to biogenic corrosive environments.

Combinations of sewer gas concentrations serve as indicators of site corrosiveness. Periodic monitoring of $H_2S$ and $CO_2$ at the formulation challenge site indicated a moderateto-severe corrosive environment, with $H_2S$ concentrations ranging between 25 ppmv and 225 ppmv and $CO_2$ concentrations ranging between 3,000 ppmv and 7,500 ppmv. These ranges have been associated with increased corrosion rates in sewer appurtenances.

Corrosion Analysis

Figure 20:
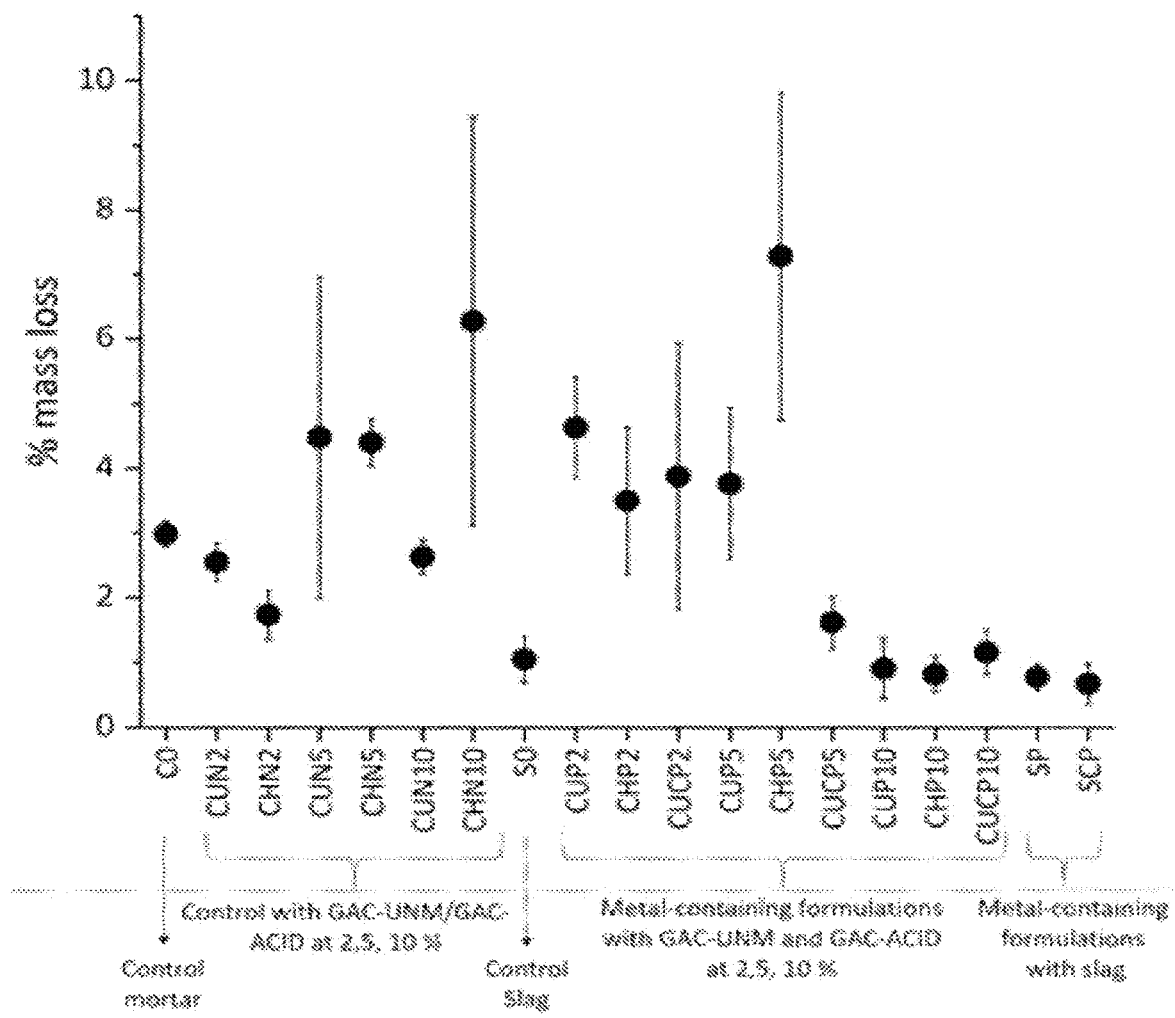
FIG. 20 is a graph showing mass losses on a percent basis (wt %) of different mortar formulations after exposure to corrosive environments. Bars indicate the range of observations. Control formulations include aggregates substitutions with no metal addition.

Samples were weighed before and after removal of soft corrosion products and were normalized to determine the percentage of cement mass lost (FIG. 20). The control formulations (C0), which contained no granular activated carbon, slag, or metals, experienced mass losses between 2.7% and 3.2% after 11 months. GAC formulations without metals experienced different degrees of mass loss and no significant trends emerged in response to increasing the fractions of fine aggregate with GAC. Mass losses for these samples ranged between 2.1% (CHN2) and 9.4% (CHN10). Corrosive mass losses associated with cement hosting different amounts of metal-saturated GAC presented the following trend: samples at 2% and 5% sand replacement resulted in mass losses between 1.8% (CUCP2) and 9.8% (CHP5), and no trends emerged based on the type of GAC, or the metal combinations used.

Formulations with 10% of sand replaced with metal-impregnated GAC had significantly lower mass losses, ranging from 0.4% (CUP10) 1.5% (CUCP10). At this substitution level, no trends were observed based on GAC type, or the metal combinations used. Overall, the slag-containing formulations experienced less mass losses than their GAC-containing counterparts. Formulations without any metal content (S0) experienced significantly higher mass losses, between 2% and 2.1%, with respect to their metal-containing counterparts. For the latter, the mass losses ranged between 0.36% (SCP) and 0.98% (SCP) and no trends were observed based on the metal combinations used.

Figure 21:
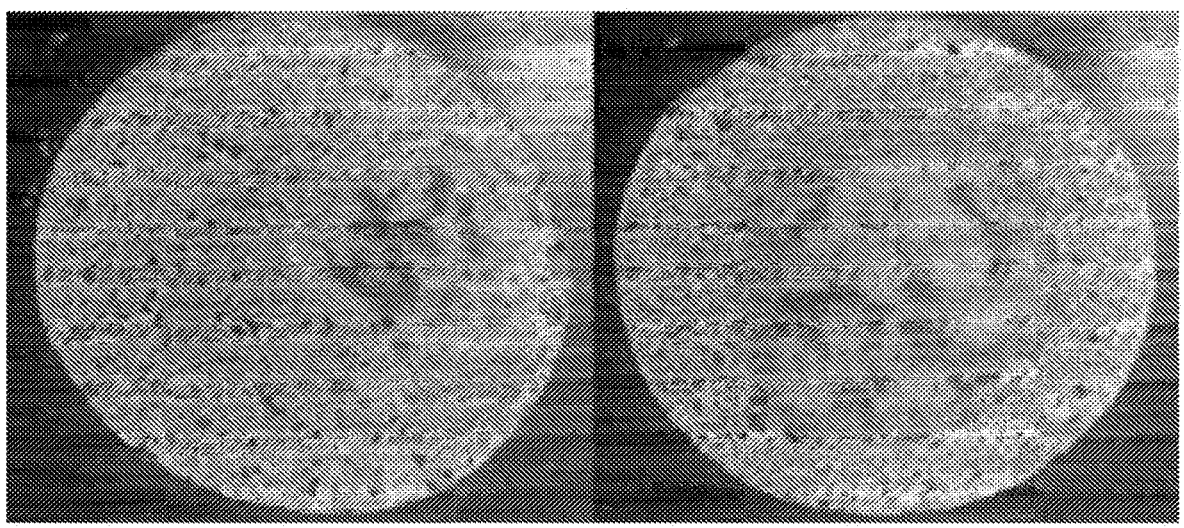
FIG. 21 show images of top view of different mortar samples after removal of superficial corrosion products. The characteristic radial corrosion fronts can be visualized by the presence of gypsum/carbonate formation and exposure of internal aggregates. Corrosion front denoted with a dashed line.
Figure 21:
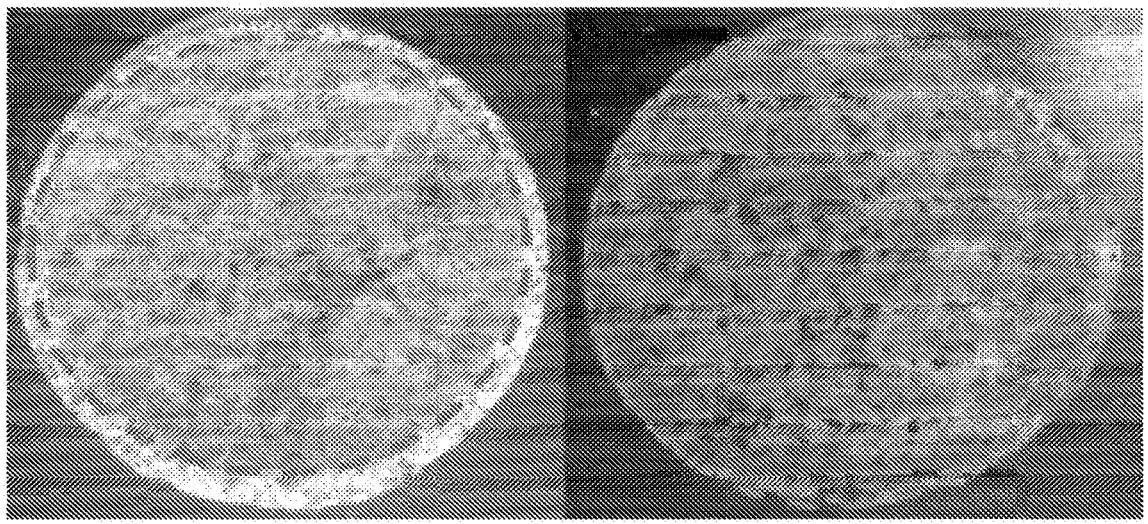
Figure 22:
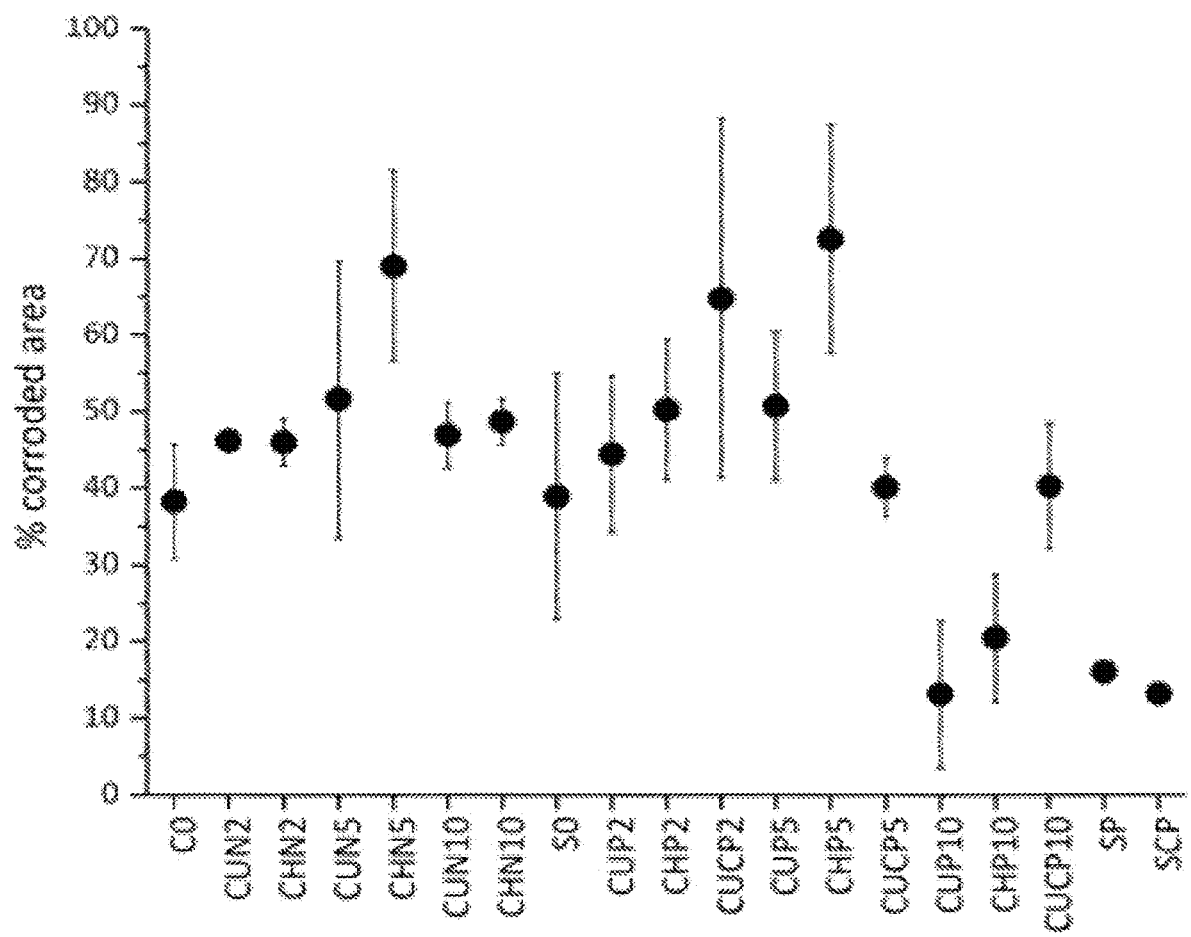
FIG. 22 is a graph showing corroded areas (%) for the different mortar samples after removal of superficial corrosion products. Bars indicate the range of observations.

After removal of the corrosion product, the samples exhibited a characteristic radial corrosion front originating at the edges of the mortar surface and progressing into the center of the sample face (FIG. 21). Different degrees of corrosion penetration were observe and quantification of corrosion extent for each sample was done by previously described imaging techniques (FIG. 22). All formulations exhibited some degree of superficial corrosion. However, the samples containing the highest metal substitutions resulted in significantly lower corrosion penetration (<30% on CUP10, CHP10, SP, and SCP mortar specimens). Formulations with uncorroded areas ranging between 50% and 70% included: CUCP10, CUCP5, and CHN2. The rest of the formulations experienced higher variability (e.g. S0), or consistently presented more than half of their exposed facial areas corroded.

Figure 23:
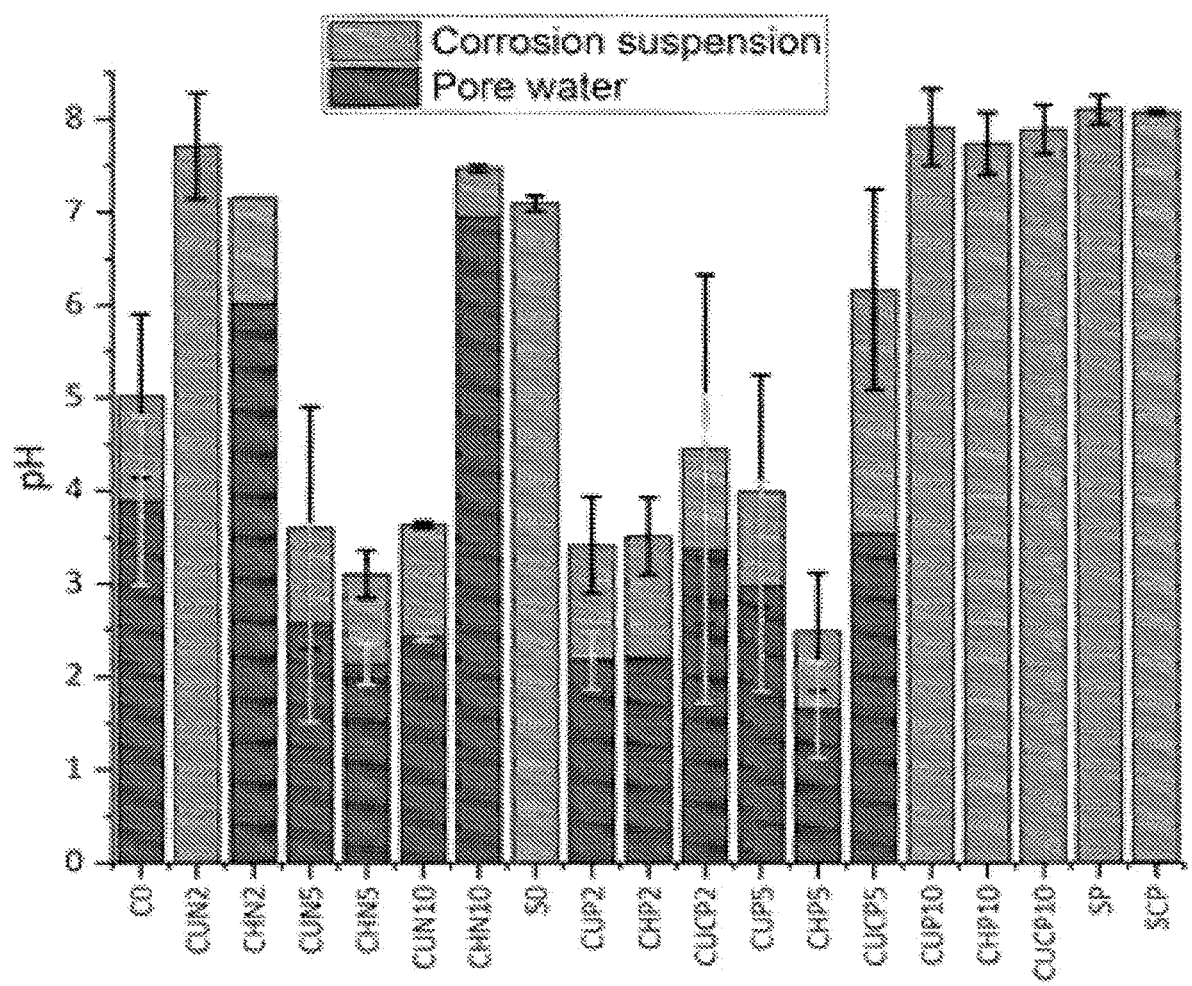
FIG. 23 is a graph showing corrosion suspension pH and water pore pH of the mortar samples after exposure to corrosive environments. Bars indicate the range of observations.

The last analyzed parameters used to evaluate the corrosion extent of the samples were the pH of the suspended corrosion eluate and the associated pore water pH (FIG. 23). pH was measured after suspending the corrosion products in 10 mL of saline solution. The pore water pH was obtained by determining the moisture content of the corrosion products along with mass balance calculations for hydronium ion. Moisture content was calculated for samples that presented at least 0.5 grams of corrosion product formation. Corrosion eluate pH ranged between 8.26 (SP) and 1.85 (CHP5). Pore water pH ranged between 6.95 (CHN10) and 1.13 (CHP5). In general, basic pH levels pHs (pH>7) were observed for samples containing the highest heavy metal doses (e.g. CUP10, CUCP10, SP, and SCP) with few exceptions that included replicates of CUN2, CHN2, CHN10, S0, and CUCP5. However, these formulations also included replicates that experienced low suspension pHs and considerable corrosion product formation (e.g. CUCP5).

Figure 24:
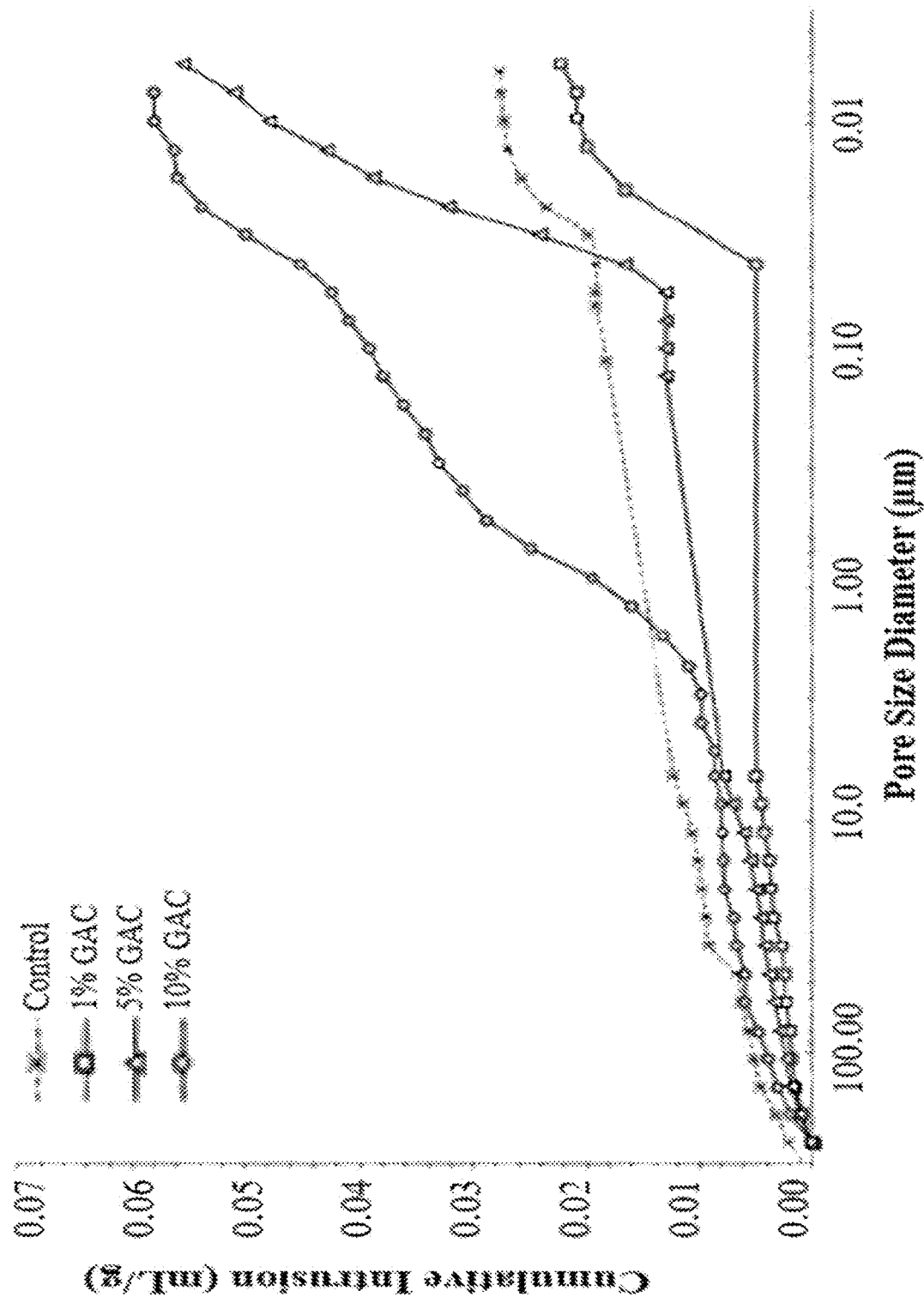
FIG. 24 is a graph showing the influence of GAC substitution in cement compositions on porosity.

After 11 months of exposure, specimens with the highest metal-laden sorbent dosages (CUP10, CHP10, SP, and SCP) experienced the least corrosion as judged by wet mass loss, uncorroded surface area, and suspension pH (pore water pH). These formulations exhibited lower variability between samples and ranged within similar values, regardless of the sorbent. Significant corrosion was observed at lower fine aggregate substitution ratios despite presence of metals. Analogous to the metal inhibition thresholds observed in aqueous enrichments, these results suggest the existence of a solid phase inhibitory threshold below which significant corrosion can occur. In certain ranges, GAC can increase porosity, which may allow for increased acid diffusion into the cement matrix (FIG. 24).

While numerous studies on concrete corrosion report degradation rates as linear penetration (mm/year), this study used mass loss as the physical parameter describing corrosion extent. This physical assessment was selected for the following reasons: 1) corrosion products lead to expansive reactions that may influence corrosion depths on the scale of millimeters; 2) the corrosion products were uneven in every dimension with significant variability within the same formulation. The corrosion profile was similar between mortar formulations. In most cases, corrosion was observed to penetrate into the coupon (depth) but also progressed to the center of the sample, radially. The radial degree of corrosion intrusion was significantly lower for the highest metal-containing formulations. The radial corrosion profiles are associated with the cylindrical geometry of mortar coupons, and their suspension and exposure to the sewer gas. The mortar samples were poured in conical plastic tubes and installed with-mold into the manhole, with the mortars only exposing a circular face to the headspace gases. This was done to minimize contact with untreated surfaces and unassociated acid dripping from these onto the mortar coupons.

However, based on the obtained corrosion profiles, it is likely that acidophiles developing on the interior plastic wall of the molds produced acid that inadvertently contacted the exposed mortar surfaces. Nonetheless, this artifact was exploited in favor of quantifying corrosion progression, as different degrees of acid intrusion were clearly observed. Parallel to the mass loss results, the formulations with highest metal-laden aggregate content consistently exhibited lower corroded areas than their counterparts.

The last parameter used to evaluate corrosion extent was the corrosion product pore water pH. The moist corrosion product fractions were used for moisture content determination, and the pore water pH was determined. The wet corrosion products were suspended in 10 mL of saline solution and pH was measured. However, corrosion product fractions were not available for fractionation and moisture content determination on formulations which significantly resist corrosion.

Most studies on biogenic concrete corrosion use pH as a major indicator of the deterioration degree of concrete samples. The three most common approaches to measure concrete pH are as follows: 1) use of flat-probe pH meters, or pH-strips, on affected surfaces, 2) determination of the pore water pH of the corrosion products, and 3) measurement of corrosion suspension pH. Flat-probe pH meters and pH strips are useful for non-destructive and on-site determination of surface pH. However, this surficial descriptive power is less useful when compared to that of the pore water pH. This comparison is especially problematic with extremely corroded surfaces that exhibit pH<1.

In this study, suspension and water pore pH were useful for comparing the corrosion degree of the different formulations, and in agreement with other independent deterioration observations (i.e. mass loss). In general, samples exhibiting obvious corrosion resulted in suspension pH levels <7 with even lower water pore pH values. Exceptions where the mass lost did not correspond to corroded surface area and product pH included: CUN2, CHN2, CHN10, and S0. For the GAC-containing formulations, this might have been a result of the corrosion product extraction procedure. It is possible that the brushing used to remove corroded cement also removed unadulterated cement that, upon suspension, neutralized part of the acid from the corroded product. Sample S0 indicated a corrosion suspension pH near neutrality. This sample also exhibited reduced mass loss but increased corroded surface area.

These results suggest that S0 was (slightly) affected by corrosion but offered some protection due to the alkalinity provided by BOF-S grains. Samples with the highest metal dosages resulted in pH levels above neutrality. Overall, these samples consistently exhibit the lowest mass losses, highest uncorroded areas, and highest suspension pH levels, suggesting these fine aggregate substitutions provided metal-induced enhanced resistance against biogenic corrosion.

Microbial Analysis

Figure 25:
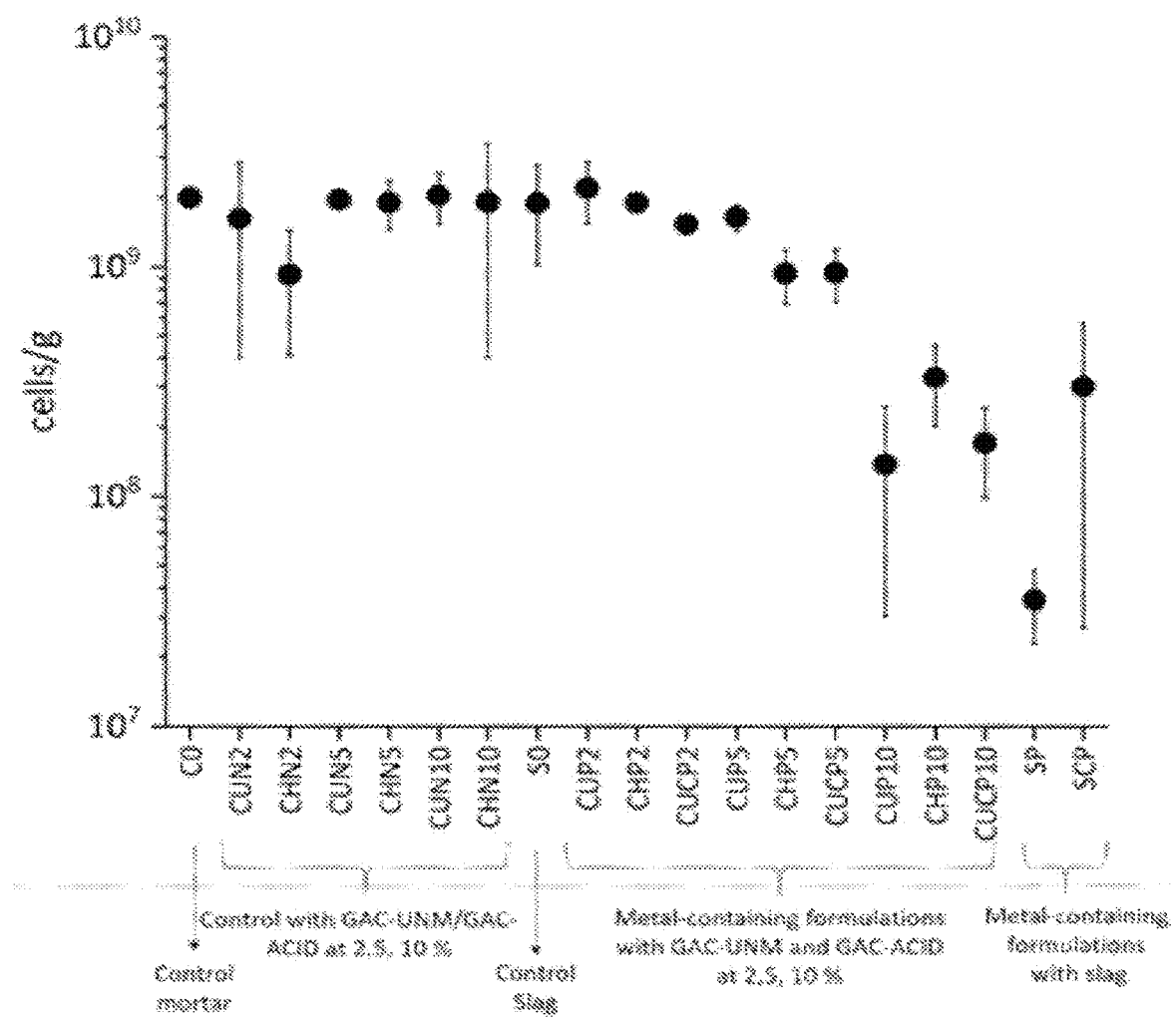
FIG. 25 is a graph showing mass normalized cell densities (cells/g) of different formulations after exposure to corrosive environments including cells recovered in corrosion products. Bars indicate the range of observations.
Figure 26:
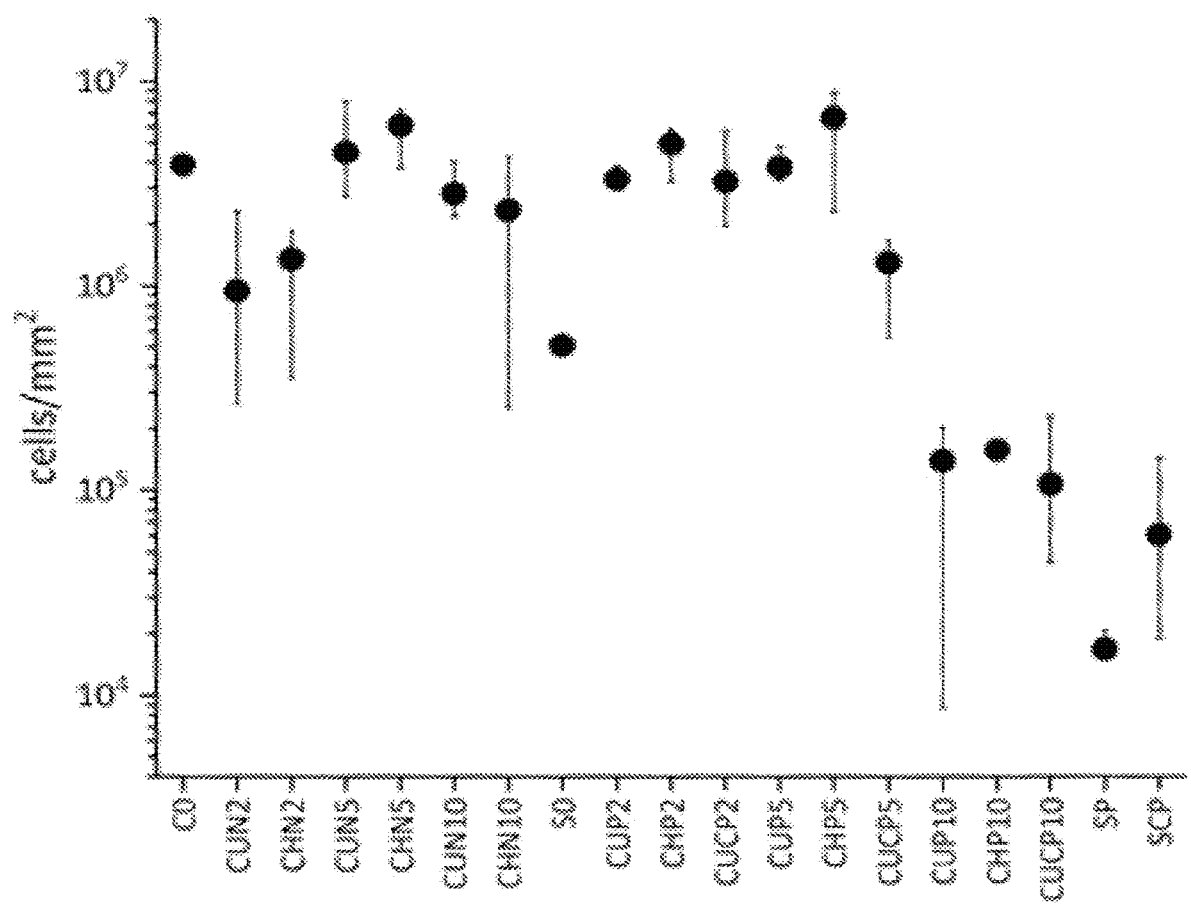
FIG. 26 is a graph showing surface normalized cell densities (cells/mm$^2$) of different formulations after exposure to corrosive environments including cells recovered in corrosion products. Bars indicate the range of observations.

Complimentary microbial analyses were used to evaluate the inhibitory potential of the mortar formulations against microbial growth, specifically *Acidithiobacillus* spp. growth. For that purpose, the mortar surfaces and corrosion products were analyzed for cell quantities, microbial activity, and abundance of universal and *Acidithiobacillus* spp. 16SrDNA copies. Direct cell counts were obtained through direct epifluorescence microscopy and normalized based by the amount of corrosion product and the original surface area of the coupons (FIG. 25 and FIG. 26). Surface cell densities decreased in response to increased substitution of fine aggregates with metal saturated sorbents, with the lowest values associated with CUP10, CHP10, CUCP10, SP, and SCP formulations. Cell abundance for these formulations ranged from $2.3 \times 10^7$ cells/g (SP) and $1.5 \times 10^5$ cells/mm$^2$ (SP), to $2.7 \times 10^8$ cells/g (SCP) and $2.3 \times 10^5$ cells/mm$^2$ (CUCP10). Formulations with fine aggregate substitutions less than 5% by mass lower metal content resulted in higher cell density values, ranging between $3.9 \times 10^8$ cells/g (CUN2) and $2.5 \times 10^5$ cells/mm$^2$ (CHN10) to $2.6 \times 10^9$ cells/g (CHN10) and $8.8 \times 10^5$ cells/mm$^2$ (CHP5).

Figure 27:
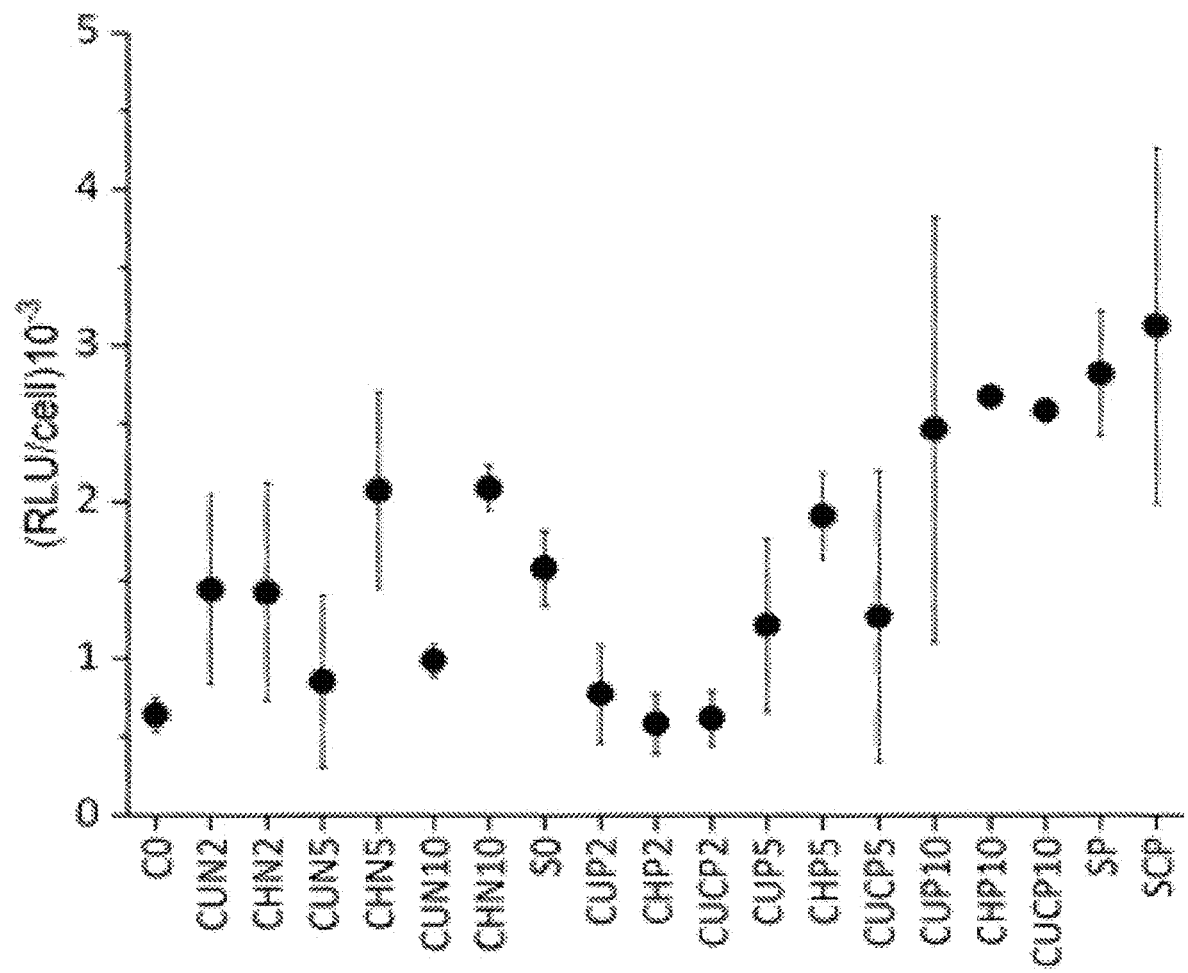
FIG. 27 is a graph showing specific microbial activity ((RLU/cell)×10$^{-3}$) of different formulations after exposure to corrosive environments including cells recovered in corrosion products. Bars indicate range of observations.
Figure 28:
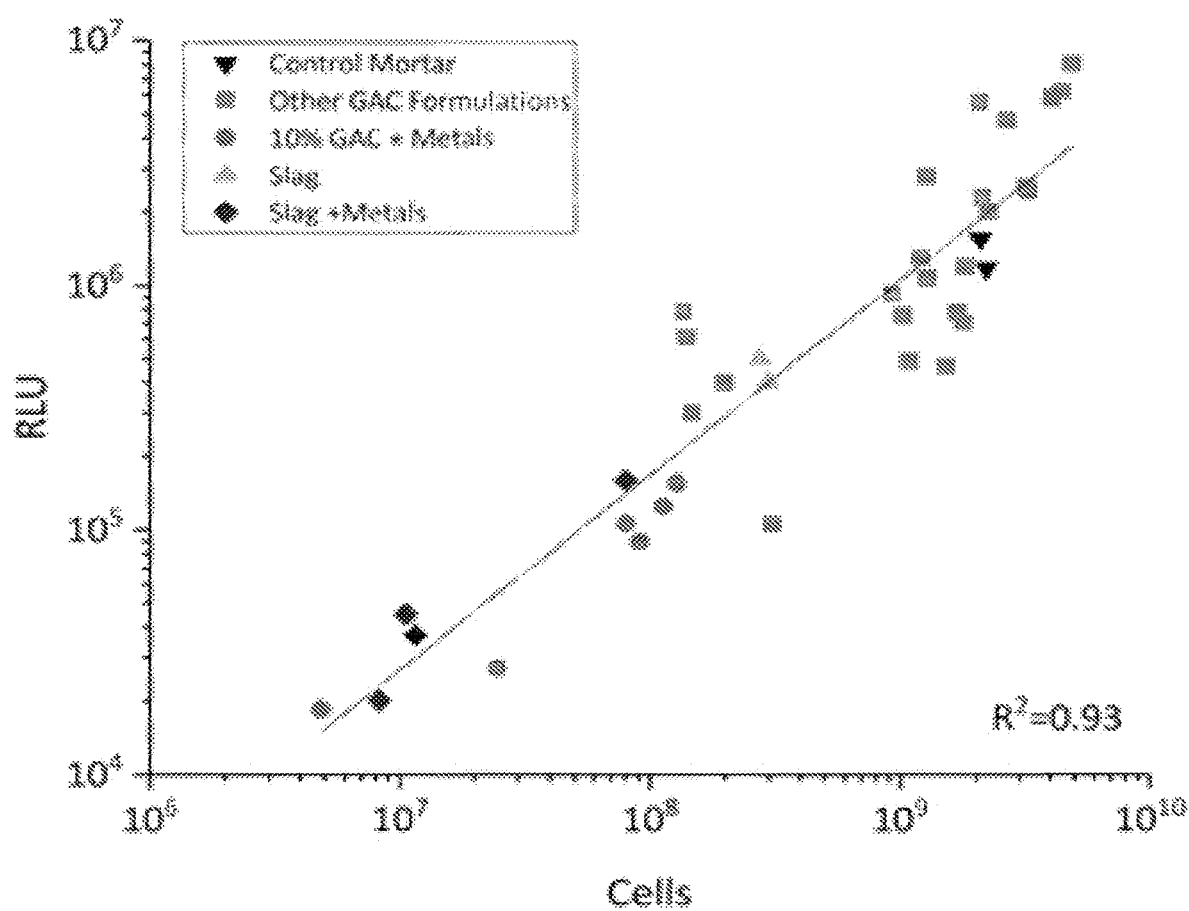
FIG. 28 is a graph showing regression of Luciferase emissions (expressed as RLU) against cell counts recovered from suspension for all the samples analyzed.

Calibrated luciferase emissions were used to assess ATP content as a surrogate for microbial activity. Swabs immersed into corrosion eluates provided RLU readings that were normalized to total cell numbers obtained from the same corrosion product suspensions (FIG. 27). In general, higher activity was observed for samples containing the highest metal loads (CUP10, CHP10, SP, and SCP). Normalized values for these samples ranged from 0.98 RLU/cells$\times 10^{-3}$ (CHP10) to 3.82 RLU/cells$\times 10^{-3}$ (CHP10). Formulations with lower metal content exhibited relatively lower specific RLU values; activity ranged between 0.39 RLU/cells$\times 10^{-3}$ (CHP2) and 2.7 RLU/cells$\times 10^{-3}$ (CHN5). A correlation emerged between the total cell densities (cells/mL) and the RLU emissions from the different corrosion product suspensions ($R^2=0.93$) (FIG. 28).

Figure 29:
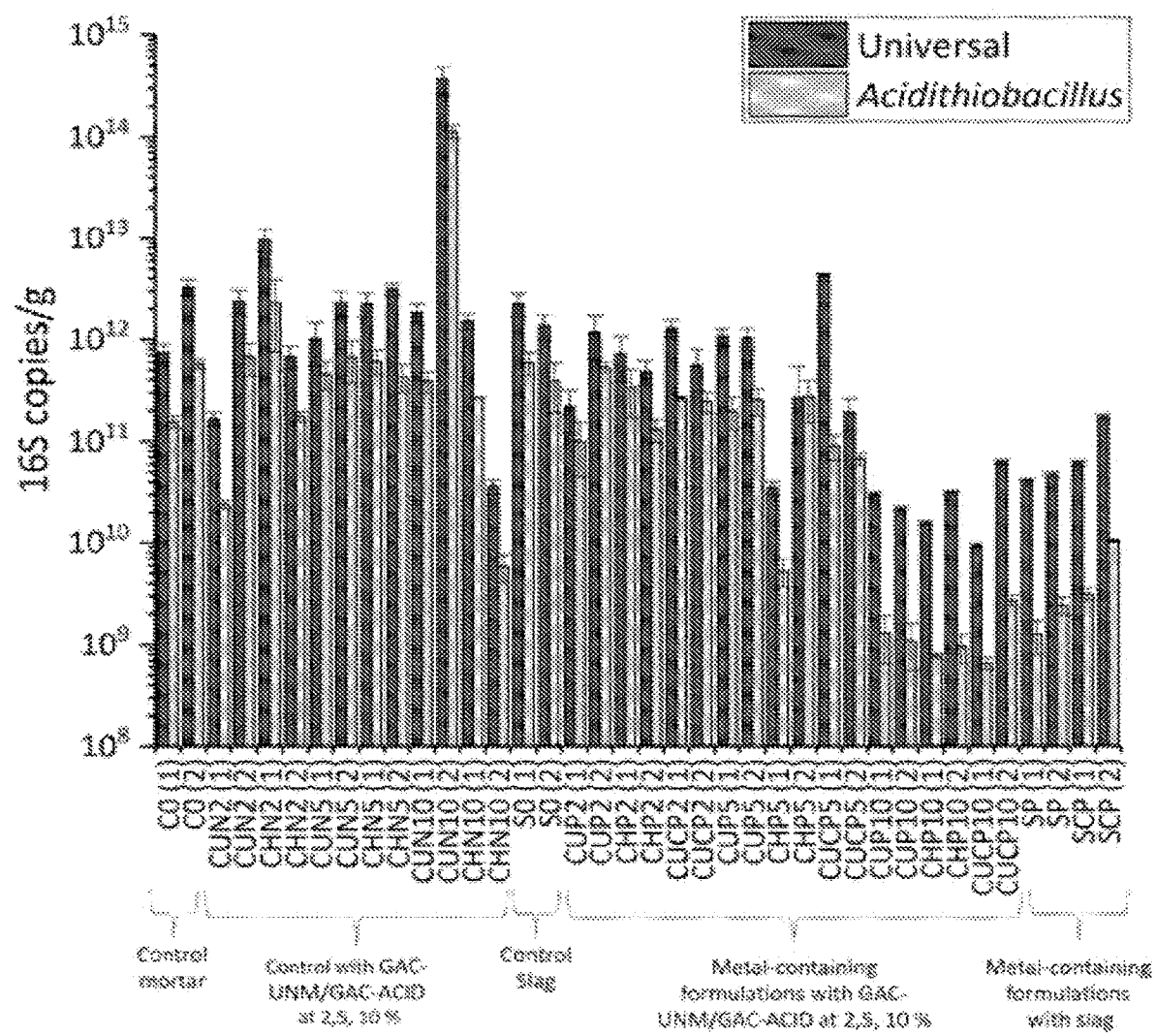
FIG. 29 is a graph showing 16S rRNA gene copies per gram of corrosion product for all analyzed samples. Numbers in parentheses indicate replicates for each formulation.

16S rRNA gene analysis was used to determine the relative abundance of bacteria on coupon surfaces and associated to corrosion products. 16S genes were quantified with qPCR using universal primers and *Acidithiobacillus*-specific primers. Gene copy numbers were normalized to the corrosion product mass recovered and surface area of the samples (FIG. 29 and FIG. 30). Analogous to cell quantification, gene copies circumscribed by universal primers were significantly lower in the formulations with the highest metal loads (CUP10, CHP10, CUCP10, CUCP10, SP, SCP). Universal amplicons corresponded to the following: $9.5 \times 10^9$ copies/g (CUCP10(1)) and $4.3 \times 10^6$ copies/mm$^2$ (CUCP10(1)) to $1.8 \times 10^9$ copies/g (SCP(2)) and $6 \times 10^7$ copies/mm$^2$ (CUCP10(2)), CUN2(1), CHN10(2) and CHP5(1) also ranged between these values (where gene copies were normalized on a mass basis only). Universal copy numbers for the rest of the samples ranged between $2.2 \times 10^{11}$ copies/g (CUP2(1)) and $1.1 \times 10^8$ copies/mm2 (CUN2(1)) to $3.7 \times 10^{14}$ copies/g (CUN10(2)) and $5.8 \times 10^{11}$ copies/mm$^2$ (CUN10(2)). *Acidithiobacillus* gene copy number exhibited similar trends to that of universal primers but resulted in lower values than the universal copies. Formulations with the highest aggregate substitutions (and metal content) ranged between $6.6 \times 10^8$ copies/g (CUCP10(1)) and $3 \times 10^5$ copies/mm$^2$ (CUCP10(1)) to $1.1 \times 10^{10}$ copies/g (SCP(2)) and $2.7 \times 10^6$ copies/mm$^2$ (SCP(2)). Exceptions that also ranged between these values (on a mass basis) included: CHN10(2) and CHP5(1). *Acidithiobacillus* copies for the rest of the samples ranged between $2.3 \times 10^{11}$ copies/g (CUN2(1)) and $1.6 \times 10^7$ copies/mm$^2$ (CUN2(1)) to $1.1 \times 10^{14}$ copies/g (CUN10(2)) and $1.8 \times 10^{11}$ copies/mm$^2$ (CUN10(2)). The relative abundance of *Acidithiobacillus* spp. is indicated in FIG. 31. Formulations with the highest aggregate substitution and metal content also had the lowest relative abundance of *Acidithiobacillus* 16S rRNA genes. Values ranged between 0.3% (CHP10(1)) and 3% (SP2). The rest of the samples displayed higher relative abundances, ranging between 13.8% (CHN5(2)) to 103.4% (CHP5(2)).

From a durability perspective, the mortar formulations were designed to find the sorbent substitution threshold which limits the development of acidophilic bacteria. After 11 months of field exposure, mortar specimens with the highest metal-laden sorbent dosages (CUP10, CHP10, SP, and SCP) experienced the lowest absolute cell abundance, microbial activity, and *Acidithiobacillus* relative abundance. The association of microbial cells were evaluated on a corrosion mass and surface area basis. Cell abundance, activity and *Acidithiobacillus* associations exhibited a significant response to the different mortar formulations. For samples exhibiting lower mass losses (<1.5 wt %) it may be more appropriate the use of surface-normalized cell abundance, as cells would be mostly found attached to the undamaged mortar's surface. Alternatively, the microbial association with specimens experiencing significant corrosion (>1.5 wt %) may be better represented on a mass normalized basis, as cells would be found at the surface and in the soft corrosion material.

Acidophile activity has traditionally been measured through changes in different metabolites (e.g. pH, sulfate, iron (III), enzymes). While less common, the specific use of rapid microbial activity detection systems has also been explored, suggesting good applicability for describing biogenic corrosion environments. These systems are preferred when easy and fast detection of microbial activity is desired. The relationship between *Acidithiobacillus* growth phases and cell density with specific activity, measured as Relative Light Units (RLU), was investigated in laboratory cultures. The changes observed in activity correlated with cell densities and culture pH, and was useful for identifying lag, exponential, stationary, and (possibly) senescing phases. Logarithmic increases in activity were observed after a short lag phase, peaking in the stationary phase (18 days after inoculation), and significantly decreasing thereafter. The decrease in activity might be attributed to nutrient depletion and metabolite-induced inhibition (product toxicity). Additionally, a linear trend between RLU and cell dilutions was observed for a stationary-phase aliquot, validating the RLU observations as a surrogate for cell quantification when *Acidithiobacillus* dominates the microbial communities.

This luminometric detection system was used to evaluate the microbial activity associated with corrosion products after 11 months of sewer. Results indicate no clear trends in microbial activity where metal-laden sorbents replaced up to 5% of the fine sand aggregates, despite presence of metals.

However, mass substitutions at 10% with metal-laden sorbents (CUP10, CHP10, CUCP10, SP, and SCP) impacted microbial activity as judged by absolute RLU values. These formulations also exhibited the highest cell-normalized RLU values among all mortar formulations. Absolute RLU values correlated well with the formulations exhibiting the least corrosion response, where microbial assemblages were not dominated by *Acidithiobacillus*. Finally, as observed for *Acidithiobacillus* liquid cultures, a linear relationship could be established between the observed cells in the corrosion products and associated microbial activity (RLU), confirming the possibility to use microbial activity as a surrogate for cell abundance from corrosion extracts.

A critical aspect in the determination of corrosion resistant formulations is confirming inhibitory effects against *Acidithiobacillus* spp. For this purpose, universal and *Acidithiobacillus*-specific quantification of 16SrRNA genes was used. These observations were normalized based on the total mass of corrosion product and the surface area of the coupons. Results suggest a clear relationship between 16SrRNA genes and overall cell abundance. Samples with higher metal content (CUP10, CHP10, CUCP10, SP, and SCP) also had the lowest recovery of universal and *Acidithiobacillus*-specific 16S rRNA gene copies, with few exceptions. Samples CUN2(1), CHN10(2), and CHP5(1) recovered amplicon pools within the range of the higher metal doses. However, these samples presented relative abundances of *Acidithiobacillus* spp. within the observed range of lower metal doses. In this scenario, formulations with enhanced inhibition also carried the lowest absolute *Acidithiobacillus* 16S copies and the lowest relative abundance where normalized to universal 16SrRNA gene copies. Approximately 50% of total DAPI-stained cells from corroded surfaces after 1 year (pH≈2) were other than SOB, notably including acid-tolerant heterotrophs.

Chemical Analysis

Investigations of sentinel chemical transformations that occurred in the cement material after exposure to the corrosive environments were done through three complimentary approaches: i) analysis of sulfur and calcium abundance in the corrosion products, ii) sequential cation extraction on unexposed and corrosion-exposed formulation, and iii) electron microprobe mapping of cement surfaces challenged by corrosive sewer environments.

Abundance of sulfur, and its correlation with free calcium content in corrosion products was used as an indicator for sulfur-oxidizing metabolism and corrosion extent. The mass-normalized values for total sulfur and sulfur-to-calcium ratios are shown in FIG. 32 and FIG. 33. Following the trends observed in the microbial analyses, the specimens with the highest fine aggregate substitution (and metal content) (CUP10, CHP10, CUCP10, SP, and SCP) consistently exhibited the lowest sulfur values per gram of corrosion product, ranging between 0.14 mg S/g (SP) and 3.5 mg S/g (CUP10).

Replicates for other formulations exhibited values within this range although with the exception of formulation CHN10. The rest of the formulations displayed higher and more variable sulfur loads, ranging between 0.8 mg S/g (CHN10) and 12.8 mg S/g (CUCP2).

Sulfur-to-Calcium ratios followed a profile similar to that observed for total sulfur content. Formulations with the highest aggregates substitutions (and highest metal loads) also presented the lowest S:Ca ratios, along with the formulation containing unadulterated slag (S0), with values ranging between 0.11 to 0.55. The rest of the formulations ranged between 0.33 (S0) and 1.67 (CHN5).

To assess the potential mobility of inhibitory metals after field exposure, a series of sequential extractions were performed on the samples. The modified Tessier method was applied partition aggregate-immobilized metals into the following five operationally defined categories:

Fraction 1 (F1)—Exchangeable. Changes in ionic strength drives metal sorption-desorption processes.

Fraction 2 (F2)—Bound to carbonates. Fraction susceptible to pH changes.

Fraction 3 (F3)—Bound to iron and manganese oxides. Fraction unstable under anoxic conditions.

Fraction 4 (F4)—Bound to sulfides and organic matter. Fraction susceptible to oxidizing conditions.

Fraction 5 (F5)—Residual. Fractions in which the metals may be found immobilized within the crystal structure of minerals.

Unexposed mortar cylinders, kept in ambient conditions for the length of the experiment (11 months), were pulverized and subjected to extraction. Mortar cylinders recovered from the sewer were cut longitudinally at the diameter, and transversally 3 mm from the most exposed face. The resulting mortar disk samples were pulverized and subjected to extraction. Formulations at 5% and 10% sand replaced with metal-laden GAC, and metal-laden slag formulations, were used to evaluate metal mobility. Cement containing no antimicrobial aggregate and containing metal-free BOF-S (C0 and S0) were used as controls with no metals. Calcium was also analyzed and used as an indicator of corrosion extent. In general, calcium fractioning followed the series F2>F1>F3>F4>F5, with a slight difference in F1 and F2. Copper partitioning followed the series F2>F4≈F3>F1≈F5, with slight differences in F3 and F4.

Finally, cobalt partitioning followed the series F2>F3>F1>F4≈F5. Calcium within C0 displayed a decrease in F1 from 47.4% to 41.8%, and increase in F2 from 49.7% to 56.4%, after exposure to corrosive environments. Calcium in F3 experienced a decrease from 2.7% to 1.7%. S0 experienced minor changes in F1 from 30.7% to 30.4%, a slight increase in F2 from 58.6% to 61.3%, and a slight decrease in F3 10.4% to 8.2%. All 5%-GAC replacement samples (CUP5, CHP5, and CUCP5) shared the same calcium and copper partitioning trends. After exposure, calcium decreased in F1 11.9%, 17.7% and 12.1%, and increased in F2 12.1%, 18.1% and 12.1%. Copper increased in F2 6.5%, 3.4% and 4.8%, and decreased in F4 6.6%, 3.5% and 4.8%. After exposure, cobalt in CUCP5 experienced minor changes before and after exposure. All 10%-GAC replacement formulations (CUP10, CHP10, and CUCP10) shared metal partitioning profiles. After exposure, calcium decreased in F1 11.6%, 16.3% and 8.1%, respectively, and increased in F2 12.1%, 16.3%, and 8.5%, respectively. Copper decreased in F2 0%, 3.9% and 5.4%, and F3 4.5%, 10.6% and 3.7%, and increased in F4 4.5%, 14.6% and 9.5%, respectively. Cobalt partitioning did not change in response to sewer exposure in CUCP10. Finally, both metal-laden slag formulations (SP and SCP) also presented similar metal partitioning behavior.

After exposure, calcium decreased in F1 11.3% and 6.5%, and increased in F2 11.1% and 4.9%, respectively. Copper increased in F2 0% and 8.2%, and F4 3.5% and 0%, while it decreased in F3 3.9% and 8.4%, respectively. Cobalt in SCP increased in F2 4.6% while decreased in F3 4.5%.

The corrosion fronts of the different formulations were characterized by electron micro probe analysis (EMPA). Longitudinal cross sections of different mortar cylinders were immersed in epoxy, polished, and coated with silver prior to analysis. The most corroded regions in the polished sections were chosen for elemental mapping. The analytical depth for each mapping included the corroded area, corrosion front, and uncorroded matrix. Selected formulations included: C0, S0, CUCP10, SCP, and CUCP5. Specific net intensity counts were obtained for: Si, Ca, Al, Fe, Mg, S, Cu, and Co (FIGS. 37A-37E and FIGS. 38A-38E). All samples presented silicon-rich nodules associated with sand grains. C0 and CUCP presented two distinct silicon regions within the mortar matrix, the regions near the sample's surface having less silicon net intensity counts, on average. Similarly, calcium in these two formulations presented the two regions. An additional calcium-rich band that separated these was observed. This front was also present at the surface of S0. CUCP10 and SCP showed little changes in calcium net intensity counts. Calcium-rich granules were observed within the matrix for S0 and SCP at different depths. Aluminum displayed a defined front in C0, CUCP10, and CUCP5. Absence of aluminum was observed passed the front and closer to the surface of the samples. S0 presented superficial dealumination near the surface. No significant trends were observed in the matrix of SCP. S0 and SCP presented aluminum-rich areas across the mapped region. Iron and magnesium presented similar trends as for aluminum. Iron- and magnesium-rich granules were also identified across S0 and SCP. Mappings of sulfur revealed a general negative correlation between this element and all the previously described. Sulfur in C0, CUCP10, and CUCP5 exhibited similar trends with different degrees of S intrusion into the matrix. Sulfur net intensity counts appeared to increase with depth, reaching the maximum at the corrosion front. Little sulfur was observed passed this front and at further depths. S0 presented a sulfur-rich superficial front, similar to the profile exhibited by calcium. SCP presented little sulfur across the mapped area. In general, net intensity counts for Cu and Co in the metal-containing formulations followed the series SCP>CUCP10>CUCP5. Cu and Co in SCP accumulated around specific granules and appeared to slightly diffuse into the cement matrix. Cu and Co in CUCP10 also appeared to accumulate around specific granules albeit by lesser net intensity counts. Absence of Cu and Co was observed passed the corrosion front and near the surface. Few net intensity counts for Cu in CUCP5 were observed across the mapped area. Richer areas appeared to concentrated around one grain (at the bottom of the image) and forming a thin line at the corrosion front. No significant Co was observed in this sample.

Once biogenic acids begin to degrade cement, soluble calcium is liberated into the corrosion product; the free calcium yield increases as corrosion progresses. Thus, the mass ratios of sulfur and calcium (S:Ca) in the corrosion products can be an indicator how much sulfur has been oxidized per unit mass of cement corroded. After 11 months of sewer exposure, formulations up to 5% GAC replacement (including relevant controls) carried mass normalized free sulfur content between 0.76 mgS/g (CHN10) and 12.76 mgS/g (CUCP2), with notable variability. Where ≥10% of the fine aggregate was replaced with metal-bearing sorbents (CUP10, CHP10, CUCP10, SP, and SCP) free sulfur was significantly lower, ranging from 0.14 mgS/g (SP) to 2.50 mgS/g (SCP). With respect to fine aggregate substitutions ≤5% and 10% without metal-bearing sorbents, free sulfur was markedly less variable. When free sulfur was normalized by free calcium, ratios followed a similar trend. Formulations up to 5% fine aggregate (GAC) replacement ranged between 0.33 (S0) and 1.67 (CHNS) S:Ca. The mortars with 10% substitution (with metals) exhibited S:Ca ratios between 0.10 (SP) and 0.42 (CHP10). An exception included the mortar controls with slag (S0), which resulted in a relatively low Ca: S ratio, resembling the latter (higher-metal loading) formulations. Free S and Ca levels correlated well with corrosion extent observations and microbial analysis, which is consistent with a cementitious material that has enhanced resistance to biogenic corrosion after nearly a year of field exposure. The temporal changes in total sulfur content and S:Ca ratios of newly installed concrete in highly corrosive sewer environments has been assessed. After one year of exposure, the samples exhibited between 2.5 mgS/g and 4 mgS/g, and S:Ca ratios between 1.78 and 3.16. As a reference, the control mortar with no aggregate substitution (C0) contained nearly 4 mgS/g.

The mobility of calcium, copper and cobalt in the mortar mixes, before and after exposure to corrosive environments, was assessed through classic sequential cation extraction. A modified Tessier approach was used for this purpose. As judged by the Tessier approach, small variations in cation inventories were observed before and after exposure. Without wishing to be bound by theory, it is possible that corrosion of the samples occurred superficially and did not penetrate further into the cement matrix, therefore leaving a significant portion of the sample unaffected by headspace gases and biogenic acid. Even though the differences were small, consistent results were observed between the different formulations. After curing, more than 80% of the total calcium was extracted within the first three Tessier fractions. This may be due to dissolution of calcium hydroxide, amorphous calcium silicate hydrate, and metal complexed calcium.

However, the distribution of other cations differed markedly between formulations containing GAC (control mortar included) and BOF-S. Calcium in GAC formulations was equally observed in the "exchangeable" and the "carbonate/sorption" fractions, with a residual fraction associated to "iron and manganese oxides". On the other hand, slag cation eluates were mostly associated with "carbonate/sorption" fraction followed by the "exchangeable" fraction and where residual Calcium was associated to "iron and manganese oxides". This is likely an effect of the calcium present in the BOF-S grains, that are strongly associated to minerals and may not be easily solubilized by the Tessier reagents.

Copper in all formulations was observed mostly associated "carbonate/sorption" fraction. Considering the highly alkaline nature of cement, most of the Cu may exist in hydrated metal phases, metal hydroxides and calcium complexes compounds near (nm-scale) or at the sorbent grains. As judged by Tessier fractions, small differences between GAC and BOF-S formulations were observed. In GAC formulations, copper association was higher with "iron and manganese oxides" than with "sulfide" fractions. On the contrary, Cu was found equally in these fractions for BOF-S formulations, indicating stronger metal association between the metal and the mortar phases. Cobalt distribution presented similarities between sorbent types: Most Co was associated with "carbonate/sorption" fraction, with minor association with "iron and manganese oxides". This suggests cobalt incorporation into the mortar is less dependent on the sorbent.

After exposure, the control mortar and all GAC formulations experienced a decrease in Calcium in the "exchangeable" Tessier fraction and, experienced similar increases in the "carbonate/sorption", with a minor decrease in the association with "iron and manganese oxide" fraction. Without wishing to be bound by theory, these changes are likely explained by the increased exposure to $CO_2$, and consequent accelerated carbonation of the calcium found at the sample surfaces. A decrease in calcium mobilization was observed from highest to lowest in the following series of formulations: CHP5>CHP10>CUCP5=CUP5>CUCP10>C0. However, no trends were observed between the amount of calcium mobilized and the degree of corrosion (C0 and 5% GAC vs 10% GAC) or sorbent type used (GAC-ACID vs GAC). The BOF-S formulations also experience a decrease in calcium in the "exchangeable" and the "iron and manganese" fractions, and an equivalent increase in the "carbonate/sorption" fraction. Carbonation also accounted for the major increase in the "carbonate" fraction. A decrease in calcium mobilization was observed following the series: SP>SCP>S0. Interestingly, Calcium in the slag control without metals (S0) was mostly mobilized from the "iron and manganese" fraction. This may be a result of the carbonation of calcium phases bound to iron and manganese present in the BOF-S grains near the mortar interface.

SP and SCP mortars may not experience the same degradation behavior as their GAC-containing counterparts because of the way the Cu and Co are held by slag grains, creating a passivation barrier and preventing calcium from react with local dissolved carbonates. Copper mobilized different between formulations that were significantly (5% GAC) and mildly (10% GAC) affected by corrosion. CUP5, CHP5, and CUCP5 experienced similar increases in the "carbonate/specifically adsorbed" fraction and equivalent decrease in the "iron and manganese oxides" fraction. The mobilization of aggregate bound Cu to more easily extractable fractions, may be a result of the increased corrosion rates observed in these samples and enhanced acid production, leading to increased Cu solubilization.

In contrast, CUP10, CHP10, and CUCP10 experienced a decrease in copper from the "carbonate/specifically adsorbed" and "iron and manganese oxide" fractions, with an equivalent increase in the "sulfide" fraction. These observations, along with the improved performance of these formulations under corrosive environments, suggests that the mobilized Cu was associated to hydrogen sulfide dissolved near the solid phase boundary, and further immobilized as insoluble CuS. Decreased Cu mobilization followed the series: CHP10>CUCP10>CUP10. This behavior resembles that of the 10% GAC formulations exposed to the Acid Neutralization Capacity assay, indicating increased Cu mobilities when sorbed to acid-modified GAC (GAC-Acid), and to a lesser extent, when Cu and Co are concomitantly loaded on unmodified GAC (GAC). Both SP and SCP mortars experienced a decrease in copper in "iron and manganese oxide" fraction, while SP exhibited an equivalent increase in "sulfide" fraction, and SCP exhibited an equivalent increase in the "carbonate/sorption" fraction. These results agreed with the ANC assay, which resulted in higher mobility for Cu in SCP than SP formulations. SCP (slag with Cu and Co) exhibited similar Cu-mobility trends than significantly more corroded samples (5% GAC), yet this formulation experienced insignificant corrosion.

As judged by elemental mappings, relatively little sulfur was deposited at the surface of SCP mortar specimens and therefore what little metal mobilization occurred was associated to carbonated species from the sewer gas ($CO_2$). Mobility of Cu (and Co) within SCP formulations indicates most metal sorption is associated to iron oxide grains where any subsequent dissolution and metal mobilization likely occurs after carbonation (extended $CO_2$ exposure). For both types of sorbents used (GAC and BOF-S), there are indications of increased Cu mobility when concomitantly loaded with Co. Finally, Cobalt in both CUCP5 and CUCP10 presented minimal variations before and after extended exposure to a corrosive atmosphere. This suggests little effect of corrosion on the fate of Cobalt. However, SCP exhibited an increase in Cobalt in the "carbonate/sorption" fraction and an equivalent decrease in the "iron and manganese oxide" fraction. As mentioned previously, this may suggest specific metal sorption into iron oxide-rich phases present in the BOF-S.

Elemental mobility within formulations after extended exposure to a corrosive atmosphere was assessed through Electron Microprobe Analysis (EMPA). Areas selected for imaging included corrosion-affected and unaffected regions on a cross-sectional plane from the corrosion exposed surfaces. Sulfur intrusion was used as surrogate to estimate corrosion extent, with formulations succumbing to sulfur penetration in the following order: CUCP5>C0>CUCP10>S0>SCP. In most cases, corrosion fronts were well defined, distinguishing corroded and uncorroded areas.

Using EMPA, corroded areas were characterized by lower calcium and silica x-ray intensities, as well as increased interstitial space between aggregates and the cement matrix. This may be a consequence of C—S—H gel dissolution and calcium hydroxide phases by sulfuric acid, and the formation of expansive gypsum. Silica-rich areas were associated with sand grains. Silica grains have no reactive potential with sewer gases or biogenic acids. Here, the x-ray intensities of silica grains were a result of poorly polished samples, indicating preferential orientations that resulted in biased intensity variations within—and between grains. This effect was not observed in the cement, indicating a more homogeneous polishing preparation. GAC grains appeared as black areas in the EMPA maps that differed from air voids by the low presence of other elements (e.g. calcium), and clear indication of Cu and Co sorbed to grain edges. BOF-S grains appeared more heterogeneous in nature, presenting different combinations of Ca-, Si-, Al-, Fe-, and Mg-rich phases, corresponding to what is typically found in steel slags, and distinctly different from the sand grains and the cement matrix.

In general, uncorroded cement presented a homogeneous distribution of Ca, Si, Al, Fe, Mg, and S. Low intensities of sulfur in these areas corresponded to the original Portland cement mix, which included small amounts of gypsum necessary for the controlled hardening rates of hydrated cement. As judged by EMPA, the corroded areas presented similar spatial spectra among corroded, with the major defining feature being the extent of sulfur intrusion (C0, CUCP5, CUCP10).

Corroded areas exhibited obvious decalcification, and desilication due to acid exposure. Additionally, depletion of aluminum, iron, and magnesium was noted in the corroded areas. Different electron microprobe studies of corroded concrete report this profile of mobile, where Fe-, Al-, and Mg-rich bands migrate to corrosion fronts. Mg-rich bands have been observed closer to uncorroded matrices; their formation attributed to Mg mobilization from the deeper uncorroded areas and subsequent precipitation with hydroxides $Mg(OH)_2$ at pH>9. Al-rich phases have also been identified, and attributed to the relatively low solubility of Al(OH)3 between pH 9 and pH 4.

The most metal-rich outer bands have been associated with Fe, which are linked to precipitation of iron oxyhydroxides between pH 4 and pH 3. These outermost bands may play a key role in the microbial activity of *Acidithiobacillus ferrooxidans* and the mobilization of iron. Under anaerobic conditions, present at corrosion depths where oxygen cannot penetrate, *A. ferrooxidans* can reduce $Fe^{2+}$ to a mobile $Fe^{2+}$ species.

Formulations with significant sulfur intrusion experienced faint and thin Fe-, Al-, and Mg-rich bands located at the corrosion fronts. The presence and size of these bands indicated accelerated corrosion rates, limiting accumulation of Mg, Al, and Fe. Significantly corroded samples (C0 and CUCP5) exhibited increased sulfur gradients with depth, reaching maximum x-ray intensities at the respective corrosion fronts. This suggests accumulation of sulfate with deposited elements, predominantly with calcium as $CaSO_4$, as supported by the presence of an enriched calcium band at the corrosion front. CUCP10 exhibited moderate sulfur intrusion with shallower depth gradients than its corroded counterparts. This formulation experienced minimal corrosion, as indicated by mass loss and microbiological assays; the degree of sulfur intrusion indicates only superficial corrosion which progressed at markedly slower rates than the control formulation (C0) or lesser dosed counterparts (CUCP5). Sulfur intrusion may have been a result of the increased porosity of formulations containing 10% GAC, as observed by different studies on ion diffusion in mortars with high water-to-cement ratios and increased pore sizes exposed.

The formulation containing only raw BOF-S (S0) experienced a thin sulfur-rich band at its surface, with minimal evidence of sulfur penetration into the mortar matrix. This sample also exhibited an enriched calcium band overlapping the sulfur band, also suggesting only superficial formation of $CaSO_4$. As observed by physical analysis, the slag control formulation without metals (S0) exhibited limited corrosion damage, which correlates with the surface accumulation of sulfur and its limited intrusion.

Sulfur was observed at very low intensities in SCP and no corrosion front was observed. Calcium was homogeneous across the cement matrix with higher intensities at the surface exposed to sewer gases. Silica, aluminum, iron, and magnesium were homogeneous across the cement matrix and no evidence for dissolution was observed. Exceptions to the element homogeneities accounted for sand, and BOF-S grains. Together with physical and microbial assays of SCP, the observations suggest that this mortar formulation was not significantly affected by the corrosive atmosphere. Slight accumulation of calcium at the surface exposed to sewer gases may be a result of a combination of carbonation and sulfide precipitation. BOF-S particles were inert when mixed and cured with OPC, and no changes in slag particles were observed when exposed to sewer gas (see S0).

As judged by EMPA, copper and cobalt x-ray intensities differed in the mortar formulations tested. CUCP5, a significantly corroded sample, exhibited low intensities of Cu in both the uncorroded and the corroded areas. A faint Cu band was observed at the corrosion front, indicating possible accumulation of Cu as $CuSO_4$. The highest Cu intensities were observed in the uncorroded area (bottom of the CUCP5 Cu map) surrounding unmodified GAC grains. Cobalt x-ray intensities were below detection limit and could not be identified surrounding co-loaded GAC grains. Formulation CUCP10 resulted in Cu and Co undetected in the corroded area and could only be detected on GAC grains. This suggests some increase in metal mobility near corroded areas, with a majority of metal associated with GAC grains in the uncorroded mortar. Finally, SCP exhibited the highest Cu and Co x-ray intensities of any mortar formulations. These metals were associated with the BOF-S grain surfaces, with little evidence for diffusion into the cement matrix. When impregnated with metals near their saturation thresholds, BOF-S grains exhibited higher Cu intensities than their GAC counterparts; a sentinel BOF-S grain accounted for the highest Cu and Co observed x-ray intensities.

EMPA analysis identified Fe and Mg with BOF grains, providing optical evidence for a metal-oxide sorption mechanism that retain copper and cobalt on some of the heterogeneous slag aggregates. EMPA evidence for slag-transition metal sorption has been previously reported. Copper and cobalt were also observed in/on grains exhibiting high calcium x-ray intensities. In these cases, metal precipitation around grains was likely responsible for this process. Metal-silicate interactions were also suggested by EMPA mapping of metal (Cu) association with homogeneous silica phases. EMPA mapping suggest metal immobilization in slag and GAC doped cements is a combination of adsorption on metal oxide surfaces and superficial precipitation. The improved antimicrobial performance of metal-BOF-S formulations may be a result of the increased specific metal loading offered by slag, creating a localized high metal concentration driving a stronger net inhibitory effect.

Example 6

Electrical Properties of Cement Compositions

Zeta Potential

Mortar formulations were prepared by substituting 10% of the fine aggregate with GAC and/or by using the PCE-Admixture. Next, 0.25-0.3 g of the mortar paste were taken and placed in vessel with 100 mL of DI water. The solutions were continuously stirred as aliquots were taken at different intervals. Next, these extracts were centrifuged for 2 min at 10,000 rpm. The supernatants were analyzed with Zeta Potential Analyzer ZETA PLUS (Brookhaven Instruments Corporation, New York, USA). Zeta-Phase Analysis Light Scattering method (PALS) software was used to compile the data.

Zeta potential was used as a proxy to judge dispersive behavior of mortar formulations, and the zeta potential for different mortar formulations are provided herein (FIG. 39). All formulations experienced an increase in zeta potential during for the duration of the experiment (120 min). The control formulation presented the highest and fastest gain, transition from −7.05 mV to 10.73 mV in 120 min. A similar behavior was observed for the formulation containing the PCE-admixture, showing a continuous increase during the same time lapse and transitioning from −7.05 mV to 5.68 mV.

The formulations containing GAC experienced an initial zeta potential decrease, followed by a lag. Initial zeta potential of carbon-containing formulations was higher than those not containing these particles. Both GAC and GAC-Acid formulations experienced the smallest potential gains, transitioning from −1.23 mV and −2.13 mV to 4.59 mV and 0.78 mV, respectively. The zeta potential in DI water for the particles decreased in the following order: GAC (−3.60 mV)>GAC-Acid (−8.98 mV)>PCE (−35.96 mV).

Example 7

Mechanical Properties of Cement Compositions

Materials

Materials used in this study were: bulk cement manufactured by HolcimLafarge (OPC Type I/II), Fly Ash type F, BASF Pozoolith 322 (water-reducer chemical admixture), and fine/coarse aggregates provided by Forterra, Inc. Commercial cement (OPC Type I/II) manufactured by Quikrete (USA) that complies with ASTM C150-18; graded standard sand (Ottawa sand) manufactured by U.S. Silica Company (USA); granular activated carbon (GAC) commercially sold as OL 20×50 and supplied by Calgon Corp. (USA) and a basic oxygen furnace steel slag (BOF-S) 20×50 US mesh size supplied by the Indiana Harbor East Steel Mill complex (USA). GAC was loaded with two different metal formulations (copper or copper/cobalt) while the BOF-S was loaded only with copper; both materials loaded to their maximum sorption capacity using $Cu(NO_3)_2$ and $Co(NO_3)_2$ solutions. Sorbed metal contents were determined using an ARL 3410+inductively coupled optical emission spectrometer (ICP) and results are shown normalized by aggregate mass elsewhere herein (Table 5).

Concrete Formulations (for Evaluation of GAC or BOF-S Compositions)

Formulations are abbreviated as follows: the formulation is labeled first by the type of aggregate (e.g. GAC or steel slag (SS)), followed by the metal sorbed (e.g. Cu, Cu/Co, or Ø (for no metal)), and the percentage of fine aggregate mass substituted (e.g. 1%, 2%, 3%, 5%, 10%, 20%, and 40%). Thus, GAC-Cu-1% indicates that the formulated comprises GAC fine aggregate sorbed with Cu, wherein 1% of the total mass of fine aggregate comprises the Cu-sorbed GAC (i.e. the fine aggregate comprises 99% Ottawa sand by weight). Formulations containing no GAC or BOF-S particles were labeled only using the word "control." All mortar formulations were standardized to a sand-to-cement (s/c) ratio of 2.1.

Water, internally sorbed by GAC or BOF-S (i.e. sorption of 75% and 3% for GAC and BOF-S, respectively), is not considered in the water to cement (w/c) ratio of the mix design. For particles saturated with water prior to incorporation into the cement mortar formulations, the reservoir is not included in the initial mixing or the formulation w/c ratio. Certain embodiments of the present disclosure have been provided in Table 10.

TABLE 10

Water apportionments for exemplary GAC or BOF-S mortar formulations.

| Formulation | (w/c) add | (w/c) total | (w/c) effective | Metal |
|---|---|---|---|---|
| control | 0.00 | 0.45 | 0.45 | 0 |
| GAC-0-1% | 0.02 | 0.47 | 0.45 | 0 |
| GAC-0-2% | 0.03 | 0.48 | 0.45 | 0 |
| GAC-0-3% | 0.05 | 0.50 | 0.45 | 0 |
| GAC-0-5% | 0.08 | 0.53 | 0.45 | 0 |
| GAC-0-10% | 0.16 | 0.61 | 0.45 | 0 |
| GAC-Cu-1% | 0.02 | 0.47 | 0.45 | Cu |
| GAC-Cu/Co-1% | 0.02 | 0.47 | 0.45 | Cu/Co |
| GAC-Cu-10% | 0.16 | 0.61 | 0.45 | Cu |
| GAC-Cu/Co-10% | 0.16 | 0.61 | 0.45 | Cu/Co |
| SS-0-5% | 0.00 | 0.45 | 0.45 | 0 |
| SS-0-20% | 0.01 | 0.46 | 0.45 | 0 |
| SS-0-40% | 0.02 | 0.47 | 0.45 | 0 |
| SS-Cu-5% | 0.00 | 0.45 | 0.45 | Cu |
| SS-Cu-20% | 0.01 | 0.46 | 0.45 | Cu |
| SS-Cu-40% | 0.02 | 0.47 | 0.45 | Cu |

Concrete Formulations (for Evaluation of GAC and BOF-S Compositions)

Three sets of concrete cylinder samples were prepared and used to investigate the response of concrete formulations containing chemical admixtures to fine aggregate replacements, comprising:

(i) concrete designs with no replacements (reference formulations);

(ii) 50% copper-laden BOF-S and 1% GAC; and (iii) 50% copper-laden BOF-S with no GAC substitution.

The formulation compositions of the present disclosure have been provided in part in Table 11 and Table 12. Formulations following the original concrete designs will be respectively referred to hereinafter with the prefix "O". The original formulations, where the fine aggregates had been replaced with 50% BOF-S and 1% GAC (w/w), will be referred to hereinafter with the prefix "CUB". Lastly, the original formulations wherein fine aggregate is replaced only with 50% of BOF-S particles (with no GAC additions), will be referred to hereinafter with the suffix "ØGAC."

TABLE 11

Compositions of Concrete Formulations with Steel slag (BOF-S) and/or GAC.

| Formulation | Cement (kg/m³) | Fly Ash (Type F) (kg/m³) | Fine Aggregate ($A^a$) (kg/m³) | Fine Aggregate ($B^b$) (kg/m³) | Coarse Aggregate ($C^c$) (kg/m³) |
|---|---|---|---|---|---|
| O-A | 169 | 54 | 270 | 676 | 0 |
| O-B | 187 | 53 | 265 | 664 | 0 |
| O-C | 199 | 60 | 259 | 648 | 0 |
| O-D | 201 | 63 | 179 | 537 | 258 |
| CUB-A | 169 | 54 | 270 | 193.5 | 0 |
| CUB-B | 187 | 53 | 265 | 189.7 | 0 |
| CUB-C | 199 | 60 | 259 | 184.9 | 0 |
| CUB-D | 201 | 63 | 179 | 171.8 | 258 |
| CUB-A-ØGAC | 169 | 54 | 270 | 203 | 0 |
| CUB-C-ØGAC | 199 | 60 | 259 | 194 | 0 |

[a]fine aggregate denominated Squeegee;
[b]fine aggregate denominated sand;
[c]3/4" coarse aggregate.

TABLE 12

Compositions of Concrete Formulations with Steel slag (BOF-S) and/or GAC.

| Formulation | Coarse Aggregate $(D^d)$ $(kg/m^3)$ | BOF-S-Cu $(kg/m^3)$ | GAC $(kg/m^3)$ | Admixture[e] (L) | Mix Water $(L/m^3)$ |
|---|---|---|---|---|---|
| O-A | 586 | 0 | 0 | 1.03 | 100.4 |
| O-B | 575 | 0 | 0 | 1.06 | 108.0 |
| O-C | 562 | 0 | 0 | 1.12 | 116.6 |
| O-D | 492 | 0 | 0 | 1.21 | 118.8 |
| CUB-A | 586 | 473 | 9.5 | 1.03 | 100.4 |
| CUB-B | 575 | 465 | 9.3 | 1.06 | 108.0 |
| CUB-C | 562 | 454 | 9.1 | 1.12 | 116.6 |
| CUB-D | 492 | 358 | 7.2 | 1.21 | 118.8 |
| CUB-A-0GAC | 586 | 473 | 0 | 1.03 | 100.4 |
| CUB-C-0GAC | 562 | 454 | 0 | 1.12 | 116.6 |

[d] 3/8" coarse aggre gate;
[e] Admixture is BASF Pozzolith 322 N. Ty pe A Water reducer.

The ordinary Portland cement (OPC) concrete cylinders used as described herein were formulated with a water to cementitious materials (w/cm) ratio of 0.45. This ratio was chosen to produce a workable concrete without the need of external vibration energy used in the full-scale manufacturing plant. Water internally sorbed by GAC and BOF-S is not immediately available to cement and thus was not accounted for as mixing water; consequently, it was not considered in the w/cm ratio of design (i.e. (w/cm) eff). GAC particles were saturated 24 h before use in the concrete mixtures. Water associating with GAC and BOF-S, in addition to that participating in initial mixing, is summarized in Table 13 as follows: water associated with GAC and BOF-S as (w/cm) add, and all the water included in the concrete design as (w/cm) total.

TABLE 13

Concrete Formulations with water to cementitious materials ratio (w/cm).

| Formulation | (w/cm) additional | (w/cm) total | (w/cm) effective |
|---|---|---|---|
| O-A | 0.00 | 0.45 | 0.45 |
| O-B | 0.00 | 0.45 | 0.45 |
| O-C | 0.00 | 0.45 | 0.45 |
| O-D | 0.00 | 0.45 | 0.45 |
| CUB-A | 0.10 | 0.55 | 0.45 |
| CUB-B | 0.09 | 0.54 | 0.45 |
| CUB-C | 0.08 | 0.53 | 0.45 |
| CUB-D | 0.06 | 0.51 | 0.45 |
| CUB-A-0GAC | 0.07 | 0.52 | 0.45 |
| CUB-C-0GAC | 0.06 | 0.51 | 0.45 |

Mortar Evaluation (Flowability, Set-Time, and Compressive Strength)

After the curing period, specimens were loaded under a uniaxial compression until failure according to ASTM standard methods. To ensure uniform loading, each cylinder was capped with a sulfur mortar. The load was applied at a loading rate of 0.25 MPa per second in accordance with ASTM C39-16, and the maximum strength of each specimen was recorded. The average of three independent tests was reported as the compressive strength. The flowability of the cement mortar formulations was measured using a standard flow table apparatus according to ASTM C1437-15. The set-times (initial and final) were determined using a standard Vicat needle apparatus (Humboldt, USA) according to ASTM C191-18.

Flowability of Mortar Compositions

Flowability results for cement mortar formulations having 1% and 10% sand replacement with metal-laden GAC particles, equivalent formulations without sorbed metals, and formulations containing 0%, 2%, 3%, and 5% GAC particles without sorbed metals are shown in FIG. 40, while flowability of cement mortar formulations both comprising copper-laden BOF-S and BOF-S without sorbed metals are shown in FIG. 41.

The flowability of mortar formulations decreased (the mixture became stiffer) in response to increasing percentage substitutions with GAC at 3% or higher (FIG. 40). However, no differences with lower replacement percentages were observed when compared to the flow characteristics of the control formulation. Overall, the maximum flowability difference was observed where replacements of 10% GAC were used, wherein a 66% decrease of flowability was observed when compared to the control formulation. No significant flowability differences were apparent between formulations containing 1% GAC, regardless of the presence or absence of biocidal metals. Furthermore, all 1% metal-laden GAC formulations presented the same flowability as the control formulation. When formulations containing 10% GAC replacements were evaluated, the flowability among them was similar, regardless of the presence or absence of metals.

Without wishing to be bound by theory, the decrease in the flowability when increasing the replacement of fine aggregate (Ottawa sand) with GAC particles may be due to microgeometric differences in roundness and sphericity between these two materials. Ottawa sand grains are highly spheroidal, while GAC particles are more angular and with very rough surfaces. Rough angular fine aggregates produce mortar of lower workability than spherical sands for the same water content.

No significant differences were observed with regard to the flowability among the different cement mortar formulations comprising BOF-S substitutions of 5%, 20%, and 40%, regardless of the presence or absence of copper as compared to the corresponding control formulation (0% BOF-S) (FIG. 41). These results differ from related studies, wherein the flowability was found to decrease in response to fine aggregate replacements with increased portions of BOF-S particles. Without wishing to be bound by theory, this behaviour may be attributed to the angular shape of the slag grains used in prior studies. Additionally, there was no compensation for the water sorbed by the steel slag particles. For the flowability studies described herein, the water sorption capacity of the BOF-S particles was considered and additional water was specifically added to compensate for this water demand (3.1% by mass). It does not appear that slag grain shape alone had any significant influence on the workability of the formulations tested here, regardless of the presence or absence of copper.

Setting-Time of Mortar Compositions

The set-times of cement mortars with formulations containing GAC particles in replacement percentages of 1%, 5%, and 10% (by mass) and BOF-S particles in replacement percentages of 5%, 20%, and 40% (by mass), were compared to a control sample and the results are shown in FIG. 42.

It was observed that the initial and final set-times are very similar between the control formulation and the 1% and 5% GAC replacements. In contrast, with a GAC replacement of 10% (by mass) the initial and final set-times significantly decreased when compared to the control (27% and 13% respectively). On the other hand, no significant set-time effects were observed between the control formulation and the formulations containing 5%, 20% and 40% no-copper BOF-S replacements. The kinetics of early hydration may be influenced by the presence of antimicrobial aggregates (FIGS. 43A-43D).

Compressive Strength of GAC Mortar Formulations

Compressive strengths of cement mortar samples having varied GAC composition percentages (e.g. 0%, 1%, 2%, 3%, 5%, and 10%) and curing periods (e.g. 7, 28, and 240 days), without sorbed metals, are shown in FIG. 45. In contrast, compressive strengths of cement mortar samples having varied GAC composition percentages (e.g. 1% and 10%) and curing period of 28 days, with sorbed metals (e.g. Cu and Cu/Co), are shown in FIG. 46.

The compressive strength results indicate that substitution of a portion of the fine aggregate (<3% by mass) with GAC grains without sorbed metals may significantly increase the compressive strength of mortar formulations (up to 14%), whereas GAC substitutions exceeding 5% by mass may decrease the compressive strength.

Compressive strength responses of formulations comprising GAC particles with sorbed biocidal metals (copper and/or cobalt) were compared to otherwise identical GAC substitutions in the absence of such metals, in a range between 1% and 10% by the fine aggregate mass replaced. Results were compared using analysis of variance (ANOVA), and the incorporation of biocidal metals with GAC particles did not have a significant effect on the compressive strength response (p=0.638).

Without wishing to be bound by theory, the compressive strength observed for these formulations may be attributed to the fact that GAC is hygroscopic, porous material, that may enhance cement hydration reactions via a sustained internal curing mechanism that locally liberates sequestered interstitial water in response to cement hydration demand, while the Ottawa sand which it replaces is chemically and physical inert. Under otherwise identical formulation conditions, GAC may act as a distributed network of micro-reservoirs that deliver water in response to the progression of the curing process. The phenomenon is consistent with an internal curing effect associated with the water (de)sorption behaviour of GAC, similar to the reaction of common lightweight aggregates used in concrete. Beyond a fine aggregate replacement threshold of approximately 3%, it may be the case that internal curing enhancements conferred by hydrated GAC particles may compensate for a concomitant decrease in the intrinsic compressive strength which results from replacing a silica sand grain with a GAC particle. Another property that may have influenced the compressive strength response is the GAC particle shape, as it is well known that rough angular particles could lead to improvements in the strength of cementitious materials due to better "interlocking" interactions between particles and the cement paste when compared with more rounded sand particles.

Compressive Strength of BOF-S Mortar Formulations

Compressive strengths of cement mortar samples having varied BOF-S composition percentages (e.g. 0%, 5%, 20%, and 40%) and curing periods (e.g. 7, 28, and 240 days), with and without sorbed metals, are shown in FIG. 47.

Experimental results were compared using analysis of variance (ANOVA), and results indicated that replacements of fine aggregate with similarly sized BOF-S particles have no significant effect on compressive strength responses when compared to a control formulation (p=0.409). Likewise, the use of copper-laden BOF-S particles does not show significant impact on compressive strength behavior when compared to formulations using the same replacement ratios of BOF-S (p=0.473).

Compressive Strength of GAC and BOF-S Concrete Formulations

The compressive strength of the concrete cylinders (FIGS. 48A-48C) prepared as described herein and the results have been provided in FIG. 49. These results indicate that the respective replacement of the fine aggregate by 50% and 1% (by mass) with similarly sized copper-laden BOF-S and GAC particles, led to a modest reduction in the compressive strength of the concrete when compared to reference formulations.

When the percentage of BOF-S aggregates (fine or coarse) in concrete formulations is higher than 30% by mass, the compressive strength response of the concrete may decrease. Compressive strength increases when coarse aggregate was replaced up to 30%, remains the same with 40% BOF-S replacements, and can decrease with 50% replacements, as compared to the reference formulation (0% BOF-S). In various embodiments, the cementitious composition has the fine aggregate replaced by BOF-S particles, with between 15-30% mass replacement ratios as the compressive strength improved between 10% and 30%; while with replacements of 50% (steel slag) it was found that the compressive strength decreased when compared to a control mix at the different ages tested (28, 90, and 180 days).

However, GAC substitutions in mortar have shown an increase in the compressive strength response (FIG. 50) and tensile strength (FIG. 51) for replacements of fine aggregate with GAC up to 3% and 3.5%, for compressive strength and tensile strength, respectively.

The inclusion of 1% GAC particles improves the compressive strength of cementitious materials rather than to decrease it. It was observed that formulations containing 1% GAC, the compressive strength was lower when compared to the formulation containing only 50% BOF-S substitutions but also to the reference formulation. Without wishing to be bound by theory, this behavior may be a result of GAC particles interacting with the chemical water-reducing admixture (BASF Pozoolith 322), thereby sorbing it from the mixing water and minimizing its plasticizer effect. Important to note here that the effective (w/cm) used for these formulations was adjusted for workability (i.e., 0.45), so any inhibition of the chemical admixture may have compromised the subsequent mixing and hydration of cement.

Moreover, the copper present in the BOF-S particles has been demonstrated to delay the hydration of mixtures containing 40% BOF-S replacements. The cumulative heat flow emitted during the first 7 days of curing, was not significantly different than the reference formulation, suggesting that the combination of components is not affecting the overall hydration process. However, the effect that this copper may have had on the efficiency of the chemical admixture (i.e., plasticizer) remains unknown.

As mentioned elsewhere herein, replacement of fine aggregate with hydrated GAC particles in the range of 1% and 3% (by mass) using a sand-to-cement ratio (s/c) of 2.10, increased the compressive strength of mortar after 28 days of curing when compared to otherwise identical mortar, not including GAC. The maximum compressive strength response was observed for 1% GAC replacements with an increase of up to 13.9% when compared to an identical formulation with no GAC (FIG. 50). Furthermore, regardless of the presence or absence of copper, replacement of fine aggregate BOF-S particles, in the range of 5% and 40% did not significantly affect compressive strength responses after 7, 28, and 240 days of curing.

Thus, the compressive strength of full-scale precast concrete compositions comprising metal-laden 40% BOF-S (Cu) and metal-laden 1% GAC-Acid (Cu+Co) were evaluated with respect to control concrete compositions and control concrete compositions lacking GAC fine aggregate replacement after 7 and 29 or 34 days of curing (FIG. 52). Favorable results were observed with respect to compressive strength for the concrete composition wherein the fine aggregate comprises 1% GAC-Acid (Cu+Co), 40% steel slag (BOF-S), and 59% sand.

Other Embodiments

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

Enumerated Embodiments

The following enumerated embodiments are provided, the numbering of which is not to be construed as designating levels of importance.

Embodiment 1 provides a composition comprising:
a cementitious substrate and at least one fine aggregate associated with at least one heavy metal,
wherein the fine aggregate is present throughout the composition and comprises at least one of granular activated carbon (GAC), steel slag, or a combination thereof.

Embodiment 2 provides the composition of Embodiment 1, wherein the GAC comprises at least one of unmodified GAC and surface area-modified granular activated carbon (GAC-Acid).

Embodiment 3 provides the composition of any of Embodiments 1-2, wherein the GAC comprises at least one heavy metal.

Embodiment 4 provides the composition of any of Embodiments 1-3, wherein the at least one heavy metal is selected from the group consisting of cadmium (Cd), chromium (Cr), zinc (Zn), copper (Cu), silver (Ag), nickel (Ni), cobalt (Co), lead (Pb), molybdenum (Mo), and tungsten (W).

Embodiment 5 provides the composition of any of Embodiments 1-4, wherein the at least one heavy metal is selected from the group consisting of Cu and Co.

Embodiment 6 provides the composition of any of Embodiments 1-5, wherein the GAC comprises either:
(a) Cu having a concentration of about 10 to about 20 mg Cu/g GAC; or
(b) Cu having a concentration of about 5 to about 15 mg Cu/g GAC and Co having a concentration of about 0.01 to about 10 mg Co/g GAC.

Embodiment 7 provides the composition of any of Embodiments 1-6, wherein the GAC comprises about 1 to about 10% (w/w) of the fine aggregate.

Embodiment 8 provides the composition of any of Embodiments 1-7, wherein the GAC comprises 1% (w/w) of the fine aggregate.

Embodiment 9 provides the composition of any of Embodiments 1-8, wherein the steel slag is basic oxygen furnace slag (BOF-S).

Embodiment 10 provides the composition of any of Embodiments 1-9, wherein the steel slag comprises at least one heavy metal.

Embodiment 11 provides the composition of any of Embodiments 1-10, wherein the at least one heavy metal is selected from the group consisting of cadmium (Cd), chromium (Cr), zinc (Zn), copper (Cu), silver (Ag), nickel (Ni), cobalt (Co), lead (Pb), molybdenum (Mo), and tungsten (W).

Embodiment 12 provides the composition of any of Embodiments 1-11, wherein the at least one heavy metal is selected from the group consisting of Cu and Co.

Embodiment 13 provides the composition of any of Embodiments 1-12, wherein the steel slag comprises either:
(a) Cu having a concentration of about 17 to about 19 mg Cu/g steel slag; or
(b) Cu having a concentration of about 16 to about 18 mg Cu/g steel slag and Co having a concentration of about 5 to about 10 mg Co/g steel slag.

Embodiment 14 provides the composition of any of Embodiments 1-13, wherein the steel slag comprises about 5 to about 50% (w/w) of the fine aggregate.

Embodiment 15 provides the composition of any of Embodiments 1-14, wherein the steel slag comprises 40% (w/w) of the fine aggregate.

Embodiment 16 provides the composition of any of Embodiments 1-15, wherein fine aggregate further comprises sand.

Embodiment 17 provides the composition of Embodiment 16, wherein the sand is Ottawa sand.

Embodiment 18 provides the composition of any of Embodiments 16-17, wherein the sand comprises about 40 to about 60% (w/w) of the fine aggregate.

Embodiment 19 provides the composition of any of Embodiments 1-18, wherein:
(a) the GAC comprises GAC-Acid, wherein:
the GAC-Acid is associated with Cu and Co,
wherein the concentration of Cu is about 8.3 mg Cu/g GAC and the concentration of Co is about 0.03 mg Co/g GAC; and
the GAC-Acid comprises about 1% (w/w) of the fine aggregate;
(b) the steel slag comprises BOF-S, wherein:
the BOF-S is associated with Cu,
wherein the concentration of Cu is about 17.9 mg Cu/g steel slag;
and
the BOF-S comprises about 40% (w/w) of the fine aggregate; and
(c) the fine aggregate further comprises sand, wherein:
the sand is Ottawa sand; and
the sand comprises about 59% (w/w) of the fine aggregate.

Embodiment 20 provides the composition of any of Embodiments 1-18, wherein the at least one heavy metal comprises two heavy metals having a ratio ranging from about 1:1 to about 3:1 (w/w).

Embodiment 21 provides a cementitious structure comprising the composition of any of Embodiments 1-20.

Embodiment 22 provides the structure of Embodiment 21, wherein the cementitious structure comprises a cementitious material selected from the group consisting of concrete, mortar, stucco, tile grout, and thin-set adhesive.

Embodiment 23 provides the structure of any of Embodiments 21-22, wherein the structure has a greater corrosion-resistance and a greater strength as compared to a cementitious structure that does not comprise the composition.

Embodiment 24 provides the composition of any of Embodiments 1-20, wherein the composition makes bio-available at least a portion of the at least one heavy metal upon contact with an environment having a pH of about 5 or less.

Embodiment 25 provides the composition of Embodiment 24, wherein the bioavailability of the at least one heavy metal reduces or inhibits the growth of acidophilic bacteria within the composition.

Embodiment 26 provides the composition of Embodiment 25, wherein the acidophilic bacteria comprises *Acidithiobacillus thiooxidans* and/or *Acidithiobacillus ferrooxidans*.

Embodiment 27 provides the composition of any of Embodiments 1-20 and 24-26, wherein the composition is a coating applied to a cementitious structure.

Embodiment 28 provides the composition of any of Embodiments 1-20 and 24-27, which comprises at least one selected from the group consisting of cement, shotcrete, and concrete.

Embodiment 29 provides the composition of any of Embodiments 1-20 and 24-28, wherein the cementitious substrate comprises a non-hydraulic cement or a hydraulic cement.

Embodiment 30 provides a method of protecting a cementitious material from microbially induced corrosion, the method comprising:
contacting at least a portion of the cementitious material with the composition of any of Embodiments 1-20 and 24-29, thereby protecting the cementitious material from microbially induced corrosion.

Embodiment 31 provides the method of Embodiment 30, wherein the contacting comprises coating at least a portion of a surface of a structure comprising the cementitious material.

Embodiment 32 provides the method of Embodiment 30, wherein the contacting comprises incorporating the composition in the at least a portion of the cementitious material.

Embodiment 33 provides the method of any of Embodiments 30-32, wherein the cementitious material is selected from the group consisting of concrete, mortar, stucco, tile grout, and thin-set adhesive.

Embodiment 34 provides the method of Embodiment 31, wherein the structure is selected from the group consisting of manholes, wet wells, pump stations, pipes, clarifiers, and channels.

Embodiment 35 provides a kit comprising the composition of any of Embodiments 1-20 and 24-29, and an instructional material, wherein the instructional material comprises instructions for using the composition of the invention to build corrosion-resistant cementitious structures.

Embodiment 36 provides a method of preparing a cementitious composition, the method comprising:
providing a homogenous cement aggregate mixture comprising:
a first fine aggregate;
at least one second fine aggregate;
cement; and
at least one heavy metal;
wherein the first fine aggregate or the at least one second fine aggregate
comprise at least one of GAC, GAC-Acid, and steel slag;
providing a first mixture comprising:
at least one coarse aggregate; and
a liquid-water reducer;
mixing the homogenous cement-aggregate mixture and the first mixture to form the cementitious composition.

Embodiment 37 provides the method of Embodiment 36, wherein providing the homogenous cement aggregate mixture comprises:
mixing the first fine aggregate and the at least one second fine aggregate to provide a fine aggregate mixture;
adding cement to the fine aggregate mixture to provide a fine aggregate cement mixture; and
mixing the fine aggregate cement mixture.

Embodiment 38 provides the method of any of Embodiments 36-37, wherein the liquid-water reducer is dispersed in a volume of water to provide a dispersed admixture solution.

Embodiment 39 provides the method of Embodiment 38, wherein providing the first mixture comprises:
adding about half of the dispersed admixture solution to at least one coarse aggregate to provide a mixture comprising the at least one coarse aggregate and dispersed admixture; and
mixing the mixture.

Embodiment 40 provides the method of any of Embodiments 38-39, wherein mixing the homogenous cement-aggregate mixture and the first mixture comprises:
adding the homogenous fine aggregate cement mixture to the first mixture to provide a second mixture;
adding about half of the dispersed admixture solution to the second mixture to provide a final mixture; and
subjecting the final mixture to a mixing and resting cycle comprising at least two periods of mixing and an intermittent resting period.

Embodiment 41 provides the method of any of Embodiments 36-40, wherein the first fine aggregate is sand.

Embodiment 42 provides the method of any of Embodiments 36-41, wherein the liquid-water reducer comprises about 1.0 to 5.0% (w/w) of 2,2',2"-nitrilothriethanol, about 0.1 to 1.0% (w/w) of 2,2'-iminodiethanol, and about 0.1 to about 1.0% (w/w) of [1,1']-biphenyl-2-ol.

Embodiment 43 provides the method of Embodiment 39, wherein the first mixture is mixed for a period of about 10 seconds.

Embodiment 44 provides the method of Embodiment 40, wherein the mixing and resting cycle comprises mixing for 3 minutes, resting for 3 minutes, and mixing for 2 minutes.

Embodiment 45 provides a composition comprising a cementitious substrate and at least one fine aggregate associated with at least one heavy metal,
wherein the at least one fine aggregate is present throughout the composition and comprises at least one of GAC and steel slag, or any combinations thereof;
prepared by a process comprising:
providing a homogenous cement aggregate mixture comprising:
a first fine aggregate;
at least one second fine aggregate;
cement; and
at least one heavy metal;
wherein the first fine aggregate or the at least one second fine aggregate comprise at least one of GAC, GAC-Acid, and steel slag;
providing a first mixture comprising:
at least one coarse aggregate; and
a liquid-water reducer;
mixing the homogenous cement-aggregate mixture and the first mixture to form the cementitious composition.

Embodiment 46 provides the composition of Embodiment 45, wherein the at least one fine aggregate comprises at least one of GAC and steel slag.

Embodiment 47 provides the composition of Embodiment 46, wherein at least one of:
(a) the GAC comprises at least one of unmodified GAC and GAC-Acid; and
(b) the steel slag comprises BOF-S.

Embodiment 48 provides the composition of any of Embodiments 46-47, wherein at least one of:
(a) the GAC comprises about 1 to about 10% (w/w) of the fine aggregate; and
(b) the steel slag comprises about 5 to about 50% (w/w) of the fine aggregate.

Embodiment 49 provides the composition of any of Embodiments 45-48, wherein the at least one heavy metal is selected from the group consisting of cadmium (Cd), chromium (Cr), zinc (Zn), copper (Cu), silver (Ag), nickel (Ni), cobalt (Co), lead (Pb), molybdenum (Mo), and tungsten (W).

Embodiment 50 provides the composition of any of Embodiments 45-49, wherein the at least one heavy metal is selected from the group consisting of Cu and Co.

Embodiment 51 provides the composition of any of Embodiments 45-50, wherein the GAC comprises either:
(a) Cu having a concentration of about 10 to about 20 mg Cu/g GAC; or
(b) Cu having a concentration of 5 to about 15 mg Cu/g GAC and Co having a concentration of about 0.01 to about 10 mg Co/g GAC.

Embodiment 52 provides the composition of any of Embodiments 45-51, wherein the steel slag comprises either:
(a) the steel slag comprises Cu having a concentration of about 17 to about 19 mg Cu/g steel slag; or
(b) the steel slag comprises Cu having a concentration of about 16 to about 18 mg Cu/g steel slag and Co having a concentration of about 5 to about 10 mg Co/g steel slag.

Embodiment 53 provides the composition of any of Embodiments 45-52, wherein:
(a) the GAC comprises GAC-Acid, wherein:
the GAC-Acid is associated with Cu and Co,
wherein the concentration of Cu is about 8.3 mg Cu/g GAC and the concentration of Co is about 0.03 mg Co/g GAC; and
the GAC-Acid comprises about 1% (w/w) of the fine aggregate;
(b) the steel slag comprises BOF-S, wherein:
the BOF-S is associated with Cu,
wherein the concentration of Cu is about 17.9 mg Cu/g steel slag;
and
the BOF-S comprises about 40% (w/w) of the fine aggregate; and
(c) the fine aggregate further comprises sand, wherein:
the sand is Ottawa sand; and
the sand comprises about 59% (w/w) of the fine aggregate.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A composition comprising:
a cementitious substrate and at least one fine aggregate associated with at least one heavy metal selected from the group consisting of cadmium (Cd), zinc (Zn), copper (Cu), silver (Ag), cobalt (Co), lead (Pb), molybdenum (Mo), and tungsten (W),
wherein the fine aggregate is present throughout the composition and comprises at least one of granular activated carbon (GAC), steel slag, or a combination thereof,
wherein the steel slag comprises about 20% to about 45% (w/w) of the fine aggregate; and
wherein the fine aggregate further comprises sand in an amount of about 40 to about 60% (w/w) of the fine aggregate.

2. The composition of claim 1, wherein at least one of the following applies:
i the GAC comprises at least one of unmodified GAC and surface area-modified granular activated carbon (GAC-Acid);
ii) the GAC comprises at least one heavy metal selected from the group consisting of cadmium (Cd), zinc (Zn), copper (Cu), silver (Ag), cobalt (Co), lead (Pb), molybdenum (Mo), and tungsten (W);
iii) the GAC comprises about 1 to about 10% (w/w) of the fine aggregate;
iv) the GAC comprises either:
(a) Cu having a concentration of about 10 to about 20 mg Cu/g GAC; or
(b) Cu having a concentration of about 5 to about 15 mg Cu/g GAC and Co having a concentration of about 0.01 to about 10 mg Co/g GAC.

3. The composition of claim 1, wherein the steel slag comprises at least one heavy metal selected from the group consisting of cadmium (Cd), zinc (Zn), copper (Cu), silver (Ag), cobalt (Co), lead (Pb), molybdenum (Mo), and tungsten (W).

4. The composition of claim 3, wherein the steel slag comprises either:
(a) Cu having a concentration of about 17 to about 19 mg Cu/g steel slag; or
(b) Cu having a concentration of about 16 to about 18 mg Cu/g steel slag and Co having a concentration of about 5 to about 10 mg Co/g steel slag.

5. The composition of claim 1, wherein the steel slag comprise about 40% (w/w) of the fine aggregate.

6. The composition of claim 1, wherein:
(a) the GAC comprises GAC-Acid, wherein:
  the GAC-Acid is associated with Cu and Co,
    wherein the concentration of Cu is about 8.3 mg Cu/g GAC and
  the concentration of Co is about 0.03 mg Co/g GAC; and
  the GAC-Acid comprises about 1% (w/w) of the fine aggregate;
(b) the steel slag comprises BOF-S, wherein:
  the BOF-S is associated with Cu,
    wherein the concentration of Cu is about 17.9 mg Cu/g steel slag; and
  the BOF-S comprises about 40% (w/w) of the fine aggregate; and
(c) the fine aggregate further comprises sand, wherein:
  the sand is Ottawa sand; and
  the sand comprises about 59% (w/w) of the fine aggregate.

7. The composition of claim 1, wherein the at least one heavy metal comprises two heavy metals having a ratio ranging from about 1:1 to about 3:1 (w/w).

8. The composition of claim 1, wherein the composition makes bioavailable at least a portion of the at least one heavy metal upon contact with an environment having a pH of about 5 or less.

9. The composition of claim 8, wherein the bioavailability of the at least one heavy metal reduces or inhibits the growth of an acidophilic bacterium within the composition, wherein the acidophilic bacterium comprises *Acidithiobacillus thiooxidans* or *Acidithiobacillus ferrooxidans*.

10. The composition of claim 1, wherein the cementitious substrate comprises a non-hydraulic cement or a hydraulic cement.

* * * * *